(12) United States Patent
Ueno et al.

(10) Patent No.: US 11,165,904 B2
(45) Date of Patent: Nov. 2, 2021

(54) ELECTRONIC APPARATUS, CONTROL DEVICE, COMPUTER-READABLE NON-TRANSITORY STORAGE MEDIUM, AND OPERATION METHOD OF ELECTRONIC APPARATUS

(71) Applicant: KYOCERA Corporation, Kyoto (JP)

(72) Inventors: Yasuhiro Ueno, Yokohama (JP); Shigeki Tanabe, Yokohama (JP); Hideki Morita, Yokohama (JP); Isao Masuike, Machida (JP); Koutaro Yamauchi, Yokohama (JP); Manabu Sakuma, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 274 days.

(21) Appl. No.: 16/416,301

(22) Filed: May 20, 2019

(65) Prior Publication Data
US 2019/0273817 A1 Sep. 5, 2019

Related U.S. Application Data

(63) Continuation of application No. PCT/JP2017/040857, filed on Nov. 14, 2017.

(30) Foreign Application Priority Data

Nov. 22, 2016 (JP) .............................. JP2016-226612
Dec. 26, 2016 (JP) .............................. JP2016-250849
Dec. 26, 2016 (JP) .............................. JP2016-250922

(51) Int. Cl.
*H04M 1/72454* (2021.01)
*H04W 4/48* (2018.01)
(Continued)

(52) U.S. Cl.
CPC ........ *H04M 1/72454* (2021.01); *G05B 19/07* (2013.01); *G06F 3/01* (2013.01);
(Continued)

(58) Field of Classification Search
CPC .... H04M 1/72454; H04M 1/00; H04M 11/00; H04M 2250/12; G05B 19/17;
(Continued)

(56) References Cited

U.S. PATENT DOCUMENTS 11,012,667 B1 * 5/2021 Nodder ................ H04N 5/2253
2012/0095671 A1 4/2012 Matsumura et al.
(Continued)

FOREIGN PATENT DOCUMENTS

JP 2004062381 A 2/2004
JP 2005149231 A 6/2005
(Continued)

*Primary Examiner* — Tai T Nguyen
(74) *Attorney, Agent, or Firm* — Studebaker & Brackett PC

(57) ABSTRACT

Provided is an electronic apparatus including an in-vehicle determiner, and a notification determiner. An in-vehicle determiner executes in-vehicle determination in which whether a first user being a user of the electronic apparatus is present in a vehicle. A notification determiner executes a determination process in which whether the electronic apparatus notifies outside the electronic apparatus based on a result of the in-vehicle determination.

18 Claims, 44 Drawing Sheets

(51) Int. Cl.
*G05B 19/07* (2006.01)
*G06F 3/01* (2006.01)
*H04B 1/3822* (2015.01)
*H04W 4/02* (2018.01)
*H04M 1/00* (2006.01)
*H04W 64/00* (2009.01)
*H04M 11/00* (2006.01)

(52) U.S. Cl.
CPC ............ *H04B 1/3822* (2013.01); *H04M 1/00* (2013.01); *H04W 4/027* (2013.01); *H04W 4/48* (2018.02); *H04W 64/00* (2013.01); *G05B 2219/37124* (2013.01); *H04M 11/00* (2013.01); *H04M 2250/12* (2013.01)

(58) Field of Classification Search
CPC ......... G05B 19/07; G05B 2219/37124; H04W 64/00; H04W 4/48; H04W 4/027; G06F 3/01; H04B 1/3822; G08G 1/166; G08G 1/005; B60Q 1/46; B60Q 9/008; B60Q 1/525; G08B 21/22
USPC ................... 701/36; 340/517, 521, 540, 541, 340/903–907, 995.1
See application file for complete search history.

(56) References Cited

U.S. PATENT DOCUMENTS

| | | | |
|---|---|---|---|
| 2013/0271275 A1* | 10/2013 | Schalk | G08G 1/0962 340/438 |
| 2015/0294568 A1 | 10/2015 | Shibata | |
| 2016/0159279 A1 | 6/2016 | Mori et al. | |
| 2016/0205238 A1* | 7/2016 | Abramson | G08G 1/0137 455/456.4 |
| 2016/0306338 A1 | 10/2016 | Morita | |
| 2016/0351049 A1 | 12/2016 | Hamada et al. | |
| 2017/0254829 A1 | 9/2017 | Tanabe et al. | |
| 2018/0290627 A1* | 10/2018 | Hariri | B60R 25/245 |
| 2020/0047668 A1* | 2/2020 | Ueno | B60W 50/14 |

FOREIGN PATENT DOCUMENTS

| | | |
|---|---|---|
| JP | 2006268081 A | 10/2006 |
| JP | 2012199781 A | 10/2012 |
| JP | 2013243584 A | 12/2013 |
| JP | 2015203948 A | 11/2015 |
| JP | 2016048830 A | 4/2016 |
| JP | 2016107792 A | 6/2016 |
| WO | 2010/100743 A1 | 9/2010 |
| WO | 2015/064662 A1 | 5/2015 |
| WO | 2015/122406 A1 | 8/2015 |

* cited by examiner

F I G . 4
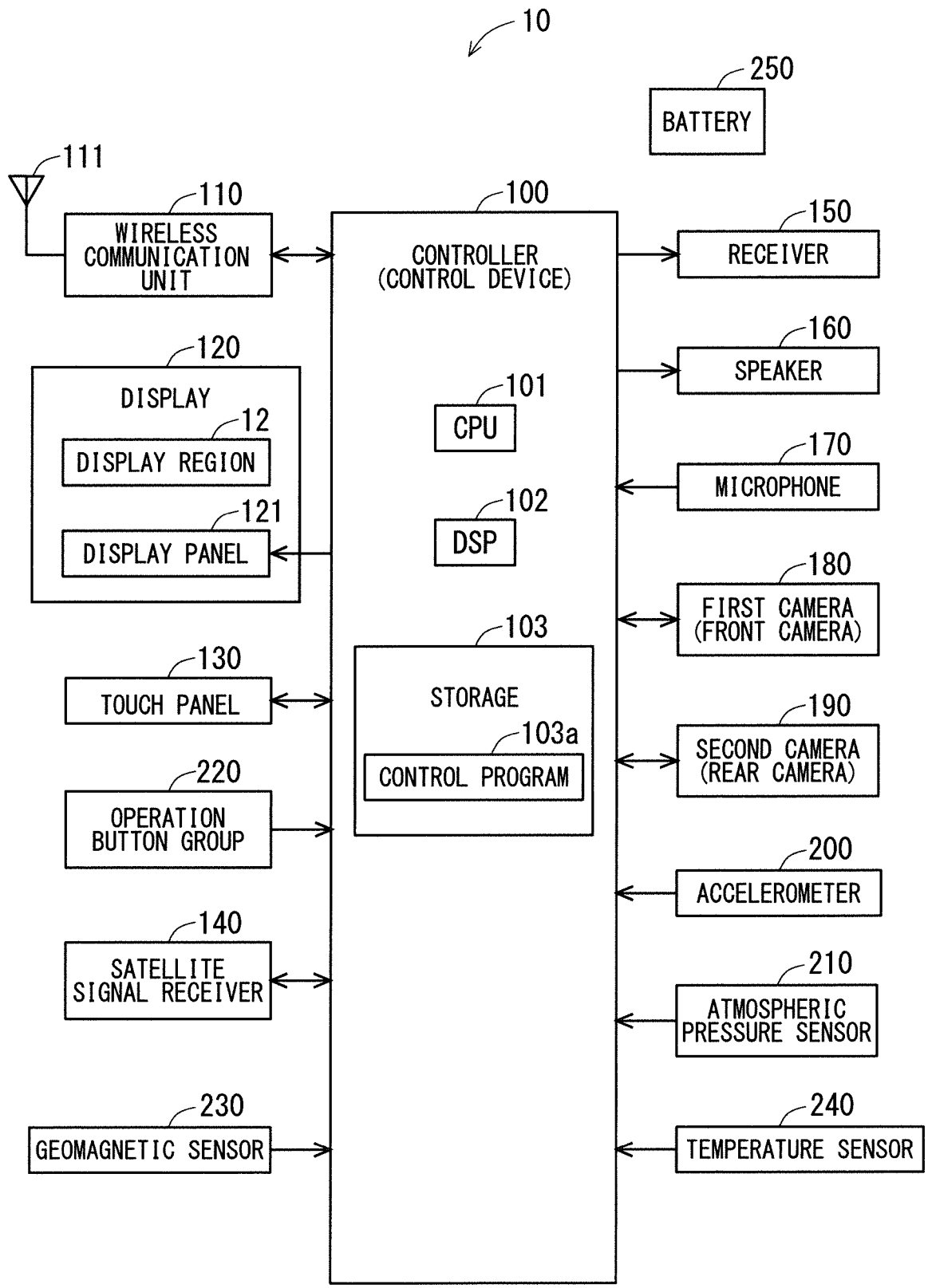

F I G. 5
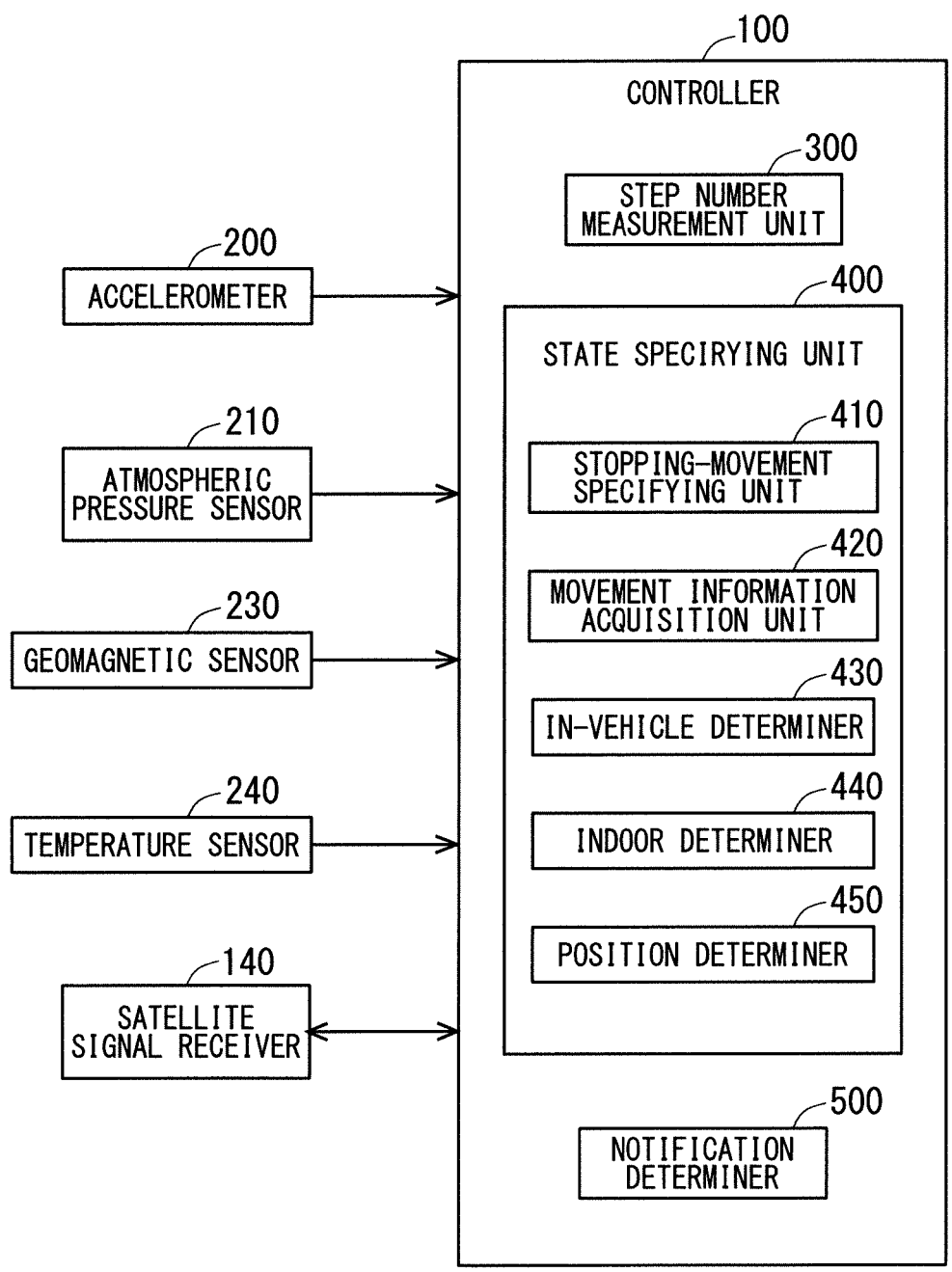

F I G . 1 4
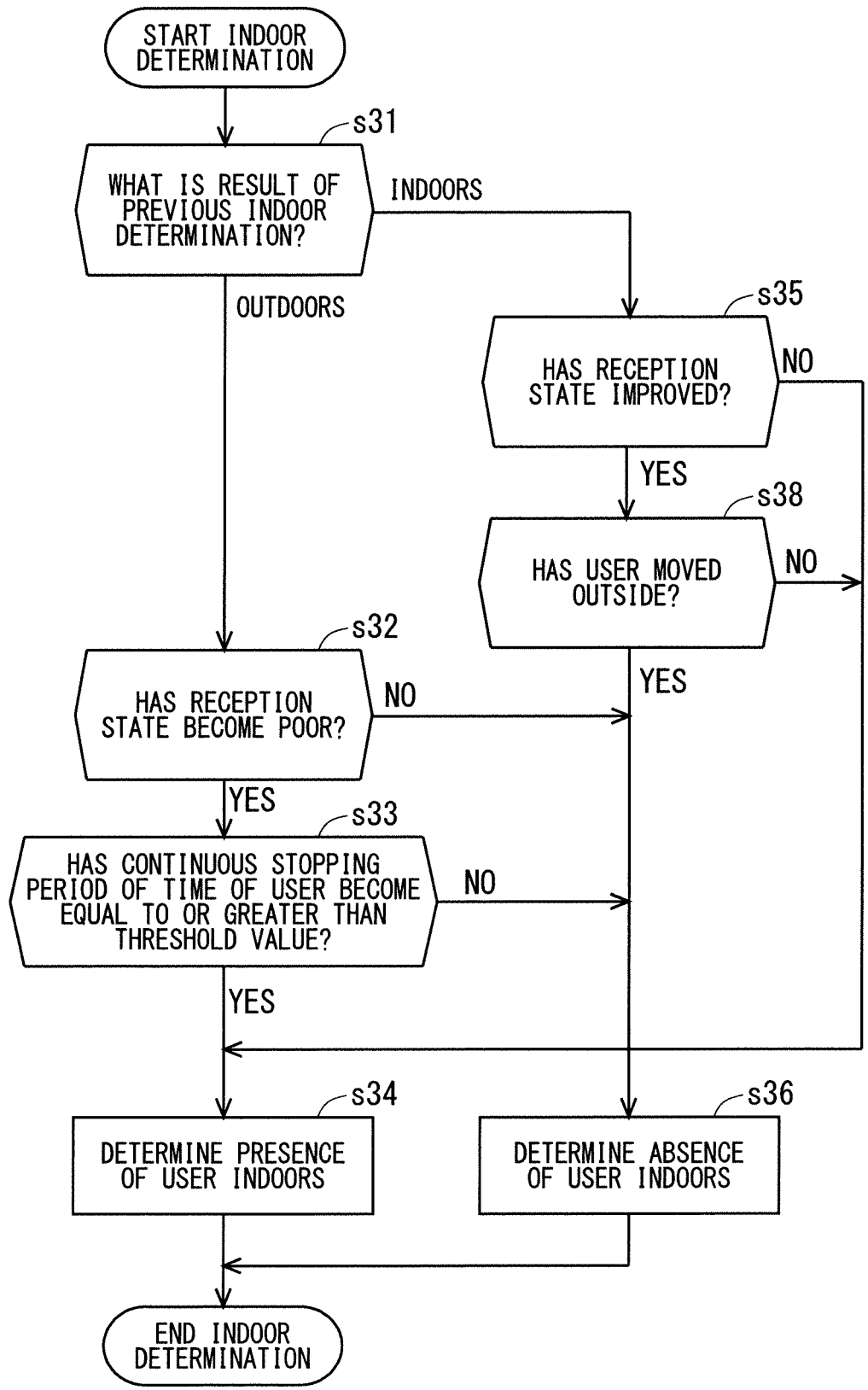

F I G . 1 6
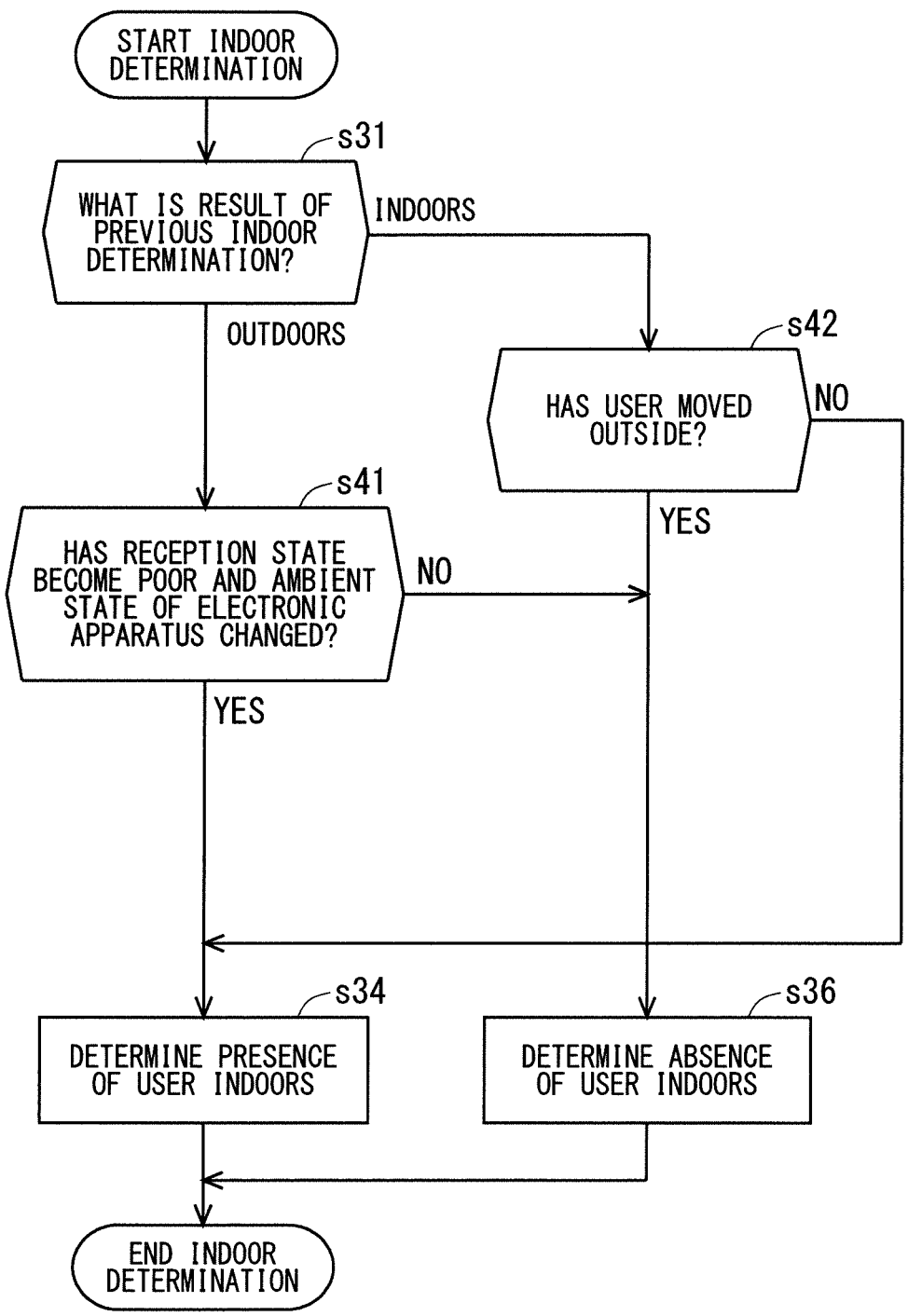

| TIME ZONE | STAY-IN HOME RATIO | |
|---|---|---|
| | WEEKDAY | DAY-OFF |
| 12:00 A.M. TO 3:00 A.M | 90% | 90% |
| 3:00 A.M. TO 6:00 A.M | 80% | 90% |
| 6:00 A.M. TO 9:00 A.M | 30% | 70% |
| 9:00 A.M. TO 12:00 P.M | 10% | 40% |
| 12:00 P.M. TO 3:00 P.M | 10% | 30% |
| 3:00 P.M. TO 6:00 P.M | 10% | 30% |
| 6:00 P.M. TO 9:00 P.M | 40% | 40% |
| 9:00 P.M. TO 12:00 A.M | 70% | 70% |

F I G . 3 1
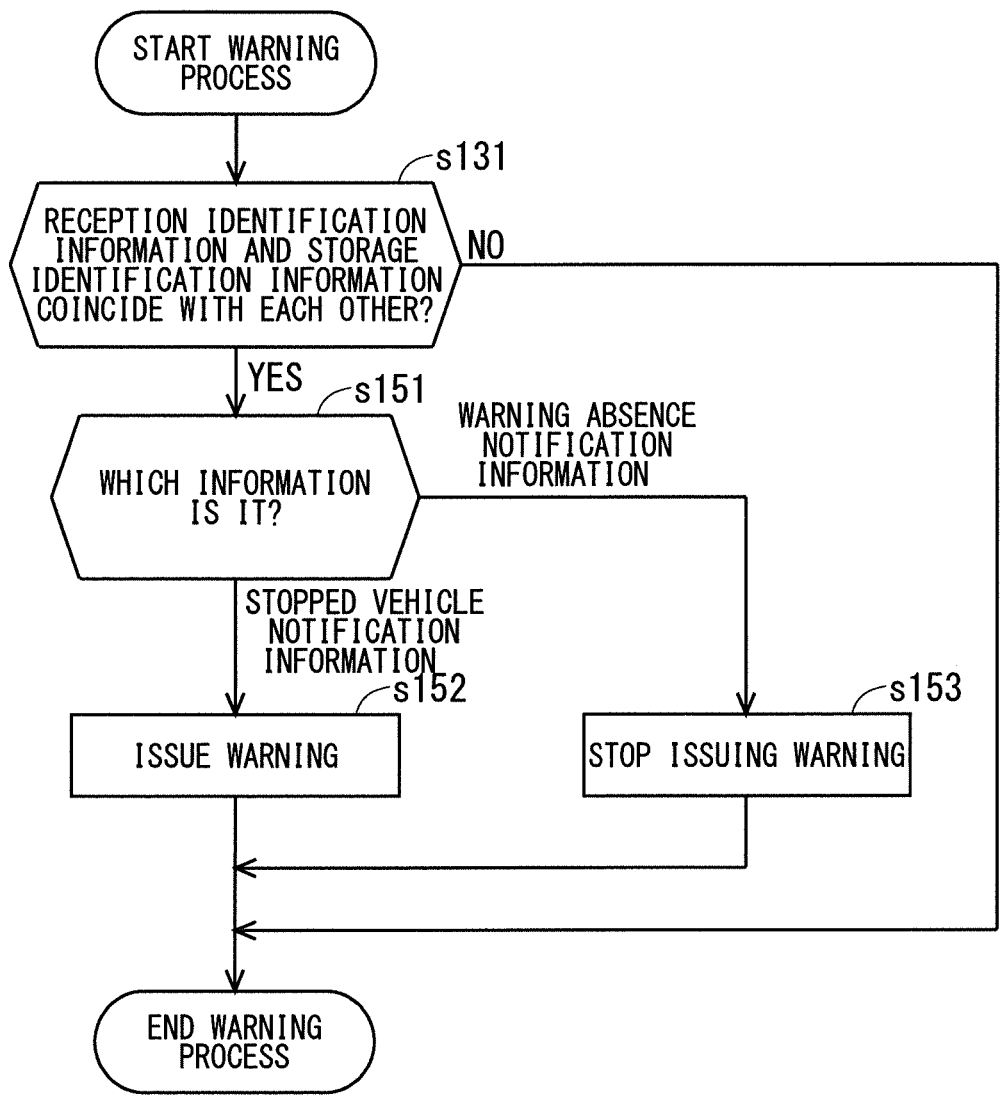

F I G . 3 8
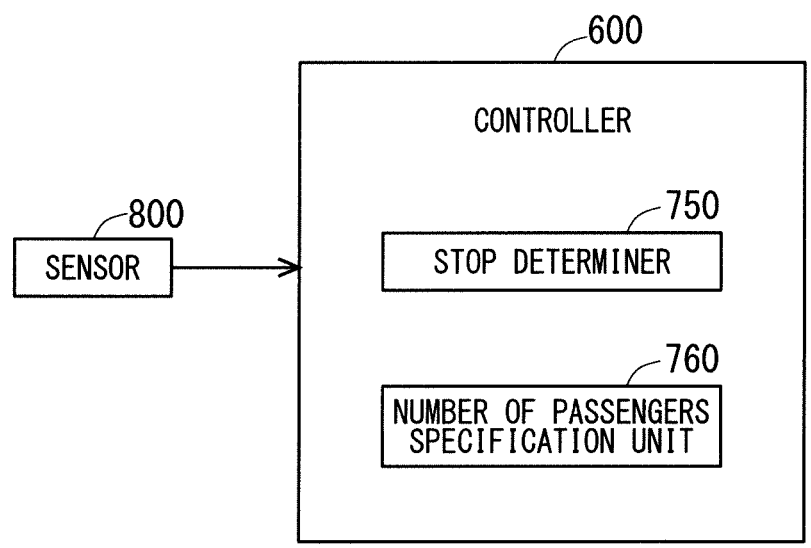

F I G. 5 1
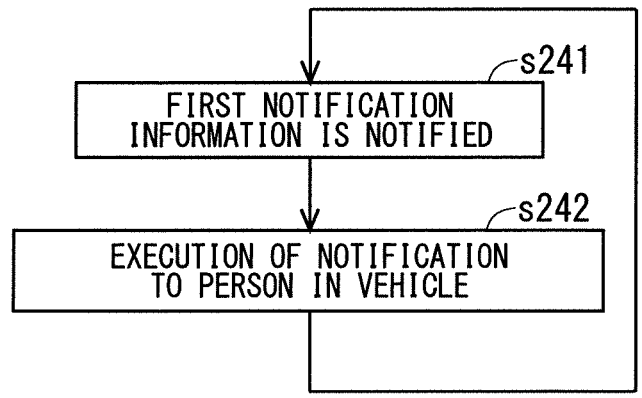

F I G . 5 6
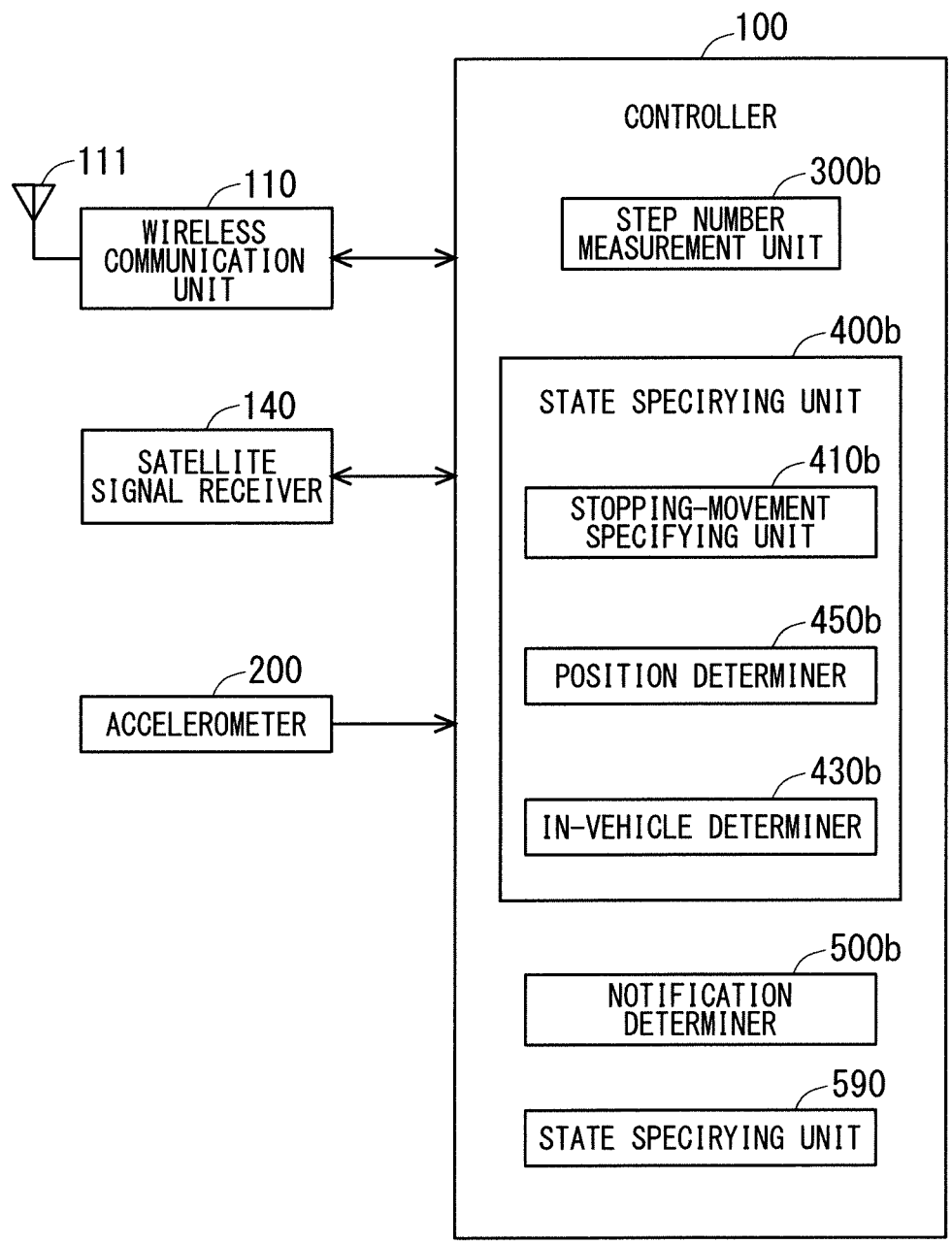

ELECTRONIC APPARATUS, CONTROL DEVICE, COMPUTER-READABLE NON-TRANSITORY STORAGE MEDIUM, AND OPERATION METHOD OF ELECTRONIC APPARATUS

CROSS-REFERENCE TO RELATED APPLICATION

The present application is a continuation based on PCT Application No. PCT/JP2017/040857 filed on Nov. 14, 2017, which claims the benefit of Japanese Application No. 2016-226612, filed on Nov. 22, 2016, Japanese Application No. 2016-250849, filed on Dec. 26, 2016, and Japanese Application No. 2016-250922, filed on Dec. 26, 2016. PCT Application No. PCT/JP2017/040857 is entitled "ELECTRONIC DEVICE, VEHICLE, CONTROL DEVICE, CONTROL PROGRAM, AND OPERATION METHOD OF ELECTRONIC DEVICE", and all Japanese Application No. 2016-226612, No. 2016-250849, and No. 2016-250922, are entitled "ELECTRONIC DEVICE, VEHICLE, CONTROL DEVICE, CONTROL PROGRAM, AND OPERATION METHOD OF ELECTRONIC DEVICE", the content of which are incorporated by reference herein in their entirety.

FIELD

The present disclosure relates to an electronic apparatus.

BACKGROUND

Various techniques relating to electronic apparatuses are proposed.

SUMMARY

An electronic apparatus, a control device, a computer-readable non-transitory storage medium, and an operation method of the electronic apparatus will be disclosed. In an embodiment, the electronic apparatus includes at least one processor. The at least one processor determines whether a first user being a user of the electronic apparatus is present in a vehicle. The at least one processor executes a determination process in which whether the electronic apparatus notifies outside the electronic apparatus based on a result of the in-vehicle determination.

Further, in an embodiment, the control device is included in an electronic apparatus and controls an operation of the electronic apparatus. The control device includes at least one processor. The at least one processor executes in-vehicle determination in which whether a first user being a user of the electronic apparatus is present in a vehicle. The at least one processor determines whether the electronic apparatus notifies outside the electronic apparatus based on a result of the in-vehicle determination.

Further, in an embodiment, the control program is a control program for controlling the electronic apparatus. The control program causes the electronic apparatus to execute a step for executing in-vehicle determination for determining whether a user of the electronic apparatus is present in the vehicle, and a step for executing a determination process for determining whether the electronic apparatus notifies outside the electronic apparatus based on a result of the in-vehicle determination.

Further, in an embodiment, the operation method of the electronic apparatus includes a step for executing in-vehicle determination for determining whether a user of the electronic apparatus is present in the vehicle, and a step for executing a determination process for determining whether the electronic apparatus notifies outside the electronic apparatus based on a result of the in-vehicle determination.

Further, in an embodiment, the electronic apparatus is used in a first vehicle and includes a communication unit and a determiner. A communication unit communicates with an other electronic apparatus in a second vehicle. The determiner determines whether a stopped direction of the first vehicle when the first vehicle is stopped and a traveling direction, which is received by the communication unit, of a traveling vehicle the other electronic apparatus in the traveling vehicle, being the traveling second vehicle, outputs satisfy a predetermined relation, and executes a determination process to determine, when determining that the stopped direction and the traveling direction satisfy the predetermined relation, execution of a first notification to the traveling vehicle.

Further, in an embodiment, the electronic apparatus communicates with an other electronic apparatus being the electronic apparatus above and is used in a vehicle.

Further, in an embodiment, the vehicle is a vehicle that includes the electronic apparatus above.

Further, in an embodiment, the control device is included in the electronic apparatus above and controls an operation of the electronic apparatus.

Further, in an embodiment, the control program is a control program for controlling an operation of the electronic apparatus above.

Further, in an embodiment, the operation method of the electronic apparatus is an operation method of the above-described electronic apparatus.

Further, in an embodiment, the electronic apparatus is used in a vehicle and includes a number of passengers specification unit and a communication unit. The number of passengers specification unit can specify the number of passengers in the stopped vehicle. The communication unit notifies outside the vehicle of the number of passengers specified in the number of passengers specification unit or information corresponding the number of passengers, when the vehicle is stopped.

Further, in an embodiment, the electronic apparatus is used in a vehicle and includes a seat specification unit and at least one processor. The seat specification unit can specify a seat at which a passenger is positioned in the stopped vehicle. The at least one processor determines whether a notification outside the vehicle is made based on a specification result in the seat specification unit, when the vehicle is stopped.

Further, in an embodiment, the electronic apparatus is used in a vehicle and includes a specification unit and at least one processor. The specification unit specifies at least one of a first state in which passengers only children, a second state in which passenger include only elderly persons, and a third state in which passengers include only children and elderly persons in the stopped vehicle. The at least one processor determines execution of a notification outside the vehicle when the specification unit has specified any of the first to third states when the vehicle is stopped.

Further, in an embodiment, the vehicle is a vehicle that includes the electronic apparatus above.

Further, in an embodiment, the control device is included in an electronic apparatus which is used in the vehicle, and controls an operation of the electronic apparatus. The control device specifies the number of passengers in the stopped vehicle and controls the electronic apparatus to notify outside the vehicle of the number of passengers or information corresponding the number of passengers, when the vehicle is stopped.

Further, in an embodiment, the control device is included in an electronic apparatus which is used in the vehicle, and controls an operation of the electronic apparatus. The control device includes a seat determiner, and at least one processor. The seat specification unit can specify a seat at which a passenger is positioned in the stopped vehicle. The at least one processor determines whether a notification outside the vehicle is made based on a specification result in the seat specification unit, when the vehicle is stopped.

Further, in an embodiment, the control device is included in an electronic apparatus which is used in the vehicle, and controls an operation of the electronic apparatus. The control device includes a determiner and at least one processor. The specification unit specifies at least one of a first state in which passengers only children, a second state in which passenger include only elderly persons, and a third state in which passengers include only children and elderly persons in the stopped vehicle. The at least one processor determines execution of a notification outside the vehicle when the specification unit has specified any of the first to third states when the vehicle is stopped.

Further, in an embodiment, the control program is a control program for controlling an operation of the electronic apparatus which is used in a vehicle. The control program causes the electronic apparatus to execute a first step for specifying the number of passengers in the stopped vehicle and a second step for notifying outside the vehicle of the number of passengers or information corresponding to the number of passengers, when the vehicle is stopped.

Further, in an embodiment, the control program is a control program for controlling an operation of the electronic apparatus which is used in a vehicle. The control program causes the electronic apparatus to execute a first step for specifying a seat at which a passenger is positioned in the stopped vehicle and a second Step for determining whether a notification outside the vehicle is made based on a specification result in the first Step, when the stopped vehicle.

Further, in an embodiment, the control program is a control program for controlling an operation of the electronic apparatus which is used in a vehicle. The control program causes the electronic apparatus to executes a first step in which at least one of the states among a first state in which passengers only children, a second state in which passenger include only elderly persons, and a third state in which passengers include only children and elderly persons in the stopped vehicle is specified and a second step in which execution of a notification outside the vehicle is determined when any one of the first to third state is specified in the first step.

Further, in an embodiment, the operation method of the electronic apparatus is an operation method of the electronic apparatus which is used in the vehicle. The operation method of the electronic apparatus includes a first step for specifying the number of passengers in the stopped vehicle and a second step for notifying outside the vehicle of the number of passengers or information corresponding to the number of passengers, when the vehicle is stopped.

Further, in an embodiment, the operation method of the electronic apparatus is an operation method of the electronic apparatus which is used in the vehicle. The operation method of the electronic apparatus includes a first step for specifying a seat at which a passenger is positioned in the stopped vehicle and a second step for determining whether a notification outside the vehicle is made based on a specification result in the first step, when the stopped vehicle.

Further, in an embodiment, the operation method of the electronic apparatus is an operation method of the electronic apparatus which is used in the vehicle. The operation method of the electronic apparatus includes a first step in which at least one of the states among a first state in which passengers only children, a second state in which passenger include only elderly persons, and a third state in which passengers include only children and elderly persons in the stopped vehicle is specified and a second step in which execution of a notification outside the vehicle is determined when any one of the first to third state is specified in the first step.

BRIEF DESCRIPTION OF THE DRAWINGS

FIG. 4 illustrates a block diagram of an example of a configuration of the electronic apparatus.

FIG. 5 illustrates a block diagram of an example of a configuration of a controller.

FIG. 14 illustrates a flowchart showing an example of an operation of the electronic apparatus.

FIG. 16 illustrates a flowchart showing an example of an operation of the electronic apparatus.

FIG. 31 illustrates a flowchart showing an example of an operation of the electronic apparatus.

FIG. 38 illustrates a block diagram of an example of a configuration of the controller.

FIG. 51 illustrates a flowchart showing an example of an operation of the electronic apparatus.

FIG. 56 illustrates a block diagram of an example of a configuration of the electronic apparatus.

DETAILED DESCRIPTION

Figure 1:
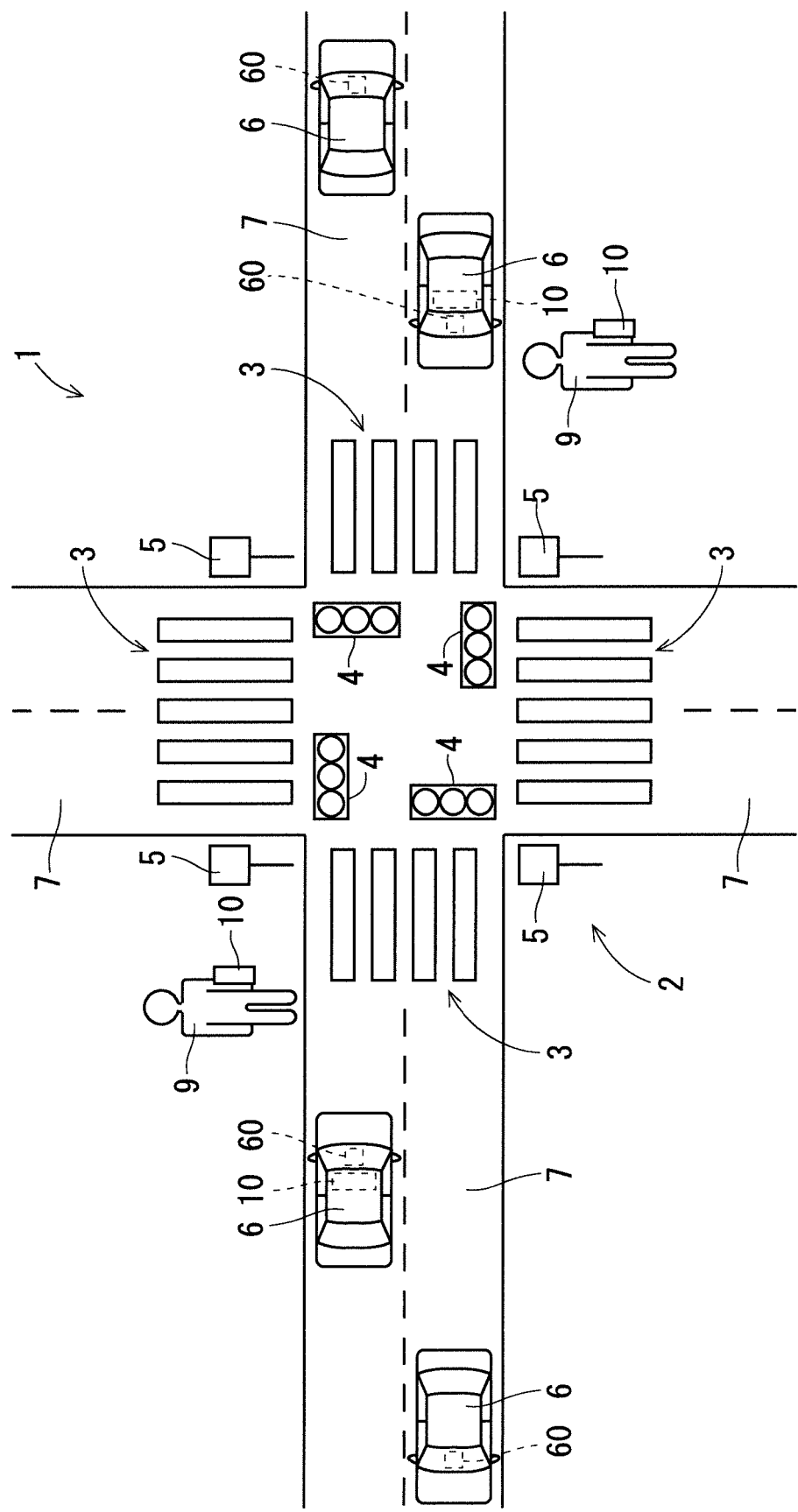
FIG. 1 illustrates an example of a system in which an electronic apparatus is used.

FIG. 1 illustrates an example of a system in which an electronic apparatus 10 is used. The electronic apparatus 10 includes, for example, a cellular phone such as a smartphone. The electronic apparatus 10 is useable, for example, in the Intelligent Transport Systems (ITS). Specifically, the electronic apparatus 10 is useable in the safe driving assistant communication system 1 in ITS. The safe driving assistant communication system 1 is also referred to as safe driving assistant system or safe driving assistant radio system.

As illustrated in FIG. 1, roadside units 5 installed at an intersection 2 or the like, vehicles 6 such as automobiles travelling on a roadway 7, and electronic apparatuses 10 can wirelessly communicate with each other in the safe driving assistant communication system 1. Therefore, the roadside units 5, the vehicles 6, and the electronic apparatuses 10 can exchange information with each other. Also, a plurality of vehicles 6 can wirelessly communicate with each other. Therefore, a plurality of vehicles 6 can exchange information with each other. Communication between the roadside unit 5 and the vehicle 6, communication between the vehicles 6, communication between the roadside unit 5 and the electronic apparatus 10 owned by the pedestrian, and communication between the electronic apparatus 10 owned by the pedestrian and the vehicle 6, are referred to as inter-road vehicle communication, inter-vehicle communication, inter-road pedestrian communication, and inter-pedestrian vehicle communication, respectively.

For example, the roadside unit 5 can notify the vehicle 6 and the electronic apparatus 10 of information on lighting of a traffic light 4 and information on road regulation. Also, the roadside unit 5 can detect the vehicle 6 and the pedestrian presenting in the vicinity thereof. The roadside unit 5 installed at the intersection 2 can detect, for example, a pedestrian crossing a crosswalk 3. And, the roadside unit 5 can notify the vehicle 6 and the electronic apparatus 10 of information on the detected vehicle 6 and pedestrian. Also, the roadside unit 5 can notify the other vehicle 6 and the electronic apparatus 10 of information notified from the vehicle 6 and the electronic apparatus 10.

The vehicle 6 can notify the other vehicle 6, the roadside unit 5, and the electronic apparatus 10 of information on its own turn signal, its own position, its own speed, and the like. For example, the vehicle 6 can notify the roadside unit 5 and the like of various information by an electronic apparatus 60 mounted on the vehicle 6, which is different from the electronic apparatus 10. Further, the vehicle 6 can receive various information notified from the roadside unit 5 or the like by the electronic apparatus 60 mounted on the vehicle 6. The electronic apparatus 60 is, for example, an electronic apparatus in which a satellite navigation device and an audio device including a radio etc. are integrated. Note that, the electronic apparatus 60 may be an individual satellite navigation device apart from the audio device or an individual audio device apart from the satellite navigation device. Further, the electronic apparatus 60 may have a vehicle control function for controlling the lamps and the direction indicator etc. of the vehicle 6. Thereafter, the electronic apparatus 60 may be referred to as "in-vehicle device 60" in some cases.

And the vehicle 6 can assist the safety driving for the driver by notifying the driver of various notifications such as a warning based on information to be notified from the roadside unit 5 or the like. The vehicle 6 can make various notifications for the driver by using a speaker, a display device, and so forth. The vehicle 6 can make various notifications for the driver by using the in-vehicle device 60 mounted on the vehicle 6.

The electronic apparatus 10 may be possessed by a user 9 who is a pedestrian. Further, in the case where the user 9 having the electronic apparatus 10 is present in the vehicle 6, for example, the electronic apparatus 10 may temporarily be in the vehicle 6. The electronic apparatus 10 can specify the state of the user 9 thereof. The electronic apparatus 10 can notify the roadside unit 5 of information on the state of the specified user 9. The operation of the electronic apparatus 10 will be described later in detail.

In this manner, the safety driving for the driver of the vehicle 6 is assisted by executing the inter-road vehicle communication, the inter-vehicle communication, the inter-road pedestrian communication, and the inter-pedestrian vehicle communication in the safe driving assistant communication system 1.

Note that in the example in FIG. 1, automobiles are illustrated as vehicles 6, however, the vehicles 6 may be vehicles other than automobiles. For example, the vehicles 6 may be buses or may be tramcars. Further, the electronic apparatus 10 can also be used in systems other than the safe driving assistant communication system 1.

<Example of Appearance of Electronic Apparatus>

Figure 2:
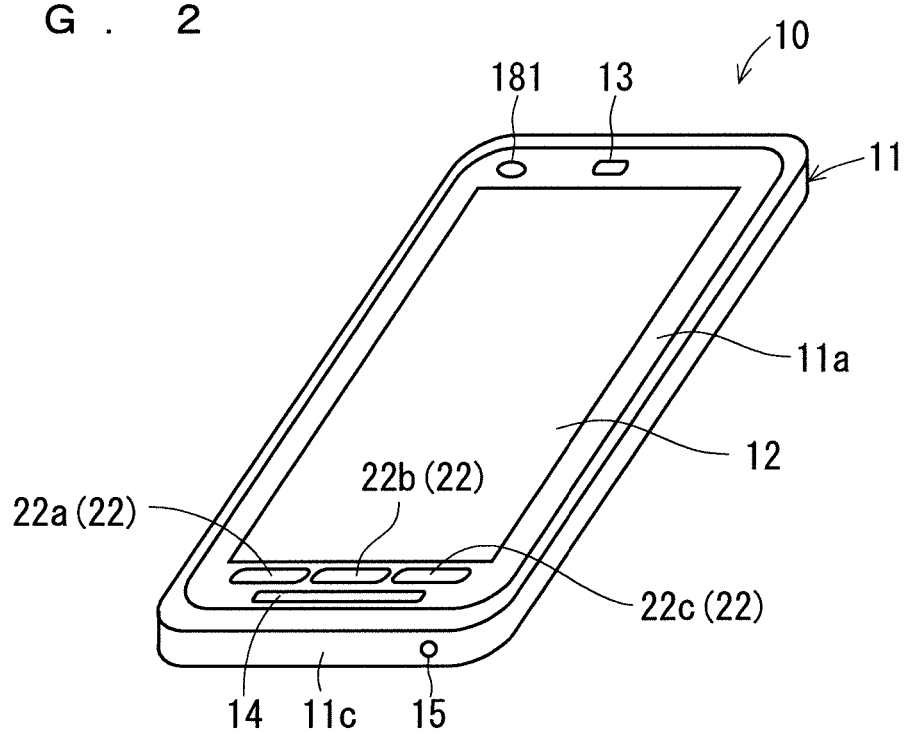
FIG. 2 illustrates a perspective view of an example of the appearance of the electronic apparatus.
Figure 3:
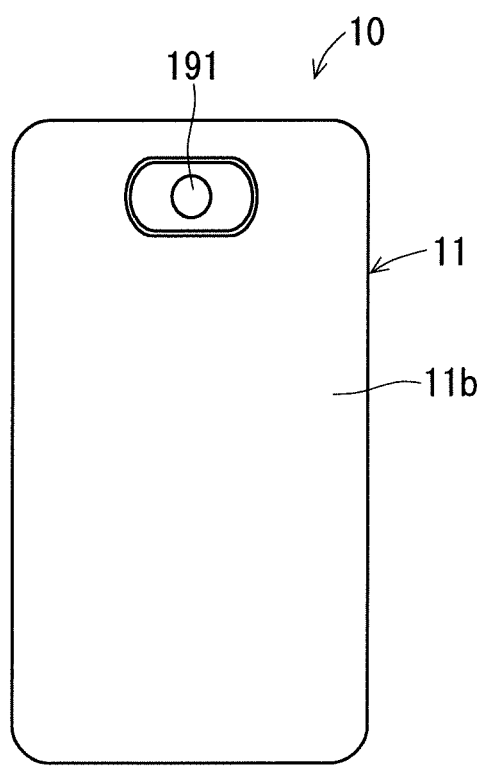
FIG. 3 illustrates a rear view of an example of the appearance of the electronic apparatus.

FIGS. 2 and 3 are a perspective view and a rear view showing an example of the appearance of the electronic apparatus 10, respectively. As illustrated in FIGS. 2 and 3, the electronic apparatus 10 has a plate-like device case 11 having a substantially rectangular shape in plan view. The device case 11 constitutes the exterior of the electronic apparatus 10.

On a front surface 11a of the device case 11, a display region 12 on which various information such as characters, symbols, and graphics are displayed is positioned. A touch panel 130 described later is positioned on the rear surface side of the display region 12. Through which, the user 9 can input the various information into the electronic apparatus 10 by operating the display region 12 on the front surface of the electronic apparatus 10 by a finger and the like. It should be noted that the user 9 can input the various information into the electronic apparatus 10 by operating the display region 12 by an operator including, for example, a pen for touch panel such as a stylus pen, besides a finger.

A receiver hole 13 is positioned on an upper end portion of the front surface 11a of the device case 11. A speaker hole 14 is positioned on a lower end portion of the front surface 11a. A microphone 15 is positioned on a lower side surface 11c of the device case 11.

A lens 181 included in a first camera 180 described later is visible from the upper end portion of the front surface 11a of the device case 11. As illustrated in FIG. 3, a lens 191 included in a second camera 190 described later is visible from an upper end portion of a rear surface 11b of the device case 11.

The electronic apparatus 10 includes an operation button group 220 (see FIG. 4 described later) including a plurality of operation buttons 22. Each operation button 22 is a hardware button, for example. Specifically, each of multiple operation buttons 22 is a push button. It should be noted that, at least one operation button 22 included in the operation button group 220 may be a software button to be displayed on the display region 12.

The operation button group 220 includes operation buttons 22a, 22b, and 22c positioned on the lower end portion of the front surface 11a of the device case 11. Further, the operation button group 220 includes a power button and volume buttons positioned on a front surface of the device case 11.

The operation button 22a is a back button, for example. The back button is an operation button for switching a display of the display region 12 to the previous display. The display of the display region 12 is switched to the previous display by operating the operation button 22a by the user 9. The operation button 22b is a home button, for example. The home button is an operation button for causing the display region 12 to display a home screen. The home screen is displayed on the display region 12 by operating the operation button 22b by the user 9. The operation button 22c is a history button, for example. The history button is an operation button for causing the display region 12 to display the history of an application executed in the electronic apparatus 10. The history of an application executed in the electronic apparatus 10 is displayed on the display region 12 by operating the operation button 22c by the user 9.

Next, various embodiments of the electronic apparatus 10 and the like will be described in detail.

First Embodiment

<Example of Electric Structure of Electronic Apparatus>

FIG. 4 illustrates a block diagram showing an example of an electric structure of the electronic apparatus 10. As illustrated in FIG. 4, the electronic apparatus 10 includes a controller 100, a wireless communication unit 110, a display 120, a touch panel 130, an operation button group 220, a satellite signal receiver 140, and a geomagnetic sensor 230. The electronic apparatus 10 further includes a receiver 150, a speaker 160, a microphone 170, a first camera 180, a second camera 190, an accelerometer 200, an atmospheric pressure sensor 210, and a temperature sensor 240. The above components included in the electronic apparatus 10 are accommodated in the device case 11.

The controller 100 can integrally manage the operation of the electronic apparatus 10 by controlling other components in the electronic apparatus 10. The controller 100 can also be said to be a control device. The controller 100 includes at least one processor for providing control and processing capability to perform various functions as described in further detail below.

In accordance with various embodiments, the at least one processor may be implemented as a single integrated circuit (IC) or as multiple communicatively coupled ICs and/or discrete circuits. It is appreciated that the at least one processor can be implemented in accordance with various known technologies.

In one embodiment, the processor includes one or more circuits or units configurable to perform one or more data computing procedures or processes by executing instructions stored in an associated memory, for example. In other embodiments, the processor may be implemented as firmware (e.g. discrete logic components) configured to perform one or more data computing procedures or processes.

In accordance with various embodiments, the processor may include one or more processors, controllers, microprocessors, microcontrollers, application specific integrated circuits (ASICs), digital signal processors, programmable logic devices, field programmable gate arrays, or any combination of the devices or structures, or other known devices and structures, to perform the functions described herein.

In the present example, the controller 100 includes a Central Processing Unit (CPU), a Digital Signal Processor (DSP) 102, and a storage 103. The storage 103 includes a CPU 101 such as a Read Only Memory (ROM) and RAM and a non-transitory storage medium capable of reading DPS 102. The ROM included in the storage 103 is a flash ROM (flash memory) which is a nonvolatile memory, for example. The storage 103 stores a plurality of control programs 103a and so forth for controlling the electronic apparatus 10. The various functions of the controller 100 are realized by executing the various control programs 103a in the storage 101 by the CPU 101 and the DSP 102.

Note that the configuration of the controller 100 is not limited to the example of FIG. 4. For example, the controller 100 may include a plurality of CPUs 101. In this case, the controller 100 may include a main CPU which performs relatively complicated processing and a sub-CPU which performs relatively simple processing. Also, the controller 100 may not include the DSP 102 or may include a plurality of DSPs 102. Note that all the functions of the controller 100 or a part of the functions of the controller 100 may be realized by a hardware circuit in which software is not required to realize the functions of the hardware circuit.

Also, the storage 103 may comprise a non-transitory storage medium that can be read by the computer except for ROM and RAM. The storage 103 may comprise, for example, a small hard disk drive and a Solid State Drive (SSD).

The plurality of control programs 103a in the storage 103 include a variety of applications (application programs). In the storage 103, for example, a calling application for performing a voice call and a video call, a browser for displaying a website, a mail application for creating, browsing, and sending and receiving electronic mails are stored. Also in the storage 103, a camera application for photographing a subject using the first camera 180 and the second camera 190, a recorded image display application for displaying a still image and a moving image recorded in the storage 103, a music reproduction control application for controlling reproduction of music data stored in the storage 103, and so forth are stored. At least one application in the storage 103 may be an application previously stored in the storage 103. Also, at least one application in the storage 103 may be an application downloaded from other apparatus by the electronic apparatus 10 and stored in the storage 103.

The wireless communication unit 110 includes an antenna 111. The wireless communication unit 110 can wirelessly communicate by, for example, a multiple types of communication method by using the antenna 111. The wireless communication unit 110 is controlled by the controller 100. It can be said that the wireless communication unit 110 is a communication circuit.

The wireless communication unit 110 can wirelessly communicate with a base station of a cellular phone system. The wireless communication unit 110 can communicate with a cellular phone other than the electronic apparatus 10 and a web server via a network such as the base station and Internet. The electronic apparatus 10 can perform data communication, a voice call, and a video call with other cellular phone and so forth.

Also, the wireless communication unit 110 can wirelessly communicate with the roadside unit 5 and the vehicle 6. The wireless communication unit 110 can wirelessly communicate with the roadside unit 5 and the vehicle 6 with the use of the 700 MHz band assigned to the ITS. In addition, the wireless communication unit 110 of the electronic apparatus 10 can wirelessly communicate directly with the wireless communication unit 110 of the other electronic apparatus 10 with the use of the 700 MHz band. Thereafter, the wireless communication with the use of the 700 MHz band assigned to ITS is referred to as "700 MHz band communication" in some cases.

Also, the wireless communication unit 110 can wirelessly communicate by the use of a wireless Local Area Network (LAN) such as Wifi. Also, the wireless communication unit 110 can perform short-range wireless communication. For example, the wireless communication unit 110 can wirelessly communicate based on Bluetooth (registered trademark). The wireless communication unit 110 may also be able to wirelessly communicate based on at least one of ZigBee (registered trademark) and Near Field Communication (NFC).

The wireless communication unit 110 performs various processes such as amplification processing on a signal received by the antenna 111, and outputs the processed reception signal to the controller 100. The controller 100 performs various processes on the reception signal to be input to acquire information included in the reception signal. Also, the controller 100 outputs a sending signal including the information to the wireless communication unit 110. The wireless communication unit 110 performs various processes such as amplification processing on the sending signal to be input, and wirelessly sends the processed sending signal from the antenna 111.

The display 120 comprises the display region 12 positioned on the front surface of the electronic apparatus 10 and a display panel 121. The display 120 can display various types of information on the display region 12. The display panel 121 includes, for example, a liquid crystal display panel or an organic EL panel. The display panel 121 can display various types of information such as characters, symbols, and graphics by being controlled by the controller 100. The display panel 121 is opposite to the display region 12 in the device case 11. Information displayed on the display panel 121 is displayed in the display region 12.

The touch panel 130 can detect the operation by an operator such as a finger on the display region 12. The touch panel 130 includes, for example, a projection type capacitance touch panel. A touch panel 130 is positioned, for example, on a rear side of the display region 12. When the user 9 performs an operation on the display region 12 with an operator such as a finger, the touch panel 130 can input an electric signal corresponding to the operation to the controller 100. The controller 100 can specify the content of the operation performed on the display region 12 based on the output signal from the touch panel 130. Then, the controller 100 can perform processing in accordance with the specified operation content.

If the user 9 operates each of the operation buttons 22 of the operation button group 220, an operation signal indicating that the any operation button 22 has been operated can be output to the controller 100. Therefore, the controller 100 can determine whether any of the operation buttons 22 has been operated regarding each operation button 22. When the controller 100 to which the operation signal is input controls other components, the function assigned to the operated operation button 22 is executed in the electronic apparatus 10.

The satellite signal receiver 140 can receive a satellite signal transmitted by a positioning satellite. The satellite signal receiver 140 can acquire position information of the electronic apparatus 10 based on the received satellite signal. Specifically, the satellite signal receiver 140 obtains information necessary for calculating the position information of the electronic apparatus 10 from the satellite signal received from the positioning satellite. The satellite signal receiver 140 obtains the position information of the electronic apparatus 10 based on the acquired information. Also, the satellite signal receiver 140 outputs to the controller 100 the number of positioning satellites from which the information necessary for calculating the position information can be obtained from the satellite signals, that is the number of captured positioning satellites. In the position information the electronic apparatus 10 acquires, latitude and longitude indicating the position of the electronic apparatus 10 is included, for example, The controller 100 can controls the satellite signal receiver 140 to operate and stop the operation. Thereafter, the number of positioning satellites captured by the satellite signal receiver 140 may be referred to as "number of captured satellites" in some cases. Also, the satellite signal receiver 140 may be simply referred to as "receiver 140" in some cases.

The receiver 140 is, for example, a GPS receiver, and is capable of receiving a radio signal from a Global Positioning System (GPS) positioning satellite. The receiver 140 calculates the current position of the electronic apparatus 10, for example, in latitude and longitude based on the received wireless signal, and outputs position information including the calculated latitude and longitude to the controller 100. The position information of the electronic apparatus 10 can also represent the location information of the user 9 holding the electronic apparatus 10.

The receiver 140 may obtain the position information of the electronic apparatus 10 based on a signal from a positioning satellite of a Global Navigation Satellite System (GNSS) other than the GPS. For example, the receiver 140 may obtain the position information of the electronic apparatus 10 based on a signal from a positioning satellite of a Global Navigation Satellite System (GLONASS), an Indian Regional Navigational Satellite System (IRNSS), a COMPASS, a Galileo, or a positioning satellite of a quasi-zenith satellite system (QZSS).

The microphone 170 can convert a sound input from the outside of the electronic apparatus 10 into an electric sound signal and output the signal to the controller 100. The sound from the outside of the electronic apparatus 10 is taken into the inside of the electronic apparatus 10 through the microphone hole 15 and input to the microphone 170.

The speaker 160 is, for example, a dynamic speaker. The speaker 160 can convert an electrical sound signal from the controller 100 into a sound and output the sound. The sound output from the speaker 160 is output to the outside from the speaker hole 14. The user 9 can hear the sound output from the speaker hole 14 even at a place away from the electronic apparatus 10.

The receiver 150 can output the received sound. The receiver 150 is, for example, a dynamic speaker. The receiver 150 can convert an electrical sound signal from the controller 100 into a sound and output the sound. The sound output from the receiver 150 is output to the outside from the receiver hole 13. The volume of the sound output from the receiver hole 13 is smaller than the volume of the sound output from the speaker hole 14. The user 9 can hear the sound output from the receiver hole 13 by bringing an ear of the user 9 close to the receiver hole 13. Instead of the receiver 150, a vibrating element such as a piezoelectric vibrating element for vibrating the front surface part of the device case 11 may be provided. In this case, the sound is transmitted to the user by vibration of the front surface part.

The first camera 180 comprises a lens 181, an image sensor, and so forth. The second camera 190 comprises a lens 191, an image sensor, and so forth. Each of the first camera 180 and the second camera 190 can photograph a subject under the control of the controller 100, generate a still image or a moving image of the photographed subject, and output the images to the controller 100.

The lens 181 of the first camera 180 is visible from the front surface 11a of the device case 11. Therefore, the first camera 180 is capable of photographing a subject present on the front surface side (display region 12 side) of the electronic apparatus 10. The first camera 180 is referred to as a front camera. The lens 191 of the second camera 190 is visible from the rear surface 11b of the device case 11. Therefore, the second camera 190 is capable of photographing a subject present on the rear surface side of the electronic apparatus 10. The second camera 190 is referred to as a rear camera.

The accelerometer 200 can detect the acceleration of the electronic apparatus 10. The accelerometer 200 is, for example, a triaxial accelerometer. The accelerometer 200 can detect the acceleration of the electronic apparatus 10 in the x-axis direction, the y-axis direction, and the z-axis direction. The x-axis direction, the y-axis direction, and the z-axis direction are set in, for example, the longitudinal direction, the lateral direction, and the thickness direction of the electronic apparatus 10, respectively.

The atmospheric pressure sensor 210 can detect the atmospheric pressure around the electronic apparatus 10. The geomagnetic sensor 230 can detect a magnetic field around the electronic apparatus 10. The geomagnetic sensor 230 is, for example, a triaxial geomagnetic sensor. The geomagnetic sensor 230 can detect a magnetic field in the x-axis direction, the y-axis direction, and the z-axis direction. The x-axis direction, the y-axis direction, and the z-axis direction are set in, for example, the longitudinal direction, the lateral direction, and the thickness direction of the electronic apparatus 10, respectively. The temperature sensor 240 can detect the temperature around the electronic apparatus 10.

The battery 250 can output the power of the electronic apparatus 10. The battery 250 is, for example, a rechargeable battery. The power output from the battery 250 is supplied to the controller 100 and respective components such as the wireless communication unit 110 included in the electronic apparatus 10.

Note that, the electronic apparatus 10 may not include at least one sensor of the accelerometer 200, the atmospheric pressure sensor 210, the geomagnetic sensor 230, and the temperature sensor 240. In this case, the electronic apparatus 10 may be wirelessly or wiredly connected to the at least one individual sensor apart from thereof.

Note that the electronic apparatus 10 may include sensors besides the accelerometer 200 and the atmospheric pressure sensor 210, the geomagnetic sensor 230, and the temperature sensor 240. For example, the electronic apparatus 10 may include at least one of a proximity sensor, an illuminance sensor, and a gyro sensor. Note that the electronic apparatus 10 may be wirelessly or wiredly connected to an individual sensor apart from the electronic apparatus 10 besides the accelerometer 200 and the atmospheric pressure sensor 210, the geomagnetic sensor 230, and the temperature sensor 240.

Note that the electronic apparatus 10 may not include the receiver 140. In this case, the electronic apparatus 10 may be wirelessly or wiredly connected to an individual receiver 140 apart from thereof.

<Example of Functional Blocks in Controller>

FIG. 5 is a diagram indicating pat of functional blocks formed by executing the control program 103a in the storage 103 by the CPU 101 and the DSP 102.

As illustrated in FIG. 5, the controller 300 comprises, for example, a step number measurement unit 300, a state specifying unit 400, and a notification determiner 500 as functional blocks. Note that at least one of the step number measurement unit 300, the state specifying unit 400, and the notification determiner 500 may be implemented by a hardware circuit in which software is not required to execute the function of the hardware circuit.

The state specifying unit 400 can specify various states of the user 9. The state specifying unit 400 includes, for example, a stopping-movement specifying unit 410, a movement information acquisition unit 420, an in-vehicle determiner 430, an indoor determiner 440, and a position determiner 450. Note that at least one of the stopping-movement specifying unit 410, the movement information acquisition unit 420, the in-vehicle determiner 430, the indoor determiner 440, and the position determiner 450 may be realized by a hardware circuit in which software is not required to realize the functions of the hardware circuit.

It should be noted that, in the case where the controller 100 includes the main CPU and the sub-CPU, some functional blocks out of the plurality of functional blocks illustrated in FIG. 5 may be realized by the sub-CPU, while the remaining functional blocks may be realized by the main CPU. For example, the stopping-movement specifying unit 410 may be realized by the sub-CPU, while the remaining functional blocks may be realized by the main CPU.

The stopping-movement specifying unit 410 can perform stopping-movement specification for specifying the state of the user 9 concerning the stop and movement of the user 9. In the stopping-movement specification, the stopping-movement specifying unit 410 can specify that the user 9 is stopped and that the user 9 is moving. In other words, the stopping-movement specifying unit 410 can determine wither a state of the user 9 is in a state of stopping or a state of moving. In other words further, the stopping-movement specifying unit 410 can determine wither the user 9 is moving. The stopping-movement specifying unit 410 can specify that the user 9 is stopped and that the user 9 is moving based on, for example, one of the position information acquired by the receiver 140 and acceleration detected by the accelerometer 200.

In the stopping-movement specification, the stopping-movement specifying unit 410 can specify stop of the user 9 and start of movement of that the user 9. The stopping-movement specifying unit 410 determines that the user 9 is stopped when the state of the user 9 changes from the state of moving to the state of stopping. When the state of the user 9 has changed from the state of stopping to the state of moving, the stopping-movement specifying unit 410 determines that the user 9 has started to move.

The stop of the user 9 is equivalent to stop of movement of the electronic apparatus 10; therefore, it can be said that the stopping-movement specifying unit 410 can specify the stop of movement of the electronic apparatus 10. Also, the start of movement of the user 9 is equivalent to the start of movement of the electronic apparatus 10; therefore, it can be said that the stopping-movement specifying unit 410 can specify the start of movement of the electronic apparatus 10.

The timing at which the state of the user 9 changes from the state of stopping to the state of moving can be said to be equivalent to the movement start timing of the user 9 and the movement start timing of the electronic apparatus 10. In the stopping-movement specification, the stopping-movement specifying unit 410 can specify the movement start timing of the user 9, in other words, the movement start timing of the electronic apparatus 10. The timing at which the state of the user 9 changes from the state of moving to the state of stopping can be said to be equivalent to the movement stop timing of the user 9 and the movement stop timing of the electronic apparatus 10. In the stopping-movement specification, the stopping-movement specifying unit 410 can specify the movement stop timing of the user 9, in other words, the movement stop timing of the electronic apparatus 10.

Further, in the stopping-movement specification, the stopping-movement specifying unit 410 can specify a moving means of the user 9 if the stopping-movement specifying unit 410 determines that the user 9 is moving. For example, based on the acceleration detected by the accelerometer 200, the stopping-movement specifying unit 410 can specify whether the user 9 is moving by oneself without riding a conveying device or whether the user 9 is moving by riding the conveying device. Here that the user 9 moves by oneself signifies that the user 9 moves by one's own foot without riding on the conveying device. If the user 9 moving by oneself is referred to as "self-movement", it can be said that the stopping-movement specifying unit 410 can specify the self-movement of the user 9. If the user 9 moving by riding the conveying device is referred to as "conveying-device traveling", it can be said that the stopping-movement specifying unit 410 can specify the conveying-device traveling of the user 209.

The self-movement that can be specified by the stopping-movement specifying unit 410 includes a walking movement of the user 9 and a running movement of the user 9. If the user 9 moving by running is referred to as "running", the self-movement includes walking and running. In addition, the conveying-device traveling that can be specified by the stopping-movement specifying unit 410 includes a bicycle-movement of the user 9 and a movement of the user 9 in which the user 9 moves on a conveying device capable of moving faster than a bicycle, such as an automobile or a train.

Hereafter, in order to distinguish between a bicycle and a conveying device that can move faster than that, stating simply "a conveying device" signifies a conveying device that can move faster than a bicycle. Further, the following terms are used for the respective moving means: "self-power" for the case where the user 9 moves by oneself, "walk" for the case where the user 9 walks, and "run" for the case where the user 9 runs.

Here, it is known that the acceleration of the electronic apparatus 10 shows a unique pattern of time variation according to the moving means of the user 9 holding the electronic apparatus 10. If the time variation pattern of the acceleration detected by the accelerometer 200 shows a pattern corresponding to "walk", the stopping-movement specifying unit 410 specifies that the moving means of the user 9 is "walk". If the time variation pattern of the acceleration detected by the accelerometer 200 shows a pattern corresponding to "run", the stopping-movement specifying unit 410 specifies that the moving means of the user 9 is "run". If the time variation pattern of the acceleration detected by the accelerometer 200 shows a pattern corresponding to "bicycle", the stopping-movement specifying unit 410 specifies that the moving means of the user 9 is "bicycle". If the time variation pattern of the acceleration detected by the accelerometer 200 shows a pattern corresponding to "conveying device", the stopping-movement specifying unit 410 specifies that the moving means of the user 9 is "conveying device".

In this manner, the stopping-movement specifying unit 410 can specify whether the moving means of the user 9 is a walking, running, bicycle or conveying device. For example, the controller 100 can cause the display 120 to display the moving means specified by the stopping-movement specifying unit 410 and the moving distance of the user 9 (the moving distance of the electronic apparatus 10). Therefore, the user 9 can distinguish and check the walking distance, the running distance, the travel distance on the bicycle, and the travel distance on the conveying device. The controller 100 can obtain the moving distance of the user 9, for example, based on the position information acquired by the receiver 140.

The movement information acquisition unit 420 can acquire movement information indicating movement of the user 9. For example, the movement information includes at least one of the continuous stopping period of time of the user 9, the continuous walking period of time of the user 9, the number of continuous walking steps of the user 9, and the traveling direction of the user 9. The movement information will be described later in detail.

The in-vehicle determiner 430 can perform in-vehicle determination for determining whether the user 9 is present in the vehicle 6. Thereafter, the inside of the vehicle 6 may be referred to as "inside vehicle" in some cases. Further, a state in which the user 9 is present in the vehicle 6 may simply be referred to as "inside vehicle" and a state in which the user 9 is absent in the vehicle 6 may simply be referred to as "outside vehicle" in some cases. The in-vehicle determination will be described later in detail.

The indoor determiner 440 can determine whether the user 9 is present in a structure such as a house, a building, and a shop. That is, the indoor determiner 440 can perform indoor determination for determining whether the user 9 is present indoors. Thereafter, a state in which the user 9 is present indoors may simply be referred to as "the indoors" and a state in which the user 9 is absent indoors may simply be referred to as "the outdoors" in some cases. The indoor determination will be described later in detail.

The position determiner 450 can determine wither the user 9 is positioned in the predetermined area (in other words predetermined place). In other words, the position determiner 450 can determine whether the electronic apparatus 10 is positioned in the predetermined area (in other words predetermined place). As the predetermined area, a place where a possible accident of a pedestrian and the vehicle 6 is likely to occur, and an area including the vicinity thereof are adopted, for example. The predetermined area includes, for example, an intersection area including an intersection 2 and the vicinity thereof, a T-shaped road area including the T-shaped road and the vicinity thereof, and a school road area including a school road for minors and the vicinity thereof. The position determiner 450 can individually determine among whether the user 9 is positioned in the intersection area, whether the user 9 is positioned in the T-shaped road area, and whether the user 9 is positioned in the school road area, respectively.

The position determiner 450 can determine, for example, whether the user 9 is positioned in the predetermined area based on the position information acquired by the receiver 140 and map information stored in a storage 103. Or, the position determiner 450 may determine whether the user 9 is positioned in the predetermined area based on whether the wireless communication unit 110 can receive a signal from a roadside unit 5 installed in the intersection 2 or the like.

As described above, the state specifying unit 400 can specify various states of the user 9. The types of the state of the user 9 specified by the state specifying unit 400 are not limited thereto.

The step number measurement unit 300 can measure the number steps of the user 9 moving by oneself. The step number measurement unit 300 measures the number steps of the user 9 moving by oneself based on the acceleration detected by the accelerometer 200, for example. The step number measurement unit 300 measures the number of steps of the user 9 when the stopping-movement specifying unit 410 specifies that the user 9 is walking or running. The controller 100 can cause the display 120 to display the number of steps measured by the step number measurement unit 300. Thereafter, the number of steps to be measured by the step number measurement unit 300 may be simply referred to as "number of measured steps" in some cases.

The notification determiner 500 can determine, based on the state of the user 209 specified by the state specifying unit 400 or the like, whether the electronic apparatus 10 makes notification outside the electronic apparatus 10.

For example, if the position determiner 450 determines that the user 9 is positioned in the intersection area and the stopping-movement specifying unit 410 specifies that the moving means of the user 9 is "run", the notification determiner 500 determines that the electronic apparatus 10 makes notification outside the electronic apparatus 10. Also, if the position determiner 450 determines that the user 9 is positioned in the intersection area and the stopping-movement specifying unit 410 specifies that the moving means of the user 9 is "bicycle", the notification determiner 500 determines that the electronic apparatus 10 makes notification outside the electronic apparatus 10. If the notification determiner 500 determines that the electronic apparatus 10 makes notification outside the electronic apparatus 10, for example, presence notification information for notifying the vehicle 6 positioned in the intersection area of the presence of the user 9 (in other words, pedestrian) from the wireless communication unit 110 to the roadside unit 5. The presence notification information may include information indicating the moving means of the user 9 specified by the stopping-movement specifying unit 410. The roadside unit 5 transmits the received presence notification information to the vehicle 6 in the intersection area. At this time, the roadside unit 5 transmits the presence notification information, for example. Based on the received presence notification information, the vehicle 6 issues a warning to the driver, for example. For example, the vehicle 6 notifies the driver that there is a pedestrian nearby with the use of the satellite navigation device. Accordingly, the driver of the vehicle 6 in the intersection area can drive while recognizing that a person is present in the intersection area. As a result, the safety of driving of the vehicle 6 is improved. Thereafter, that the electronic apparatus 10 makes notification outside the electronic apparatus 10 may be referred to as "execution of notification" in some cases. Thereafter, that the electronic apparatus 10 does not make notification outside the electronic apparatus 10 may be referred to as "non-execution of notification" in some cases.

The content of the information the electronic apparatus 10 notifies outside thereof is not limited to the above example. In addition, the electronic apparatus 10 can directly notify the vehicle 6.

<Example of Operation Flow of Electronic Apparatus>

Figure 6:
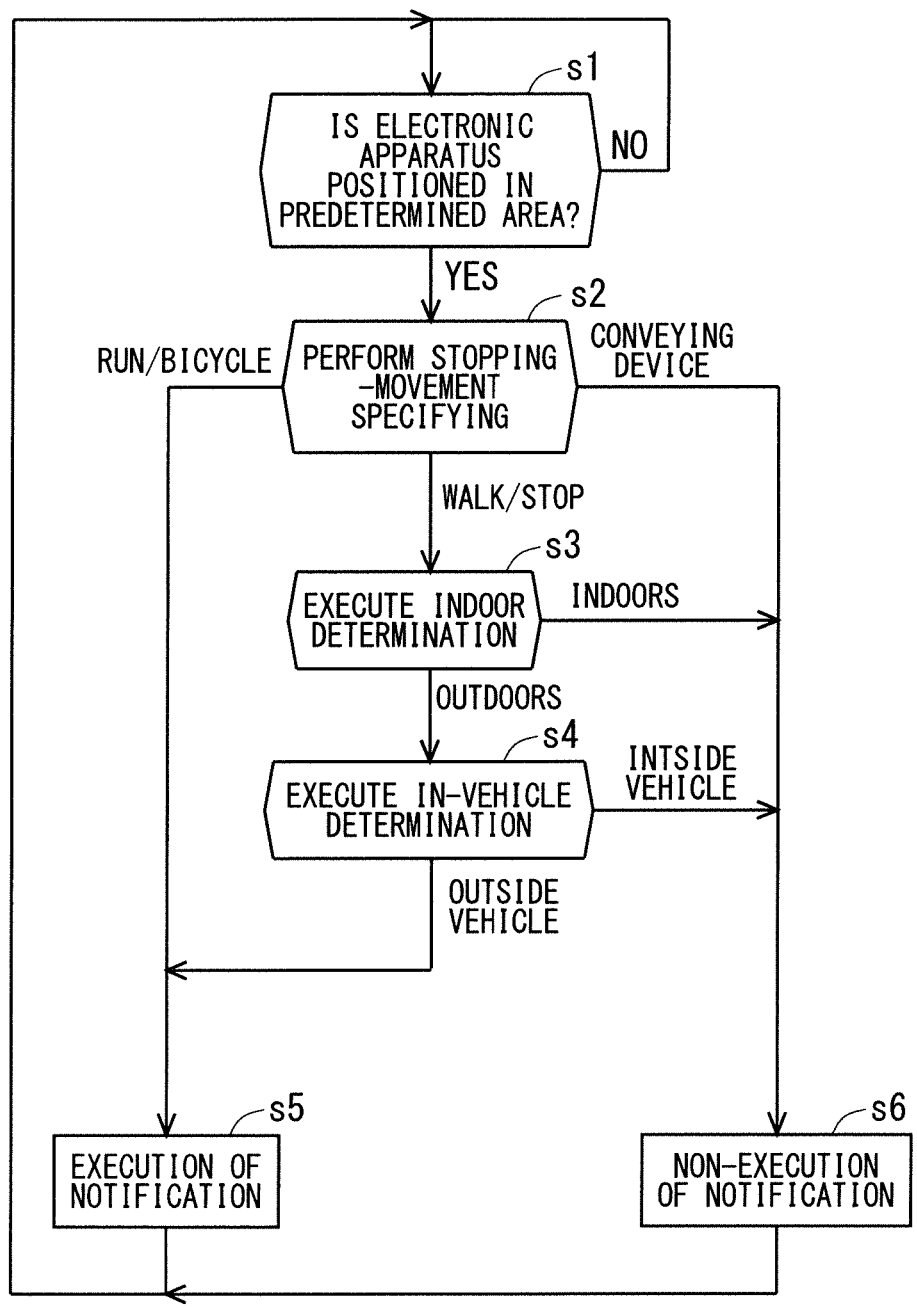
FIG. 6 illustrates a flowchart showing an example of an operation of the electronic apparatus.

FIG. 6 illustrates a flowchart showing an example of an operation until the electronic apparatus 10 makes notification outside thereof. The electronic apparatus 10 performs a series of processes of Steps s1 to s6 illustrated in FIG. 6 regularly or irregularly, in a repeated manner.

As illustrated in FIG. 6, in Step s1, the position determiner 450 determines whether the electronic apparatus 10 is positioned in the predetermined area. If the electronic apparatus 10 is determined to be positioned in the predetermined area in Step s1, the stopping-movement specifying unit 410 performs the stopping-movement specification in Step s2. If the electronic apparatus 10 is determined not to be positioned in the predetermined area in Step s1, Step s1 is re-executed.

In the stopping-movement specification in Step s2, if the user 9 is moving and the moving means is specified as "conveying device", in Step s6, the notification determiner 500 determines non-execution of notification. If the moving means of the user 9 is a conveying device such as an automobile, train, bus, etc., the user 9 is highly likely to be safe from the vehicle 6. Therefore, it can be said that a warning to the driver of the vehicle 6 is less required to be issued. Therefore, in the case where the moving means of the user 9 is specified as "conveying device", the notification determiner 500 determines that the electronic apparatus 10 does not notify outside the electronic apparatus 10. Thereby, in the case where the user 9 is safe from the vehicle 6, reduction in potential reception of information which is less required from the driver is ensured. Therefore, the possibility that annoyance to the driver is caused by receiving the less required information can be reduced. When Step s6 is executed, the electronic apparatus 10 re-executes Step s1 and operates in a similar manner thereafter.

In the stopping-movement specification in Step s2, if the user 9 is moving and the moving means is specified as "run", Step s5 is executed. In the stopping-movement specification, if the user 9 is moving and the moving means is specified as "bicycle", Step s5 is executed. In Step s5, the notification determiner 500 determines the execution of notification. If the moving means of the user 9 is "run" and "bicycle", it can hardly be said that the user 9 is safe from the vehicle 6. Therefore, in the case where the moving means of the user 9 is specified as "run", the notification determiner 500 determines that the electronic apparatus 10 notifies outside the electronic apparatus 10. If Step s5 is executed, the electronic apparatus 10 re-executes Step s1 and operates in a similar manner thereafter.

If the notification determiner 500 determines the execution of notification, the above presence notification information or the like, for example, is notified from the wireless communication unit 110 to the roadside unit 5. The roadside unit 5 notifies the vehicle 6 presenting in the predetermined area of the received presence notification information. If the electronic apparatus 10 is determined to be, for example, in the T-shaped road area in Step s1, the roadside unit 5 installed in the T-shaped road area notifies the vehicle 6 presenting in the T-shaped road area of the presence notification information received from the electronic apparatus 10. In the vehicle 6, the in-vehicle device 60 receives the presence notification information and issues a warning to the driver based on the received presence notification information. It should be noted that, the presence notification information may be directly notified from the electronic apparatus 10 to the vehicle 6 presenting in the T-shaped road area.

If the user is specified to be stopped in the stopping-movement specification in Step s2, the indoor determiner 440 performs the indoor determination in Step s3. If the user 9 is moving and the moving means is specified as "walk" in the stopping-movement specification, the indoor determiner 440 performs the indoor determination in Step s3.

If "the indoors" is determined in the indoor determination in Step s3, Step s6 is executed and the notification non-execution is determined. In the case where the user 9 is present in a structure such as a building, the user 9 is highly likely to be safe from the vehicle 6. Therefore, if the user 9 is determined to be present indoors, the electronic apparatus 10 is determined not to notify the outside.

Meanwhile, if "the outdoors" is determined in the indoor determination in Step s3, the in-vehicle determiner 430 performs the in-vehicle determination in Step s4. If "inside vehicle" is determined in the in-vehicle determination, Step s6 is executed and the notification non-execution is determined. In the case where the user 9 is present in the vehicle 6, the user 9 is highly likely to be safe from the vehicle 6. Therefore, if the user 9 is determined to be present indoors, the electronic apparatus 10 is determined not to notify the outside.

If "outside vehicle" is determined in the in-vehicle determination in Step s4, that is, if the user is determined to be present neither indoors nor in the vehicle, Step s5 is executed and the execution of notification is determined. In the case where the user 9 is present outdoor and outside of the vehicle, it can hardly be said that the user 9 is safe from the vehicle 6. Therefore, if the user 9 is determined to be present neither indoors nor in the vehicle, that the electronic apparatus 10 makes notification outside is determined.

Instead of Step s6, the notification determiner 500 may determine the execution of notification. In such a case, notification information for notifying that the risk the user 9 presenting in the vicinity thereof unexpectedly appears is low may be notified from the electronic apparatus 10 to the vehicle 6 via the roadside unit 5 or directly to the vehicle 6.

Figure 7:
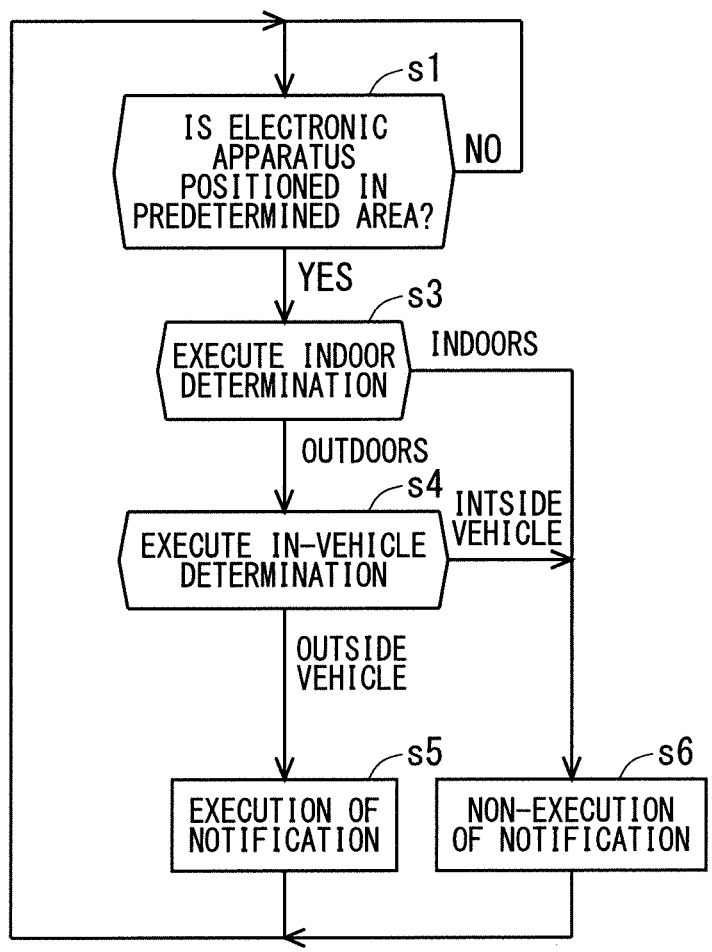
FIG. 7 illustrates a flowchart showing an example of an operation of the electronic apparatus.

Further, as shown in FIG. 7, the stopping-movement specification at Step s2 may not be executed. In this case, if it is determined that the electronic apparatus 10 is present in the predetermined area in Step s1, the indoor determination in Step s3 is executed.

Figure 8:
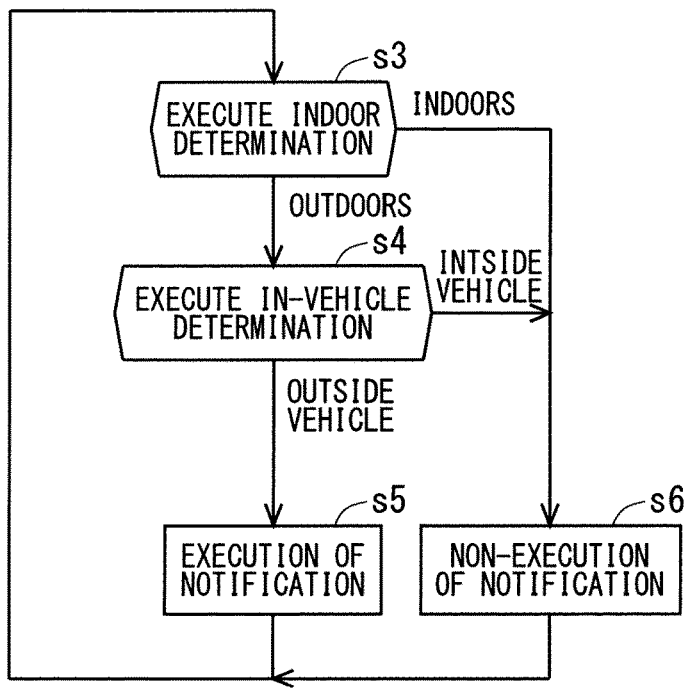
FIG. 8 illustrates a flowchart showing an example of an operation of the electronic apparatus.

As illustrated in FIG. 8, Step s1 may not be executed. In the example of FIG. 8, Step s1 is not executed in the flow of FIG. 7, however, Step s1 may not be executed in the flow of FIG. 6. In this case, when Step s5 is executed, Step s2 is re-executed, and when Step s6 is executed, Step s2 is re-executed.

Figure 9:
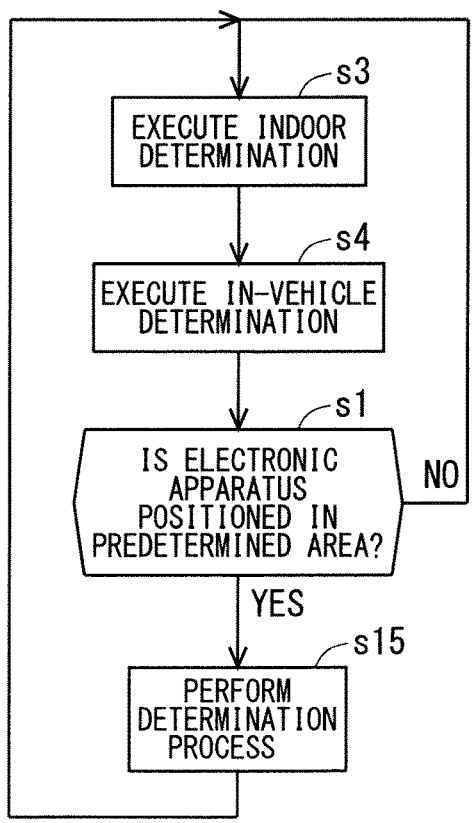
FIG. 9 illustrates a flowchart showing an example of an operation of the electronic apparatus.

Further, as illustrated in FIG. 9, Step s1 may be executed after the indoor determination and the in-vehicle determination are executed. In the example of FIG. 9, the indoor determination is executed in Step s3, and thereafter, the in-vehicle determination is executed in Step s4. Then Step s1 is executed. If the electronic apparatus 10 is determined to be positioned in the predetermined area in Step s1, the notification determiner 500 performs in Step s15, a determination process in which whether the electronic apparatus 10 makes notification outside is determined based on the result of the indoor determination in Step s3 and the result of the in-vehicle determination in Step s4. In Step s15, if it is determined as "the indoors" in the indoor determination, the notification determiner 500 determines the non-execution of notification. Also if it is determined as "inside vehicle" in the in-vehicle determination, the notification determiner 500 determines the non-execution of notification. And if it is determined as "the outdoors" in the indoor determination, and is determined as "outside vehicle" in the in-vehicle determination, the notification determiner 500 determines the execution of notification.

Although the stopping-movement specification is not performed in the example of FIG. 9, the stopping-movement specification may be performed before Step s1. In this case, in Step s15, the notification determiner 500 determines whether the electronic apparatus 10 makes notification outside based on the result of the stopping-movement specification, the result of the indoor determination, and the result of the in-vehicle determination. For example, the notification determiner 500 determines the non-execution of notification if it is determined that the moving means is "conveying device" in the stopping-movement specification. Also if it is determined as "the indoors" in the indoor determination, the notification determiner 500 determines the non-execution of notification and if it is determined as "inside vehicle" in the in-vehicle determination, the notification determiner 500 determines the execution of notification. The notification determiner 500 determines the execution of notification if it is determined that the moving means is "run" in the stopping-movement specification. Also, the notification determiner 500 determines the execution of notification if it is determined that the moving means is "bicycle" in the stopping-movement specification. And if it is determined as "the outdoors" in the indoor determination, and is determined as "outside vehicle" in the in-vehicle determination, the notification determiner 500 determines the execution of notification.

In each of the above examples, the execution order of indoor determination and the in-vehicle determination may be interchanged. Or, the indoor determination and the in-vehicle determination may be performed in parallel. Also, one of the indoor determination and the in-vehicle determination may not be performed.

As described above, the notification determiner 500 performs the determination process in which whether or not the electronic apparatus 10 makes notification outside based on the in-vehicle determination result, so that the probability that the electronic apparatus 10 makes less required notification outside can be reduced. Thus, the convenience of the electronic apparatus 10 is improved.

Further, the notification determiner 500 performs the determination process in which whether or not the electronic apparatus 10 makes notification outside based on the indoor determination result, so that the probability that the electronic apparatus 10 makes less required notification outside can be reduced. Thus, the convenience of the electronic apparatus 10 is improved.

In the examples illustrated in FIGS. 6, 7, and 9, the notification determiner 500 performs the determination process when the electronic apparatus 10 is positioned in the predetermined area, and does not perform the determination process when the electronic apparatus 10 is not positioned in the predetermined area. Therefore, the electronic apparatus 10 can decide whether the electronic apparatus 10 makes notification outside when necessary.

In the examples illustrated in FIGS. 6 and 7, the in-vehicle determiner 430 performs the in-vehicle determination when the electronic apparatus 10 is positioned in the predetermined area, and does not perform the in-vehicle determination when the electronic apparatus 10 is not positioned in the predetermined area. Therefore, the electronic apparatus 10 can perform the in-vehicle determination when necessary.

In the examples illustrated in FIGS. 6 and 7, the indoor determiner 440 performs the indoor determination when the electronic apparatus 10 is positioned in the predetermined area, and does not perform the indoor determination when the electronic apparatus 10 is not positioned in the predetermined area. Therefore, the electronic apparatus 10 can perform the indoor determination when necessary.

In the example of FIG. 6 and the like, in the stopping-movement specification, the in-vehicle determiner 430 does not perform the in-vehicle determination when the moving means is specified as "conveying device", "run" and "bicycle", while the in-vehicle determiner 430 performs the in-vehicle determination when the moving means is specified as "walk". As described above, the in-vehicle determiner 430 performs the in-vehicle determination according to the type of the moving means specified by the stopping-movement specification, so that the process of the electronic apparatus 10 is more simplified than the case where the in-vehicle determination is constantly performed.

In the example of FIG. 6 and the like, in the stopping-movement specification, the indoor determiner 440 does not perform the indoor determination when the moving means is specified as "conveying device", "run" and "bicycle", while the vehicle indoor determiner 440 performs the indoor determination when the moving means is specified as "walk". As described above, the indoor determiner 440 performs the indoor determination according to the type of the moving means specified by the stopping-movement specification, so that the process of the electronic apparatus 10 is more simplified than the case where the indoor determination is constantly performed.

<Example of In-Vehicle Determination>

Next, details of the in-vehicle determination will be described. In the following, examples of a plurality of types of the in-vehicle determination will be described.

<First Example of In-Vehicle Determination: In-Vehicle Determination Based on Setting or Unsetting of Communication Connection Setting>

In the present example, the in-vehicle determiner 430 determines whether the user 9 is present in the vehicle 6 based on whether setting (hereinafter, may be referred to as "communication connection setting") required for the communication connection between the in-vehicle device 60 mounted on the vehicle 6 and the wireless communication unit 110 is established in the device 10. The in-vehicle determiner 430 determines that the user 9 is present in the vehicle when the communication connection setting is established in the electronic apparatus 10. Meanwhile, the in-vehicle determiner 430 determines that the user 9 is absent in the vehicle when the communication connection setting is unestablished in the electronic apparatus 10.

The in-vehicle device 60 is compatible with at least one of Bluetooth and Wifi, for example. When pairing is completed between the in-vehicle device 60 compatible with Bluetooth and the electronic apparatus 10, the communication connection setting required for the communication connection between the in-vehicle device 60 and the wireless communication unit 110 is established in the electronic apparatus 10. When the completion of the pairing between the in-vehicle device 60 compatible with Bluetooth and the electronic apparatus 10 is confirmed, the in-vehicle determiner 430 determines to be "inside vehicle". Meanwhile, when the completion of the pairing is unconfirmed, the in-vehicle determiner 430 determines to be "outside vehicle".

The communication connection setting required for the communication connection between the in-vehicle device 60 compatible with Wifi functioning as an access point and the electronic apparatus 10 is established by inputting a security key assigned to the in-vehicle device 60 (also referred to as a password or an encryption key) to the electronic apparatus 10. If the wireless communication unit 110 receives Service Set Identifier (SSID) transmitted by the in-vehicle device 60 compatible with Wifi and the security key for SSID is stored in the storage 103 the in-vehicle determiner 430 determines to be "inside vehicle". Meanwhile, if the security key for SSID transmitted from the in-vehicle device 60 compatible with Wifi received by the wireless communication unit 110 is not stored in the storage 103, the in-vehicle determiner 430 determines to be "outside vehicle".

As described above, the in-vehicle determiner 430 determines whether the user 9 is present in the vehicle based on whether the communication connection setting is established in the electronic apparatus 10, so that the electronic apparatus 10 can more correctly determine whether the user 9 is present in the vehicle.

<Second Example of In-Vehicle Determination: In-Vehicle Determination Based on Movement of Electronic Apparatus>

If the user 9 is present, not in the vehicle 6 owned by the user, but in another person's vehicle 6, the communication connection setting required for establishing the communication connection between the electronic apparatus 10 of the user 9 and the communication device mounted on the vehicle 6 of the other person is possibly unestablished in the electronic apparatus 10. Therefore, in the above-described "first example of in-vehicle determination", the in-vehicle determiner 430 cannot possibly appropriately determine that the user 9 is present in the vehicle, if the user 9 is present in the other person's vehicle 6.

On the other hand, if a plurality of users 9 are present in the same vehicle 6, a plurality of electronic apparatuses 10 owned by each of the plurality of users 9 highly possibly operate in the same manner.

Therefore, in the present example, the in-vehicle determiner 430 included in the electronic apparatus 10 determines whether the user 9 of the electronic apparatus 10 is present in the vehicle, based on the movement of the other electronic apparatus 10 that determines that the user 9 of the other electronic apparatus 10 which is different from the electronic apparatus 10 and the movement of the electronic apparatus 10. As a result, the electronic apparatus 10 can correctly determine whether the user 9 is present in the vehicle, even if the communication connection setting is unestablished.

Thereafter, the electronic apparatus 10 subject of description of operation may be referred to as "subject apparatus 10" in some cases. The user 9 of the subject apparatus 10 may also be referred to as "subject user 9". Thereafter, the electronic apparatus 10 different from the subject apparatus 10 may be referred to as "other apparatus 10" in some cases. Further, the user 9 of the other apparatus 10 may also be referred to as "other user 9". The in-vehicle determiner 430 determines whether the subject user 9 is present in the vehicle based on the movement of the other apparatus 10 that determines that the other user 9 is present in the vehicle and the movement of the subject apparatus 10. In the present example, a case in which the stopping-movement specification in Step s2 is not executed is assumed as illustrated in FIGS. 7 to 9 described above.

The prerequisite for the in-vehicle determination of the present example is that a plurality of electronic apparatuses 10 (a plurality of electronic apparatuses 10 respectively owned by a driver and a passenger) present in the same vehicle 6 communicate with each other through Bluetooth. For example, the subject user 9 operates the display region 12 or the like of the subject apparatus 10 to pair the subject apparatus 10 to the other apparatus 10 presenting in the same vehicle 6 as the subject apparatus 10. Thereby, a plurality of electronic apparatuses 10 presenting in the same vehicle 6 can communicate with each other through Bluetooth.

In the present example, when the in-vehicle determiner 430 has determined that the user 9 is present in the vehicle, every time the movement of the electronic apparatus 10 stops, the electronic apparatus 10 notifies the other apparatus 10 communicable with the electronic apparatus 10 of the timing at which the movement of the electronic apparatus 10 stops, that is the movement stop timing, through Bluetooth and so forth. The electronic apparatus 10 can specify the movement stop timing of the electronic apparatus 10 based on the result of the stopping-movement specification in the stopping-movement specifying unit 410.

Figure 10:
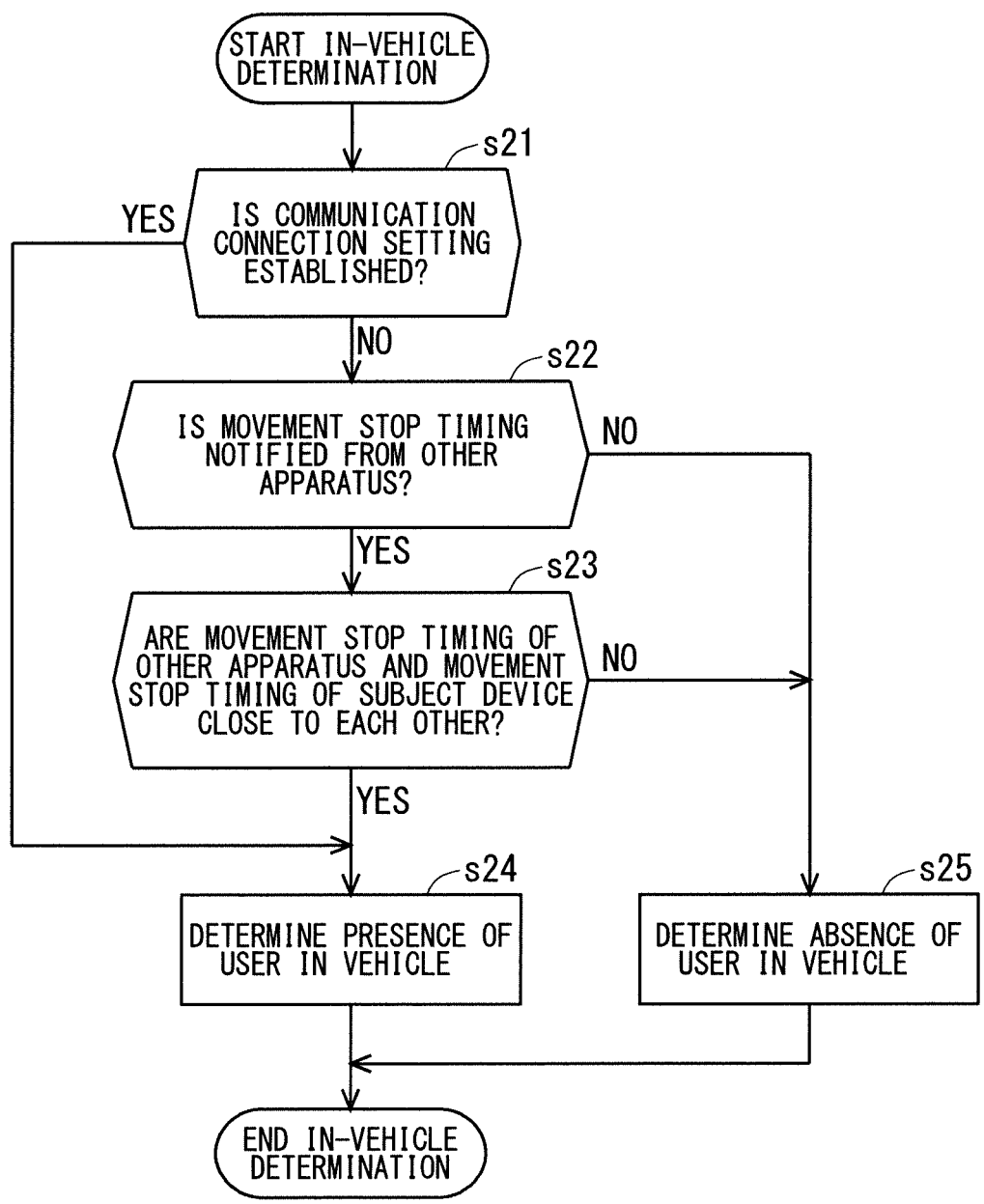
FIG. 10 illustrates a flowchart showing an example of an operation of the electronic apparatus.

FIG. 10 illustrates a flowchart showing an example of the in-vehicle determination according to the present example. As illustrated in FIG. 10, in Step s21, the in-vehicle determiner 430 confirms whether the communication connection setting is established in the subject apparatus 10, as is in the same with the first example of the in-vehicle determination. In the case where the communication connection setting has been established in the subject apparatus 10, the in-vehicle determiner 430 determines that the subject user 9 is present in the vehicle in Step s24. If the subject user 9 is present in the vehicle 6 owned by the subject user 9, it may be determined in Step s21 that the communication connection setting is established in the subject apparatus 10.

In the case where the communication connection setting has not been established in the subject apparatus 10, the in-vehicle determiner 430 determines whether the movement stop timing is notified from the other apparatus 10 that determines that the other user 9 is present in the vehicle in Step s22. If the subject user 9 is present in the vehicle 6 owned by the other user 9, it may be determined in Step s21 that the communication connection setting is unestablished in the subject apparatus 10.

In Step s22, if the in-vehicle determiner 430 determines that the movement stop timing is not notified from the other apparatus 10, the in-vehicle determiner 430 determines that the subject user 9 is absent in the vehicle in Step s25. If the movement stop timing is not notified from the other apparatus 10 that determines that the other user 9 is present in the vehicle to the subject apparatus 10, the subject apparatus 10 is highly possibly present apart from the other apparatus 10. Therefore, in Step s22, if the in-vehicle determiner 430 determines that the movement stop timing is not notified from the other apparatus 10, the subject user 9 is highly possibly absent in the vehicle.

On the other hand, if the in-vehicle determiner 430 determines that the movement stop timing is notified from the other apparatus 10, the in-vehicle determiner 430 determines whether the subject user 9 is present in the vehicle based on the movement stop timing to be notified and the movement stop timing of the subject apparatus 10. The in-vehicle determiner 430 can specify the movement stop timing of the subject apparatus 10 based on the result of the stopping-movement specification in the stopping-movement specifying unit 410.

Here, if the movement stop timing of the other apparatus 10 that determines that the other user 9 is present in the vehicle is close to the movement stop timing of the subject apparatus 10, the subject user 9 is highly possibly present in the same vehicle 6 as the other user 9.

Therefore, if the in-vehicle determiner 430 determines that the movement stop timing is notified from the other apparatus 10 in the Step s22, the in-vehicle determiner 430 performs stop timing comparison in which whether the latest movement stop timing notified from the other apparatus 10 that determines that the other user 9 is present in the vehicle and the latest movement stop timing of the subject apparatus 10 are close to each other in Step s23.

In the stop timing comparison, the in-vehicle determiner 430 determines whether a difference between the latest movement stop timing of the other apparatus 10 and the latest movement stop timing of the subject apparatus 10 is equal to or smaller than a first threshold value. And if the in-vehicle determiner 430 determines that the difference is equal to or smaller than the first threshold value, the in-vehicle determiner 430 determines the latest movement stop timing of the other apparatus 10 and the latest movement stop timing of the subject apparatus 10 are close to each other. And if the in-vehicle determiner 430 determines that the difference is larger than the first threshold value, the in-vehicle determiner 430 determines the latest movement stop timing of the other apparatus 10 and the latest movement stop timing of the subject apparatus 10 are not close to each other.

In the present specification, as long as there is no inconsistency, the wording that a certain value is equal to or smaller than the threshold value is rephrased as that the certain value is smaller than the threshold value, and vice versa. Also, as long as there is no inconsistency, the wording that a certain value is equal to or greater than the threshold value is rephrased as that the certain value is larger than the threshold value, and vice versa.

In the above example, if the difference between the latest movement stop timing of the other apparatus 10 and the latest movement stop timing of the subject apparatus 10 is equal to or smaller than the first threshold value, the in-vehicle determiner 430 determines that the both timings are close to each other, and if the difference is larger than the first value the in-vehicle determiner 430 determines that the both timings are not close to each other. Applying the above rule, if the difference between the latest movement stop timing of the other apparatus 10 and the latest movement stop timing of the subject apparatus 10 is equal to or smaller than the first threshold value, the in-vehicle determiner 430 may determine that the both timings are close to each other, and if the difference is larger than the first value the in-vehicle determiner 430 may determine that the both timings are not close to each other.

In Step s23, if the in-vehicle determiner 430 determines that the movement stop timing of the other apparatus 10 and the movement stop timing of the subject apparatus 10 are close to each other, the in-vehicle unit 430 determines that the subject user 9 is present in the same vehicle 6 of the other user 9 and determines that the subject user 9 is present in the vehicle in Step s24. Meanwhile, if the in-vehicle determiner 430 determines that the movement stop timing of the other apparatus 10 and the movement stop timing of the subject apparatus 10 are not close to each other, the in-vehicle determiner 430 determines that the subject user 9 is absent in the vehicle in Step s25.

Thereafter, being determined "close" in the stop timing comparison signifies that both of the movement stop timings are determined to be close to each other. Thereafter, being determined "not close" in the stop timing comparison signifies that both of the movement stop timings are determined not to be close to each other.

Note that the in-vehicle determiner 430 may perform the stop timing comparison a plurality of times in Step s23. In this case, if the in-vehicle determiner 430 determines "close" in each of the plurality of stop timing comparisons, the in-vehicle determiner 430 may determine that the subject user 9 is present in the vehicle, and if the in-vehicle determiner 430 determines "not close" in at least one of the plurality of stop timing comparisons, the in-vehicle determiner 430 may determine that the subject user 9 is absent in the vehicle.

In addition, if the in-vehicle determiner 430 has determined that the user 9 is present in the vehicle, every time the movement of the electronic apparatus 10 starts, the electronic apparatus 10 may notify the other apparatus 10 communicable with the electronic apparatus 10 of the timing at which the movement of the electronic apparatus 10 starts, that is the movement start timing, through Bluetooth and so forth. In this case, the in-vehicle determiner 430 determines whether the movement start timing is notified from the other apparatus 10 in Step s22. If it is determined that the movement start timing is not notified from the other apparatus 10 in Step s22, Step s25 is executed to determine that the subject user 9 is absent in the vehicle. On the other hand, if it is determined that the movement start timing is notified from the other apparatus 10 in Step s22, the in-vehicle determiner 430 performs start timing comparison, in Step s23, in which whether the latest movement start timing notified from the other apparatus 10 that determines that the other user 9 is present in the vehicle and the latest movement start timing of the subject apparatus 10 are close to each other. The in-vehicle determiner 430 can specify the movement start timing of the subject apparatus 10 based on the result of the stopping-movement specification in the stopping-movement specifying unit 410. As in the stop timing comparison, for example, the in-vehicle determiner 430 compares the difference between both the movement start timings with a second threshold value, thereby determining whether both the movement start timings are close to each other.

In the start timing comparison, if the in-vehicle determiner 430 determines that both the movement start timings are close to each other, the in-vehicle determiner 430 determines that the subject user 9 is present in the same vehicle 6 as the other user 9, executes Step s24, and determines "inside vehicle". On the other hand, if the in-vehicle determiner 430 determines that both the movement start timings are not close to each other, the in-vehicle determiner 430 executes Step s25 and determines "outside vehicle".

Thereafter, being determined "close" in the start timing comparison signifies that both of the movement start timings are determined to be close to each other. Also, being determined "not close" in the start timing comparison signifies that both of the movement start timings are determined not to be close to each other.

Note that the in-vehicle determiner 430 may perform the start timing comparison a plurality of times in Step s23. In this case, if the in-vehicle determiner 430 determines "close" in each of the plurality of start timing comparisons, the in-vehicle determiner 430 may determine "inside vehicle", and if the in-vehicle determiner 430 determines "not close" in at least one of the plurality of start timing comparisons, the in-vehicle determiner 430 may determine "outside vehicle".

In addition, if the in-vehicle determiner 430 has determined that the user 9 is present in the vehicle, the electronic apparatus 10 may notify the other apparatus 10 communicable with the electronic apparatus 10 of the movement stop timing and the movement start timing both as timing information through Bluetooth and so forth. In this case, the in-vehicle determiner 430 determines whether the timing information is notified from the other apparatus 10 in Step s22. If it is determined that the timing information is not notified from the other apparatus 10 in Step s22, Step s25 is executed. On the other hand, if it is determined that the timing information is notified from the other apparatus 10 in Step s22, the in-vehicle determiner 430 performs both of stop timing comparison and the start timing comparison in Step s23.

In Step s23, if the in-vehicle determiner 430 performs both of the stop timing comparison and the start timing comparison, the in-vehicle determiner 430 determines "inside vehicle" when "close" is determined in the stop timing comparison and "close" is determined in the start timing comparison, for example. On the other hand, the in-vehicle determiner 430 determines "outside vehicle" when "not close" is determined in the stop timing comparison and "not close" is determined in the start timing comparison.

The in-vehicle determiner 430 may perform the stop timing comparison and the start timing comparison a plurality of times in Step s23. In this case, if the in-vehicle determiner 430 determines "close" in each of the plurality of stop timing comparisons and determines "close" in each of the plurality of start timing comparisons, the in-vehicle determiner 430 determines "inside vehicle". On the other hand, if the in-vehicle determiner 430 determines "not close" in at least one of the plurality of stop timing comparisons and determines "not close" in at least one of the plurality of start timing comparisons, the in-vehicle determiner 430 determines "outside vehicle".

In the in-vehicle determination described above, the movement stop timing or the movement start timing is used as the information indicating the movement of the electronic apparatus 10, however, the vibration of the electronic apparatus 10 may also be used. The in-vehicle determiner 430 may determine whether the subject user 9 is present in the vehicle based on the vibration of the subject apparatus 10 and the vibration of the other apparatus 10 that determines that the other user 9 is present in the vehicle. In this example, the electronic apparatus 10 that determines that the user 9 is present in the vehicle notifies the other apparatus 10 communicable with the electronic apparatus 10 of the pattern of temporal change of acceleration (hereinafter, referred to as "traveling acceleration pattern" in some cases) detected by the accelerometer 200 while the electronic apparatus 10 is moving through Bluetooth and so forth, for example. And the in-vehicle determiner 430 determines whether the traveling acceleration pattern indicating the vibration of the other apparatus 10 is notified from the other apparatus 10 in Step s22. If it is determined that the traveling acceleration pattern is not notified from the other apparatus 10 in Step s22, Step s25 is executed. On the other hand, if it is determined that the traveling acceleration patter is notified from the other apparatus 10 in Step s22, the in-vehicle determiner 430 performs pattern comparison in which the traveling acceleration pattern notified from the other apparatus 10 that determines that the other user 9 is present in the vehicle and the pattern of temporal change of acceleration (traveling acceleration pattern) detected by the accelerometer 200 while the subject apparatus 10 is moving in Step s23.

Here, if the traveling acceleration pattern in the other apparatus 10 that determines that the other user 9 is present in the vehicle and the traveling acceleration patter in the subject apparatus 10 share a similarity, the subject user 9 is highly possibly present in the vehicle 6 in the same vehicle 6 as the other user 9. Therefore, in the pattern comparison, the in-vehicle determiner 430 determines whether the traveling acceleration pattern notified from the other apparatus 10 that determines that the other user 9 is present in the vehicle and the traveling acceleration pattern of the subject apparatus 10 share the similarity. If the in-vehicle determiner 430 determines that both the traveling acceleration patterns share the similarity, the in-vehicle determiner 430 determines that the subject user 9 is present in the same vehicle 6 as the other user 9, executes Step s24, and determines "inside vehicle". On the other hand, if the in-vehicle determiner 430 determines that both the traveling acceleration patterns do not share the similarity, the in-vehicle determiner 430 executes Step s25 and determines "outside vehicle". Whether the two traveling acceleration patterns share the similarity is determined, for example, based on amplitude and periods of the two traveling acceleration patterns.

In this manner, the in-vehicle determiner 430 determines whether the subject user 9 is present in the vehicle based on the movement of the other apparatus 10 that determines that the other user 9 is present in the vehicle and the movement of the subject apparatus 10; therefore, the electronic apparatus 10 can correctly determine whether the subject user 9 is present in the vehicle even if the subject user 9 rides the other person's vehicle 6.

Thereafter, in the pattern comparison, being determined "similarity shared" signifies that the both the traveling acceleration patterns are determined to share the similarity. Also, in the pattern comparison, being determined "similarity not shared" signifies that the both the traveling acceleration patterns are determined not to share the similarity.

Note that the in-vehicle determiner 430 may determine whether the user 9 is present in the vehicle based on at least one of the movement stop timing and the movement start timing and the traveling acceleration pattern. In this case, the in-vehicle determiner 430 performs, for example, at least one of the stop timing comparison and the start timing comparison and the pattern comparison.

If the stop timing comparison and the pattern comparison are performed, the in-vehicle determiner 430 determines "inside vehicle" when "close" is determined in the stop timing comparison and "similarity shared" is determined in the pattern comparison. On the other hand, the in-vehicle determiner 430 determines "outside vehicle" when "not close" is determined in the stop timing comparison and determines "outside vehicle" when "similarity not shared" is determined in the pattern comparison.

If the start timing comparison and the pattern comparison are performed, the in-vehicle determiner 430 determines "inside vehicle" when "close" is determined in the start timing comparison and "similarity shared" is determined in the pattern comparison. On the other hand, the in-vehicle determiner 430 determines "outside vehicle" when "not close" is determined in the start timing comparison and determines "outside vehicle" when "similarity not shared" is determined in the pattern comparison.

If the stop timing comparison, the start timing comparison, and the pattern comparison are performed, the in-vehicle determiner 430 determines "inside vehicle" when "close" is determined in each of the stop timing comparison and the start timing comparison and "similarity shared" is determined in the pattern comparison. On the other hand, the in-vehicle determiner 430 determines "outside vehicle" when "not close" is determined in the stop timing comparison, determines "outside vehicle" when "not close" is determined in the start timing comparison, and determines "outside vehicle" when "similarity not shared" is determined in the pattern comparison.

<Third Example of In-Vehicle Determination: In-Vehicle Determination Based on Presence or Absence of Predetermined Information Reception>

If the user 9 is present, not in the vehicle 6 owned by the user, but in another person's vehicle 6, the communication connection setting is possibly unestablished in the electronic apparatus 10 of the user 9. Therefore, in the "first example of in-vehicle determination", the in-vehicle determiner 430 cannot possibly appropriately determine that the user 9 is present in the vehicle, if the user 9 is present in the other person's vehicle 6.

Therefore, in the present example, the in-vehicle determiner 430 determines whether the user 9 is present in the vehicle based on whether the wireless communication unit 110 receives the predetermined information transmitted from the in-vehicle device 60.

For example, a case where manufacturer information indicating the name of the manufacturer of the in-vehicle device 60 is included in device information transmitted by the in-vehicle device 60 compatible with at least one of Bluetooth and Wifi is considered. In this case, the in-vehicle determiner 430 determines that the user 9 is present in the vehicle, if the wireless communication unit 110 receives the manufacturer information included in the device information through Bluetooth or Wifi indicates a car manufacturer. That is, when the wireless communication unit 110 receives the manufacturer information indicating a car manufacturer, the in-vehicle determiner 430 determines that the user 9 is present in the vehicle. On the other hand, the in-vehicle determiner 430 determines that the user 9 is absent in the vehicle, if the manufacturer information received through Bluetooth or Wifi indicates a manufacturer except a car manufacturer. That is, when the wireless communication unit 110 does not receive the manufacturer information indicating a car manufacturer, the in-vehicle determiner 430 determines that the user 9 is absent in the vehicle. Alternatively, the in-vehicle determiner 430 may determine that the user 9 is present in the vehicle, if the wireless communication unit 110 receives the manufacturer information indicating a manufacturer of a satellite navigation device through Bluetooth or Wifi. Alternatively, the in-vehicle determiner 430 may determine that the user 9 is present in the vehicle, if the wireless communication unit 110 receives the manufacturer information indicating a manufacturer of a car audio device through Bluetooth or Wifi. If the electronic apparatus 10 stores a list of car manufacturers, a list of manufacturers of car navigation devices, or a list of manufacturers of car audio devices in the storage 103, the in-vehicle determiner 430 determines whether the wireless communication unit 110 receives the manufacture information indicating a car manufacturer and the like based on the lists.

Further, for example, a case where the device information transmitted by the in-vehicle device 60 includes the on-board information indicating that the in-vehicle device 60 is a communication device mounted on the vehicle is considered. In this case, the in-vehicle determiner 430 determines that the user 9 is present in the vehicle, if the wireless communication unit 110 receives the on-board information through Bluetooth or Wifi. On the other hand, the in-vehicle determiner 430 determines that the user 9 is absent in the vehicle, if the wireless communication unit 110 does not receive the on-board information through Bluetooth or Wifi.

As described above, the in-vehicle determiner 430 determines whether the user 9 is present in the vehicle based on whether the wireless communication unit 110 receives the predetermined information transmitted from the in-vehicle device 60; therefore, the electronic apparatus 10 can correctly determine whether the user 9 is present in the vehicle even if the communication connection setting is unestablished.

<Fourth Example of In-Vehicle Determination: In-Vehicle Determination Based on State of Ambient Air Around the Electronic Apparatus>

In the present example, the in-vehicle determiner 430 determines whether the user 9 is present in the vehicle based on a state of ambient air around electronic apparatus 10.

Figure 11:
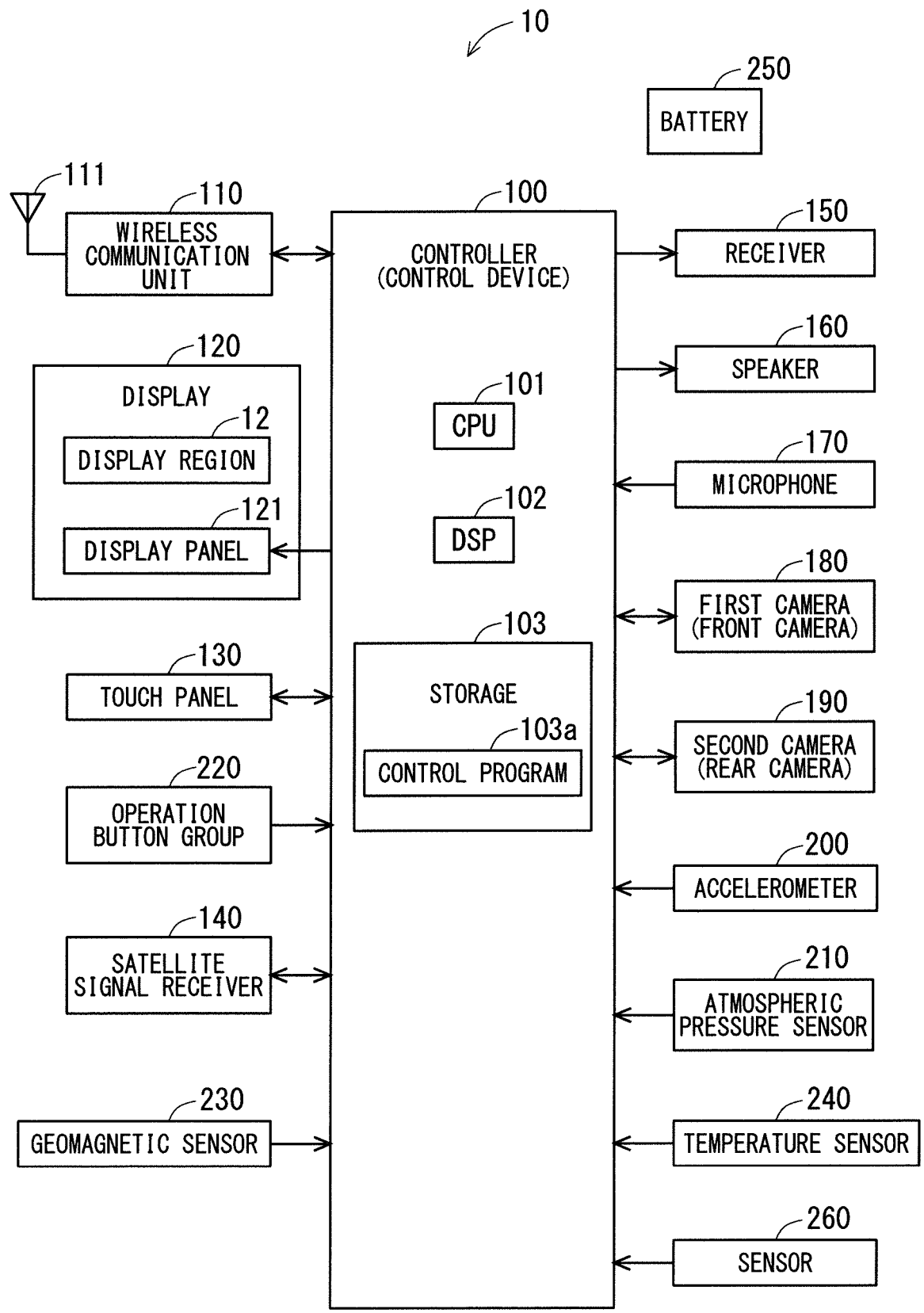
FIG. 11 illustrates a block diagram of an example of a configuration of the electronic apparatus.

As illustrated in FIG. 11, the electronic apparatus 10 according to the present example, a sensor 260 that detects the state of ambient air around the electronic apparatus 10. The sensor 260 is, for example, a gas sensor that detects ambient gas around the electronic apparatus 10 as the state of ambient air around the electronic apparatus 10. In the in-vehicle determination, the in-vehicle determiner 430 determines whether the user 9 is present in the vehicle based on a detection result produced by the sensor 260. The system of the gas sensor may be a semiconductor type or another type.

It is known that the gas components contained in the air in the vehicle 6 and the gas components contained in the air outside the vehicle 6 are different from each other in terms of kind and concentration. In the present example, the detection result in the case where the electronic apparatus 10 is present in the vehicle 6 produced by the sensor 260 is stored in the storage 103 as vehicle gas information. It can be said that the vehicle gas information indicates a state of air in the vehicle 6. In the in-vehicle determination, the in-vehicle determiner 430 acquires the detection result from the sensor 260 and compares the acquired detection result with the vehicle gas information in the storage 103. And the in-vehicle determiner 430 determines whether the user 9 is present in the vehicle, if the detection result produced by the sensor 260 and the vehicle gas information share a similarity. On the other hand, the in-vehicle determiner 430 determines whether the user 9 is absent in the vehicle, if the detection result produced by the sensor 260 and the vehicle gas information do not share the similarity. Whether the detection result produced by the sensor 260 and the vehicle gas information share the similarity is determined based kinds and concentration contained in the respective detection result and the vehicle gas information.

In an operation mode for the electronic apparatus 10 of the present example includes a gas information registration mode for registering the vehicle gas information with the electronic apparatus 10. When the electronic apparatus 10 is present in the vehicle, the user 9 operates the display region 12, for example, to cause the electronic apparatus 10 to set the operation mode to the gas information registration mode. In the electronic apparatus 10 in the gas information registration mode, when the user 9 performs a predetermined operation on the display region 12, for example, the detection result produced by the sensor 260 is stored in the storage 103 as vehicle gas information. The gas information is registered with the electronic apparatus 10 in this manner. When the vehicle gas information is registered with the electronic apparatus 10, the user 9 operates the display region 12 to cause the electronic apparatus 10 to release the gas information registration mode.

The electronic apparatus 10 may automatically register the vehicle gas information. For example, the controller 100 registers the detection result produced by the sensor 260 when the moving means is specified "conveying device" by the stopping-movement specifying unit 410 with the storage 103 as the vehicle gas information. If the user 9 is moving on the "conveying device", the controller 100 may update the vehicle gas information in the storage 103 on a regular or irregular basis.

Note that the sensor 260 may, for example, be a smell sensor that detects an ambient smell around the electronic apparatus 10 as the state of ambient air around the electronic apparatus 10. In this case, in the in-vehicle determination, the in-vehicle determiner 430 may determine whether the user 9 is present in the vehicle based on whether the sensor 260 detects a specific smell. As the specific smell, for example, a smell of an aromatic product provided in a vehicle can be mentioned. In the example, the type of smell detected by the sensor 260 when the electronic apparatus 10 is present in the vehicle is stored in the storage 103 as vehicle smell information. The in-vehicle determiner 430 determines whether the type of smell detected by sensor 260 matches the vehicle smell information in storage 103 in the in-vehicle determination. If the type of smell detected by the sensor 260 matches the vehicle smell information, the in-vehicle determiner 430 determines that the user 9 is present in the vehicle. On the other hand, if the type of smell detected by the sensor 260 does not match the vehicle smell information, the in-vehicle determiner 430 determines that the user 9 is absent in the vehicle. Storage of the vehicle smell information in the storage 103, that is, the registration of the vehicle smell information with the electronic apparatus 10 may be performed by the user 9 operating the display region 12 in the same manner as registration of the vehicle gas information with the electronic apparatus 10, or may be automatically performed by the electronic apparatus 10.

Also, if a barcode indicating the type of smell contained in the aromatic product provided in the vehicle indicates is affixed to the aromatic product, the type of smell indicated by the barcode may be registered with the electronic apparatus 10 as the vehicle smell information. The electronic apparatus 10 can read information from the barcode and store the read information in the storage 103 as the vehicle smell information.

As described above, the in-vehicle determiner 430 determines whether the user 9 is present in the vehicle based on whether the state of ambient air around the electronic apparatus 10; therefore, the electronic apparatus 10 can more correctly determine whether the user 9 is present in the vehicle.

<Fifth Example of In-Vehicle Determination: In-Vehicle Determination Based on Type of Moving Means of User>

As shown in FIGS. 7 to 9, when the Step s2 is not executed, the in-vehicle determiner 430 may determine whether the user 9 is present in the vehicle based on the type of the moving means of the user 9 specified by the stopping-movement specifying unit 410.

For example, if the moving means of the user 9 is determined to be "conveying device" in the stopping-movement specification, the in-vehicle determiner 430 determines that the user 9 is present in the vehicle. On the other hand, if the moving means of the user 9 is determined to be "walk" in the stopping-movement specification, the in-vehicle determiner 430 determines that the user 9 is absent in the vehicle. Also, if it is determined to be "run" in the stopping-movement specification, the in-vehicle determiner 430 determines that the user 9 is absent in the vehicle. Further, if it is determined to be "bicycle" in the stopping-movement specification, the in-vehicle determiner 430 determines that the user 9 is absent in the vehicle.

As described above, the in-vehicle determiner 430 determines whether the user 9 is present in the vehicle based on whether the type of the moving means of the user 9, which is specified by the stopping-movement specifying unit 410; therefore, the electronic apparatus 10 can more correctly determine whether the user 9 is present in the vehicle.

As described above, the five types of in-vehicle determination according to the first to fifth examples have been described. In the above-described Step s4, the in-vehicle determiner 430 may perform two or more types of in-vehicle determination among the five types of in-vehicle determination as provisional in-vehicle determination, and may determine whether the user 9 is present in the vehicle ultimately, based on the result of the provisional in-vehicle determination.

For example, the in-vehicle determiner 430 ultimately determines that the user 9 is present in the vehicle, when it is determined as "inside vehicle" in at least one type of provisional in-vehicle determination among the two or more types of executed provisional in-vehicle determination. And the in-vehicle determiner 430 ultimately determines that the user 9 is absent in the vehicle, when it is determined as "outside vehicle" in all two or more types of executed provisional in-vehicle determination. If the in-vehicle determiner 430 performs the in-vehicle determination according to the second and the third examples provisionally, for example, it can be said that the in-vehicle determiner 430 determines whether the user 9 is present in the vehicle based on the movement of the other apparatus 10 that determines that the other user 9 is present in the vehicle and the movement of the subject apparatus 10, and whether the wireless communication unit 110 of the subject apparatus 10 receives the predetermined information transmitted from the in-vehicle device 60. If the in-vehicle determiner 430 performs the in-vehicle determination according to the third and the fourth examples provisionally, for example, it can be said that the in-vehicle determiner 430 determines whether the user 9 is present in the vehicle based on the movement of the other apparatus 10 that determines that the other user 9 is present in the vehicle, the movement of the subject apparatus 10, and the state of ambient air around the subject apparatus 10.

<Example of Leaving Vehicle Determination>

In some cases, the user 9 leaves the vehicle 6 and stays outside thereof, with the electronic apparatus 10 being left in the vehicle 6. In such a case where the electronic apparatus 10 is present in the vehicle, the user 9 can possibly be determined to be present in the vehicle even if the user 9 has left the vehicle 6 in the above in-vehicle determination.

Figure 12:
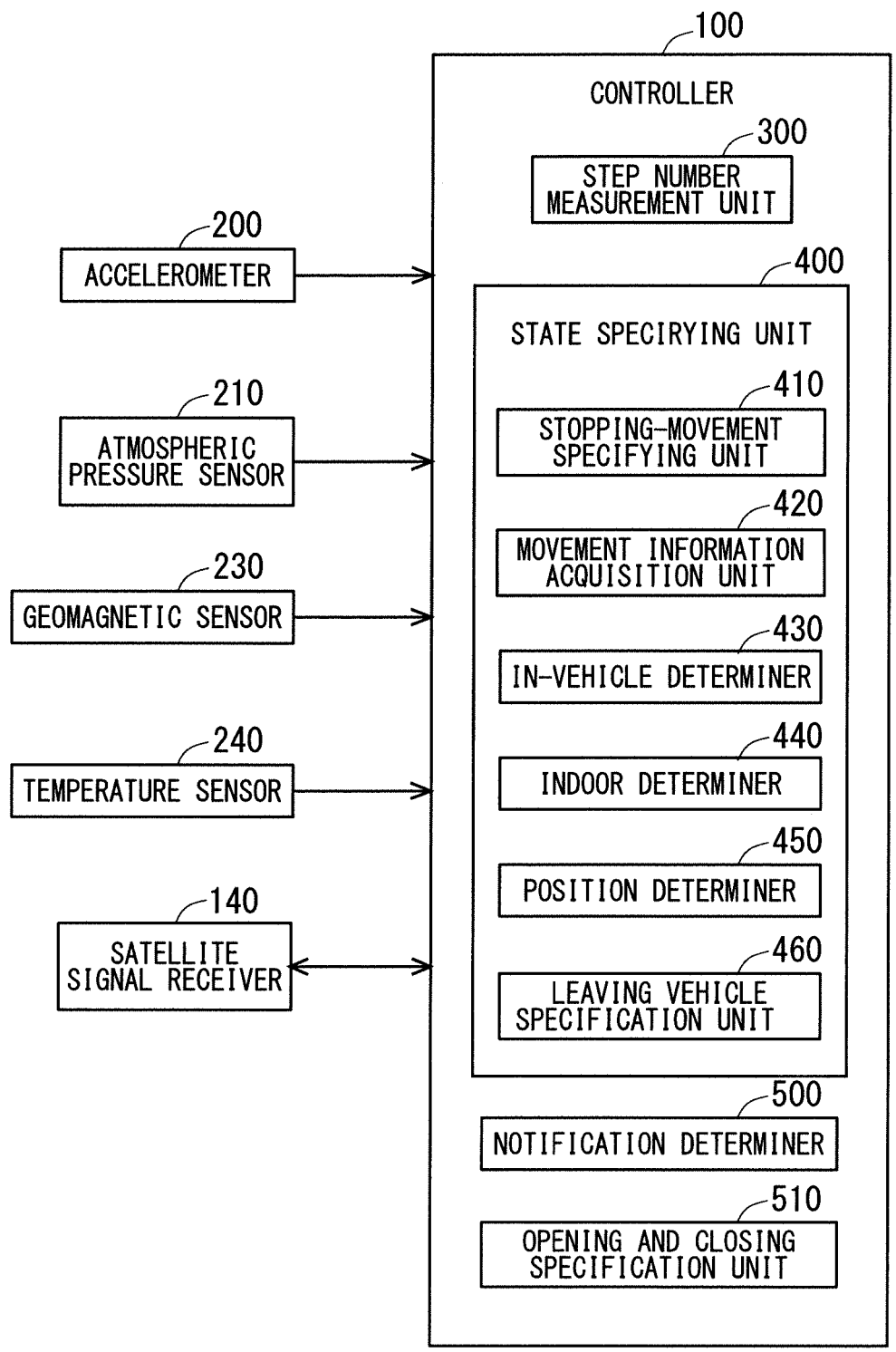
FIG. 12 illustrates a block diagram of an example of a configuration of the controller.

Therefore, even when the user 9 leaves the vehicle 6 with the electronic apparatus 10 being left in the vehicle, the electronic apparatus 10 may correctly determine that the user 9 has left the vehicle 6. FIG. 12 illustrates a block diagram showing an example of a configuration of the controller 100 of the electronic apparatus 10 in this case.

As illustrated in FIG. 12, the controller 100 includes an opening and closing specification unit 510 that can specify opening and closing of a door of the vehicle 6. Further, the state specifying unit 400 includes a leaving vehicle specification unit 460 that can specify that the user 9 has left the vehicle 6. Note that at least one of the opening and closing specification unit 510 and the leaving vehicle specification unit 460 may be realized by a hardware circuit in which software is not required to realize the functions of the hardware circuit.

The opening and closing specification unit 510 can specify opening and closing of the door of the vehicle 6 based on shaking of the electronic apparatus 10. The opening and closing specification unit 510 can specify opening and closing of the door of the vehicle 6 based on acceleration that indicates the shaking of the electronic apparatus 10, which is detected by the accelerometer 200, for example.

The vehicle 6 shakes as the door of the vehicle 6 opens. At this point, if the electronic apparatus 10 is present in the vehicle 6, the electronic apparatus 10 shakes as well. Acceleration detected by the accelerometer 200 changes as the electronic apparatus 10 shakes. Therefore, based on the acceleration detected by the accelerometer 200, the opening and closing specification unit 510 can specify that the door of the vehicle 6 has opened.

Similarly, the vehicle 6 shakes as the door of the vehicle 6 closes. At this point, if the electronic apparatus 10 is present in the vehicle 6, the electronic apparatus 10 shakes as well. Acceleration detected by the accelerometer 200 changes as the electronic apparatus 10 shakes. Therefore, based on the acceleration detected by the accelerometer 200, the opening and closing specification unit 510 can specify that the door of the vehicle 6 has closes.

The leaving vehicle specification unit 460 determines that the user 9 has left the vehicle 6, if the opening and closing specification unit 510 specifies that the door of the vehicle 6 is opened, and then the opening and closing specification unit 510 specifies that the door of the vehicle 6 is closed after the stopping-movement specifying unit 410 has specified that movement of the electronic apparatus 10 stopped if the in-vehicle determiner 430 determines that the user 9 is present in the vehicle. That is, the leaving vehicle specification unit 460 determines that the user 9 has left the vehicle 6, if the door of the vehicle 6 is closed after it opens after the movement of the electronic apparatus 10 has stopped if the user 9 is present in the vehicle. Thus, even when the user 9 leaves the vehicle 6 with the electronic apparatus 10 being left in the vehicle, the electronic apparatus 10 can correctly specify that the user 9 has left the vehicle 6.

If the leaving vehicle specification unit 460 determines that the user 9 has left the vehicle 6 and the electronic apparatus 10 is positioned in the predetermined area, the notification determiner 500 determines "execution of notification". On the other hand, even when the leaving vehicle specification unit 460 determines that the user 9 has left the vehicle 6, the electronic apparatus 10 is not positioned in the predetermined area, the notification determiner 500 determines "non-execution of notification". Noted that the notification determiner 500 may determine "execution of notification", irrespective of whether the electronic apparatus 10 is positioned in the predetermined area, and the leaving vehicle specification unit 460 determines that the user 9 has left the vehicle 6.

The leaving vehicle specification unit 460 may determine that the user 9 has left the vehicle 6, if the opening and closing specification unit 510 specifies that the door of the vehicle 6 is opened after the stopping-movement specifying unit 410 has specified that movement of the electronic apparatus 10 stopped if the in-vehicle determiner 430 determines that the user 9 is present in the vehicle. In this case, the opening and closing specification unit 510 may not specify that the door of the vehicle 6 is closed.

Also the leaving vehicle specification unit 460 may determine that the user 9 has left the vehicle 6, if the opening and closing specification unit 510 specifies that the door of the vehicle 6 is closed after the stopping-movement specifying unit 410 has specified that movement of the electronic apparatus 10 stopped if the in-vehicle determiner 430 determines that the user 9 is present in the vehicle. In this case, the opening and closing specification unit 510 may not specify that the door of the vehicle 6 is opened.

As described above, in the present example, the leaving vehicle specification unit 460 determines that user 9 has left the vehicle, if at least one of opening and closing of the door of the vehicle 6 is specified after the stopping of movement of the electronic apparatus 10 has been specified if the user 9 is determined to be present in the vehicle. In other words, the leaving vehicle specification unit 460 determines that user 9 has left the vehicle, if at least one of opening and closing of the door of the vehicle 6 is specified after the state of the electronic apparatus 10 has changed from the moving state to the stopping state if the user 9 is determined to be present in the vehicle. Thus, the electronic apparatus 10 can correctly specify leaving of the user 9 from the vehicle 6.

It should be noted that, even when the user 9 leaves the vehicle 6 with the electronic apparatus 10, the electronic apparatus 10 possessed by the user 9 highly possibly shakes. Thus, even when the user 9 leaves the vehicle 6 with the electronic apparatus 10, the leaving vehicle specification unit 460 can correctly specify that the user 9 has left the vehicle 6.

Also, in the case where the user 9 leaves the vehicle 6 with the electronic apparatus 10 and executes self-movement, the stopping-movement specifying unit 410 of the electronic apparatus 10 specifies execution of self-movement of the user 9. Therefore, the leaving vehicle specification unit 460 may determine that user 9 has left the vehicle 6, if the stopping-movement specifying unit 410 specifies that the user 9 executes the self-movement after the stopping of movement of the electronic apparatus 10 has specified if the user 9 is determined to be present in the vehicle. Thus, if the user 9 leaves the vehicle 6 with the electronic apparatus 10, the leaving of the user 9 from the vehicle 6 can be more correctly specified.

Further, if the vehicle 6 can notify the electronic apparatus 10 in the vehicle 6 of opening and closing information on its door through Bluetooth or the like, the leaving vehicle specification unit 460 may determine that the user 9 has left the vehicle 6 based on the opening and closing information on the door from the vehicle 6. For example, the leaving vehicle specification unit 460 may determine that user 9 has left the vehicle 6, if the leaving vehicle specification unit 460 is notified, from the vehicle 6, that the door of the vehicle 6 is opened after the stopping of movement of the electronic apparatus 10 has specified if the user 9 is determined to be present in the vehicle. Also, the leaving vehicle specification unit 460 may determine that user 9 has left the vehicle 6, if the leaving vehicle specification unit 460 is notified, from the vehicle 6, that the door of the vehicle 6 is closed after the stopping of movement of the electronic apparatus 10 has specified if the user 9 is determined to be present in the vehicle. Also, the leaving vehicle specification unit 460 may determine that user 9 has left the vehicle 6, if the leaving vehicle specification unit 460 is notified, from the vehicle 6, that the door of the vehicle 6 is opened, and then the door of the vehicle 6 is closed after the stopping of movement of the electronic apparatus 10 has specified if the user 9 is determined to be present in the vehicle.

Accordingly, after the stopping of movement of the electronic apparatus 10 has specified if the user 9 is determined to be present in the vehicle, if at least one of opening and closing of the door is notified from the vehicle 6, the leaving vehicle specification unit 460 determines that the user 9 has left the vehicle 6; therefore, the electronic apparatus 10 can correctly specify that the user 9 leaves the vehicle 6.

<Example of Indoor Determination>

Next, details of the indoor determination will be described. In the following, examples of a plurality of types of the indoor determination will be described.

<First Example of Indoor Determination: Utilization of Change in Reception State and User's Movement>

If the user 9 moves from the outdoors to the indoors, the reception state highly possibly becomes poor. If the user 9 moves from the indoors to the outdoors, the reception state highly possibly improves. Accordingly, whether the user 9 is present indoors can be correctly determined to some degree based on the change in the reception state of the receiver 140.

However, even when the user 9 is present outdoors, the reception state may change in cases where when the user 9 temporarily passes into a tunnel or under a bridge, or when a shade is temporarily above the user 9, for example. Therefore, in the case where the user 9 is present indoors based on only the change of the reception state of the receiver 140, the determination may possibly mistakenly be made.

Therefore, the indoor determiner 440 according to the present example determines whether the user 9 is present indoors, based on the change of the reception state of the receiver 140 and the movement information indicating the movement of the user 9, which is acquired by the movement information acquisition unit 420. Accordingly, the electronic apparatus 10 can more correctly determine whether the user 9 is present indoors.

The movement information includes at least one of the continuous stopping period of time of the user 9, the continuous walking period of time of the user 9, the number of continuous walking steps of the user 9, and the traveling direction of the user 9. Here, the continuous stopping period of time of the user 9 indicates a period of time during which the user 9 continuously stops. The continuous walking period of time of the user 9 indicates a period of time during which the user 9 is continuously walking. And the number of continuous walking steps of the user 9 indicates the number of steps measured from start of walking in the case where the user 9 is continuously walking. The indoor determination based on the continuous stopping period of time of the user 9, the indoor determination based on the continuous walking period of time of the user 9, the indoor determination based on the number of continuous walking steps of the user 9, and the indoor determination based on the traveling direction of the user 9 will be described below. Hereinafter, stating simply the reception state signifies the reception state of the receiver 140.

<Example of Indoor Determination Based on Continuous Stopping Period of Time of User>

Figure 13:
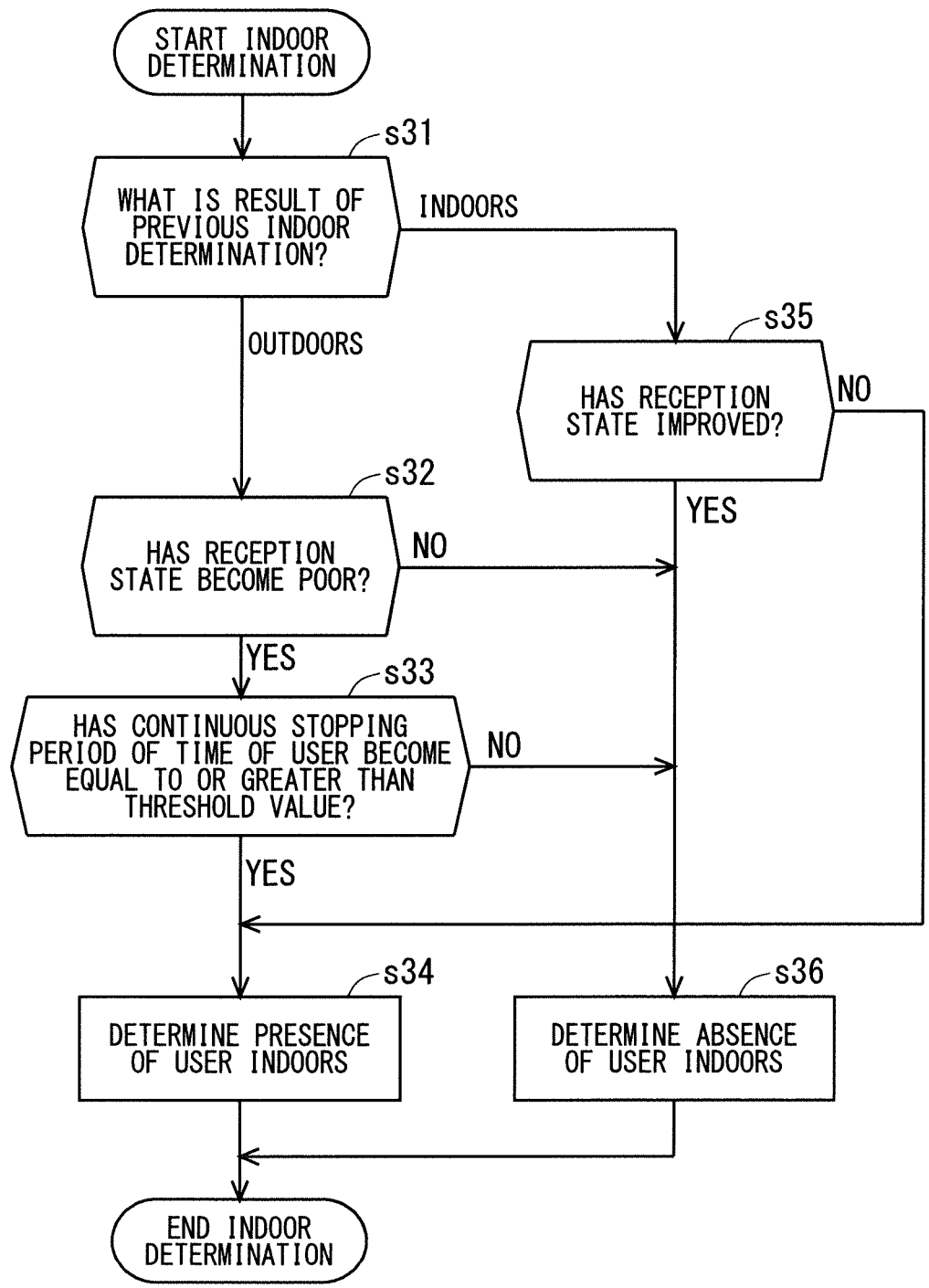
FIG. 13 illustrates a flowchart showing an example of an operation of the electronic apparatus.

If the user 9 is present indoors, the user 9 highly possibly stops for a long period of continuous time. Therefore, the indoor determiner 440 determines whether the user 9 is present indoors based on, for example, the change of reception state and the continuous stopping period of time of the user 9. FIG. 13 illustrates a flowchart showing an example of the indoor determination in this case.

As illustrated in FIG. 13, the indoor determiner 440 confirms the result of the previous indoor determination in Step s31. If the indoor determiner 440 determines "the outdoors" in the previous indoor determination, that is, the indoor determiner 440 determines that the user 9 is present outdoors, the indoor determiner 440 determines whether the reception state becomes poor during a predetermined time in Step s32. If the indoor determiner 440 has determined that the reception state has become poor during the predetermined time, the indoor determiner 440 checks (monitors) whether the continuous stopping period of time of the user 9 in a state where the reception state has been poor becomes equal to or greater than a third threshold value for a predetermined time in Step s33. On the other hand, the indoor determiner 440 determines that the user 9 is absent indoors, if the indoor determiner 440 determines that the reception state does not become poor during the predetermined time.

In Step s33, if the indoor determiner 440 confirms that the continuous stopping period of time of the user 9 in the state where the reception state has been poor has become equal to or greater than the third threshold value during the predetermined time, the indoor determiner 440 determines "the indoors" in Step s34. On the other hand, if the indoor determiner 440 does not confirm that the continuous stopping period of time of the user 9 in the state where the reception state has been poor has become equal to or greater than the third threshold value during the predetermined time, the indoor determiner 440 determines "the outdoors" in Step s36.

The third threshold value is set to ten seconds or more, for example. The indoor determiner 430 can specify the continuous stopping period of time of the user 9 based on the result of the stopping-movement specification in the stopping-movement specifying unit 410.

The indoor determiner 440 determines that the reception state becomes poor, for example, when the latest number of captured satellites acquired by the receiver 140 is smaller than the previously acquired number of captured satellites, and when an absolute value of the difference between the both numbers of captured satellites is equal to or greater than a fourth threshold value. The fourth threshold value is set to three or more, for example. Note that, the C/N value of the reception signal at the receiver 140 may be adopted, instead for the number of captured satellites. The C/N value represents the ratio between the carrier power and the noise power and indicates the reception quality. The receiver 140 is capable of calculating the C/N value of the reception signal and outputting the signal to the controller 100. The indoor determiner 440 determines that the reception state becomes poor, when the latest C/N value acquired by the receiver 140 is smaller than the previously acquired C/N value, and when an absolute value of the difference between the both C/N values is equal to or greater than a fifth threshold value. The fifth threshold value is set to ten or more, for example.

If the indoor determiner 440 determines "the indoors" in the previous indoor determination as a result of the confirmation of the result of the previous indoor determination in Step s31, that is, if the indoor determiner 440 determines that the user 9 is present indoors, the indoor determiner 440 checks whether the reception state improves during the predetermined time in Step s35. If the indoor determiner 440 determines that the reception state improves during the predetermined time, the indoor determiner 440 determines "the outdoors" in Step s36. On the other hand, if the indoor determiner 440 does not confirm the improvement in the reception state during the predetermined time, that is, the reception state does not improve for the predetermined time, the indoor determiner 440 determines "the indoors" in Step s34.

The indoor determiner 440 determines that the reception state has improved, for example, when the latest number of captured satellites acquired by the receiver 140 is greater than the previously acquired number of captured satellites, and when an absolute value of the difference between the both numbers of captured satellites is equal to or greater than a sixth threshold value. The sixth threshold value is set to three or more, for example. Note that, the C/N value of the reception signal at the receiver 140 may be adopted, instead for the number of captured satellites.

Accordingly, the indoor determiner 440 determines whether the user 9 is present indoors based on the change in the reception state and the continuous stopping period of time of the user 9; therefore, the electronic apparatus 10 can more correctly determine whether the user 9 is present indoors.

Thereafter, to check whether the continuous stopping period of time of the user 9 in the state where the reception state has been poor becomes equal to or greater than the third threshold value for the predetermined time may be referred to as "stopping period of time check in poor state". Further, if "stopping period of time: great" is confirmed in the stopping period of time check in poor state, this signifies that the continuous stopping period of time of the user 9 in the state where the reception state has been poor has become equal to or greater than the third threshold value during the predetermined time has been confirmed. Further, if "stopping period of time: great" is unconfirmed in the stopping period of time check in poor state, this signifies that the continuous stopping period of time of the user 9 in the state where the reception state has been poor has become equal to or greater than the third threshold value during the predetermined time has been unconfirmed.

<Example of Indoor Determination Based on Continuous Walking Period of Time of User>

If the user 9 is present indoors, the probability that the continuous walking period of time of the user 9 becomes great is low. Therefore, the indoor determiner 440 determines whether the user 9 is present indoors based on, for example, the change of reception state and the continuous stopping period of time of the user 9. In this case, In the above-described Step s33, the indoor determiner 440 checks whether the continuous stopping period of time of the user 9 in the state where the reception state has been poor becomes equal to or greater than a seventh threshold value for a predetermined time. If the indoor determiner 440 confirms that the continuous stopping period of time of the user 9 in the state where the reception state has been poor becomes equal to or greater than the seventh threshold value for the predetermined time, the indoor determiner 440 executes Step s36 and determines "the outdoors". On the other hand, the indoor determiner 440 does not confirm that the continuous stopping period of time of the user 9 in the state where the reception state has been poor becomes equal to or greater than the seventh threshold value for the predetermined time, the indoor determiner 440 executes Step s34 and determines "the indoors". The seventh threshold value is set to five to ten seconds, for example. The indoor determiner 440 can specify the continuous walking period of time of the user 9 based on the result of the stopping-movement specification in the stopping-movement specifying unit 410. The other part of the indoor determination of the present example is the same as the example of FIG. 13.

Accordingly, the indoor determiner 440 determines whether the user 9 is present indoors based on the change in the reception state and the continuous walking period of time of the user 9; therefore, the electronic apparatus 10 can more correctly determine whether the user 9 is present indoors.

Thereafter, to check whether the continuous walking period of time of the user 9 in the state where the reception state has been poor becomes equal to or greater than the seventh threshold value for the predetermined time may be referred to as "walking period of time check in poor state". Also, if "walking period of time: great" is confirmed in the walking period of time check in poor state, this signifies that the continuous walking period of time of the user 9 in the state where the reception state has been poor has become equal to or greater than the seventh threshold value during the predetermined time has been confirmed. Also, if "walking period of time: great" is unconfirmed in the walking period of time check in poor state, this signifies that the continuous walking period of time of the user 9 in the state where the reception state has been poor has become equal to or greater than the seventh threshold value during the predetermined time has been unconfirmed.

<Example of Indoor Determination Based on Number of Continuous Walking Steps of User>

If the user 9 is present indoors, the probability that the number of continuous walking steps of the user 9 becomes great is low. Therefore, the indoor determiner 440 determines whether the user 9 is present indoors based on, for example, the change of reception state and the number of continuous walking steps of the user 9. In this case, in the above-described Step s33, the indoor determiner 440 checks whether the number of continuous walking steps of the user 9 in the state where the reception state has been poor becomes equal to or greater than an eighth threshold value for a predetermined time. If the indoor determiner 440 confirms that the number of continuous walking steps of the user 9 in the state where the reception state has been poor becomes equal to or greater than the eighth threshold value for the predetermined time, the indoor determiner 440 executes Step s36 and determines "the outdoors". On the other hand, the indoor determiner 440 does not confirm that the number of continuous walking steps of the user 9 in the state where the reception state has been poor becomes equal to or greater than the eighth threshold value for the predetermined time, the indoor determiner 440 executes Step s34 and determines "the indoors". The seventeenth threshold value is set to five to ten, for example. The indoor determiner 440 can specify the stopping-movement specification of the user 9 based on the result of the stopping-movement specification in the stopping-movement specifying unit 410. The other part of the indoor determination of the present example is the same as the example of FIG. 13.

Accordingly, the indoor determiner 440 determines whether the user 9 is present indoors based on the change in the reception state and the number of continuous walking steps of the user 9; therefore, the electronic apparatus 10 can more correctly determine whether the user 9 is present indoors.

Thereafter, to check whether the number of continuous walking steps of the user 9 in the state where the reception state has been poor becomes equal to or greater than the eighth threshold value for the predetermined time may be referred to as "number of steps check in poor state". Also, if "number of steps: great" is confirmed in the number of steps check in poor state, this signifies that the number of continuous walking steps of the user 9 in the state where the reception state has been poor has become equal to or greater than the eighth threshold value during the predetermined time has been confirmed. Also, if "number of steps: great" is unconfirmed in the number of steps check in poor state, this signifies that the number of continuous walking steps of the user 9 in the state where the reception state has been poor has become equal to or greater than the eighth threshold value during the predetermined time has been unconfirmed.

<Example of Indoor Determination Based on Traveling Direction of User>

If the user 9 is present indoors, the probability that the traveling direction of the user 9 remains unidirectional for long period of time is low. Therefore, the indoor determiner 440 determines whether the user 9 is present indoors based on, for example, the change of reception state and the traveling direction of the user 9. In this case, in the above-described Step s33, the indoor determiner 440 checks whether the traveling direction of the user 9 in the state where the reception state has been poor remains unchanged for a predetermined time. The indoor determiner 440 can specify the traveling direction of the user 9 based on the magnetic field detected by the geomagnetism sensor 230. The indoor determiner 440 determines that whether the traveling direction of the user 9 in the state where the reception state has been poor remains unchanged for the predetermined time, the indoor determiner 440 executes Step s36 and determines "the outdoors". On the other hand, the indoor determiner 440 determines that whether the traveling direction of the user 9 in the state where the reception state has been poor has changed for the predetermined time, the indoor determiner 440 executes Step s34 and determines "the indoors". The other part of the indoor determination of the present example is the same as the example of FIG. 13.

Accordingly, the indoor determiner 440 determines whether the user 9 is present indoors based on the change in the reception state and the traveling direction of the user 9; therefore, the electronic apparatus 10 can more correctly determine whether the user 9 is present indoors.

Thereafter, to check whether the traveling direction of the user 9 in the state where the reception state has been poor remains unchanged for the predetermined time may be referred to as "traveling direction check in poor state". Further, if "unchanged" is confirmed in the traveling direction check in poor state, this signifies that the traveling direction of the user 9 in the state where the reception state has been poor is not changed during the predetermined time has been determined. Further, if "unchanged" is unconfirmed in the traveling direction check in poor state, this signifies that the traveling direction of the user 9 in the state where the reception state has been poor has changed during the predetermined time has been determined.

Note that the indoor determiner 440 may determine whether the user 9 is present indoors based on the change in the reception state and at least two types of information among the continuous stopping period of time of the user 9, the continuous walking period of time of the user 9, the number of continuous walking steps of the user 9, and the traveling direction of the user 9.

For example, the indoor determiner 440 may determine whether the user 9 is present indoors based on the continuous stopping period of time and the continuous walking period of time of the user 9 and the change in the reception state, by performing the stopping period of time check in poor state and the walking period of time check in poor state in Step s33. In this case, if "stopping period of time: great" is confirmed in the stopping period of time check in poor state and "walking period of time: great" is unconfirmed in the walking period of time check in poor state, the indoor determiner 440 determines "the indoors". On the other hand, the indoor determiner 440 determines "the outdoors" if "stopping period of time: great" is unconfirmed in the stopping period of time check in poor state and determines "the outdoors" if "walking period of time: great" is confirmed in the walking period of time check in poor state.

Further, for example, the indoor determiner 440 may determine whether the user 9 is present indoors based on the continuous stopping period of time, the continuous walking period of time, and the number of continuous walking steps of the user 9, and the change in the reception state, by performing the stopping period of time check in poor state, the walking period of time check in poor state, and the number of steps check in poor state in Step s33. In this case, if "stopping period of time: great" is confirmed in the stopping period of time check in poor state, "walking period of time: great" is unconfirmed in the walking period of time check in poor state, and "number of steps: great" is unconfirmed in the number of steps check in poor state, the indoor determiner 440 determines "the indoors". On the other hand, the indoor determiner 440 determines "the outdoors" if "stopping period of time: great" is unconfirmed in the stopping period of time check in poor state and determines "the outdoors" if "walking period of time: great" is confirmed in the walking period of time check in poor state.

Also, if "number of steps: great" is confirmed in the number of steps check in poor state, the indoor determiner 440 determines "the outdoors".

Further, for example, the indoor determiner 440 may determine whether the user 9 is present indoors based on the continuous stopping period of time, the continuous walking period of time, the number of continuous walking steps, and the traveling direction of the user 9 and the change in the reception state, by performing the stopping period of time check in poor state, the walking period of time check in poor state, the number of steps check in poor state, and the traveling direction check in poor state in Step s33. In this case, the indoor determiner 440 determines "the indoors" if "stopping period of time: great" is confirmed in the stopping period of time check in poor state, "walking period of time: great" is unconfirmed in the walking period of time check in poor state, "number of steps: great" is unconfirmed in the number of steps check in poor state, and "unchanged" is unconfirmed in the traveling direction check in poor state. On the other hand, the indoor determiner 440 determines "the outdoors" if "stopping period of time: great" is unconfirmed in the stopping period of time check in poor state and determines "the outdoors" if "walking period of time: great" is confirmed in the walking period of time check in poor state. Further, the indoor determiner 440 determines "the outdoors" if "number of steps: great" is confirmed in the number of steps check in poor state and determines "the outdoors" if "unchanged" is confirmed in the traveling direction check in poor state.

Further, even if the user 9 is present indoors, when the user 9 is by the window, the reception state can be improved. Therefore, as the above-described example of FIG. 13, the indoor determiner 440 may possibly determine that the user 9 is not present indoors even if the user 9 is present indoors, if the indoor determiner 440 determines that the user 9 is present indoors, and then determines "the outdoors" when it determines that the reception stated has improved.

On the other hand, if the user 9 is present indoors, even if the reception state has improved, probability that the continuous stopping period of time of the user 9 becomes great and the probability that the continuous walking period of time of the user 9 does not become great do not change.

Therefore, if the indoor determiner 440 determines that the user 9 is present indoors, and then determines that the reception state has improved, the indoor determiner 440 may specify that the user 9 has moved outside based on the movement information.

For example, if the indoor determiner 440 determines that the reception state has improved during the predetermined time in Step s35, and then the indoor determiner 440 executes Step s38 as illustrated in FIG. 14. In Step s38, the indoor determiner 440 determines whether the user 9 has moved outside based on the movement information. In Step s38, the indoor determiner 440 determines whether the user 9 has moved outside based on the continuous stopping period of time, for example. The indoor determiner 440 checks, for a predetermined time, whether the continuous stopping period of time of the user 9 with the reception state is improved becomes equal to or greater than the third threshold value. Thereafter, this confirmation may be referred to as "stopping period of time check in improved state". If the indoor determiner 440 does not confirm that the continuous stopping period of time of the user 9 in the state where the reception state has been improved has become equal to or greater than the third threshold value during the predetermined time, the indoor determiner 440 determines that the user 9 has moved outside. And the indoor determiner 440 executes Step s36 and determines "the outdoors". On the other hand, if the indoor determiner 440 confirms that the continuous stopping period of time of the user 9 in the state where the reception state has been improved has become equal to or greater than the third threshold value during the predetermined time, the indoor determiner 440 determines that the user 9 has not moved outside. And the indoor determiner 440 executes Step s34 and determines "the indoors".

Thereafter, if "stopping period of time: great" is confirmed in the stopping period of time check in improved state, this signifies that the continuous stopping period of time of the user 9 in the state where the reception state has been improved has become equal to or greater than the third threshold value during the predetermined time has been confirmed. Further, if "stopping period of time: great" is unconfirmed in the stopping period of time check in improved state, this signifies that the continuous stopping period of time of the user 9 in the state where the reception state has been improved has become equal to or greater than the third threshold value during the predetermined time has been unconfirmed.

Note that in Step s38, the indoor determiner 440 may determine whether the user 9 has moved outside based on the continuous walking period of time. In this case, the indoor determiner 440 checks, for a predetermined time, whether the continuous walking period of time of the user 9 with the reception state is improved becomes equal to or greater than the seventh threshold value. This confirmation may be referred to as "walking period of time check in improved state". If the indoor determiner 440 confirms that the continuous walking period of time of the user 9 in the state where the reception state has been improved has become equal to or greater than the seventh threshold value during the predetermined time, the indoor determiner 440 determines that the user 9 has moved outside. On the other hand, if the indoor determiner 440 does not confirm that the continuous walking period of time of the user 9 in the state where the reception state has been improved has become equal to or greater than the seventh threshold value during the predetermined time, the indoor determiner 440 determines that the user 9 has not moved outside.

Thereafter, if "walking period of time: great" is confirmed in the walking period of time check in improved state, this signifies that the continuous walking period of time of the user 9 in the state where the reception state has been poor has become equal to or greater than the seventh threshold value during the predetermined time has been confirmed. Also, if "walking period of time: great" is unconfirmed in the walking period of time check in improved state, this signifies that the continuous walking period of time of the user 9 in the state where the reception state has been poor has become equal to or greater than the seventh threshold value during the predetermined time has been unconfirmed.

Alternatively in Step s38, the indoor determiner 440 may determine whether the user 9 has moved outside based on the number of continuous walking steps. In this case, the indoor determiner 440 checks, for a predetermined time, whether the number of continuous walking steps of the user 9 with the reception state is improved becomes equal to or greater than the eighth threshold value. This confirmation may be referred to as "number of steps check in improved state". If the indoor determiner 440 confirms that the number of continuous walking steps of the user 9 in the state where the reception state has been improved has become equal to or greater than the eighth threshold value during the predetermined time, the indoor determiner 440 determines that the user 9 has moved outside. On the other hand, if the indoor determiner 440 does not confirm that the number of continuous walking steps of the user 9 in the state where the reception state has been improved has become equal to or greater than the eighth threshold value during the predetermined time, the indoor determiner 440 determines that the user 9 has not moved outside.

Thereafter, if "number of steps: great" is confirmed in the number of steps check in improved state, this signifies that the number of continuous walking steps of the user 9 in the state where the reception state has been improved has become equal to or greater than the eighth threshold value during the predetermined time has been confirmed. Also, if "number of steps: great" is unconfirmed in the number of steps check in improved state, this signifies that the number of continuous walking steps of the user 9 in the state where the reception state has been improved has become equal to or greater than the eighth threshold value during the predetermined time has been unconfirmed.

Further in Step s38, the indoor determiner 440 may determine whether the user 9 has moved outside based on the traveling direction of the user 9. In this case, the indoor determiner 440 checks whether the traveling direction of the user 9 in the state where the reception state has been improved remains unchanged for a predetermined time. This confirmation may be referred to as "traveling direction check in improved state" in some cases. If the indoor determiner 440 determines that the traveling direction of the user 9 in the state where the reception state has been improved remains unchanged for a predetermined time, the indoor determiner 440 determines that user 9 has not moved outside. On the other hand, if the indoor determiner 440 determines that the traveling direction of the user 9 in the state where the reception state has been improved has unchanged for the predetermined time, the indoor determiner 440 determines that user 9 has moved outside.

Thereafter, if "unchanged" is confirmed in the traveling direction check in improved state, this signifies that the traveling direction of the user 9 in the state where the reception state has been improved has not changed during the predetermined time has been determined. Further, if "unchanged" is unconfirmed in the traveling direction check in improved state, this signifies that the traveling direction of the user 9 in the state where the reception state has been improved has changed during the predetermined time has been determined.

Also, in Step s38, the indoor determiner 440 may determine whether the user 9 has moved outside based on at least two types of information among the continuous stopping period of time of the user 9, the continuous walking period of time of the user 9, the number of continuous walking steps of the user 9, and the traveling direction of the user 9.

For example, the indoor determiner 440 may determine whether the user 9 has moved outside based on the continuous stopping period of time and the continuous walking period of time of the user 9 and the change in the reception state, by performing the stopping period of time check in improved state and the walking period of time check in improved state in Step s38. In this case, if "stopping period of time: great" is confirmed in the stopping period of time check in improved state and "walking period of time: great" is unconfirmed in the walking period of time check in improved state, the indoor determiner 440 determines that the user 9 has not moved outside. On the other hand, the indoor determiner 440 determines that the user 9 has moved outside if "stopping period of time: great" is unconfirmed in the stopping period of time check in improved state and determines that the user 9 has moved outside if "walking period of time: great" is confirmed in the walking period of time check in improved state.

Further, for example, the indoor determiner 440 may determine whether the user 9 has moved outside based on the continuous stopping period of time, the continuous walking period of time, and the number of continuous walking steps of the user 9, by performing the stopping period of time check in improved state, the walking period of time check in improved state, and the number of steps check in improved state in Step s38. In this case, if "stopping period of time: great" is confirmed in the stopping period of time check in improved state and "walking period of time: great" is unconfirmed in the walking period of time check in improved state, the indoor determiner 440 determines that the user 9 has not moved outside. On the other hand, the indoor determiner 440 determines that the user 9 has moved outside if "stopping period of time: great" is unconfirmed in the stopping period of time check in improved state and determines that the user 9 has moved outside if "walking period of time: great" is confirmed in the walking period of time check in improved state. Also, if "number of steps: great" is confirmed in the number of steps check in improved state, the indoor determiner 440 determines that the user 9 has moved outside.

Further, for example, the indoor determiner 440 may determine whether the user 9 has moved outside based on the continuous stopping period of time, the continuous walking period of time, the number of continuous walking steps, and the traveling direction of the user 9 by performing the stopping period of time check in improved state, the walking period of time check in improved state, the number of steps check in improved state, and the traveling direction check in improved state in Step s38. In this case, if "stopping period of time: great" is confirmed in the stopping period of time check in improved state, "walking period of time: great" is unconfirmed in the walking period of time check in improved state, "number of steps: great" is unconfirmed in the number of steps check in improved state, and "unchanged" is unconfirmed in the traveling direction check in improved state, the indoor determiner 440 determines that the user 9 has not moved outside, other hand, the indoor determiner 440 determines that the user 9 has moved outside if "stopping period of time: great" is unconfirmed in the stopping period of time check in improved state and determines that the user 9 has moved outside if "walking period of time: great" is confirmed in the walking period of time check in improved state. Also, if "number of steps: great" is confirmed in the number of steps check in improved state, the indoor determiner 440 determines that the user 9 has moved outside and determines that the user 9 has moved out if "unchanged" is confirmed.

Therefore, if the indoor determiner 440 determines that the user 9 is present indoors, and then determines that the reception state has improved, the indoor determiner 440 specifies that the user 9 has moved outside based on the movement information; therefore, the electronic apparatus 10 can more correctly specifies that the user 9 has moved outside.

<Second Example of Indoor Determination: Utilization of Change in Reception State and Change in Height Position of Electronic Apparatus>

If the user 9 is present indoors, the height position of the electronic apparatus 10 may highly possibly be changed as the user 9 may move up from the first floor to the second floor, or move down from the first floor to the basement.

Therefore, the indoor determiner 440 may determine whether the user 9 is present indoors based on the change in the height position of the electronic apparatus 10 and the change in the reception state.

In the present example, in the above-described Step s33, the indoor determiner 440 checks, for example, whether the height position of the electronic apparatus 10 in the state where the reception state has been poor has increased by equal to or greater than a predetermined value for a predetermined time. Also, the indoor determiner 440 checks whether the height position of the electronic apparatus 10 in the state where the reception state has been poor has decreased by equal to or greater than the predetermined value for the predetermined time. The indoor determiner 440 can determine whether the height position of the electronic apparatus 10 has increased by equal to or greater than the predetermined value based on a detection result by the atmospheric pressure sensor 210. The indoor determiner 440 can determine whether the height position of the electronic apparatus 10 has decreased by equal to or greater than the predetermined value based on a detection result by the atmospheric pressure sensor 210.

If the indoor determiner 440 confirms that the height position of the electronic apparatus 10 in the state where reception state has been poor has increased by equal to or greater than the predetermined value in the predetermined time, the indoor determiner 440 executes Step s34 and determines "the indoors". If the indoor determiner 440 confirms that the height position of the electronic apparatus 10 in the state where the reception state has been poor has decreased by equal to or greater than the predetermined value in the predetermined time, the indoor determiner 440 executes Step s34 and determines "the indoors". On the other hand, if the indoor determiner 440 does not confirm that the height position of the electronic apparatus 10 in the state where the reception state has been poor has increased by equal to or greater than the predetermined value in the predetermined time, and if the indoor determiner 440 does not confirm that the height position of the electronic apparatus 10 in the state where the reception state has been poor has decreased by equal to or greater than the predetermined value in the predetermined time, the indoor determiner 440 executes Step s36 and determines "the outdoors".

Accordingly, the indoor determiner 440 determines whether the user 9 is present indoors based on the change in the height position of the electronic apparatus 10 and the change in the reception state; therefore, the electronic apparatus 10 can more correctly determine whether the user 9 is present indoors.

Alternatively in the above described in Step s38 of FIG. 14, the indoor determiner 440 may determine whether the user 9 has moved outside based on the change in the height position of the electronic apparatus 10. In this case, the indoor determiner 440 checks whether the height position of the electronic apparatus 10 in the state where the reception state has been improved has increased by equal to or greater than the predetermined value for the predetermined time. Also, the indoor determiner 440 checks whether the height position of the electronic apparatus 10 in the state where the reception state has been improved has decreased by equal to or greater than the predetermined value for the predetermined time. If the indoor determiner 440 confirms that the height position of the electronic apparatus 10 in the state where the reception state has been improved has increased by equal to or greater than the predetermined value in the predetermined time, the indoor determiner 440 determines that the user 9 has not moved outside. If the indoor determiner 440 confirms that the height position of the electronic apparatus 10 in the state where the reception state has been improved has decreased by equal to or greater than the predetermined value in the predetermined time, the indoor determiner 440 determines that the user 9 has not moved outside. On the other hand, if the indoor determiner 440 does not confirm that the height position of the electronic apparatus 10 in the state where the reception state has been improved has increased by equal to or greater than the predetermined value in the predetermined time, and if the indoor determiner 440 does not confirm that the height position of the electronic apparatus 10 in the state where the reception state has been improved has decreased by equal to or greater than the predetermined value in the predetermined time, the indoor determiner 440 determines that the user 9 has moved outside.

Accordingly, the indoor determiner 440 determines the user 9 is present indoors, and then determines that the user 9 has moved outside based on the change in the height position of the electronic apparatus 10 and the change in the reception state; therefore, the electronic apparatus 10 can more correctly determine whether the user 9 has moved outside.

<Third Example of Indoor Determination: Utilization of Change in Reception State and Change in Ambient State of Electronic Apparatus>

If the user 9 moves from the indoors to the outdoors, the ambient state of the electronic apparatus 10 may highly possibly be changed. If the user 9 moves from the outdoors to the indoors, the ambient temperature of the electronic apparatus 10 may highly possibly be changed, for example. Also, if the user 9 moves from the outdoors to the indoors, the ambient magnetic field of the electronic apparatus 10 may highly possibly be changed. If the user 9 moves from the outdoors to the indoors, the ambient air of the electronic apparatus 10 may highly possibly be changed.

Therefore, the indoor determiner 440 may determine whether the user 9 is present indoors based on the change in the ambient state of the electronic apparatus 10 and the change in the reception state. The indoor determiner 440 may determine whether the user 9 is present indoors, for example, based on the change in at least one of the states of ambient temperature, ambient magnetic field, and ambient air of the electronic apparatus 10 and the change in the reception state.

Figure 15:
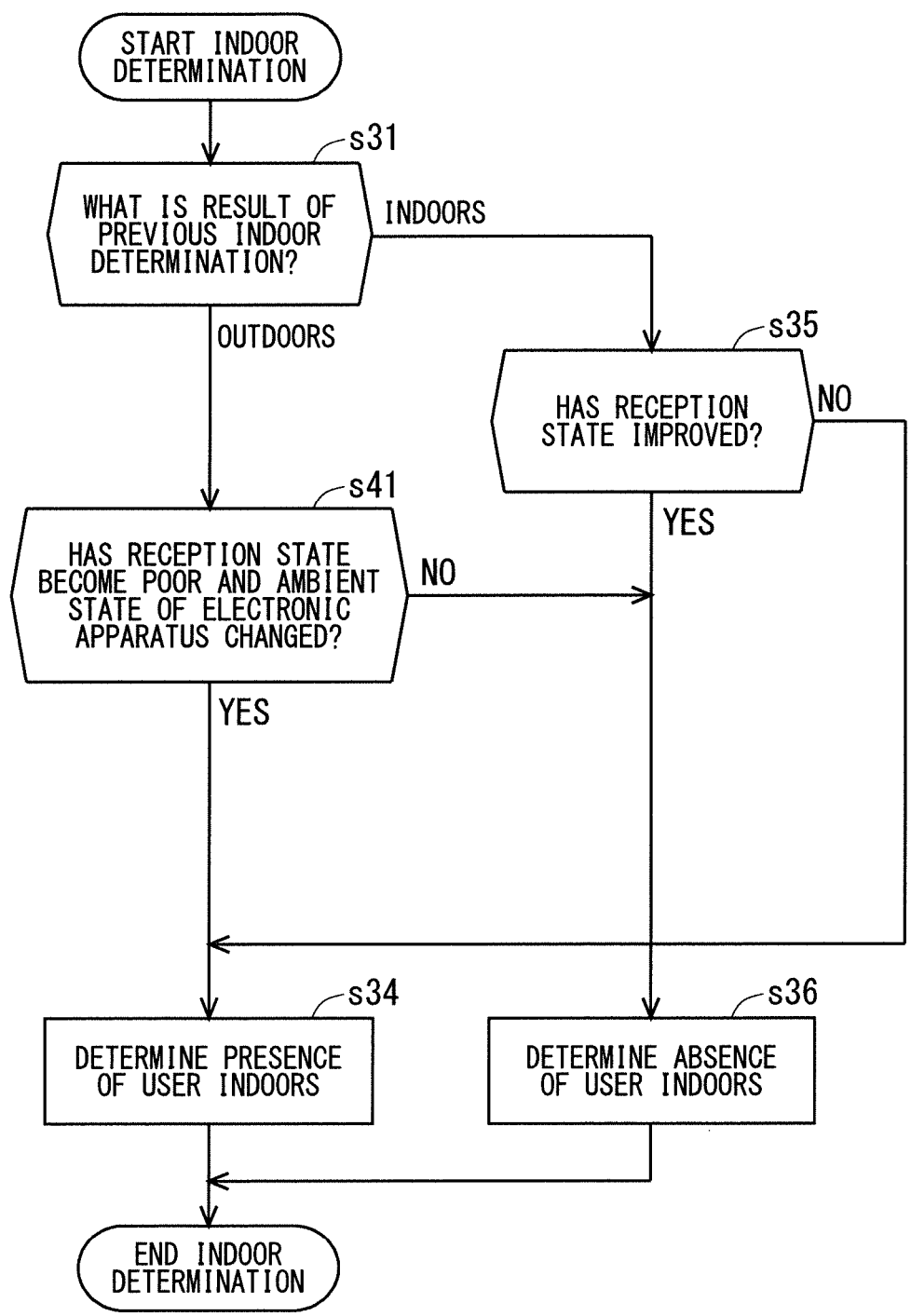
FIG. 15 illustrates a flowchart showing an example of an operation of the electronic apparatus.

FIG. 15 illustrates a flowchart showing an example of the indoor determination according to the present example. In the flowchart of FIG. 15, Step s41 is executed instead of Steps s32 and s33 in the flowchart of FIG. 13.

As illustrated in FIG. 15, if "the outdoors" has been determined in the previously performed indoor determination in Step s31, the indoor determiner 440 determines whether the user 9 is present indoors based on the change in the ambient state of the electronic apparatus 10 and the change in the reception state in Step s41. For example, in Step s41, the indoor determiner 440 determines whether the reception state has become poor and whether the ambient state of the electronic apparatus 10 has changed in the predetermined time. If the indoor determiner 440 determines that the reception state has become poor and the ambient state of the electronic apparatus 10 has changed in the predetermined time, the indoor determiner 440 executes Step s34 and determines "the indoors". On the other hand, if the case where the reception state becomes poor and the ambient state of the electronic apparatus 10 changes does not occur in the predetermined time, the indoor determiner 440 executes Step s36 and determines "the outdoors".

When the ambient temperature of the electronic apparatus 10 has increased by equal to or greater than the predetermined value, the indoor determiner 440 may determine that the ambient state of the electronic apparatus 10 has changed in Step s41. Also when the ambient temperature of the electronic apparatus 10 has decreased by equal to or greater than the predetermined value, the indoor determiner 440 may determine that the ambient state of the electronic apparatus 10 has changed. The indoor determiner 440 can determine whether the ambient temperature of the electronic apparatus 10 has increased by equal to or greater than the predetermined value and whether the ambient temperature has decreased by equal to or greater than the predetermined value based on a detection result produced by the temperature sensor 240.

When the ambient magnetic field intensity of the electronic apparatus 10 has increased by equal to or greater than a predetermined value, the indoor determiner 440 may determine that the ambient state of the electronic apparatus 10 has changed in Step s41. Also when the ambient magnetic field intensity of the electronic apparatus 10 has decreased by equal to or greater than the predetermined value, the indoor determiner 440 may determine that the ambient state of the electronic apparatus 10 has changed. The indoor determiner 440 can determine whether the ambient magnetic field intensity of the electronic apparatus 10 has increased by equal to or greater than the predetermined value and whether the ambient magnetic field intensity has decreased by equal to or greater than the predetermined value based on a detection result produced by the geomagnetism sensor 230.

When the state of ambient air of the electronic apparatus 10 has changed, the indoor determiner 440 may determine that the ambient state of the electronic apparatus 10 has changed in Step s41. In this case, the indoor determiner 440 determines whether the state of ambient air of the electronic apparatus 10 has changed based on a result produced by the sensor 260 illustrated in above-described FIG. 11. If the sensor 260 is, for example, a gas sensor, the indoor determiner 440 determines that the state of ambient air of the electronic apparatus 10 has changed when at least one of the type and the concentration of the gas detected by the sensor 260 changes greatly. Also if the sensor 260 is, for example, a smell sensor, the indoor determiner 440 determines that the state of ambient air of the electronic apparatus 10 has changed when at least one of the type and the concentration of the smell detected by the sensor 260 changes greatly.

Further, when the ambient temperature of the electronic apparatus 10 has either increased or decreased by equal to or greater than the predetermined value and the ambient magnetic field intensity of the electronic apparatus 10 has either increased or decreased by equal to or greater than a predetermined value, the indoor determiner 440 may determine that the ambient state of the electronic apparatus 10 has changed in Step s41.

Further, if the ambient temperature of the electronic apparatus 10 has either increased or decreased by equal to or greater than the predetermined value, and the ambient air of the electronic apparatus 10 has changed, the indoor determiner 440 may determine that the ambient state of the electronic apparatus 10 has changed in Step s41.

Further, if the ambient temperature of the electronic apparatus 10 has either increased or decreased by equal to or greater than the predetermined value, the ambient magnetic field intensity of the electronic apparatus 10 has either increased or decreased by equal to or greater than the predetermined value, and the ambient air of the electronic apparatus has changed, the indoor determiner 440 may determine that the ambient state of the electronic apparatus 10 has changed.

Further, if the ambient magnetic field intensity of the electronic apparatus 10 has either increased or decreased by equal to or greater than the predetermined value and the ambient air of the electronic apparatus 10 has changed, the indoor determiner 440 may determine that the ambient state of the electronic apparatus 10 has changed in Step s41.

Accordingly, the indoor determiner 440 determines whether the user 9 is present indoors based on the change in the ambient state of the electronic apparatus 10 and the change in the reception state; therefore, the electronic apparatus 10 can more correctly determine whether the user 9 is present indoors.

Note that the indoor determiner 440 may determine whether the user 9 has moved outside based on the change in the ambient state of the electronic apparatus 10 in Step s42, instead of above-mentioned Step s35. In the flowchart of FIG. 16, Step s42 is executed instead of Step s35 in the flowchart of FIG. 15.

In Step s42, the indoor determiner 440 determines whether the reception state has improved and whether the ambient state of the electronic apparatus 10 has changed in the predetermined time. As in Step s41, the indoor determiner 440 can determine whether the ambient state of the electronic apparatus 10 has changed. If the indoor determiner 440 determines that the reception state has improved and the ambient state of the electronic apparatus 10 has changed in the predetermined time, the indoor determiner 440 determines that the user 9 has moved outside. And the indoor determiner 440 executes Step s36 and determines "the outdoors". On the other hand, if the case where the reception state improves and the ambient state of the electronic apparatus 10 changes does not occur in the predetermined time, the indoor determiner 440 determines that the user 9 has not moved outside. And the indoor determiner 440 executes Step s34 and determines "the indoors".

Accordingly, the indoor determiner 440 determines the user 9 is present indoors, and then determines that the user 9 has moved outside based on the change in the ambient state of the electronic apparatus 10 and the change in the reception state; therefore, the electronic apparatus 10 can more correctly determine whether the user 9 has moved outside.

<Fourth Example of Indoor Determination: Indoor Determination Based on Behavioral Pattern of User>

Figures 17, 18:
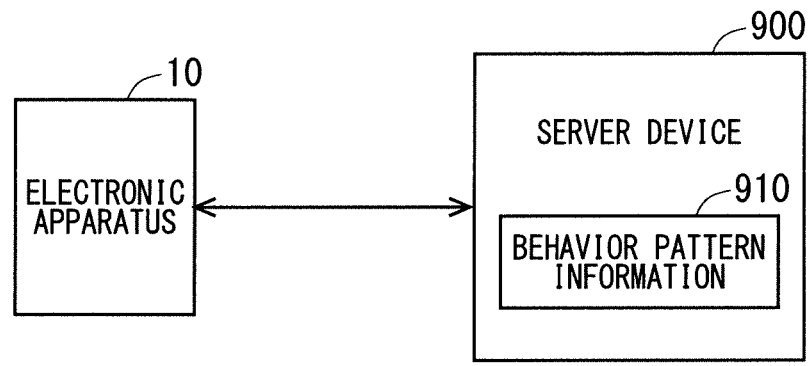
FIG. 17 illustrates a block diagram of a state in which the electronic apparatus and a server device communicate with each other.
FIG. 18 illustrates a table showing an example of behavior pattern information.

Therefore, the indoor determiner 440 determines whether the user 9 is present indoors based on, behavior pattern information 910 indicating a behavioral pattern of the user 9. In the present example, as illustrated in FIG. 17, the electronic apparatus 10 can communicate with a server device 900 storing the behavior pattern information 910 by using the wireless communication unit 110. When the indoor determination is performed, the electronic apparatus 10 acquires the behavior pattern information 910 from the server device 900.

FIG. 18 illustrates a table showing an example of the behavior pattern information 910. As illustrated in FIG. 18, the behavior pattern information 910 is information in which, for each of a plurality of time zones of one day, the probability of the user 9 being at home (stay-in home ratio) for each time zone on a weekday and the probability of the user 9 being at home (stay-in home ratio) for each time zone on a day-off are associated with each other. For example, for the time zone after 12:00 a.m. and before 3:00 a.m., the stay-in home ratio in this time zone of a weekday is 90%, and the stay-in home ratio in this time zone of a day-off is 90%. And for the time zone after 9:00 a.m. and before 12:00 p.m., the stay-in home ratio in this time zone of a weekday is 10%, and the stay-in home ratio in this time zone of a day-off is 40%.

In the indoor determination, the indoor determiner 440 acquires the behavior pattern information 910 from the server device 900. And, the indoor determiner 440 acquires the stay-in home ratio of the time zone including the current time in the current day of a week from the behavior pattern information 910. For example, in the case where the current day of a week is a weekday and the current time is 10:00 a.m., the indoor determiner 440 acquires the weekday stay-in home ratio of 10% in the time zone of 9:00 a.m. to 12:00 p.m. The indoor determiner 440 can acquire the current time and the current day of a week from a real-time clock or the like included in the electronic apparatus 10. Thereafter, the stay-in home ratio acquired from the behavior pattern information 910 in the indoor determination may be referred to as "acquired stay-in home ratio" in some cases.

Therefore, the indoor determiner 440 determines whether the user 9 is present indoors based on the acquired stay-in home ratio. For example, the indoor determiner 440 determines that the user 9 is present indoors if the acquired stay-in home ratio is equal to or greater than 80%. On the other hand, the indoor determiner 440 determines that the user 9 is absent indoors if the acquired stay-in home ratio is smaller than 80%.

In the example of FIG. 18, in the case where the current time is 2:00 p.m. and the current day of a week is a day-off, the acquired stay-in home ratio is 30%; therefore, the indoor determiner 440 determines "the outdoors". Further, in the example of FIG. 18, in the case where the current time is 5:00 a.m. and the current day of a week is a weekday, the acquired stay-in home ratio is 80%; therefore, the indoor determiner 440 determines "the indoors".

The behavior pattern information 910 may be produced by the server device 900 or may be produced by the electronic apparatus 10. The behavior pattern information 910 can be produced, for example, based on the position information of the electronic apparatus 10.

If the server device 900 produces the behavior pattern information 910, the electronic apparatus 10 regularly transmits the position information acquired by the receiver 140 to the server device 900, for example. Also, the electronic apparatus 10 transmits home information indicating an home address of the user 9 to the server device 900. The server device 90X) produces the behavior pattern information 910 based on the position information and the home information transmitted from the electronic apparatus 10. For example, if the server device 900 specifies that the user 9 stays at home in the time zone of 12:00 a.m. to 3:00 a.m. for eight days of the ten weekdays based on the position information and the home information of the electronic apparatus 10, the server device 900 sets the weekday stay-in home ratio in this time zone to 80%. It should be noted that, the production method of the behavior pattern information 910 is not limited thereto.

Alternatively, when the user 9 stays at home, the user 9 may perform a predetermined operation on the electronic apparatus 10 so that the stay-in home information indicating that the user 9 stays at home may input be input into the electronic apparatus 10. In this case, the electronic apparatus 10 may produce the behavior pattern information 910 based on the input stay-in home information. Alternatively, the electronic apparatus 10 may notify the server device 900 of the input stay-in home information. In this case, the server device 900 may produce the behavior pattern information 910 based on the stay-in home information received from the electronic apparatus 10.

Accordingly, the indoor determiner 440 determines whether the user 9 is present indoors based on the behavior pattern information 910 indicating the behavioral pattern of the user 9; therefore, the electronic apparatus 10 can more correctly determine whether the user 9 is present indoors.

It should be noted that, the production method of the behavior pattern information 910 is not limited to the example of FIG. 18. The behavior pattern information 910 may include the probability of the user 9 being at workplace (stay-in workplace ratio) in each time zone of weekdays and days-off. In this case, the indoor determiner 440 may acquire the stay-in workplace ratio of the time zone including the current time in the current day of a week from the behavior pattern information 910 and may determine whether the user 9 is present indoors based on the acquired stay-in workplace ratio. For example, the indoor determiner 440 determines "the indoors" if the acquired stay-in workplace ratio is equal to or greater than 80%, while determines "the outdoors" if the acquired stay-in workplace ratio is smaller than 80%.

Alternatively, the indoor determiner 440 may determine whether the user 9 is present indoors based on the behavior pattern information 910 and other information. For example, the indoor determiner 440 may determine whether the user 9 is present indoors based on the behavior pattern information 910 and the connection state for communication between the Wifi access point (hereinafter referred to as "home access point") installed at home of the user 9 and the wireless communication unit 110. Hereinafter, stating simply the connection state signifies the connection state for communication between the home access point and the communication unit 110.

In the case where the indoor determiner 440 determines whether the user 9 is present indoors based on the behavior pattern information 910 and the connection state, for example, a value of a stay-in home ratio in the behavior pattern information 910 is weighted (importance is given thereto), and a type of connection state is also weighted. This weighting can be said to indicate the degree of certainty that the user 9 is present indoors, which is derived from the information corresponding thereto.

For example, if the stay-in home ratio is A %, A is the weighting therefor. Accordingly, if the stay-in home ratio is 90%, 90 is the weighting therefor. Also, if the home access point and the communication unit 110 establish a stable communication connection, the weighting is 90. If the home access point and the communication unit 110 establish an unstable communication connection, the weighting is 50. And if the home access point and the communication unit 110 do not establish a communication connection, that is, no connection is established, the weighting is 10.

In the indoor determination, the indoor determiner 440 acquires a stay-in home ratio corresponding to the current time and the current day of a week from the behavior pattern information 910 and specifies the connection state. And the indoor determiner 440 obtains an additional value of the weight corresponding to the acquired stay-in home ratio and the weight corresponding to the specified connection state. The indoor determiner 440 determines "the indoors" if an additional value for the obtained weight is equal to or greater than a ninth threshold value, while determines "the outdoors" if the additional value is smaller than the ninth threshold value. The ninth threshold value is set to 120, for example.

For example, if the case where the acquired stay-in home ratio is 90% (weight: 90) and the home access point and the wireless communication unit 110 establish the stable communication connection is specified (weight: 90), the additional value of the weight is 180. In this case, "the indoors" is determined. Also, if the case where the acquired stay-in home ratio is 30% (weight: 30) and the home access point and the wireless communication unit 110 establish no communication connection (weight: 10) is specified, the additional value of the weight is 40. In this case, "the outdoors" is determined. Further, if the case where the acquired stay-in home ratio is 80% (weight: 80) and the home access point and the wireless communication unit 113 establish the unstable communication connection (weight: 50) is specified, the additional value of the weight is 130. In this case, "the indoors" is determined.

Alternatively, the indoor determiner 440 may determine whether the user 9 is present indoors based on the result of the stopping-movement specification produced by the stopping-movement specifying unit 410 and the behavior pattern information 910. In this case, for example, similarly to the above, a value of a stay-in home ratio is weighted. "Stop of the user 9" specified in the stopping-movement specification is weighted with 90, and for "walk" and "run", which are the moving means of the user 9, are weighted with 50 and 10, respectively. "Bicycle" and "conveying device", which are the moving means of the user 9 specified in the stopping-movement specification may not be used in the indoor determination.

In the indoor determination, the indoor determiner 440 acquires a stay-in home ratio corresponding to the current time and the current day of a week from the behavior pattern information 910 and checks the result of the stopping-movement specification. And the indoor determiner 440 obtains an additional value of the weight corresponding to the acquired stay-in home ratio and the weight corresponding to the specified content in the stopping-movement specification. The indoor determiner 440 determines "the indoors" if an additional value for the obtained weight is equal to or greater than a tenth threshold value, while determines "the outdoors" if the additional value is smaller than the tenth threshold value. The tenth threshold value is set to 120, for example.

For example, if the case where the acquired stay-in home ratio is 90% (weight: 90) and "walk" is specified in the stopping-movement specification (weight: 50), the additional value of the weight is 140. In this case, "the indoors" is determined. Also, if the case where the acquired stay-in home ratio is 70% (weight: 70) and "run" is specified in the stopping-movement specification (weight: 10), the additional value of the weight is 80. In this case, "the outdoors" is determined. Further, if the case where the acquired stay-in home ratio is 80% (weight: 80) and "stop of the user 9" is specified in the stopping-movement specification (weight: 90), the additional value of the weight is 170. In this case, "the indoors" is determined.

Alternatively, the indoor determiner 440 may determine whether the user 9 is present indoors based on the result of the stopping-movement specification produced by the stopping-movement specifying unit 410, the connection state, and the behavior pattern information 910. In this case, for example, similarly to the above, the type of connection state is weighted, the value of the stay-in home ratio is weighted, and the content to be specified in the stopping-movement specification is weighted. In the indoor determination, the indoor determiner 440 acquires a stay-in home ratio corresponding to the current time and the current day of a week from the behavior pattern information 910, checks the result of the stopping-movement specification, and specifies the connection state. And the indoor determiner 440 obtains an additional value of the weight corresponding to the acquired stay-in home ratio and the weight corresponding to the specified content in the stopping-movement specification. The indoor determiner 440 determines "the indoors" if an additional value for the obtained weight is equal to or greater than an eleventh threshold value, while determines "the outdoors" if the additional value is smaller than the eleventh threshold value. The eleventh threshold value is set to 180, for example.

For example, if the case where the acquired stay-in home ratio is 40% (weight: 40), "walk" is specified in the stopping-movement specification (weight: 50), and the unstable communication connection between the home access point and the wireless communication unit 110 is specified (weight: 50), the additional value of the weight is 140. In this case, "the outdoors" is determined. Also, if the case where the acquired stay-in home ratio is 80% (weight: 80), "stop of the user 9" is specified in the stopping-movement specification (weight: 90), and the stable communication connection between the home access point and the wireless communication unit 110 is specified (weight: 90), the additional value of the weight is 260. In this case, "the indoors" is determined.

Accordingly, the indoor determiner 440 determines whether the user 9 is present indoors based on the behavior pattern information 910 and at least one of the result of the stopping-movement specification and the connection state; therefore, the electronic apparatus 10 can more correctly determine whether the user 9 is present indoors.

As described above, the four types of indoor determination according to the first to fourth examples have been described. In the above-described Step s3, the indoor determiner 440 may perform two or more types of the indoor determination of 4 types of the indoor determination as provisional indoor determination and may ultimately determine whether the user 9 is present indoors based on the result of the provisional indoor determination. For example, the indoor determiner 440 ultimately determines that the user 9 is present indoors, when it is determined as "the indoors" in at least one type of provisional indoor determination among the two or more types of executed provisional indoor determination. And the indoor determiner 440 ultimately determines that the user 9 is absent indoors, when it is determined as "the outdoors" in two or more types of executed provisional indoor determination.

Second Embodiment

Next, another example of the electronic apparatus 10 or the like will be described in detail.

Figure 19:
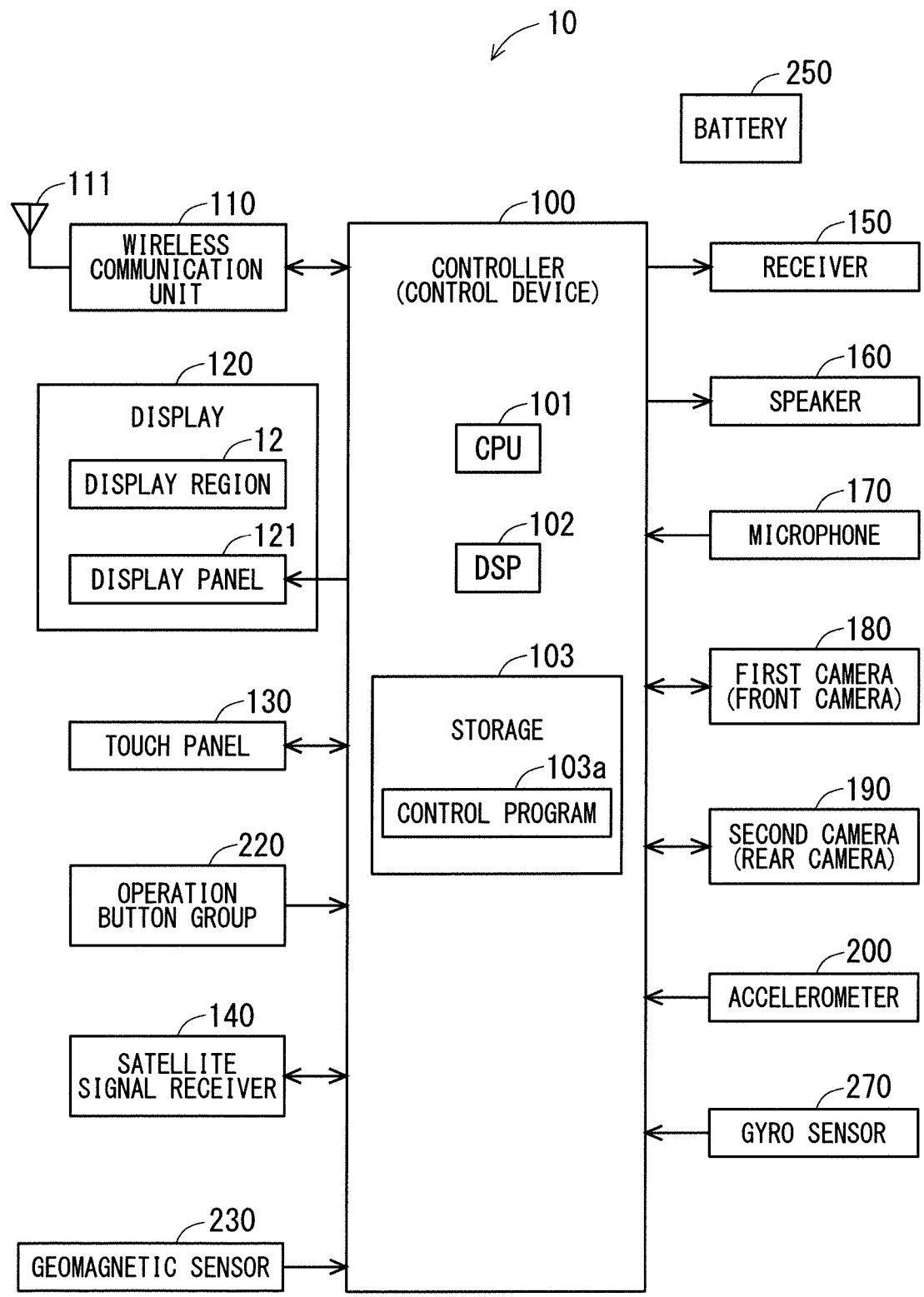
FIG. 19 illustrates a block diagram of an example of a configuration of an electronic apparatus.

FIG. 19 illustrates a block diagram showing an example of an electric structure of the electronic apparatus 10 according to the present example. As illustrated in FIG. 19, the electronic apparatus 10 according to the present example includes a gyro sensor 270 instead of the atmospheric pressure sensor 210 and the temperature sensor 240 in the electronic apparatus 10 illustrated in FIG. 4. Note that the electronic apparatus 10 may include the atmospheric pressure sensor 210 and the temperature sensor 240.

The gyro sensor 270 is, for example, a triaxial gyro sensor. The gyro sensor 270 can detect angular velocities around the respective x-axis, y-axis, and z-axis. The x-axis direction, the y-axis direction, and the z-axis direction of the gyro sensor 270 are set in, for example, the longitudinal direction, the lateral direction, and the thickness direction of the electronic apparatus 10, respectively. Based on the detection result of the gyro sensor 270, the controller 100 can obtain the rotation angle of the posture of the electronic apparatus 10 around the respective axes in the x-axis direction, the y-axis direction, and the z-axis direction.

In the present example, the controller 100 can specify the azimuth viewed from the electronic apparatus 10 based on the detection result of a geomagnetism sensor 220. Then, the controller 100 can cause the display 120 to display the specified azimuth.

Note that the electronic apparatus 10 may not include the receiver 270. In this case, the electronic apparatus 10 may be wirelessly or wiredly connected to an individual gyro sensor 270 apart from thereof.

Figure 20:
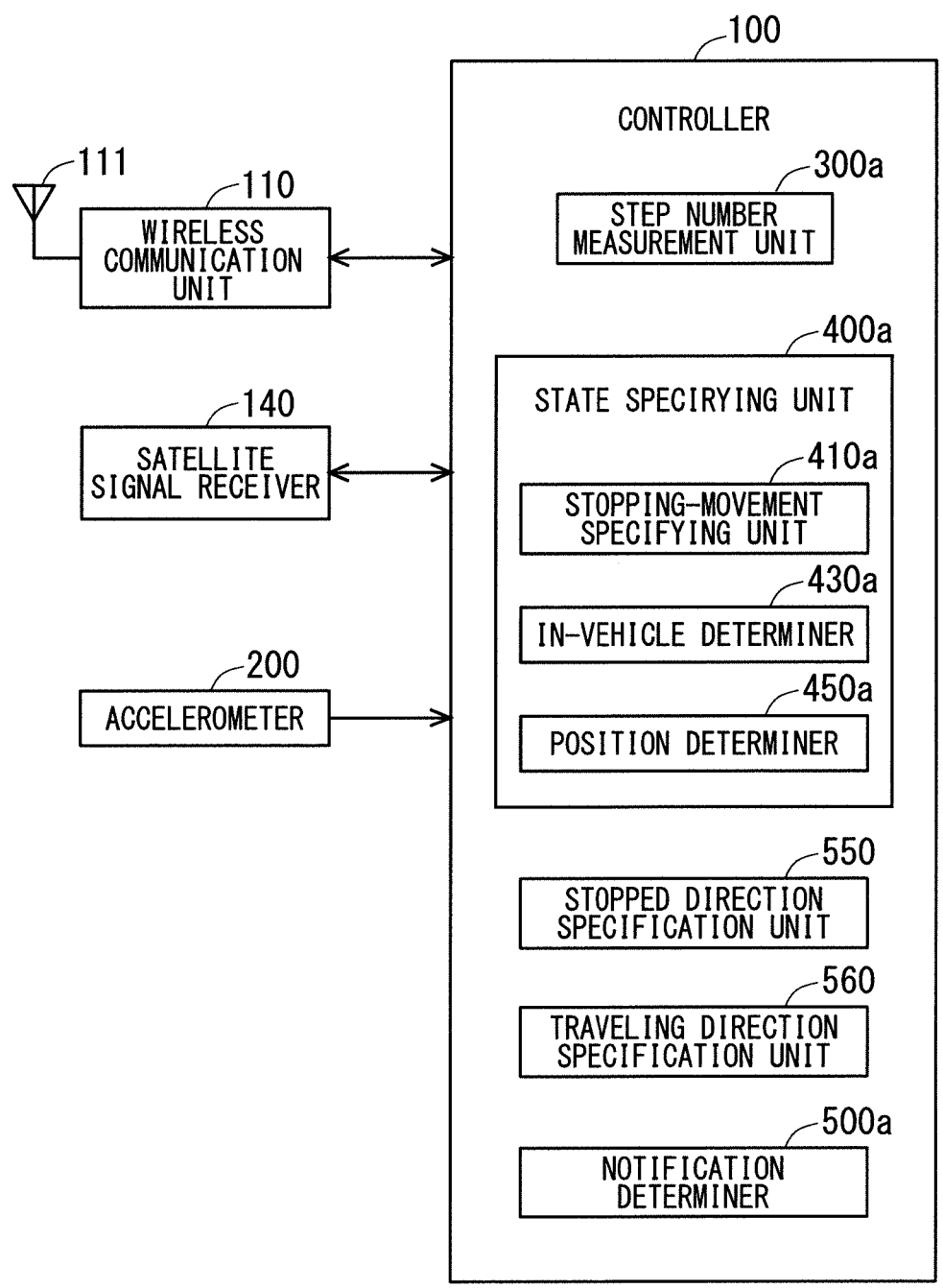
FIG. 20 illustrates a block diagram of an example of a configuration of a controller.

FIG. 20 illustrates a block diagram of a part of an example of functional blocks formed in the controller 100 according to the present example.

As illustrated in FIG. 20, the controller 100 includes a step number measurement unit 300a, a state specifying unit 400a, a stopped direction specification unit 550, a traveling direction specification unit 560 and a notification determiner 500a as functional blocks. At least one of the step number measurement unit 300a, the state specifying unit 400a, the stopped direction specification unit 550, the traveling direction specification unit 560 and the notification determiner 500a may be realized by a hardware circuit in which software is not required to realize the functions of the hardware circuit.

The state specifying unit 400a can specify various states of the user 9. In other words, the state specifying unit 400a can specify various states of the electronic apparatus 10 possessed by the user 9. The state specifying unit 400 includes, for example, a stopping-movement specifying unit 410a, an in-vehicle determiner 430a, and a position determiner 450a. At least one of the stopping-movement specifying unit 410, the in-vehicle determiner 430a, and the position determiner 450a may be realized by a hardware circuit in which software is not required to realize the functions of the hardware circuit.

It should be noted that, in the case where the controller 100 includes the main CPU and the sub-CPU, some functional blocks out of the plurality of functional blocks illustrated in FIG. 20 may be realized by the sub-CPU, while the remaining functional blocks may be realized by the main CPU. For example, the stopping-movement specifying unit 410a may be realized by the sub-CPU, while the remaining functional blocks may be realized by the main CPU.

The stopping-movement specifying unit 410a can perform stopping-movement specification for specifying the state of the user 9 concerning the stop and movement of the user 9. In the stopping-movement specification, the stopping-movement specifying unit 410a can specify, as is in the same with the above-described stopping-movement specifying unit 410, that the user 9 is stopped and that the user 9 is moving. The stop of the user 9 is equivalent to the stop of the electronic apparatus 10; therefore, it can be said that the stopping-movement specifying unit 410a can determine whether the electronic apparatus 10 is stopped.

In the stopping-movement specification, the stopping-movement specifying unit 410a can specify, as is in the same with the above-described stopping-movement specifying unit 410, stop of the user 9 and start of movement of that the user 9. The stop of the user 9 is equivalent to stop of movement of the electronic apparatus 10; therefore, it can be said that the stopping-movement specifying unit 410s can specify the stop of movement of the electronic apparatus 10.

Also, the start of movement of the user 9 is equivalent to the start of movement of the electronic apparatus 10; therefore, it can be said that the stopping-movement specifying unit 410*a* can specify the start of movement of the electronic apparatus 10.

Further, in the stopping-movement specification, the stopping-movement specifying unit 410*a* can specify the moving means of the user 9 if the stopping-movement specifying unit 410*a* determines that the user 9 is moving. Specifically, the stopping-movement specifying unit 410*a* can specify whether the moving means of the user 9 is a walking, running, bicycle or conveying device.

For example, the controller 100 can cause the display 120 to display the moving means specified by the stopping-movement specifying unit 410 and the moving distance of the user 9 (the moving distance of the electronic apparatus 10). Therefore, the user 9 can distinguish and check the walking distance, the running distance, the travel distance on the bicycle, and the travel distance on the conveying device. The controller 100 can obtain the moving distance of the user 9, for example, based on the position information acquired by the receiver 140.

The in-vehicle determiner 430*a* can perform in-vehicle determination for determining whether the user 9 is present in the vehicle 6. The state in which the user 9 is present in the vehicle 6 is equivalent to the state in which the electronic apparatus 10 is present in the vehicle 6; therefore, the in-vehicle determiner 430*a* can perform in-vehicle determination for determining whether the electronic apparatus 10 is present in the vehicle 6. The in-vehicle determination according to the present example will be described later in detail.

As is in the same with the position determiner 450, the position determiner 450*a* can determine wither the user 9 is positioned in the predetermined area (in other words predetermined place). In other words, the position determiner 450*a* can determine whether the electronic apparatus 10 is positioned in the predetermined area (in other words predetermined place). As the predetermined area, a place where a possible accident of a pedestrian and the vehicle 6 is likely to occur, and an area including the vicinity thereof are adopted, for example. The predetermined area includes, for example, the above-described intersection area, the T-shaped road area, and the school road area. The position determiner 450*a* can individually determine among whether the user 9 is positioned in the intersection area, whether the user 9 is positioned in the T-shaped road area, and whether the user 9 is positioned in the school road area, respectively.

As described above, the state specifying unit 400*a* can specify various states of the user 9. The types of the state of the user 9 specified by the state specifying unit 400*a* are not limited thereto.

As is in the same with the above-described step number measurement unit 300, the step number measurement unit 300*a* can measure the number steps of the user 9 moving by oneself. The step number measurement unit 300*a* measures the number of steps of the user 9 when the stopping-movement specifying unit 410*a* specifies that the user 9 is walking or running. The controller 100 can cause the display 120 to display the number of steps measured by the step number measurement unit 300*a*.

In the case where the electronic apparatus 10 is present in the traveling vehicle 6, the traveling direction specification unit 560 can specify the traveling direction of the vehicle 6. If the vehicle in which the electronic apparatus 10 is present is traveling, the traveling direction specification unit 560 can specify the traveling direction of the vehicle 6 based on, for example, the position information acquired by the receiver 140 and map information stored in a storage 103. If the in-vehicle determiner 430*a* determines that the electronic apparatus 10 is present in the vehicle 6 and the stopping-movement specifying unit 410*a* specifies that the electronic apparatus 10 is moving, it can be said that the vehicle in which the electronic apparatus 10 is present is traveling. Therefore, the traveling direction specification unit 560 can specify that the vehicle in which the electronic apparatus 10 is present is traveling based on the result of the in-vehicle determination and the result of the stopping-movement specification. Thereafter, the vehicle 6 in which the electronic apparatus 10 is present may be referred to as "specified vehicle 6" in some cases. Further, the vehicle that is traveling may be referred to as "traveling vehicle 6B" in some cases. Further, the specified vehicle 6 that is traveling may be referred to as "traveling specified vehicle 6B" in some cases.

In the case where the specified vehicle 6 includes a function of specifying the traveling direction of the specified vehicle 6, the traveling direction specification unit 580 may specify the traveling direction of the specified vehicle 6 by acquiring the traveling direction of the specified vehicle 6 from the specified vehicle 6 through the wireless communication unit 110 and so forth. In the case where the in-vehicle device 60 mounted on the specified vehicle 6 includes the function of specifying the traveling direction of the specified vehicle 6, the traveling direction specification unit 580 may specify the traveling direction of the specified vehicle 6 by acquiring the traveling direction of the specified vehicle 6 from the in-vehicle device 60 through the wireless communication unit 110 and so forth.

The stopped direction specification unit 550 can specify the stopped direction of the stopped specified vehicle 6. Here, the concept of the stop of the vehicle 6 includes both "stop" and "parking" in the Road Traffic Act of Japan. Also, the stopped direction signifies the direction the stopped vehicle 6 faces in. Specifically, the stopped direction signifies the direction the front side of the stopped vehicle 6 faces in. Accordingly, for example, if the stopped direction of the vehicle is "North", the vehicle 6 is stopped with the front side thereof (headlamps) facing in the "North". Thereafter, the vehicle 6 that is stopped may be referred to as "stopped vehicle 6B" in some cases. Also, the specified vehicle 6 that is stopped may be referred to as "stopped specified vehicle 6A" in some cases.

For example, the stopped direction specification unit 550 can specify the stopped direction of the specified vehicle 6 when the specified vehicle 6 has stopped based on the traveling direction specified by the traveling direction specification unit 560 during the specified vehicle 6 is traveling. For example, the stopped direction specification unit 550 specifies the traveling direction specified immediately before the specified vehicle 6 stops by the traveling direction specification unit 560 as the stopped direction of the specified vehicle 6 when the specified vehicle 6 has stopped. If the in-vehicle determiner 430*a* determines that the electronic apparatus 10 is present in the vehicle 6 and the stopping-movement specifying unit 410*a* specifies that the electronic apparatus 10 has stopped, it can be said that the specified vehicle 6 has stopped. Also, if the in-vehicle determiner 430*a* determines that the electronic apparatus 10 is present in the vehicle 6 and the stopping-movement specifying unit 410*a* specifies that the electronic apparatus 10 is stopped, it can be said that the specified vehicle 6 is stopped. Therefore, the stopped direction specification unit 550 can specify that the specified vehicle 6 has stopped and that the specified vehicle 6 is stopped based on the result of the in-vehicle determination and the result of the stopping-movement specification.

In the case where the specified vehicle 6 includes a function of specifying the stopped direction of the specified vehicle 6, the stopped direction specification unit 550 may specify the stopped direction of the specified vehicle 6 by acquiring the stopped direction of the specified vehicle 6 from the specified vehicle 6 through the wireless communication unit 110 and so forth. In the case where the in-vehicle device 60 mounted on the specified vehicle 6 includes a function of specifying the stopped direction of the specified vehicle 6, the stopped direction specification unit 550 may specify the stopped direction of the specified vehicle 6 by acquiring the stopped direction of the specified vehicle 6 from the in-vehicle device 60 through the wireless communication unit 110 and so forth.

The notification determiner 500a can determine whether notification is made outside the electronic apparatus 10. For example, the notification determiner 500a determines whether the notification is made outside the electronic apparatus 10 based on the state of the user 9 specified by the state specifying unit 400a.

For example, if the position determiner 450a determines that the user 9 is positioned in the intersection area and the stopping-movement specifying unit 410a specifies that the moving means of the user 9 is "run", the notification determiner 500a determines that the notification is made outside the electronic apparatus 10. For example, if the position determiner 450a determines that the user 9 is positioned in the intersection area and the stopping-movement specifying unit 410a specifies that the moving means of the user 9 is "bicycle", the notification determiner 500a determines that the notification is made outside the electronic apparatus 10. If the notification determiner 500a determines that the notification is made outside the electronic apparatus 10, for example, presence notification information for notifying the vehicle 6 positioned in the intersection area of the presence of the user 9 (pedestrian) from the wireless communication unit 110 to the roadside unit 5. The presence notification information may include information indicating the moving means of the user 9 specified by the stopping-movement specifying unit 410a. The roadside unit 5 transmits the received presence notification information to the vehicle 6 in the intersection area. At this time, the roadside unit 5 transmits the presence notification information by, for example, broadcasting. In the vehicle 6, the in-vehicle device 60 receives the presence notification information and issues a warning to the driver, based on the received presence notification information. For example, the vehicle 6 notifies the driver that there is a pedestrian nearby. Accordingly, the driver of the vehicle 6 in the intersection area can drive while recognizing that a person is present in the intersection area. As a result, the safety of driving of the vehicle 6 is improved.

The content of the information the electronic apparatus 10 notifies outside thereof is not limited to the above example. In addition, the electronic apparatus 10 can directly notify the vehicle 6.

<Example of In-Vehicle Determination>

Various methods are conceivable as a method of in-vehicle determination in the present example. In the following, two examples of the in-vehicle determination will be described.

<First Example of In-Vehicle Determination>

As is in the same with the in-vehicle determination in the above-described first embodiment, the in-vehicle determiner 430a can determine whether the user 9 is present in the vehicle 6 based on the type of the moving means of the user 9 specified by the stopping-movement specifying unit 410a.

For example, if the moving means of the user 9 is determined to be "conveying device" in the stopping-movement specification, the in-vehicle determiner 430a determines that the user 9 is present in the vehicle 6. On the other hand, if the moving means of the user 9 is determined to be "walk" in the stopping-movement specification, the in-vehicle determiner 430a determines that the user 9 is absent in the vehicle 6. Further, if it is determined to be "run" in the stopping-movement specification, the in-vehicle determiner 430a determines that the user 9 is absent in the vehicle 6. Further, if it is determined to be "bicycle" in the stopping-movement specification, the in-vehicle determiner 430a determines that the user 9 is absent in the vehicle 6.

<Second Example of In-Vehicle Determination>

As is in the same with the in-vehicle determination in the above-described first embodiment, the in-vehicle determiner 430a determines whether the user 9 is present in the vehicle 6 based on whether setting (that is, communication connection setting) required for the communication connection between the in-vehicle device 60 mounted on the vehicle 6 and the wireless communication unit 110 is established in the electronic apparatus 10. Specifically, the in-vehicle determiner 430a determines that the user 9 is present in the vehicle 6 when the communication connection setting is established in the electronic apparatus 10. Meanwhile, the in-vehicle determiner 430a determines that the user 9 is absent in the vehicle 6 when the communication connection setting is unestablished in the electronic apparatus 10. The detailed operation of the in-vehicle determiner 430a in this case is the same as the operation of the in-vehicle determiner 430 of the first embodiment.

It should be noted that the in-vehicle determiner 430a may perform the in-vehicle determination by another method. For example, as is the same with the in-vehicle determination in the first embodiment above, the in-vehicle determiner 430a may determine whether the subject user 9 is present in the vehicle based on the movement of the other apparatus 10 that determines that the other user 9 is present in the vehicle and the movement of the subject apparatus 10. Alternatively, as is in the same with the in-vehicle determination in the first embodiment, the in-vehicle determiner 430a may determine that the user 9 is present in the vehicle based on whether the wireless communication unit 110 receives predetermined information (manufacturer information indicating a car manufacturer, for example) transmitted from the in-vehicle device 60. Also, as is in the same with the in-vehicle determination in the first embodiment, the in-vehicle determiner 430a may determine whether the user 9 is present in the vehicle based on a state of ambient air around electronic apparatus 10.

<Communication Between Stopped Vehicle and Traveling Vehicle>

Figure 21:
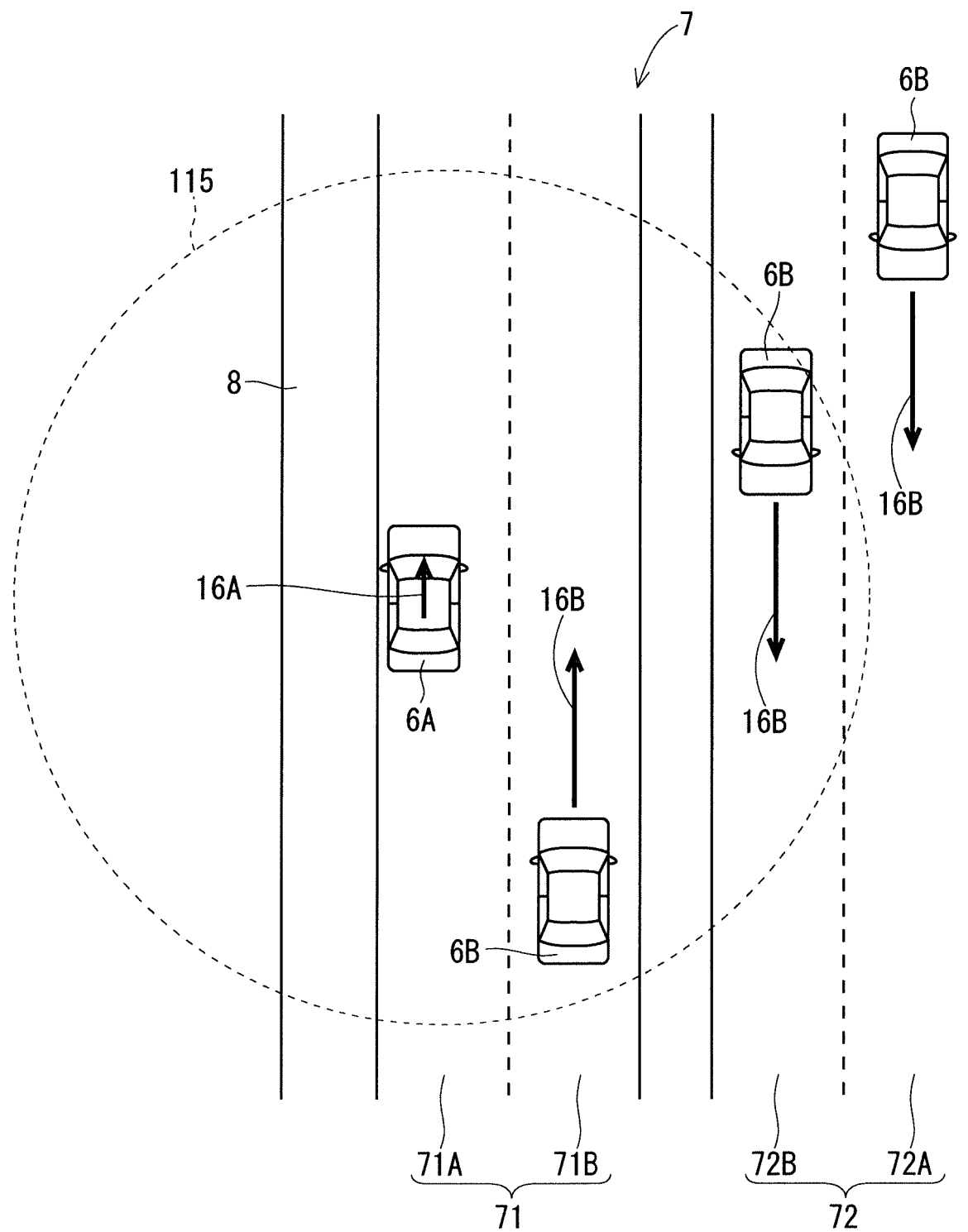
FIG. 21 illustrates a diagram of an example of a state of a stopped vehicle and a traveling vehicle in a roadway.

FIG. 21 illustrates a diagram of an example of a state of a stopped vehicle 6A and a traveling vehicle 6B on a roadway 7. In FIG. 21, a roadway 7 including two two-lane roads or four lanes in total and a sidewalk 8 is illustrated. In a first lane pair 71 of the roadway 7, a stopped vehicle 6A is present and in a first traveling lane 71A and a traveling vehicle 6B is present in the first overtaking lane 71B. Also, in a second lane pair 72 of the roadway 7, for each of a second traveling lane 72A and a second overtaking lane 72B, a traveling vehicle 6B is present. The stopped direction 16A of the stopped vehicle 6A substantially coincides with the traveling direction 16B of the traveling vehicle 6B in the first overtaking lane 71B. Also, the stopped direction 16A of the stopped vehicle 6A is substantially opposite to the traveling direction 16B of the traveling vehicles 6B in the second traveling lane 72*a* and the second overtaking lane 72B.

A In the case where the traveling vehicle 6B travels right past the stopped vehicle 6A, the door of the stopped vehicle 6A could open abruptly, a person could unexpectedly come out from the stopped vehicle 6A, or a person could appear from behind the stopped vehicle 6A. In the example of FIG. 21, the door of the stopped vehicle 6A could open abruptly, a person could unexpectedly come out from the stopped vehicle 6A, or a person could appear from behind the stopped vehicle 6A, at the time when the traveling vehicle 6B traveling in the first overtaking lane 71B is about to overtake the stopped vehicle 6A. Meanwhile, even if the driver of the traveling vehicle 6B senses the danger and brakes the traveling vehicle 6B, the traveling vehicle 6B does not stop instantly. Accordingly, it is desirable for the driver of the traveling vehicle 6B to recognize the presence of the stopped vehicle 6A ahead thereof as early as possible.

Therefore, such a traveling vehicle 6B in the first overtaking lane 71B which is highly likely to travel past the stopped vehicle 6A can specify the presence of the stopped vehicle 6A ahead thereof as early as possible with repetitive notification by the stopped vehicle 6A to a vehicle 6 around thereof by the use of 700 MHz band communication. Thus, at the time when the traveling vehicle 6B that is highly likely to travel past the stopped vehicle 6A receives the notification from the stopped vehicle 6A, the notification to the driver of the traveling vehicle 6B is made; therefore, the driver can recognize the presence of the stopped vehicle 6A ahead thereof ahead of time. In FIG. 21, the communication area 115 of the 700 MHz band communication of the stopped vehicle 6A is schematically illustrated by a broken line. The radius of the communication area 115 is, for example, about several tens of meters to 200 m.

However, the notification made by the stopped vehicle 6A to the outside is not limited to the traveling vehicle 6B that is highly likely to travel past the stopped vehicle 6A, and a traveling vehicle 6B that is unlikely to travel past the stopped vehicle 6B may also possibly receive the notification. The notification made by the stopped vehicle 6A to the outside may also possibly, for example, be received by the traveling vehicle 6B in the opposite lane, such as the traveling vehicle 6B in the second overtaking lane 72B. For the traveling vehicle 6B which is unlikely to travel past the stopped vehicle 6A, the notification made by the stopped vehicle 6A to the outside is hardly necessary, and the traveling vehicle 6B possibly receives the notification that is hardly necessary for the traveling vehicle 6B. As a result, an unnecessary process may occur in the traveling vehicle 6B which is unlikely to travel past the stopped vehicle 6A.

Therefore, in the present example, the electronic apparatus 10 in the stopped specified vehicle 6A compares the traveling direction 16B of the traveling specified vehicle 6B with the stopped direction 16A of the stopped specified vehicle 6A and determines whether the notification to the traveling specified vehicle 6B is made based on the comparison result. The electronic apparatus 10 in the stopped specified vehicle 6A receives the traveling direction 16B of the traveling specified vehicle 6B from the electronic apparatus 10 in the traveling specified vehicle 6B. For example, the electronic apparatus 10 in the stopped specified vehicle 6A determines whether external warning notification with which the presence of the stopped specified vehicle 6A is made to the traveling specified vehicle 6B based on the comparison result between the traveling direction 16B and the stopped direction 16A. As a result, the probability that the notification, to the traveling specified vehicle 6B which hardly requires the notification from the stopped specified vehicle 6A as the traveling direction 16B is greatly different from the stopped direction 16A of the stopped specified vehicle 6A like the traveling vehicle 6B in the opposite lane, is made can be reduced. That is, the probability that the notification to the traveling specified vehicle 6B which is unlikely to overtake the stopped specified vehicle 6A is made can be reduced. The description in terms of this point will be made below. Thereafter, the electronic apparatus 10 in the stopped specified vehicle 6A may be referred to as "device 10 in stopped vehicle" in some cases. Thereafter, the electronic apparatus 10 in the traveling specified vehicle 6B may be referred to as "device 10 in traveling vehicle" in some cases. Further, making external warning notification may be referred to as "execution of external warning notification" and not making external warning notification may be referred to as "non-execution of external warning notification" in some cases. The device 10 in stopped vehicle can be said to determine execution and non-execution of the external warning notification.

<Operation of Electronic Apparatus in Traveling Specified Vehicle>

Figure 22:
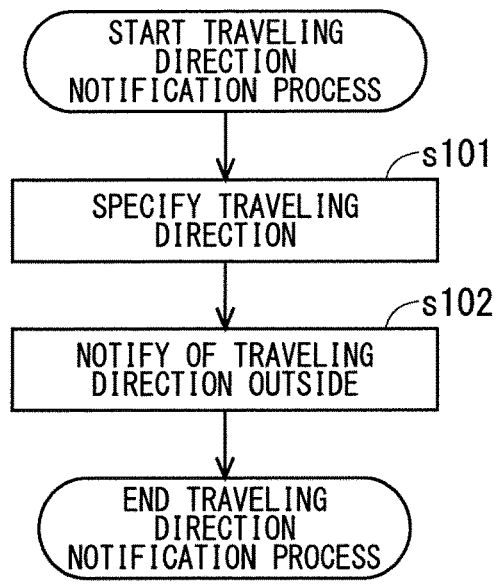
FIG. 22 illustrates a flowchart showing an example of an operation of the electronic apparatus.

FIG. 22 is a flowchart showing an example of a traveling direction notification process executed by the device 10 in traveling vehicle. The device 10 in traveling vehicle repeatedly executes the traveling direction notification process illustrated in FIG. 22. That is, if the in-vehicle determiner 430*a* determines that the electronic apparatus 10 is present in the vehicle 6 and the stopping-movement specifying unit 410*a* specifies that the electronic apparatus 10 is moving, the electronic apparatus 10 repeatedly executes the traveling direction notification process. The electronic apparatus 10 executing the traveling direction notification process in the traveling specified vehicle 6B may be the electronic apparatus 10 possessed by the driver of the traveling specified vehicle 6B or an electronic apparatus 10 possessed by a person other than the driver in the traveling specified vehicle 6B.

As illustrated in FIG. 22, in the electronic apparatus 10 in the traveling specified vehicle 6B, the traveling direction specification unit 560 specifies, as described above, the traveling direction of the traveling specified vehicle 6B in step s101. Next in Step s102, the wireless communication unit 110 notifies outside the electronic apparatus 10 of the specified traveling direction in Step s101, by the use of 700 MHz band communication. Thus the traveling direction notification process is ended. In the present example, the traveling direction specification unit 560 specifies the traveling direction of the traveling specified vehicle 6B expressed in azimuth angle. The azimuth angle represents an orientation at an angle of 0° to 360°. In the azimuth angle, for example, the north is 0° and 360°, the east is 900, the south is 180°, and the west is 270°. It should be noted that the angle corresponding to each direction is not limited thereto. In Step s102, the wireless communication unit 110 notifies outside the electronic apparatus 10 of the traveling azimuth angle specified in Step s101 by, for example, broadcasting. Thereafter, the azimuth angle specified in Step s101 may be referred to as "traveling azimuth angle" in some cases.

When the specified vehicle 6 starts driving, the electronic apparatus 10 in the specified vehicle 6 repeatedly executes the traveling direction notification process. And when the specified vehicle 6 stops, the electronic apparatus 10 in the specified vehicle 6 ends the traveling direction notification process. The device 10 in traveling vehicle executes the traveling direction notification process, for example, every several tens ms to several hundred ms.

If the device 10 in traveling vehicle is present within the communication area 115 of the 700 MHz band communication, the device 10 in stopped vehicle can receive the traveling direction (traveling azimuth angle) notified by the device 10 in traveling vehicle.

<Operation of Electronic Apparatus in Stopped Specified Vehicle>

Figure 23:
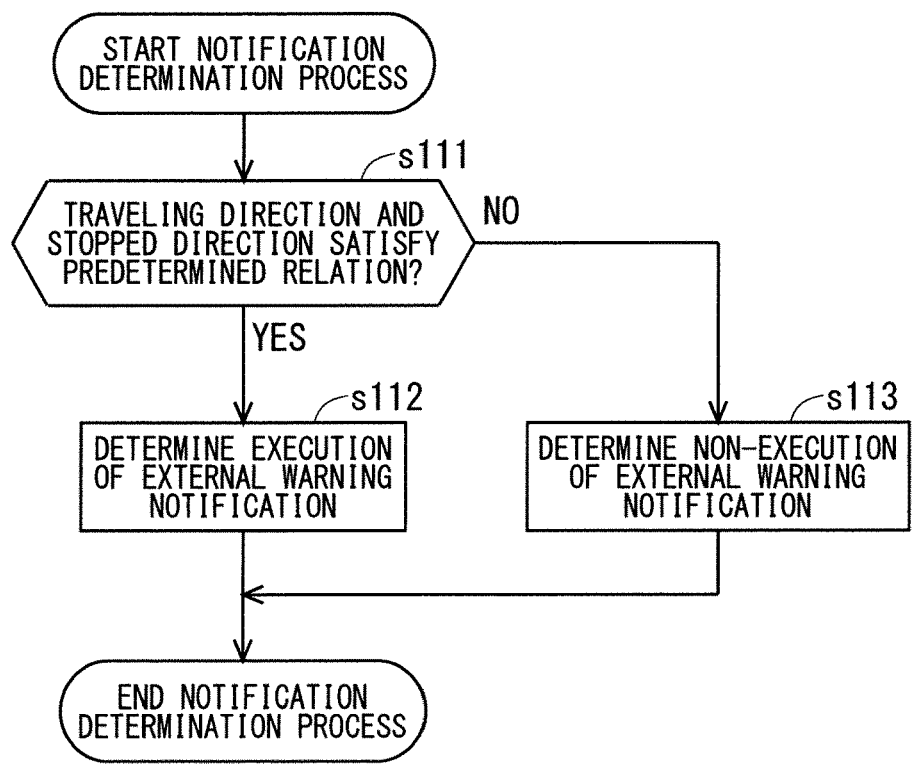
FIG. 23 illustrates a flowchart showing an example of an operation of the electronic apparatus.

FIG. 23 is a flowchart showing an example of a notification determination process executed by the notification determiner 500a of the device 10 in stopped vehicle. The device 10 in stopped vehicle executes the notification determination process illustrated in FIG. 23 every time the device receives the traveling direction (traveling azimuth angle). That is, if the in-vehicle determiner 430a determines that the electronic apparatus 10 is present in the vehicle 6 and the stopping-movement specifying unit 410a specifies that the electronic apparatus 10 is stopped, the electronic apparatus 10 executes the notification determination process every time the wireless communication unit 110 receives the traveling direction (traveling azimuth angle) by the use of 700 MHz band communication. The electronic apparatus 10 executing the notification determination process in the stopped specified vehicle 6A may be the electronic apparatus 10 possessed by the driver of the stopped specified vehicle 6A or an electronic apparatus 10 possessed by a person other than the driver in the traveling specified vehicle 6A.

As illustrated in FIG. 23, in the electronic apparatus 10 received the traveling direction in the stopped vehicle 6A, the notification determiner 500a determines whether the traveling direction received by the electronic apparatus 10 and the stopped direction specified by the stopped direction specification unit 550 satisfy a predetermined relation in Step s111.

In the present example, the stopped direction specification unit 550 specifies the stopped direction of the stopped vehicle 6A expressed in azimuth angle. Thereafter, the azimuth angle specified by the stopped direction specification unit 550 may be referred to as "stopped azimuth angle" in some cases.

For example, the notification determiner 500a determines an absolute value which is a difference between the traveling azimuth angle received by the wireless communication unit 110 and the stopped azimuth angle specified by the stopped direction specification unit 550 as a direction deviation amount. Then the notification determiner 500a determines whether the obtained direction deviation amount is equal to or smaller than a threshold value. This threshold value is set to 10 to 30°, for example. If the direction deviation amount is equal to or smaller than the threshold value, the notification determiner 500a determines that the traveling direction and the stopped direction satisfy the predetermined relation. On the other hand, if the direction deviation amount is greater than the threshold value, the notification determiner 500a determines that the traveling direction and the stopped direction do not satisfy the predetermined relation.

If the notification determiner 500a determines that the traveling direction and the stopped direction satisfy the predetermined relation in Step s111, the notification determiner 500a determines execution of the external warning notification in Step s112. That is, if the traveling direction of the traveling vehicle 6B the electronic apparatus 10 has received and the stopped direction of the stopped vehicle 6A in which the electronic apparatus 10 is present are equal or substantially equal to each other, the notification determiner 500a determines execution of the external warning notification. Thus the notification determination process is ended. On the other hand, if the notification determiner 500a determines that the traveling direction and the stopped direction do not satisfy the predetermined relation, the notification determiner 500a determines non-execution of the external warning notification in Step s113. That is, if the traveling direction of the traveling vehicle 6B the electronic apparatus 10 has received and the stopped direction of the stopped vehicle 6A in which the electronic apparatus 10 is present are greatly different from each other, the notification determiner 500a determines non-execution of the external warning notification. Thus the notification determination process is ended.

It should be noted that if it is determined that the traveling direction and the stopped direction do not satisfy the predetermined relation in Step s111, the notification determination process may be ended without executing Step s113.

Further, the notification determiner 500a may determine that the traveling direction and the stopped direction satisfy the predetermined condition if the direction deviation amount is smaller than the threshold value and may determine that the traveling direction and the stopped direction do not satisfy the predetermined condition if the direction deviation amount is equal to or greater than the threshold value. Further, the notification determiner 500a may determine the traveling direction and the stopped direction satisfy the predetermined condition if the traveling azimuth angle and the stopped azimuth angle are equal to each other and may determine the traveling direction and the stopped direction do not satisfy the predetermined condition if the traveling azimuth angle and the stopped azimuth angle are not equal to each other.

In the present example, the device 10 in traveling vehicle repeatedly makes notification of the traveling direction; therefore, the device 10 in stopped vehicle repeatedly receives the traveling direction from the electronic apparatus 10 in the same traveling specified vehicle 6B within the communication area 115. Thus, in the present example, the device 10 in stopped vehicle repeatedly executes the notification determination process for the same traveling specified vehicle 6B within the communication area 115.

Further, as described above, if the in-vehicle determiner 430a determines that the electronic apparatus 10 is present in the vehicle 6, the notification determiner 500a executes the notification determination process. It can be said that the state where the electronic apparatus 10 is present in the vehicle 6 is equivalent to the state where the user 9 of the electronic apparatus 10 is present in the vehicle 6. Therefore, it can be said that if the in-vehicle determiner 430a determines that a person is present in the vehicle 6, the notification determiner 500a executes the notification determination process.

If the execution of the external warning notification is determined in the notification determiner 500a of the electronic apparatus 10, the stopped specified vehicle 6A in which the electronic apparatus 10 is present makes the external warning notification to the traveling vehicle 6B. An example of method of the external warning notification will be described.

First Notification Example

In the present example, if the execution of the external warning notification is determined in the notification determiner 500a, rear lamps the stopped specified vehicle 6A includes are turned on, thereby, the external warning notification to the traveling vehicle 6B is made.

If the execution of the external warning notification is determined, the controller 100 causes the wireless communication unit 110 to transmit lighting instruction information for instructing the stopped specified vehicle 6A to turn on the rear lamps. The controller 100 functions as a lighting controller that controls the stopped specified vehicle 6A to turn on the rear lamps.

The lighting instruction information transmitted by the wireless communication unit 110 is received by the in-vehicle device 60 mounted on the stopped specified vehicle 6A. The in-vehicle device 60 outputs the received lighting instruction information to the vehicle control device that controls the stopped specified vehicle 6A. Receiving the lighting instruction information, the vehicle control device turns on the rear lamps. For example, the vehicle control device controls the rear right and left direction indicators (turn signal) to blink for a predetermined time (for example, about 10 seconds). Accordingly, the warning is issued to the traveling specified vehicle 6B approaching the stopped specified vehicle 6A from behind and having notified the stopped specified vehicle 6A of the traveling direction. Therefore, the driver of the traveling specified vehicle 6B can recognize the presence of the stopped vehicle 6A ahead, ahead of time.

In the above-described example of FIG. 21, if the traveling specified vehicle 6B traveling in the first overtaking lane 71B and outputting the traveling direction outside has entered into the communication area 115 of the 700 MHz band communication of the stopped specified vehicle presenting in the first traveling lane 71A, the stopped specified vehicle 6A automatically turns on the rear lamps. Therefore, the driver of the traveling specified vehicle 6B in the first overtaking lane 71B can recognize the presence of the stopped vehicle 6A ahead, ahead of time.

Figure 24:
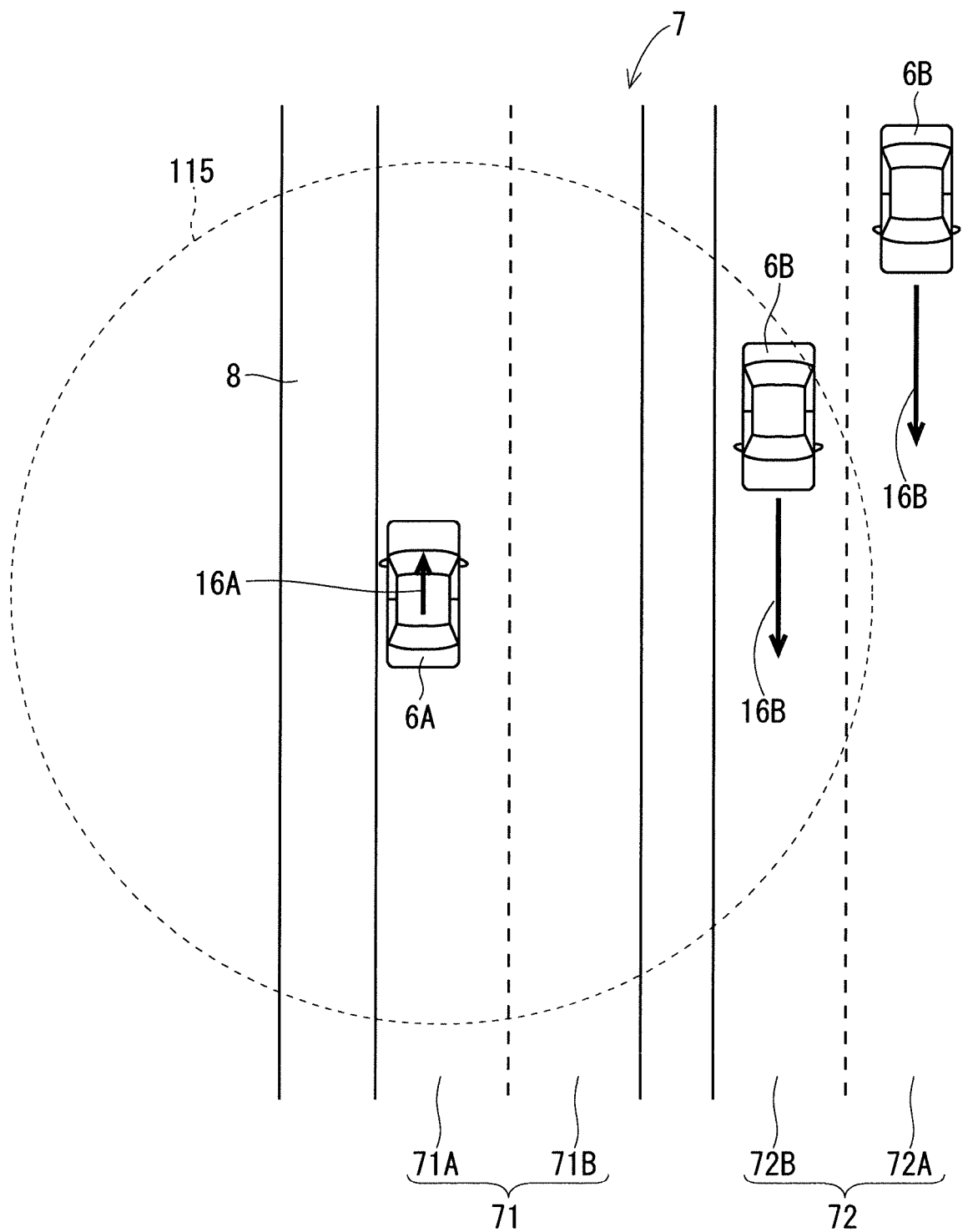
FIG. 24 illustrates a diagram of an example of a state of a stopped vehicle and a traveling vehicle in a roadway.

Meanwhile, as illustrated in FIG. 24, if only the traveling specified vehicle 6B of which traveling direction is greatly different from the stopped direction of the stopped specified vehicle 6A is present in the communication area 115, the execution of the external warning notification is not determined in the electronic apparatus 10 in the stopped specified vehicle 6A. In the example of FIG. 24, only the traveling specified vehicle 6B in the second overtaking lane 72B that is an opposite lane, is present in the communication area 115. In such a case, therefore, the probability that the external warning notification that is hardly necessary for the traveling specified vehicle 6B in the communication area 115 is made can be reduced.

It should be noted that, if the execution of the external warning notification is determined, the stopped specified vehicle 6A may turn on not only the rear lamps but also the front lamps. For example, the stopped specified vehicle 6A may turn on the rear right and left direction indicators and the front right and left indicators. In the case where only the rear lamps of the stopped specified vehicle 6A are turned on, the light of the stopped specified vehicle 6A is less likely to enter into eyes of the driver of the traveling vehicle 6B which is positioned ahead of the stopped specified vehicle 6A and does not travel past the stopped vehicle 6A. Therefore, the probability that the external warning notification that is hardly necessary for the driver is made can be reduced.

Also, if the execution of the external warning notification is determined, the rear lamps of the stopped specified vehicle 6A may be turned on and if the non-execution of the external warning notification is determined, the rear lamps of the stopped specified vehicle 6A may be turned off.

Second Notification Example

In the present example, if the execution of the external warning notification is determined in the notification determiner 500a, the wireless communication unit 110 makes the external warning notification to the traveling vehicle 6B.

If the execution of the external warning notification is determined, the wireless communication unit 110 makes the external warning notification by transmitting stopped vehicle notification information for notifying the traveling specified vehicle 6B of the presence of the stopped vehicle 6A by control of the controller 100 by the use of 700 MHz band communication. The wireless communication unit 110 transmits the stopped vehicle notification information by, for example, broadcasting. Therefore, the stopped vehicle notification information is notified to the electronic apparatus 10 in the traveling specified vehicle 6B in the communication area 115 from the device 10 in stopped vehicle.

If the wireless communication unit 110 receives the stopped vehicle notification information, the device 10 in traveling vehicle issues the warning to a person in the traveling specified vehicle 6B based on the stopped vehicle notification information. For example, in the device 10 in traveling vehicle, the controller 100 causes the display 120 to display, for a predetermined time, notification information for notifying the presence of the stopped vehicle 6A ahead. An example of the notification information may be a string of letters such as "be aware of a stopped vehicle ahead" or may be a symbol indicating the stopped vehicle 6A ahead. Alternatively, in the device 10 in traveling vehicle, the controller 100 may output audio for notifying the presence of the stopped vehicle 6A ahead at least once from the speaker 160. Alternatively, the device 10 in traveling vehicle may output audio for notifying the presence of the stopped vehicle 6A ahead at least once from the speaker 160 as well as may cause the display 120 to display, for the predetermined time, the notification information for notifying the presence of the stopped vehicle 6A ahead. The warning issued when the device 10 in traveling vehicle receives the stopped vehicle notification information is not limited thereto.

Accordingly, if the execution of the external warning notification is determined, in the device 10 in stopped vehicle, the wireless communication unit 110 makes the external warning notification. Accordingly, the warning is issued to the traveling specified vehicle 6B approaching the stopped specified vehicle 6A from behind. Therefore, the driver or the like of the traveling specified vehicle 6B can recognize the presence of the stopped vehicle 6A ahead, ahead of time.

In the above-described example of FIG. 21, if the traveling specified vehicle 6B traveling in the first overtaking lane 71B has entered into the communication area 115 of the 700 MHz band communication of the stopped specified vehicle presenting in the first traveling lane 71A, the electronic apparatus 10 in the traveling specified vehicle 6B issues the warning based on the stopped vehicle notification information transmitted by the device 10 in stopped vehicle. Therefore, the driver or the like of the traveling specified vehicle 6B in the first overtaking lane 71B can recognize the presence of the stopped vehicle 6A ahead, ahead of time.

Meanwhile, as illustrated in FIG. 24 above, if only the traveling specified vehicle 6B of which traveling direction is greatly different from the stopped direction of the stopped specified vehicle 6A is present in the communication area 115, the execution of the external warning notification is not determined in the electronic apparatus 10 in the stopped specified vehicle 6A, and the traveling specified vehicle 6B does not receive the stopped vehicle notification information. In such a case, therefore, the probability that the external warning notification that is hardly necessary for the traveling specified vehicle 6B in the communication area 115 is made can be reduced.

Note, the electronic apparatus 10 which has received the stopped vehicle notification information and is in the traveling specified vehicle 6B may transmit the stopped vehicle notification information to the in-vehicle device 60 included in the traveling specified vehicle 6B. In this case, the in-vehicle device 60 which has received the stopped vehicle notification information issues the warning based on the stopped vehicle notification information. For example, in the case where the in-vehicle device 60 represents a satellite navigation device, the satellite navigation device displays a symbol indicating the stopped vehicle for a predetermined time. The satellite navigation device may output audio for notifying the presence of the stopped vehicle 6A ahead at least once, in place of or in addition to displaying, on the map, a symbol indicating the stopped vehicle ahead for a predetermined time. Accordingly, even in the case where the in-vehicle device 60 of the traveling specified vehicle 6B makes notification based on the stopped vehicle notification information received by the electronic apparatus 10 in the traveling specified vehicle 6B, the notification of the presence of the stopped vehicle 6A can be made to the driver or the like of the traveling specified vehicle 6B.

As described above, in the present example, if the stopped direction of the stopped vehicle 6A and the traveling direction of the traveling vehicle 6B satisfy the predetermined relation, the execution of the notification to the traveling vehicle 6B is determined, therefore, the probability that the notification that is hardly necessary for the traveling vehicle 6B is made can be reduced. Thus, the convenience of the electronic apparatus is improved.

Also as described above, if the predetermined relation in Step s111 indicates the direction deviation amount is smaller than the threshold value, the stopped specified vehicle 6A can properly make notification to the traveling specified vehicle 6B approaching the stopped specified vehicle 6A from behind, even if the traveling direction 16B is changing or the stopped specified vehicle 6A is stopped obliquely to the lane.

Figure 25:
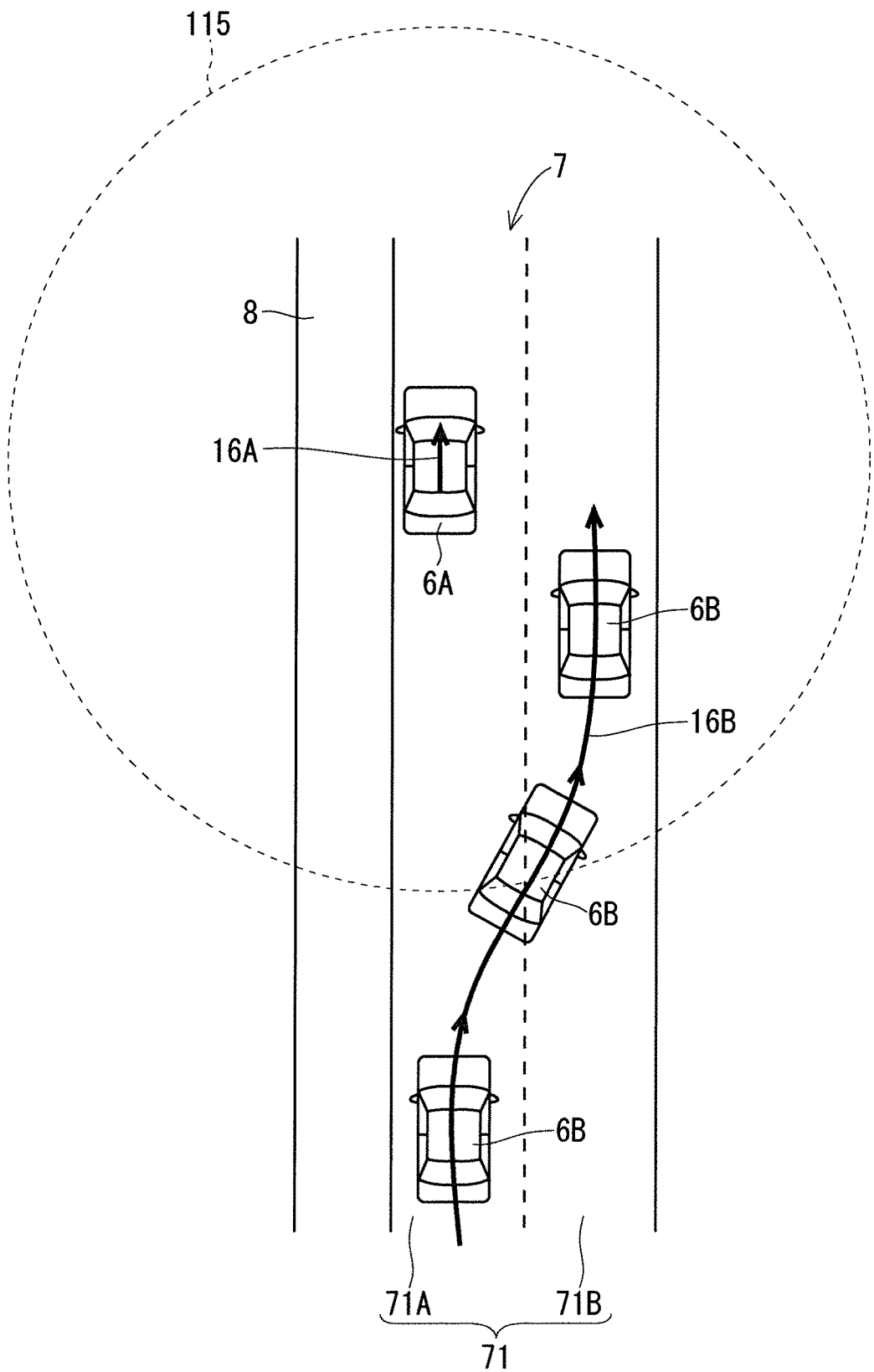
FIG. 25 illustrates a diagram of an example of a state of a stopped vehicle and a traveling vehicle in a roadway.

As illustrated in FIG. 25 for example, there is a case in which the traveling specified vehicle 6B traveling in the same lane as the first traveling lane 71A in which the stopped specified vehicle 6A is stopped has changed the lane to the first overtaking lane 71B, and then overtakes the stopped specified vehicle 6A. In this case, when the traveling specified vehicle 6B enters into the communication area 115, the traveling direction 16B of the traveling specified vehicle 6B may possibly slightly deviate from the stopped direction of the stopped vehicle 6A. At this point, if the notification determiner 500a determines the execution of the external warning notification if the stopped direction 16A and the traveling direction 16B are equal to each other, the execution of the external warning notification is not determined when the traveling specified vehicle 6B enters into the communication area 115. As a result, at the point when the traveling specified vehicle 6B enters into the communication area 115, the stopped specified vehicle 6A has a trouble making notification to the traveling specified vehicle 6B.

Meanwhile, in the case where the predetermined relation in Step s111 indicates the direction deviation amount is smaller than the threshold value, that is, in the case where the execution of the external warning notification is determined if the direction deviation amount is smaller than the threshold value, by setting the threshold value appropriately, the notification determiner 500a can determined the execution of the external warning notification at the point when the traveling specified vehicle 6B enters into the communication area 115. Therefore, at the point when the traveling specified vehicle 6B enters into the communication area 115, the stopped specified vehicle 6A can make notification to the traveling specified vehicle 6B. Thus, the stopped specified vehicle 6A can make notification properly to the traveling specified vehicle 6B even in the case where the traveling direction 16B of the traveling specified vehicle 6B changes as illustrated in FIG. 25.

Figure 26:
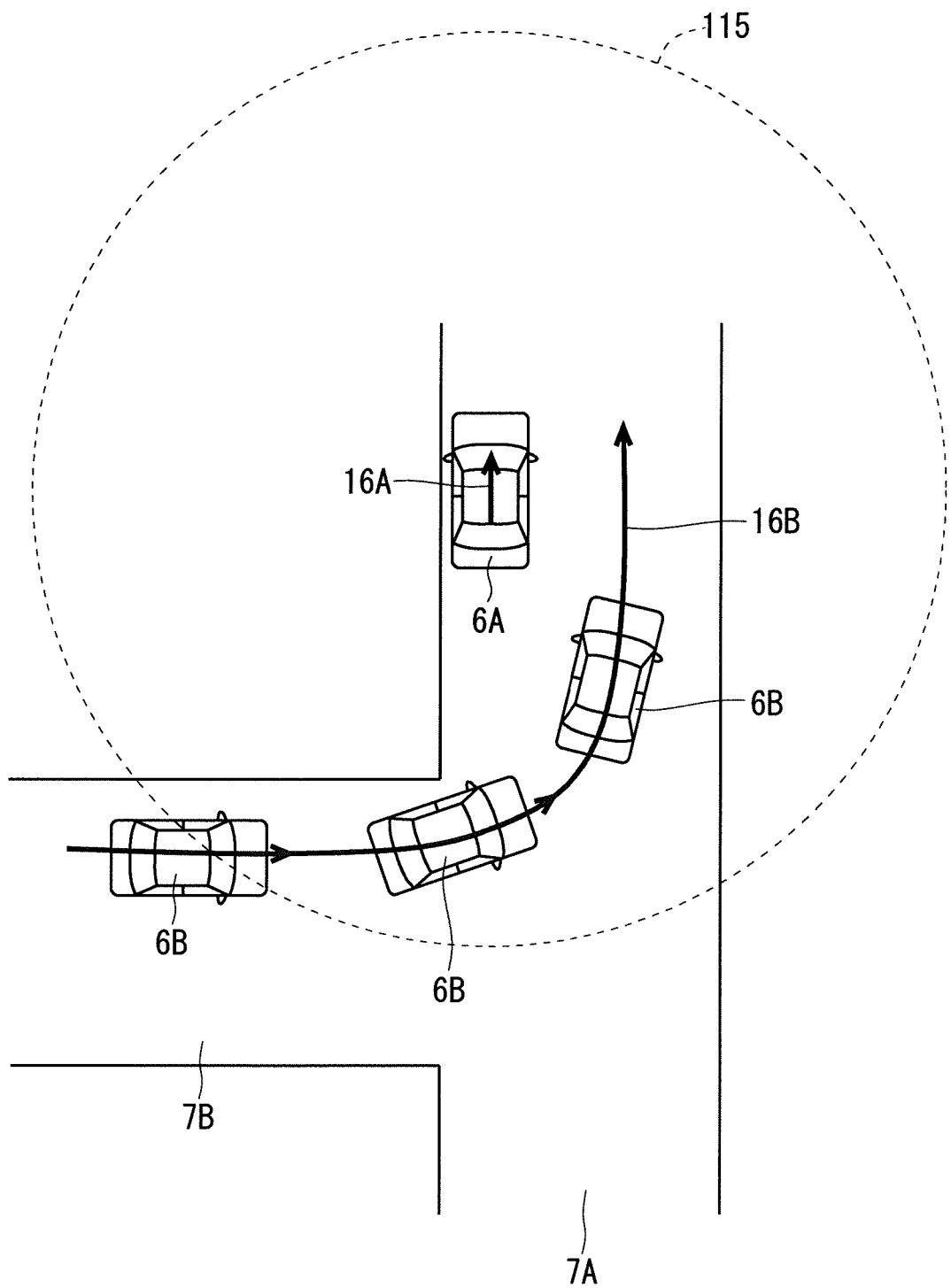
FIG. 26 illustrates a diagram of an example of a state of a stopped vehicle and a traveling vehicle in a roadway.

In addition, as illustrated in FIG. 26, a case where the traveling specified vehicle 6B greatly changes the traveling direction 16B and then overtakes the stopped specified vehicle 6A can be conceivable. FIG. 16 illustrates a state in which the traveling specified vehicle 6B traveling in the roadway 7B makes a left-turn to enter into the roadway 7A the road 7B meets and is about to overtake the stopped specified vehicle 6A. In such a case, if the notification determiner 500a determines the execution of the external warning notification when the stopped direction 16A and the traveling direction 16B are equal to each other, the execution of the external warning notification may not possibly be determined until the traveling specified vehicle 6B is about to overtake. As a result, the stopped specified vehicle 6A has a trouble making notification to the traveling specified vehicle 6B behind, ahead of time.

Meanwhile, in the case where the execution of the external warning notification is determined if the direction deviation amount is smaller than the threshold value, by setting the threshold value appropriately, the notification determiner 500a can determined the execution of the external warning notification at a timing when the traveling specified vehicle 6B appears to present behind the stopped specified vehicle 6A. Therefore, the stopped specified vehicle 6A can make notification to the traveling specified vehicle 6B, ahead of time. Thus, the stopped specified vehicle 6A can make notification properly to the traveling specified vehicle 6B even in the case where the traveling direction 16B of the traveling specified vehicle 6B changes as illustrated in FIG. 26.

Figure 27:
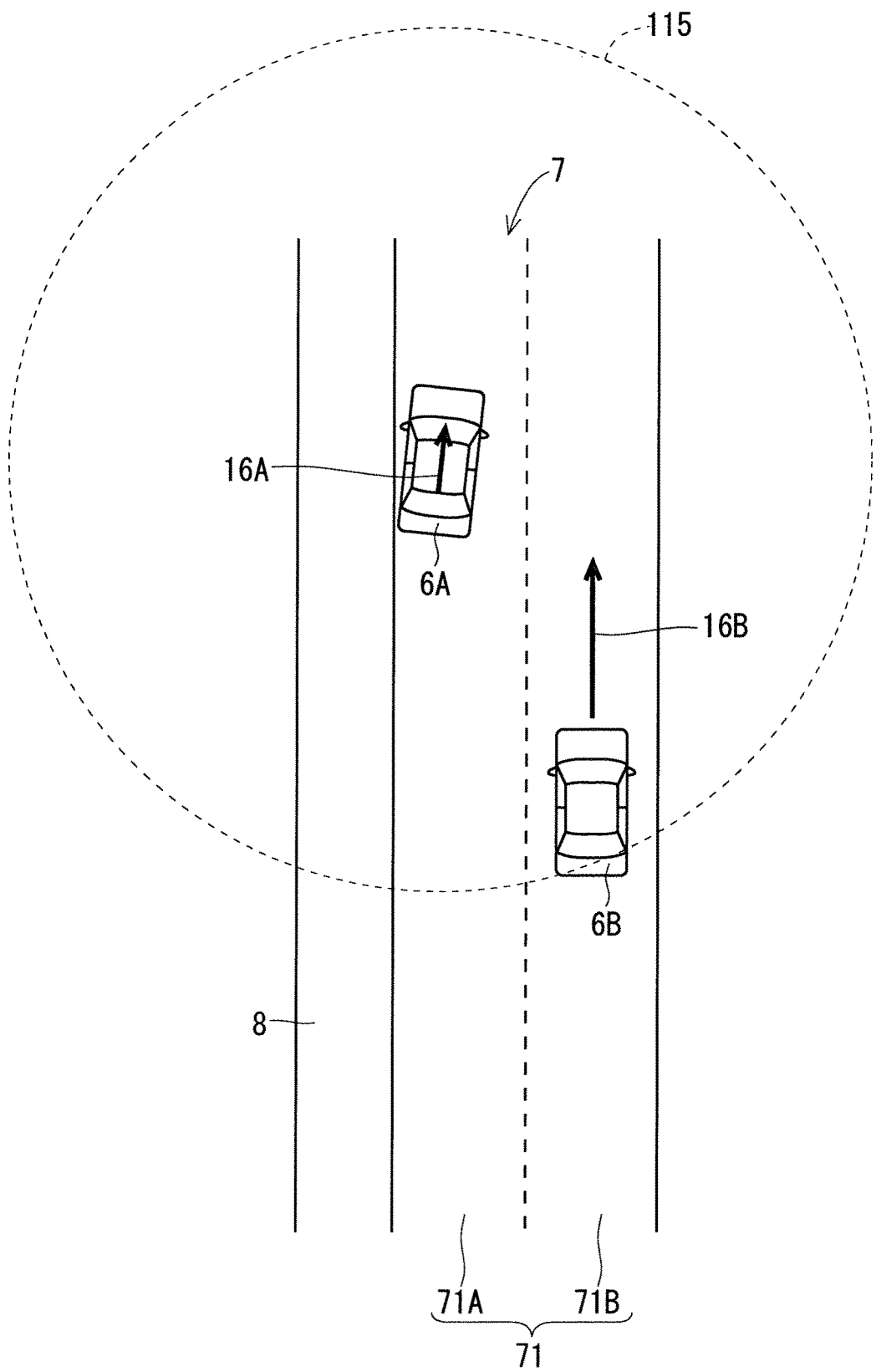
FIG. 27 illustrates a diagram of an example of a state of a stopped vehicle and a traveling vehicle in a roadway.

Also as illustrated in FIG. 27, a case where the stopped specified vehicle 6A is stopped obliquely to the lane can be conceivable. In such a case, if the notification determiner 500a determines the execution of the external warning notification when the stopped direction 16A and the traveling direction 16B are equal to each other, the notification determiner 500a may not possibly be able to determine the execution of the external warning notification even if the traveling specified vehicle 6B is present in the communication area 115. As a result, the stopped specified vehicle 6A has a trouble making notification to the traveling specified vehicle 6B behind.

Meanwhile, in the case where the execution of the external warning notification is determined if the direction deviation amount is smaller than the threshold value, by setting the threshold value appropriately, the notification determiner 500a can determined the execution of the external warning notification at a point when the traveling specified vehicle 6B enters into the communication area 115. Therefore, the stopped specified vehicle 6A can properly make notification to the traveling specified vehicle 6B behind, even if the stopped direction 16a is oblique to the lane.

Further in the present example, the device 10 in stopped vehicle repeatedly executes the notification determination process for the same traveling specified vehicle 6B within the communication area 115; therefore, the device 10 in stopped vehicle can appropriately determine the execution of the external warning notification even if the traveling specified vehicle 6B changes the traveling direction 16B in the communication area 115. For example, as illustrated in above FIG. 26, even if, at the point when the traveling specified vehicle 6B enters into the communication area 115, the traveling direction 16B thereof is greatly deviated from the stopped direction 16A of the stopped specified vehicle 6A, the notification determiner 500a can determine the execution of the external warning notification at the point when the traveling direction 16B becomes closer to the stopped direction 16A. Therefore, the stopped specified vehicle 6A can more reliably make notification to the traveling specified vehicle 6B behind.

It should be noted that the device 10 in stopped vehicle may repeatedly transmit output instruction information for instructing output of the traveling direction to the traveling vehicle 6B outside the device 10 in stopped vehicle by the use of 700 MHz band communication by broadcasting. In this case, the device 10 in traveling vehicle may execute the traveling direction notification process when receiving the output instruction information from the device 10 in stopped vehicle, instead of self-propelled execution of the traveling direction notification process. Even in such a case, the device 10 in traveling vehicle can repeatedly make notification of the traveling direction to the device 10 in stopped vehicle.

Other Examples of Second Embodiment

In the following, other examples of the present embodiment will be described below.

First Other Example of Second Embodiment

In the above-described second notification example, the device 10 in stopped vehicle transmits the stopped vehicle notification information by broadcasting, however, in the present example, the device 10 in stopped vehicle transmits the stopped vehicle notification information individually to each traveling specified vehicle 6B.

Figure 28:
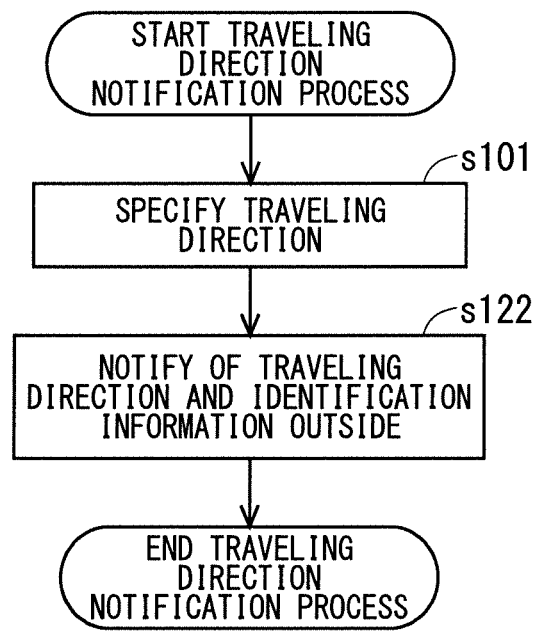
FIG. 28 illustrates a flowchart showing an example of an operation of the electronic apparatus.

FIG. 28 is a flowchart showing an example of a traveling direction notification process according to the present example. As illustrated in FIG. 28, the electronic apparatus 10 in the traveling specified vehicle 6B executes above-described Step s101 and specifies the traveling direction of the traveling specified vehicle 6B. Subsequently in Step s122, the communication unit wireless communication unit 110 transmits the traveling azimuth angle indicating the traveling direction specified in Step s101 and a signal including identification information assigned to the electronic apparatus 10 for identifying the electronic apparatus 10 outside the electronic apparatus 10 by the use of 700 MHz communication band by broadcasting. Thus the traveling direction notification process is ended. The identification information of the electronic apparatus 10 is stored in the storage 103 of the electronic apparatus 10. The device 10 in traveling vehicle repeatedly executes the traveling direction notification process illustrated, similarly to the above.

The device 10 in stopped vehicle according to the present example, the wireless communication unit 110 receives the signal including the identification information and the traveling direction. In the device 10 in stopped vehicle, determining the execution of the external warning notification in the notification determination process, the notification determiner 500a transmits the signal including the identification information received together with the traveling direction used in the notification determination process and the stopped vehicle notification information. The wireless communication unit 110 transmits the signal including the reception identification information and the stopped vehicle notification information by the use of 700 MHz band communication.

Figure 29:
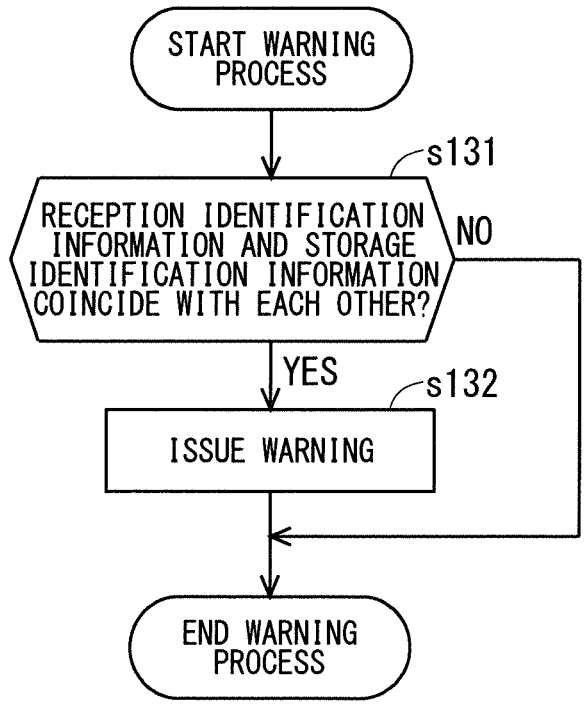
FIG. 29 illustrates a flowchart showing an example of an operation of the electronic apparatus.

If the wireless communication unit 110 receives the signal including the stopped vehicle notification information and the identification information, the device 10 in traveling vehicle executes a warning process based on the signal. FIG. 29 illustrates a flowchart showing an example of the warning process.

As illustrated in FIG. 29, in the device 10 in traveling vehicle, in Step s131, the controller 100 determines whether reception identification information that is the identification information included in the signal received by the wireless communication unit 110 and storage identification information that is the identification information in the storage 103 coincide with each other. In Step s131, if the inconsistency between the reception identification information and the storage identification information is determined, the warning process is ended. On the other hand, consistency between the reception identification information and the storage identification information is determined in Step s131, the device 10 in traveling vehicle regards the stopped vehicle notification information received by the wireless communication unit 110 as information addressed to the subject apparatus and issues the warning in Step s132. For example in Step s132, as described above, the controller 100 causes the display 120 to display, for a predetermined time, notification information for notifying the presence of the stopped vehicle 6A ahead. Alternatively, the controller 100 outputs audio for notifying the presence of the stopped vehicle 6A ahead at least once from the speaker 160. The controller 100 may output audio for notifying the presence of the stopped vehicle 6A ahead at least once from the speaker 160 as well as may cause the display 120 to display, for the predetermined time, the notification information for notifying the presence of the stopped vehicle 6A ahead. Therefore, the driver of the traveling specified vehicle 6B approaching from behind the stopped specified vehicle 6A can recognize the presence of the stopped vehicle 6A ahead, ahead of time.

Note, similarly to the above, the wireless communication unit 110 of the electronic apparatus 10 in the traveling specified vehicle 6B may transmit the received stopped vehicle notification information to the in-vehicle device 60 of the traveling specified vehicle 6B in Step s132. In this case, the in-vehicle device 60 which has received the stopped vehicle notification information issues the warning based on the stopped vehicle notification information in the same manner as described above.

In the above example, if the execution of the external warning notification is determined in the notification determination process, the stopped vehicle notification information is individually notified to each traveling vehicle 6B by using the identification information of the traveling vehicle 6B outputting the traveling direction used in the notification determination process. Therefore, the probability that the notification is made to the traveling vehicle 6B which hardly requires the notification from the stopped vehicle 6A can be further reduced.

For example, as illustrated in FIG. 21, even in a case where, not only the traveling specified vehicle 6B in the first overtaking lane 71B, of which traveling direction 16B is substantially equal to the stopped direction 16B, but also the traveling specified vehicle 6B in the opposite lane, of which traveling direction 16B is greatly different from the stopped direction 16A are present in the communication area 115 of the device 10 in stopped vehicle, the probability that the notification, to the traveling vehicle 6B in the opposite direction, which hardly requires the notification from the device 10 in stopped vehicle, is made can be reduced. As a result, the probability that the traveling specified vehicle 6B which does not require notification from the device 10 in stopped vehicle 10 executes a process in accordance with the notification can be reduced.

Second Other Example of Second Embodiment

Figure 30:
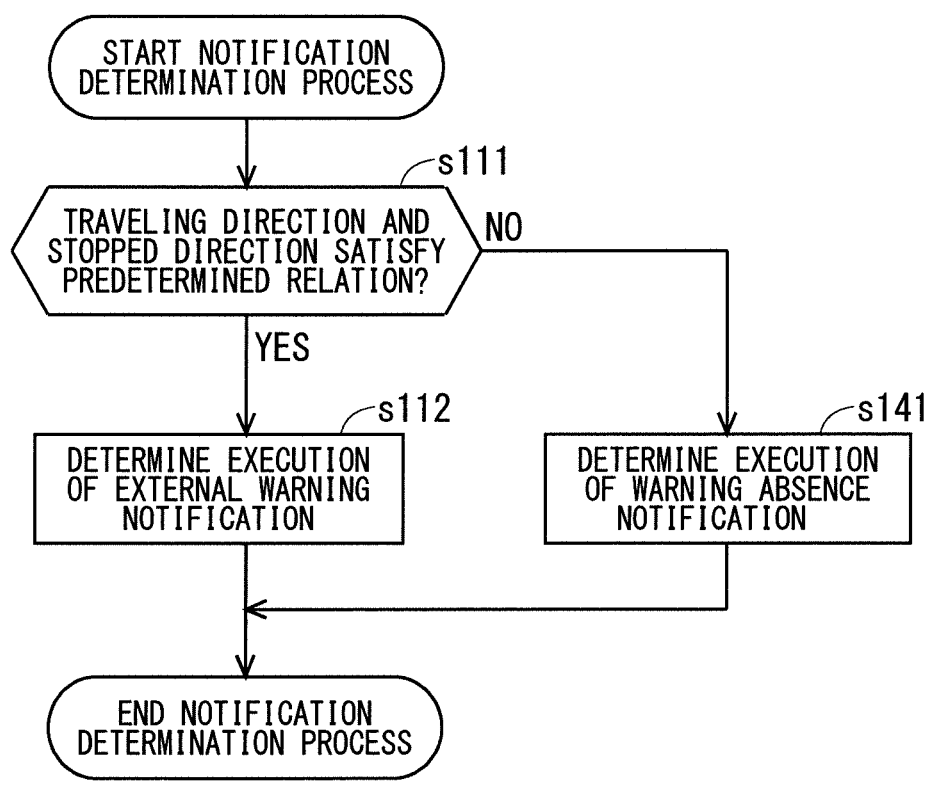
FIG. 30 illustrates a flowchart showing an example of an operation of the electronic apparatus.

FIG. 30 illustrates a flowchart showing an example of a notification determination process executed by the device 10 in stopped vehicle according to the present example. In the present example, as is the same with the first other example of the second embodiment, the device 10 in traveling vehicle repeatedly transmits a signal including the traveling direction and identification information by the use of the 700 MHz band communication.

As illustrated in FIG. 30, the notification determiner 500a executes Step s111 above. If the notification determiner 500a determines that the traveling direction and the stopped direction satisfy the predetermined relation in Step s111, the notification determiner 500a executes Step s122 above and determines the execution of the external warning notification. On the other hand, if the notification determiner 500a determines that the traveling direction and the stopped direction do not satisfy the predetermined relation in Step s111, the notification determiner 500a determines execution of warning absence notification for notifying the traveling vehicle 6B of absence of warning in Step s141.

In the notification determination process, determining the execution of the external warning notification, the wireless communication unit 110 transmits the signal including the identification information transmitted together with the traveling direction used in the notification determination process and the stopped vehicle notification information by the use of 700 MHz band communication, as is the same with the first other example of the second embodiment.

On the other hand, if the execution of the warning absence notification is determined in the notification determination process, the wireless communication unit 110 transmits a signal including the identification information transmitted together with the traveling direction used in the notification determination process and the warning absence notification for notifying the traveling specified vehicle 6B of absence of warning by the use of 700 MHz band communication. In this manner, the warning absence notification to the traveling specified vehicle 6B is made the device 10 in stopped vehicle.

FIG. 31 illustrates a flowchart showing an example of a warning process executed by the device 10 in traveling vehicle according to the present example. As illustrated in FIG. 31, the controller 100 executes Step s131 above. If the consistence between the reception identification information and the storage identification information is determined in Step s131, the controller 100 checks whether the information received together with the reception identification information by the wireless communication unit 110 is the stopped vehicle notification information or the warning absence notification information in Step s151, if the information received together with the reception identification information by the wireless communication unit 110 is determined to be the stopped vehicle notification information in Step s151, the device 10 in traveling vehicle issues the warning to a person in the traveling specified vehicle 6B as is in the same with Step s132, in Step s152. Accordingly, the warning process is ended. It should be noted that in Step s152, the in-vehicle device 60 of the traveling specified vehicle 6B may issue the warning by displaying or the like.

On the other hand, if the information received together with the reception identification information by the wireless communication unit 110 is determined to be the warning absence notification information in Step s151, the device 10 in traveling specified vehicle 6B stops issuing the warning in Step s153. Accordingly, the warning process is ended. Note, if the warning is not being issued when the information received together with the reception identification information by the wireless communication unit 110 is determined to be the warning absence notification information in Step s153, the warning process is ended without executing Step s153.

If the notification information for notifying the presence of the stopped vehicle 6A ahead is being displayed on the display 120 in Step s153, for example, the displaying of the notification information is deleted. Also, if the speaker 160 is caused to repeatedly output audio for notifying the presence of the stopped vehicle 6A ahead, the audio output from the speaker 160 is stopped. Also, if the in-vehicle device 60 of the traveling specified vehicle 6B is being issued by displaying or the like, the device 10 in traveling vehicle causes the in-vehicle device 60 to stop the warning.

Accordingly, if it is determined that the traveling direction and the stopped direction do not satisfy the predetermined condition in the notification determination process in the present example, the warning absence notification is made to the traveling specified vehicle 6B. Therefore, the probability that the notification hardly necessary for the driver or the like in the traveling specified vehicle 6B is made can be reduced when the state of the traveling specified vehicle 6B in the communication area 115 shifts from the state where the external warning notification is necessary to the state where the external warning notification is hardly necessary.

Figure 32:
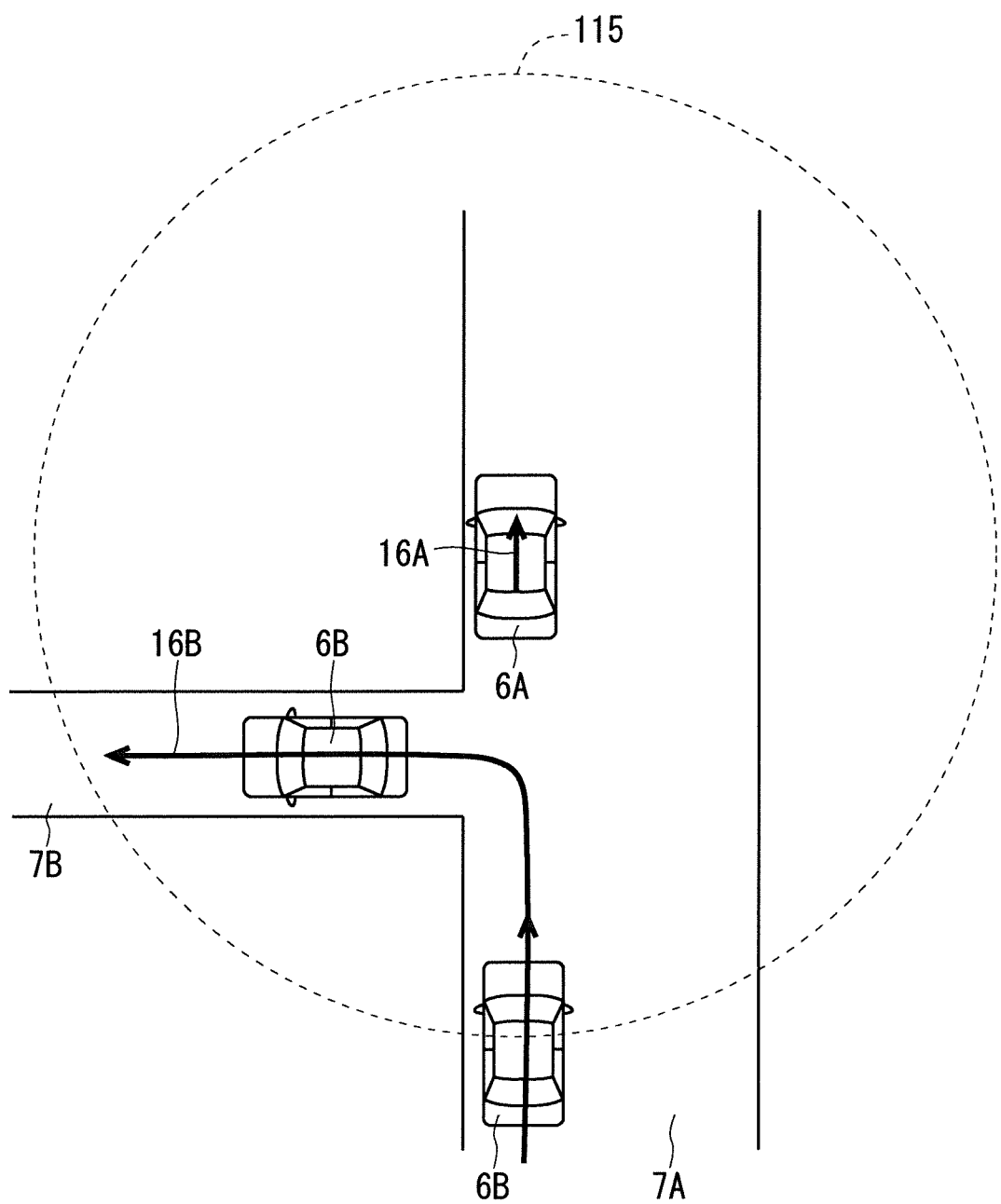
FIG. 32 illustrates a diagram of an example of a state of a stopped vehicle and a traveling vehicle in a roadway.

As illustrated in FIG. 32 for example, a case in which the traveling specified vehicle 6B traveling in the same roadway as the roadway 7A in which the stopped specified vehicle 6A is stopped makes a left-turn before the stopped specified vehicle 6A and enters into the roadway 7B the roadway road way 7A meets is considered. In this case, the traveling specified vehicle 6B is unlikely to overtake the stopped specified vehicle 6A after the left-turn; therefore, the external warning notification from the stopped specified vehicle 6A is hardly necessary for the traveling specified vehicle 6B. In the present example, while the traveling specified vehicle 6B in the communication area 115 is traveling in the roadway 7A, the external warning notification is made from the stopped specified vehicle 6A to the traveling specified vehicle 6B and the warning absence notification is made from the stopped specified vehicle 6A to the traveling specified vehicle 6B after the left-turn. Therefore, the probability that the external warning notification that is hardly necessary for the driver in the traveling specified vehicle 6B present in the communication area 115 after the left-turn is made can be reduced.

Third Other Example of Second Embodiment

Figure 33:
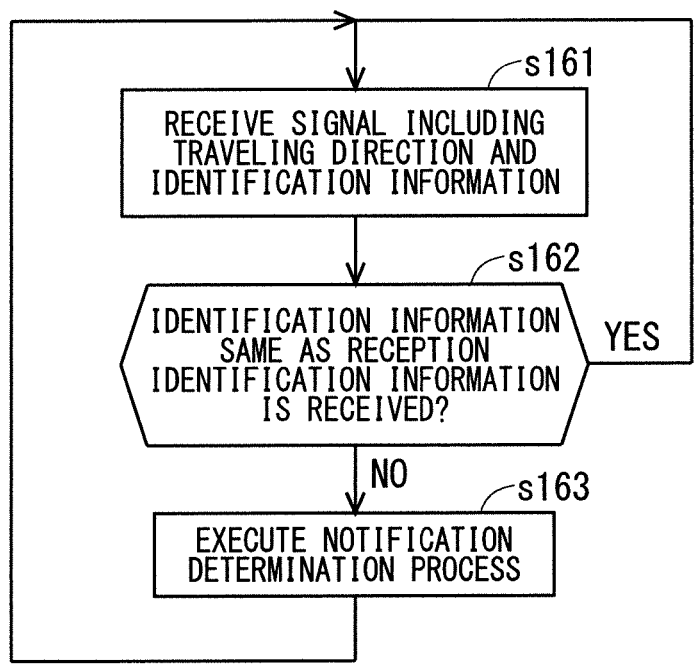
FIG. 33 illustrates a flowchart showing an example of an operation of the electronic apparatus.

In the above-described first other example of the second embodiment, the device 10 in stopped vehicle repeatedly executed the notification determination process for the same traveling specified vehicle 6B present within the communication area 115, however, the device 10 in stopped vehicle may execute the notification determination process only once. FIG. 33 illustrates a flowchart showing an example of an operation of the device 10 in stopped vehicle in this case.

As illustrated in FIG. 33, in Step s161, as the wireless communication unit 110 receives the signal including the traveling direction and the identification information, the notification determiner 500a determines whether the wireless communication unit 110 receives identification information same as the identification information which is the reception identification information included in the signal received in Step s161 between a time point a predetermined time period back from the present and the present in Step s162. The predetermined time period is set to a value larger than a time interval at which the device 10 in traveling vehicle transmits the signal including the traveling direction and the identification information. In other words, the predetermined time period in Step s162 is set to a value larger than an execution interval of the traveling direction notification process in the device 10 in traveling vehicle. The predetermined time period in Step s162 is set to several times the time interval at which the device 10 in traveling vehicle transmits the signal including the traveling direction and the identification information.

Determining, in Step s162, that the wireless communication unit 110 does not receive the identification information same as the reception identification information from the time point a predetermined time period back from the present up to the present, the notification determiner 500a determines that the electronic apparatus 10 that has transmitted the reception identification information present in the communication area 115 has not yet executed the notification determination process for the traveling specified vehicle 6B present therein, and determines to execute the notification determination process in Step s163. Thereafter, if Step s161 is re-executed, the device 10 in stopped vehicle operates similarly.

On the other hand, determining, in Step s162, that the wireless communication unit 110 receives the identification information same as the reception identification information from the time point a predetermined time period back from the present up to the present, the notification determiner 500a determines that the electronic apparatus 10 that has transmitted the reception identification information present in the communication area 115 has executed the notification determination process for the traveling specified vehicle 6B present therein, and determines not to execute the notification determination process. Thereafter, if Step s161 is re-executed, the device 10 in stopped vehicle operates similarly.

The device 10 in stopped vehicle operates as in FIG. 33; therefore, the notification determination process for the traveling specified vehicle 6B is executed when the traveling specified vehicle 6B enters into the communication area 115, and then the notification determination process is not to be executed therefor unless the traveling specified vehicle 6B leaves from and then re-enters into the communication area 115.

Accordingly, even in the case where the device 10 in stopped vehicle executes the notification determination process for the same traveling specified vehicle 6B present in the communication area 115 only once, the probability that the notification from the stopped vehicle 6A, which is hardly necessary for the traveling vehicle 6B, is made can be reduced.

Note that in the present example, as is the same with the first other example of the second embodiment, the device 10 in stopped vehicle may execute the external warning notification individually for each device 10 in traveling vehicle by individually communicating with the device 10 in traveling vehicle. Alternatively, the device 10 in stopped vehicle may execute the external warning notification for the device 10 in traveling vehicle in the communication area 115 by broadcasting, as is the same with the above-described second notification example. Alternatively, the external warning notification may be executed by turning on the rear lamps of the stopped specified vehicle 6A, as is the same with the above-described first notification example.

Fourth Other Example of Second Embodiment

In the third other example of the second embodiment, the notification determination process is executed only once when the traveling specified vehicle 6B enters into the communication area 115; therefore, if the traveling direction 16B of the traveling specified vehicle 6B at the time when the traveling specified vehicle 6B enters into the communication area 115 is greatly different from the stopped direction 16A of the stopped specified vehicle 6A as illustrated in above-described FIG. 26, the stopped specified vehicle 6A may not possibly execute the external warning notification for the specified vehicle 6B.

Therefore, in the notification determination process for the traveling specified vehicle 6B, if the device 10 in stopped vehicle according to the present example determines the non-execution of the external warning notification, the device 10 in stopped vehicle re-executes the notification determination process for the traveling specified vehicle 6B. In other words, in the notification determination process for the traveling specified vehicle 6B, if the device 10 in stopped vehicle determines that the traveling direction and the stopped direction do not satisfy the predetermined relation, the device 10 in stopped vehicle re-executes the notification determination process for the traveling specified vehicle 6B. Accordingly even in the case where the traveling direction 16B of the traveling specified vehicle 6B at which the traveling specified vehicle 6B that is likely to overtake the stopped specified vehicle 6A enters into the communication area 115 is greatly different from the stopped direction 16A of the stopped specified vehicle 6A, the device 10 in stopped vehicle can reliably execute the external warning notification to the traveling specified vehicle 6B.

Figure 34:
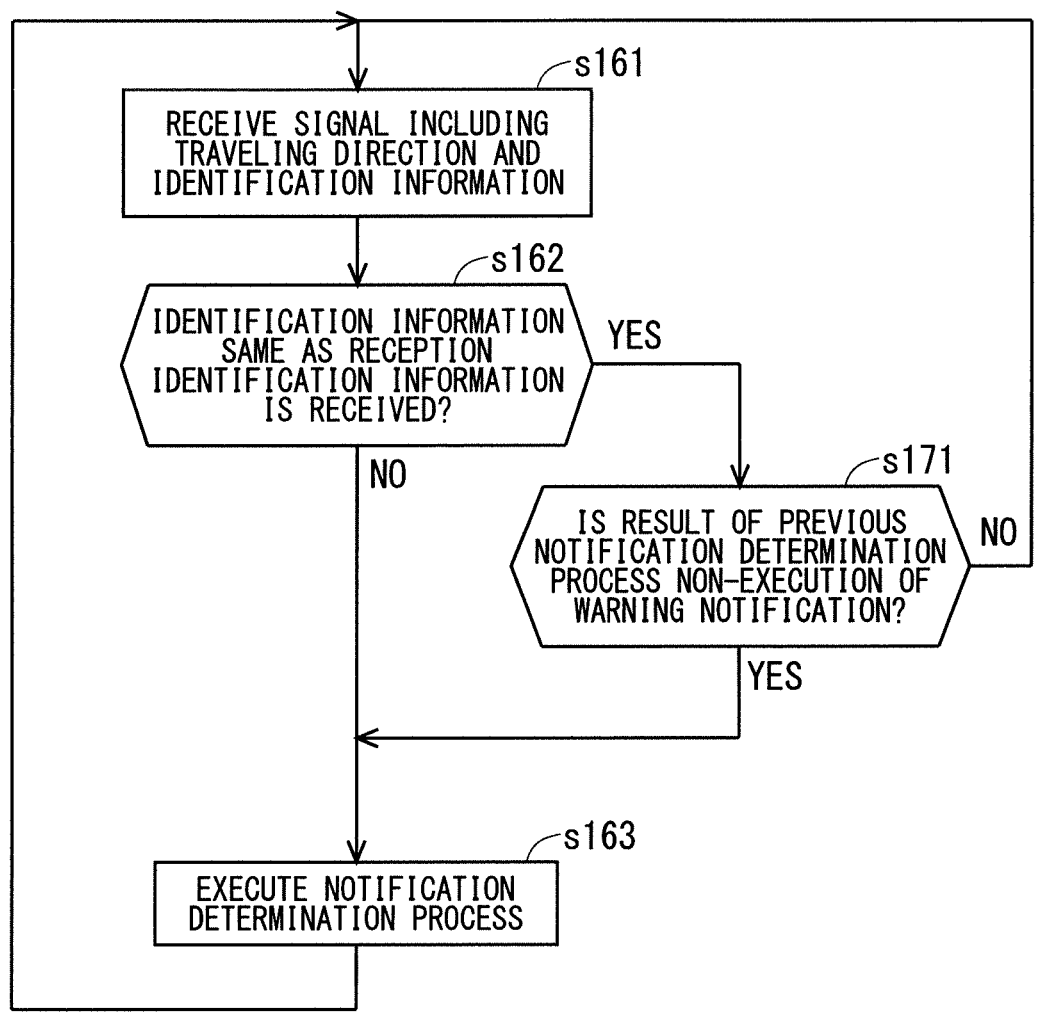
FIG. 34 illustrates a flowchart showing an example of an operation of the electronic apparatus.

FIG. 34 illustrates a flowchart showing an example of an operation of the device 10 in stopped vehicle according to the present example. As illustrated in FIG. 34, the device 10 in stopped vehicle executes Steps s161 and s162 above. Determining, in Step s162, that the wireless communication unit 110 does not receive the identification information same as the reception identification information from the time point a predetermined time period back from the present up to the present, the notification determiner 500a executes Step s163 and executes the notification determination process.

Determining, in Step s162, that the wireless communication unit 110 does not receive the identification information same as the reception identification information from the time point a predetermined time period back from the present up to the present, the notification determiner 500a executes Step s171 and executes the notification determination process. In Step s171, the notification determiner 500a checks whether the non-execution of the warning notification in the previous notification determination process is determined. If the notification determiner 500a determines the non-execution of the warning notification in the previous notification determination process, the notification determiner 500 executes Step s163 to execute the notification determination process. In other words, in the previous notification determination process, if the notification determiner 500a determines that the traveling direction and the stopped direction do not satisfy the predetermined relation, the notification determiner 500a executes the notification determination process. On the other hand, if the notification determiner 500a determines the execution of the warning notification in the previous notification determination process, the notification determiner 500 does not execute the notification determination process. Thereafter, if Step s161 is re-executed, the device 10 in stopped vehicle operates similarly.

Accordingly, if it is determined that the traveling direction and the stopped direction do not satisfy the predetermined relation in the notification determination process for the traveling specified vehicle 6B, the notification determination process for the traveling specified vehicle 6B is re-executed; therefore, even in the case where, as illustrated in above-described FIG. 26, the traveling direction 16B of the traveling specified vehicle 6B at the time when the traveling specified vehicle 6B enters into the communication area 115 is greatly different from the stopped direction of the stopped specified vehicle 6A, the probability that the external warning notification for the traveling specified vehicle 6B is made can be improved.

It should be noted that, as is the same with the first other example of the second embodiment, in the present example, the external warning notification may be executed individually for each device 10 in traveling device. Alternatively, the external warning notification for the device 10 in traveling vehicle in the communication area 115 may be executed by broadcasting, as is the same with the above-described second notification example. Alternatively, the external warning notification may be executed by turning on the rear lamps of the stopped specified vehicle 6A, as is the same with the above-described first notification example.

Fifth Other Example of Second Embodiment

In each of the above examples, when the stopped direction 16A of the stopped vehicle 6A and the traveling direction 16B of the traveling vehicle 6B are equal or substantially equal to each other, the external warning notification is made. Therefore, the external warning notification is likely to be made after the traveling vehicle 6B has overtaken the stopped vehicle 6A. The external warning notification is hardly necessary for the traveling vehicle 6B that has overtaken the stopped vehicle 6A; therefore, the external warning notification is likely to be made in vain.

Therefore, in the present example, the notification determiner 500a does not determine the execution of the external warning notification as soon as the traveling direction and the stopped direction satisfy the predetermined relation, but determines the execution of the external warning notification when the both directions satisfy the predetermined relation and the reception strength of a signal from the device 10 in traveling vehicle satisfies a predetermined condition.

Figure 35:
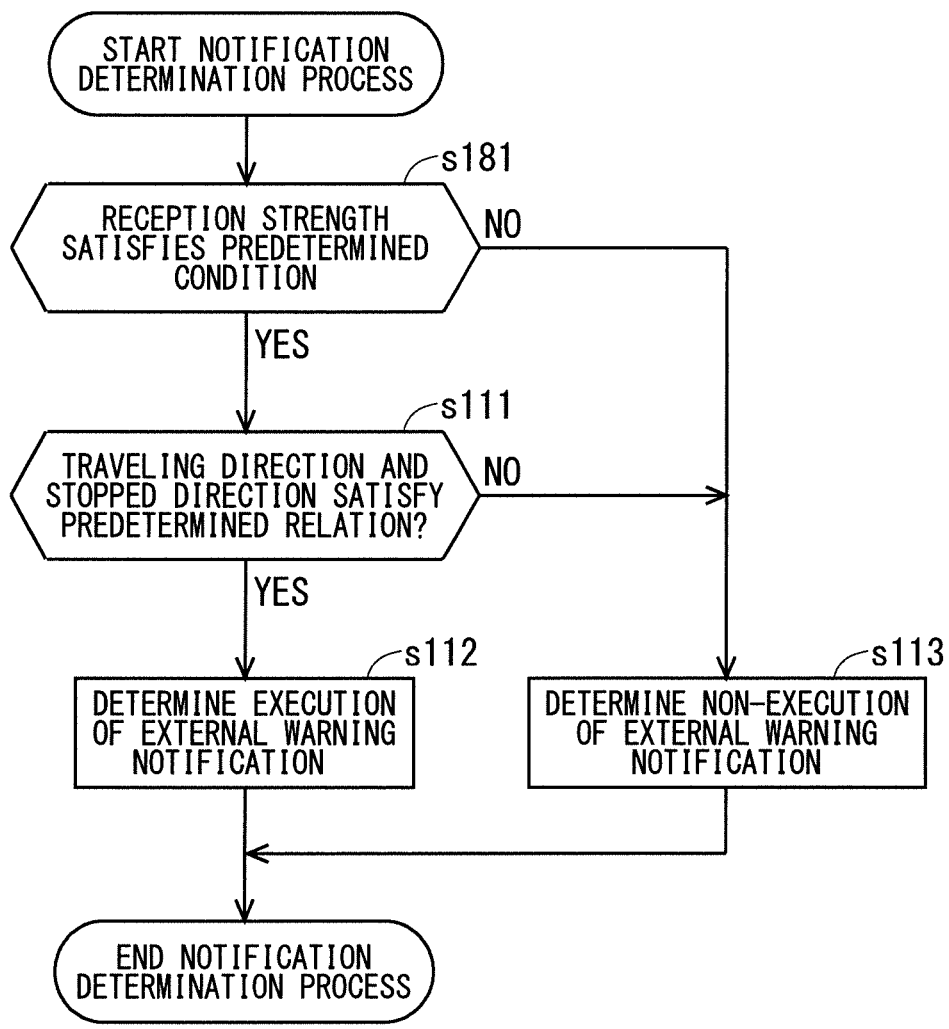
FIG. 35 illustrates a flowchart showing an example of an operation of the electronic apparatus.

FIG. 35 illustrates a flowchart showing an example of the notification determination process according to the present example. In the present example, as is the same with the above example, the device 10 in traveling vehicle repeatedly transmits a signal including the traveling direction and the identification information.

If the wireless communication unit 110 receives the signal including the traveling direction and the identification information, in the device 10 in stopped vehicle, the notification determiner 500a determines whether the reception strength of the signal from the device 10 in traveling vehicle transmitting the reception identification information which is the identification information received by the wireless communication unit 110 satisfies the predetermined condition in Step s181. In Step s181, for example, the reception strength of the signal from the device 10 in traveling vehicle has been increased, the notification determiner 500a determines the reception strength satisfies the predetermined condition.

Here, in the electronic apparatus 10 in the stopped specified vehicle 6A, the reception strength of the electronic apparatus 10 in the traveling specified vehicle 6B transmits is increased as the traveling specified vehicle 6B approaches the stopped specified vehicle 6A. Therefore, it can be said that the notification determiner 500a determines whether the traveling specified vehicle 6B approaches the stopped specified vehicle 6A in Step s181.

In the present example, the wireless communication unit 110 obtains the reception strength of the signal every time the wireless communication unit 110 receives the signal including the traveling direction and the identification information. The wireless communication unit 110 obtains, for example, Received Signal Strength Indicator (RSSI) as reception strength of the signal. If the wireless communication unit 110 obtains the reception strength of the signal including the identification information, the controller 100 associates the reception strength with the identification information and stores this in the storage 103. If the wireless communication unit 110 does not receive the signal for a certain time or more after the start of the reception of signal including the identification, the controller 100 determines that the traveling specified vehicle 6B in which the device 10 in traveling vehicle to which the identification information belongs is present has left from the communication area 115 and deletes all reception strength associated with the identification information from the storage 103.

In Step s181, the notification determiner 500a reads out a first reception strength which is the latest reception strength corresponding to the reception identification information and a second reception strength which is the reception strength obtained a time before the first reception strength was obtained, from the storage 103. And if the first reception strength is greater than the second reception strength, the notification determiner 500a determines that the reception strength of the signal from the device 10 in traveling vehicle to which the reception identification information belongs has been increased and determines the reception strength satisfies the predetermined condition. On the other hand, if the first reception strength is equal to or smaller than the second reception strength, the notification determiner 500a determines that the reception strength of the signal from the device 10 in traveling vehicle to which the reception identification information belongs has not been increased and determines the reception strength does not satisfy the predetermined condition. Note, if only one reception strength corresponding to the reception identification information stored in the storage 103, Step s181 is not executed.

If the notification determiner 500a determines that the reception strength of the signal from the device 10 in traveling vehicle to which the reception identification information belongs satisfies the predetermined condition in Step s181, the notification determiner 500a operates similarly as in above-described FIG. 23. In other words, if the traveling specified vehicle 6B in which the device 10 in traveling vehicle to which the reception identification information belongs approaches the stopped specified vehicle 6A in Step s181, the notification determiner 500a operates similarly as in above-described FIG. 23. On the other hand, if it is determined that the reception strength of the signal from the device 10 in traveling vehicle to which the reception identification information belongs to does not satisfy the predetermined condition in Step s181, the notification determiner 500a executes Step s113 and determines the non-execution of the external warning notification.

As the device 10 in stopped vehicle operates as illustrated in FIG. 35; therefore, the probability that the external warning notification to the traveling specified vehicle 6B that has overtaken the stopped specified vehicle 6A is made can be reduced.

For example, in the example in above-described FIG. 21, if the traveling specified vehicle 6B traveling in the first overtaking lane approaches the stopped specified vehicle 6A from behind, YES is determined in Step s181 and the execution of the external warning notification is determined. On the other hand, if the traveling specified vehicle 6B traveling in the first overtaking lane 71B has overtaken the stopped specified vehicle 6A, NO is determined in Step s181 and the execution of the external warning notification is not determined. Therefore, the probability that the external warning notification to the traveling specified vehicle 6B is made can be reduced after the traveling specified vehicle 6B traveling in the first overtaking lane 71B has overtaken the stopped specified vehicle 6A.

Note that Step s181 may be executed between Step s111 and Step s112. Also, in Step s181, for example, the reception strength of the signal from the device 10 in traveling vehicle to which the reception identification information belongs has been decreased, the notification determiner 500a may determine the reception strength satisfies the predetermined condition. In this case, if the notification determiner 500a acquires the above-described first and second reception strength from the storage 103 and if the first reception strength is smaller than the second reception strength, the notification determiner 500a determines that the reception strength of the signal from the device 10 in traveling vehicle to which the reception identification information belongs has been decreased and determines the reception strength does not satisfy the predetermined condition. On the other hand, if the first reception strength is equal to or greater than the second reception strength, the notification determiner 500a determines that the reception strength of the signal from the device 10 in traveling vehicle to which the reception identification information belongs has not been decreased and determines the reception strength satisfies the predetermined condition.

Even if the device 10 in stopped vehicle operates in this manner, the probability that the external warning notification to the traveling specified vehicle 6B that has overtaken the stopped specified vehicle 6A is made can be reduced.

The method of an external warning notification according to the present example may take either the first notification example or the second notification example. Or, the external warning notification may be made individually to each traveling specified vehicle 6B as in the first other example of the second embodiment. Or, as in the second other example of the second embodiment, the warning absence notification is made when the non-execution of the external warning notification is determined in the notification determination process.

Sixth Other Example of Second Embodiment

In the notification determination process, the electronic apparatus 10 in the stopped specified vehicle 6A may make a predetermined notification to a person in the stopped specified vehicle 6A if the execution of the external warning notification is determined. In this case, if the execution of the external warning notification is determined in the notification determination process, for example, the controller 100 causes the display 120 to display approach notification information for notifying that the traveling vehicle 6B is approaching from behind for a predetermined time. Alternatively, the controller 100 may output approach notification audio for notifying that the traveling vehicle 6B is approaching from behind from the speaker 160 at least once, in place of or in addition to causing the display 120 to display the approach notification information. Accordingly the warning to the driver or the like in the stopped specified vehicle 6A is issued. A string of letters or a symbol may be used as the approach notification information.

Also, in the notification determination process, the device 10 in stopped vehicle may stop making the predetermined notification if the non-execution of the external warning notification is determined. In this case, if the approach notification information is displayed on the display 120, the display of the approach notification information is deleted. Also, if the approach notification audio is being repeatedly output from the speaker 160, the output of the approach notification audio from the speaker 160 is stopped.

Accordingly, if the execution of the external warning notification is determined, the electronic apparatus 10 in the stopped specified vehicle 6A makes a notification to a person in the stopped specified vehicle specified vehicle; therefore, the driver in the stopped specified vehicle 6A can recognize that the traveling vehicle 6B is approaching the stopped specified vehicle 6A from behind. Therefore, the probability that the driver or the like in the stopped vehicle 6A could open the door, or could unexpectedly come out from the stopped vehicle 6A even if the traveling vehicle 6B is approaching the stopped vehicle 6A from behind, is reduced.

Seventh Other Example of Second Embodiment

If an electronic apparatus (thereafter, referred to as "vehicle mounted device", in some cases) mounted on the vehicle 6 includes a similar configuration to the electronic apparatus 10, the electronic apparatus in the stopped vehicle 6A may similarly operate to the electronic apparatus 10 in the stopped vehicle 6A. That is, the vehicle mounted device of the stopped vehicle 6A may wirelessly communicate with the device 10 in traveling device by the use of 700 MHz band communication to execute the above-described notification determination process, in place of the electronic apparatus 10 in the stopped vehicle 6A. In this case, the in-vehicle device 60 in the stopped vehicle 6A may execute the notification determination process or the like, or the in-vehicle device 60 and the electronic apparatus including the vehicle control device in the stopped vehicle 6A may execute the notification determination process or the like.

Accordingly, if the vehicle mounted device included in the stopped vehicle 6A executes the notification determination process or the like, even if no person is present in the stopped vehicle 6A, the vehicle mounted device can execute the notification determination process or the like. The vehicle mounted device included in the stopped vehicle 6A may determine whether a person is present in the stopped vehicle 6A and may execute the notification determination process if the vehicle mounted device determines the presence of a person in the stopped vehicle 6A. If the vehicle mounted device included in the stopped vehicle 6A can communicate with the electronic apparatus 10 through, for example, at least one of Wifi and Bluetooth, the vehicle mounted device can determine the presence of a person in the stopped vehicle 6A. Also, if the vehicle mounted device included in the stopped vehicle 6A includes a geomagnetic sensor, the vehicle mounted device can specify the stopped direction of the stopped vehicle 6A based on the detection result of the geomagnetic sensor. Also, if the vehicle mounted device included in the stopped vehicle 6A includes a geomagnetic sensor and a gyro sensor, the vehicle mounted device may specify the stopped direction of the stopped vehicle 6A based on the detection result of the geomagnetic sensor and the detection result of the gyro sensor.

Further, the vehicle mounted device included in the traveling vehicle 6B may similarly operate to the electronic apparatus 10 in the traveling vehicle 6B. That is, the vehicle mounted device included in the traveling vehicle 6B may execute the above-described traveling direction notification process and warning process or the like, in place of the electronic apparatus 10 in the traveling vehicle 6B. In this case, the in-vehicle device 60 in the traveling vehicle 6B may execute the traveling direction notification process or the like, or the in-vehicle device 60 and the electronic apparatus including the vehicle control device in the traveling vehicle 6B may execute the traveling direction notification process or the like. If the vehicle mounted device included in the traveling vehicle 6B includes a geomagnetic sensor, the vehicle mounted device can specify the traveling direction of the traveling vehicle 6A based on the detection result of the geomagnetic sensor. Also, if the vehicle mounted device included in the traveling vehicle 6B includes a geomagnetic sensor and a gyro sensor, the vehicle mounted device may specify the traveling direction of the traveling vehicle 6B based on the detection result of the geomagnetic sensor and the detection result of the gyro sensor.

Accordingly, if the vehicle mounted device included in the traveling vehicle 6B executes the traveling direction notification process or the like, the vehicle mounted device may communicate with the device 10 in stopped vehicle to notify the traveling direction or the like of the traveling direction or the like, or may communicate with a vehicle mounted device included in the stopped vehicle 6A to notify the vehicle mounted device of the traveling direction or the like.

Third Embodiment

Next, the other example of the electronic apparatus 10 or the like will be described in detail. Thereafter, the electronic apparatus 10 may be referred to as "mobile apparatus 10" in some cases.

Figure 36:
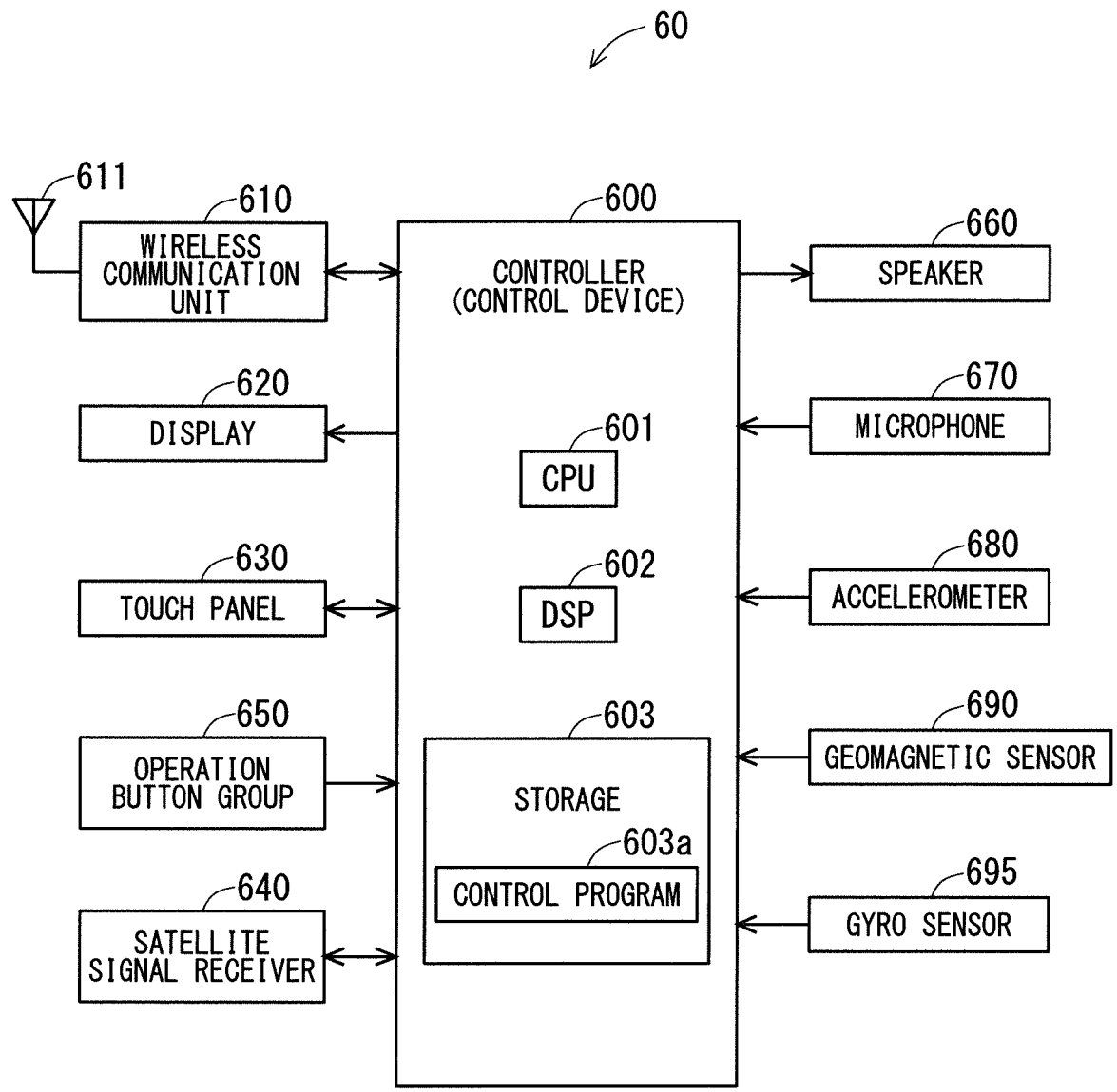
FIG. 36 illustrates a block diagram of an example of a configuration of an electronic apparatus.

FIG. 36 illustrates a block diagram showing an example of part of a configuration of the in-vehicle device 60 according to the present example. Note, the electric structure of the mobile apparatus 10 according to the present example is the same as the electric structure illustrated in above-described FIG. 19.

As illustrated in FIG. 36, the in-vehicle device 60 includes a controller 600, a wireless communication unit 610, a display 620, a touch panel 630, an operation button group 650, and a satellite signal receiver 640. The in-vehicle device 60 further includes a speaker 660, a microphone 670, an accelerometer 680, a geomagnetic sensor 690, and a gyro sensor 695. Hereinafter, in describing the operation of the in-vehicle device 60, the vehicle 6 signifies the vehicle 6 on which the in-vehicle device 60 is mounted, unless otherwise specified.

The controller 600 can integrally manage the operation of the in-vehicle device 60 by controlling other components in the in-vehicle device 60. The controller 600 can also be said to be a control device. The controller 600 includes at least one processor for providing control and processing capability to perform various functions as described in further detail below.

In accordance with various embodiments, the at least one processor may be implemented as a single integrated circuit (IC) or as multiple communicatively coupled ICs and/or discrete circuits. It is appreciated that the at least one processor can be implemented in accordance with various known technologies.

In one embodiment, the processor includes one or more circuits or units configurable to perform one or more data computing procedures or processes by executing instructions stored in an associated memory, for example. In other embodiments, the processor may be implemented as firmware (e.g. discrete logic components) configured to perform one or more data computing procedures or processes.

In accordance with various embodiments, the processor may include one or more processors, controllers, microprocessors, microcontrollers, application specific integrated circuits (ASICs), digital signal processors, programmable logic devices, field programmable gate arrays, or any combination of the devices or structures, or other known devices and structures, to perform the functions described herein.

In the present example, the controller 600 includes a CPU 601, a DSP 602, and storage 603. The storage 603 includes, as is the same with the storage 103 of the mobile apparatus 10, a CPU 601 such as a ROM and RAM and a non-transitory storage medium capable of reading DPS 602. The storage 603 stores a plurality of control programs 603a and so forth for controlling the in-vehicle device 60. The various functions of the controller 600 are realized by executing the various control programs 603a in the storage 603 by the CPU 601 and the DSP 602.

Also, as is the same with the controller 100 of the mobile apparatus 10, the controller 600 may include a plurality of CPUs 604, may not include the DSP 602 or may include a plurality of DSPs 602. Note that all the functions of the controller 600 or a part of the functions of the controller 600 may be realized by a hardware circuit in which software is not required to realize the functions of the hardware circuit. Also, as is the same with the storage 103 of the mobile apparatus 10, the storage 603 may comprise a non-transitory storage medium that can be read by the computer except for ROM and RAM.

The plurality of control programs 603a in the storage 603 include a variety of applications application programs. In the storage 603, a navigation application for providing route guidance for a user by using a map or the like, a music playback control application for performing playback control of music data stored in the storage 603, and a video playback control application for performing playback control of video data stored in the storage 603. At least one application in the storage 603 may be an application previously stored in the storage 603. Also, at least one application in the storage 603 may be an application downloaded from other apparatus by the in-vehicle device 60 and stored in the storage 603.

The wireless communication unit 610 includes an antenna 611. The wireless communication unit 610 can wirelessly communicate by, for example, a multiple types of communication method by using the antenna 611. The wireless communication unit 610 is controlled by the controller 600. It can be said that the wireless communication unit 610 is a communication circuit.

The communication unit 610 can receive a signal for radio broadcasting. Also, the wireless communication unit 610 can wirelessly communicate with the roadside unit 5 and the mobile apparatus 10. Also, the wireless communication unit 610 can wirelessly communicate with the roadside unit 5 and the mobile apparatus 10 by the use of 700 MHz band communication. In addition, the wireless communication unit 610 of the in-vehicle device 60 can wirelessly communicate directly with the wireless communication unit 610 of the other in-vehicle device 60 by the use of the 700 MHz band.

Also, the wireless communication unit 610 can wirelessly communicate by the use of a wireless LAN such as Wifi. Also, the wireless communication unit 610 can perform short-range wireless communication. For example, the wireless communication unit 610 can wirelessly communicate based on Bluetooth. The wireless communication unit 610 may also be able to wirelessly communicate based on at least one of ZigBee and NFC.

The wireless communication unit 610 performs various processes such as amplification processing on a signal received by the antenna 611, and outputs the processed reception signal to the controller 600. The controller 600 performs various processes on the reception signal to be input to acquire information included in the reception signal. Also, the controller 600 outputs a sending signal including the information to the wireless communication unit 610. The wireless communication unit 610 performs various processes such as amplification processing on the sending signal to be input, and wirelessly sends the processed sending signal from the antenna 611.

The wireless communication unit 610 may be able to wirelessly communicate with a base station of a cellular phone system. In this case, the wireless communication unit 610 can communicate with a cellular phone and a web server via a network such as the base station, the Internet, or the like.

The display 620 includes, for example, a liquid crystal display panel or an organic EL panel. The display 620 can display various types of information such as characters, symbols, and graphics by being controlled by the controller 600.

The touch panel 630 can detect the operation by an operator such as a finger on the display screen of the display 620. The touch panel 630 includes, for example, a projection type capacitance touch panel. When the user performs an operation on the display screen with an operator such as a finger, the touch panel 630 can input an electric signal corresponding to the operation to the controller 600. The controller 600 can specify the content of the operation performed on the display screen based on the electric signal from the touch panel 630. Then, the controller 600 can perform processes in accordance with the specified operation content.

An operation button group 650 includes a plurality of operation buttons. Each operation button of the operation button group 650 is a home button, for example. If the user operates each of the operation buttons, an operation signal indicating that the any operation button has been operated can be output to the controller 600. Therefore, the controller 600 can determine whether any of the operation buttons has been operated for each operation button. When the controller 600 to which the operation signal is input controls other components, the function assigned to the operated operation button is executed in the in-vehicle device 60.

The satellite signal receiver 640 can receive a satellite signal transmitted by a positioning satellite. The satellite signal receiver 640 can acquire position information indicating the position of the vehicle 6 based on the received satellite signal. In the position information the satellite signal receiver 640 acquires includes latitude and longitude indicating the position of the vehicle 6, for example. The controller 600 can controls the satellite signal receiver 640 to operate and stop the operation. Thereafter, the satellite signal receiver 640 may be simply referred to as "receiver 640" in some cases.

The receiver 640 is, for example, a GPS receiver, and is capable of receiving a radio signal from a GPS positioning satellite. The receiver 640 calculates the current position of the vehicle 6, for example, in latitude and longitude based on the received wireless signal, and outputs position information including the calculated latitude and longitude to the controller 600. Note, the receiver 640 may obtain, as is the same with the receiver 140 of the mobile apparatus 10, the position information of the mobile apparatus 10 based on a signal from the positioning satellite of a GNSS other than the GPS.

The speaker 660 is, for example, a dynamic speaker. The speaker 660 can convert an electrical sound signal from the controller 600 into a sound and output thus obtained sound outside the in-vehicle device 60.

The microphone 670 can detect the external sound of the electronic apparatus 60. The microphone 670 can convert the detected sound into an electric sound signal and output the signal to the controller 600.

The accelerometer 680 can detect the acceleration of the in-vehicle device 60. In other words, the accelerometer 680 can detect the acceleration of the vehicle 6. The accelerometer 680 is, for example, a triaxial accelerometer. The geomagnetic sensor 690 is, for example, a triaxial geomagnetic sensor. The geomagnetic sensor 690 can detect a magnetic field in the x-axis direction, the y-axis direction, and the z-axis direction. The gyro sensor 695 is, for example, a triaxial gyro sensor. The gyro sensor 695 can detect angular velocities around the respective x-axis, y-axis, and z-axis. The controller 600 can specify the traveling direction or the like of the vehicle 6 based on the detection results of the accelerometer 680, the geomagnetic sensor 690, and the gyro sensor 695. The controller 600 can correct the position information acquired by the receiver 640 based on the detection results of the accelerometer 680, the geomagnetic sensor 690, and the gyro sensor 695.

Note that, the in-vehicle device 60 may not include at least one sensor of the accelerometer 680, the geomagnetic sensor 690, and the gyro sensor 695. In this case, the in-vehicle device 60 may be wirelessly or wiredly connected to the at least one individual sensor apart from thereof. The electronic apparatus 60 may also include, as is the same with the mobile apparatus 10, sensors besides the accelerometer 680, the geomagnetic sensor 690, and the gyro sensor 695. In this case, the in-vehicle device 60 may be wirelessly or wiredly connected to an individual sensor apart from the in-vehicle device 60 besides the accelerometer 680, the geomagnetic sensor 690, and the gyro sensor 695.

Figure 37:
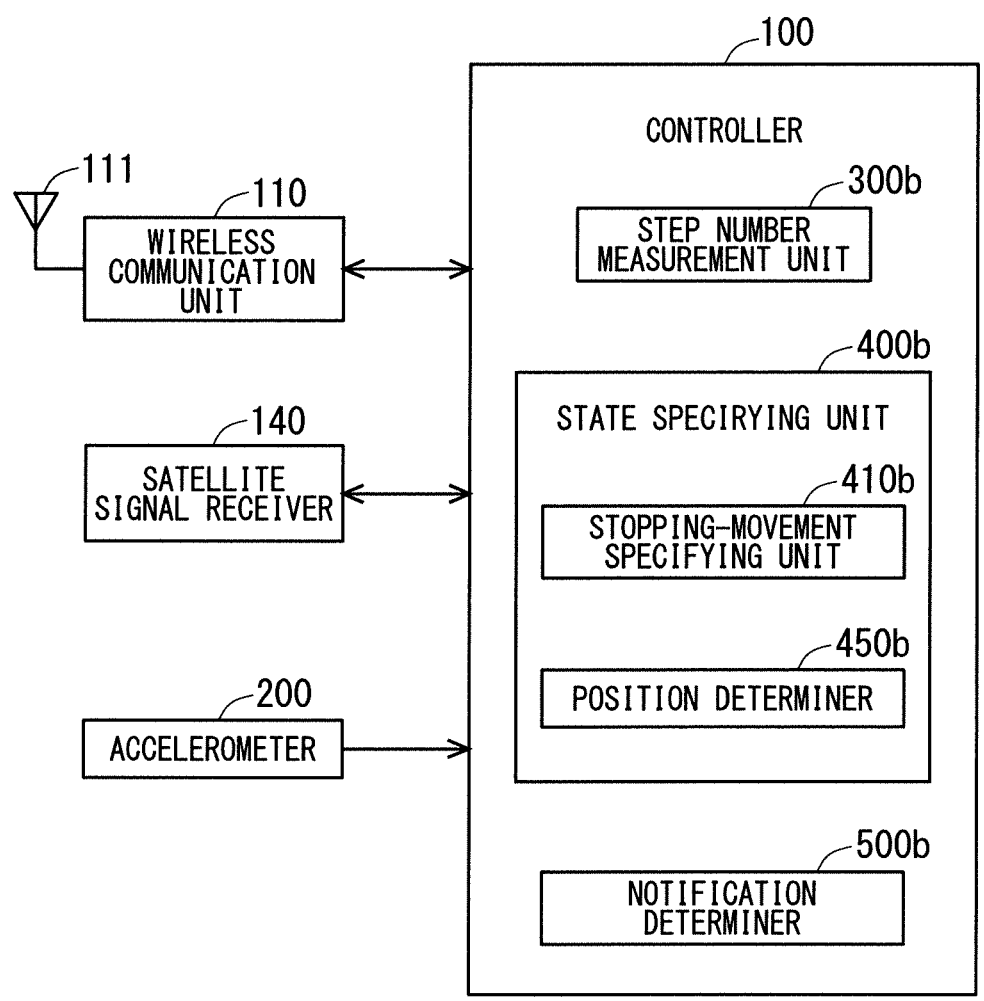
FIG. 37 illustrates a block diagram of an example of a configuration of a controller.

FIG. 37 illustrates a block diagram of a part of an example of functional blocks formed in the controller 100 according to the present example. As illustrated in FIG. 37, the controller 100 includes a step number measurement unit 300b, a state specifying unit 400b, and a notification determiner 500b as functional blocks. At least one of the step number measurement unit 300b, the state specifying unit 400b, and the notification determiner 500b may be realized by a hardware circuit in which software is not required to realize the functions of the hardware circuit.

The state specifying unit 400b can specify various states of the user 9. In other words, the state specifying unit 400b can specify various states of the mobile apparatus 10 possessed by the user 9. The state specifying unit 400b includes, for example, a stopping-movement specifying unit 410b and a position determiner 450b. At least one of the stopping-movement specifying unit 410b and the position determiner 450b may be realized by a hardware circuit in which software is not required to realize the functions of the hardware circuit.

The stopping-movement specifying unit 410b can perform stopping-movement specification for specifying the state of the user 9 concerning the stop and movement of the user 9. In the stopping-movement specification, the stopping-movement specifying unit 410b can specify, as is the same with the above-described stopping-movement specifying unit 410, that the user 9 is stopped and that the user 9 is moving. The stop of the user 9 is equivalent to the stop of the mobile apparatus 10; therefore, it can be said that the stopping-movement specifying unit 410b can determine whether the mobile apparatus 10 is stopped.

In the stopping-movement specification, the stopping-movement specifying unit 410b can specify, as is in the same with the above-described stopping-movement specifying unit 410, stop of the user 9 and start of movement of that the user 9. The stop of the user 9 is equivalent to stop of movement of the mobile apparatus 10; therefore, it can be said that the stopping-movement specifying unit 410b can specify the stop of movement of the mobile apparatus 10. Also, the start of movement of the user 9 is equivalent to the start of movement of the mobile apparatus 10; therefore, it can be said that the stopping-movement specifying unit 410b can specify the start of movement of the mobile apparatus 10.

Further, in the stopping-movement specification, the stopping-movement specifying unit 410b can specify the moving means of the user 9 if the stopping-movement specifying unit 410b determines that the user 9 is moving. Specifically, the stopping-movement specifying unit 410b can specify whether the moving means of the user 9 is a walking, running, bicycle or conveying device.

For example, the controller 100 can cause the display 120 to display the moving means specified by the stopping-movement specifying unit 410b and the moving distance of the user 9 (the moving distance of the mobile apparatus 10). Therefore, the user 9 can distinguish and check the walking distance, the running distance, the travel distance on the bicycle, and the travel distance on the conveying device. The controller 100 can obtain the moving distance of the user 9, for example, based on the position information acquired by the receiver 140.

As is in the same with the position determiner 450, the position determiner 450b can determine wither the user 9 is positioned in the predetermined area (in other words predetermined place). In other words, the position determiner 450b can determine whether the mobile apparatus 10 is positioned in the predetermined area (in other words predetermined place). As the predetermined area, a place where a possible accident of a pedestrian and the vehicle 6 is likely to occur, and an area including the vicinity thereof are adopted, for example. The predetermined area includes, for example, the above-described intersection area, the T-shaped road area, and the school road area. The position determiner 450b can individually determine among whether the user 9 is positioned in the intersection area, whether the user 9 is positioned in the T-shaped road area, and whether the user 9 is positioned in the school road area, respectively.

As described above, the state specifying unit 400b can specify various states of the user 9. Note, the types of the state of the user 9 specified by the state specifying unit 400b are not limited thereto.

As is in the same with the above-described step number measurement unit 300, the step number measurement unit 300b can measure the number steps of the user 9 moving by oneself. The step number measurement unit 300b measures the number of steps of the user 9 when the stopping-movement specifying unit 410b specifies that the user 9 is walking or running. The controller 100 can cause the display 120 to display the number of steps measured by the step number measurement unit 300b.

The notification determiner 500b can determine whether the mobile apparatus 10 notifies outside the mobile apparatus 10. For example, the notification determiner 500a determines whether the notification is made outside the mobile apparatus 10 based on the state of the user 9 specified by the state specifying unit 400b.

For example, if the position determiner 450b determines that the user 9 is positioned in the intersection area and the stopping-movement specifying unit 410b specifies that the moving means of the user 9 is "run", the notification determiner 500b determines that the notification is made outside the mobile apparatus 10. Also, if the position determiner 450b determines that the user 9 is positioned in the intersection area and the stopping-movement specifying unit 410b specifies that the moving means of the user 9 is "bicycle", the notification determiner 500b determines whether the mobile apparatus 10 notifies outside the mobile apparatus 10.

If the notification determiner 500b determines that the notification is made outside the mobile apparatus 10, for example, presence notification information for notifying the vehicle 6 positioned in the intersection area of the presence of the user 9 (pedestrian) from the wireless communication unit 110 to the roadside unit 5. The presence notification information may include information indicating the moving means of the user 9 specified by the stopping-movement specifying unit 410b. The roadside unit 5 transmits the received presence notification information to the vehicle 6 in the intersection area. At this time, the roadside unit 5 transmits the presence notification information by, for example, broadcasting. Based on the received presence notification information, the vehicle 6 issuing a warning to the driver, for example. For example, the vehicle 6 notifies the driver, by the use of the in-vehicle device 60, that there is a pedestrian nearby. Accordingly, the driver of the vehicle 6 in the intersection area can drive while recognizing that a person is present in the intersection area. As a result, the safety of driving of the vehicle 6 is improved.

Note, the content of the information notified outside the mobile apparatus 10 by the mobile apparatus 10 is not limited to the above example. In addition, the mobile apparatus 10 can directly notify the vehicle 6.

FIG. 38 illustrates a block diagram of a part of an example of functional blocks formed in the controller 600 by the CPU 601 and the DSP 602 of the in-vehicle device 60 executing the control program 603a in the storage 603.

As illustrated in FIG. 38, the controller 100 includes a stop determiner 750 and a number of passengers specification unit 760 as functional blocks, for example. Note that at least one of the stop determiner 750 and the number of passengers specification unit 760 may be realized by a hardware circuit in which software is not required to realize the functions of the hardware circuit.

The stop determiner 750 can specify whether the vehicle 6 is stopped. Here, the concept of the stop of the vehicle 6 includes, as described above, both "stop" and "parking" in the Road Traffic Act of Japan. The stop determiner 750 determines, for example, whether the vehicle 6 is stopped based on the result of a sensor 800 that detects the rotation speed of the axle of the vehicle 6, or the like. It can be said that the stop determiner 750 can specify whether the vehicle 6 is traveling. The sensor 800 is electrically connected to the controller 600 of the in-vehicle device 60 in a wired or wireless manner. The sensor 800 may be a part of the in-vehicle device 60.

The number of passengers specification unit 760 can specify the number of passengers in the stopped vehicle 6. The method of specifying the number of passengers will be described later in detail.

<Notification Made Outside by Stopped Vehicle>

Figure 39:
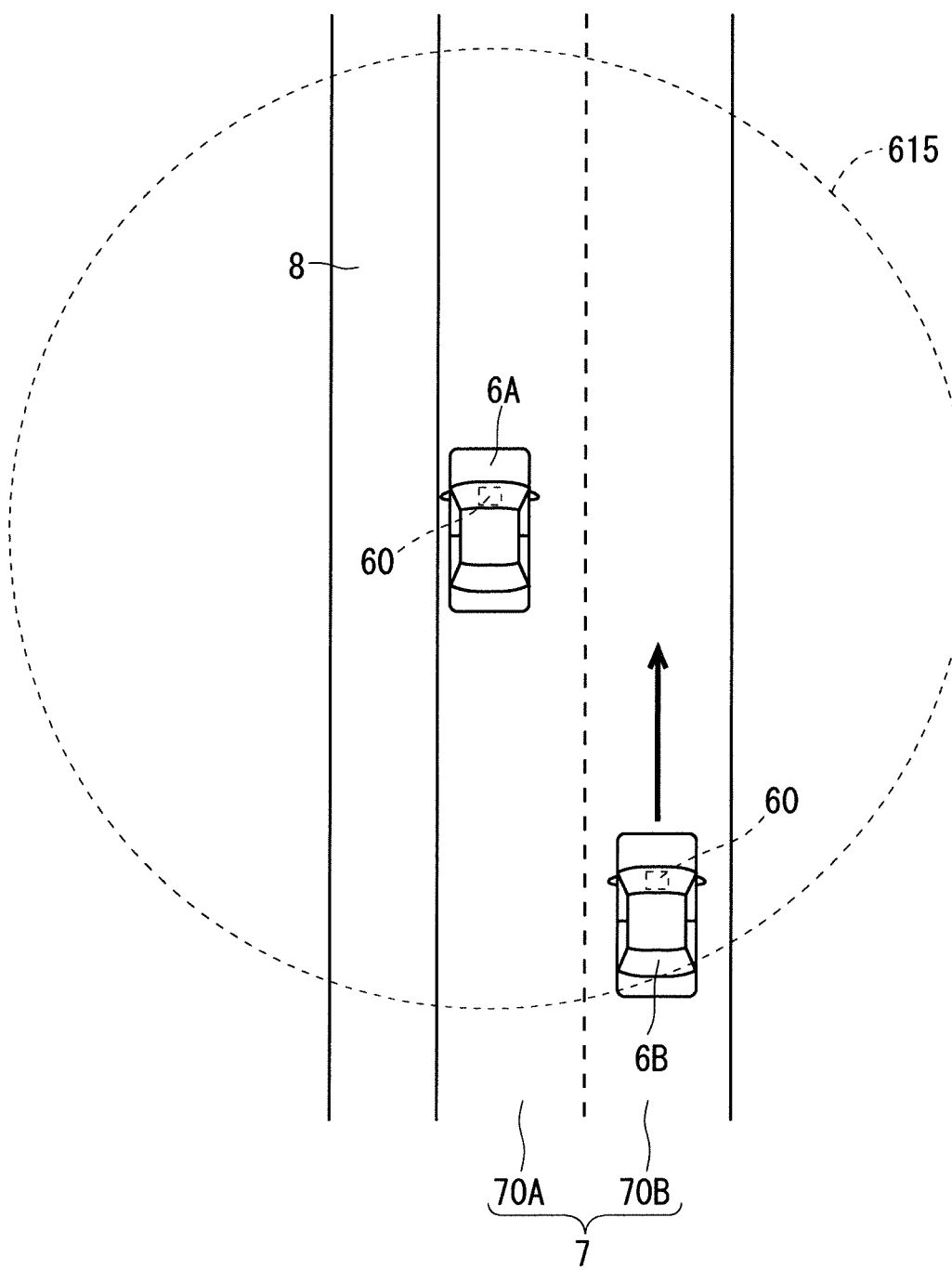
FIG. 39 illustrates a diagram of an example of a state of a stopped vehicle and a traveling vehicle in a roadway.

FIG. 39 illustrates a diagram of an example of a state of a stopped vehicle 6A (that is, stopped vehicle 6A) and a traveling vehicle 6B (that is, traveling vehicle 6B) in the roadway 7. In FIG. 39, the roadway 7 including the traveling lane 70A and the overtaking lane 70B is illustrated. In the example of FIG. 39, the stopped vehicle 6A is stopped in the traveling lane 70 and the traveling vehicle 6B is traveling in the overtaking lane 70B. In FIG. 39, the communication area 615 of the 700 MHz band communication of the in-vehicle device 60 of the stopped vehicle 6A is schematically illustrated by a broken line. The radius of the communication area 615 is, for example, about several tens of meters to 200 m.

In the example of FIG. 39, a person could unexpectedly come out from the stopped vehicle 6A in the case where the traveling vehicle 6B approaches the stopped vehicle 6A from behind. Therefore, it is preferable that a driver or the like in the traveling vehicle 6B can recognize the probability that a person could unexpectedly come out from the stopped vehicle 6A ahead, in advance. Meanwhile, it can be considered that the probability that a person could unexpectedly come out from the stopped vehicle 6A is high where the number of passengers in the stopped vehicle 6A is large.

Therefore, in the present example, the in-vehicle device 60 of the stopped vehicle 6A notifies outside the stopped vehicle 6A of the number of passengers specified by the number of passengers specification unit 760 by the use of 700 MHz band communication. Accordingly, the in-vehicle device 60 of the traveling vehicle 6B present in the communication area 615 of the in-vehicle device 60 of the stopped vehicle 6A can recognize the number of passengers in the stopped vehicle 6A. Thus, the in-vehicle device 60 of the traveling vehicle 6B makes a predetermined notification to the person in the traveling vehicle 6B based on the received number of passengers; therefore, the driver or the like of the traveling vehicle 6B can recognize the probability that a person could unexpectedly come out from the stopped vehicle 6A ahead. The description in terms of this point will be made below.

Figure 40:
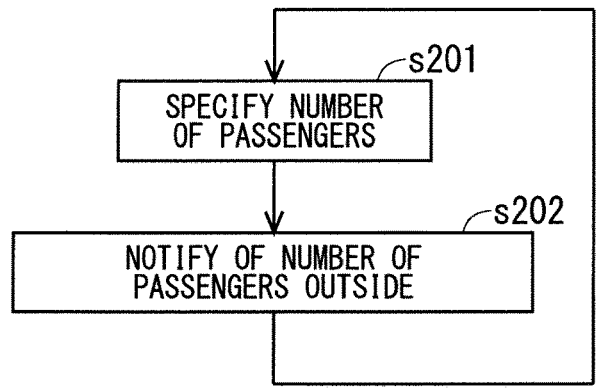
FIG. 40 illustrates a flowchart showing an example of an operation of the electronic apparatus.

FIG. 40 illustrates a flowchart showing an example of an operation of in-vehicle device 60 of the stopped vehicle 6.

If the stop determiner 750 determines that the vehicle 6 is stopped, the in-vehicle device 60 of the vehicle 6 repeatedly executes a process illustrated in FIG. 40.

As illustrated in FIG. 40, the number of passengers specification unit 760 specifies the number of passengers of the vehicle 6 in Step s201. And in Step s202, the controller 600 transmits a signal including the number of passengers specified in Step s201 to the wireless communication unit 610 by, for example, broadcasting. The wireless communication unit 610 transmits the signal including the number of passengers by the use of 700 MHz band communication. Therefore, the number of passengers of the vehicle 6 is notified outside the vehicle 6. Thereafter, Step s201 is re-executed, and hereafter, the in-vehicle device 60 operates similarly.

Figure 41:
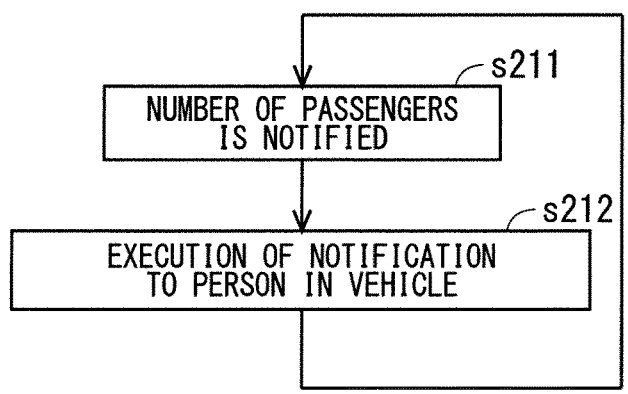
FIG. 41 illustrates a flowchart showing an example of an operation of the electronic apparatus.

FIG. 41 illustrates a flowchart showing an example of an operation of in-vehicle device 60 of the traveling vehicle 6. If the stop determiner 750 determines that the vehicle 6 is not stopped, in other words, if the stop determiner 750 determines that the vehicle 6 is traveling, the in-vehicle device 60 of the vehicle 6 repeatedly executes a process illustrated in FIG. 41.

As illustrated in FIG. 41, if the in-vehicle device 60 of the traveling vehicle 6 is notified from the in-vehicle device 60 of the stopped vehicle 6A of the number of passengers in Step s211, the in-vehicle device 60 of the traveling vehicle 6 executes Step s212. In Step s212, the in-vehicle device 60 makes a notification to a person in the vehicle 6 based on the number of passengers the wireless communication unit 610 received in Step s211. Thereafter, Step s211 is re-executed, and hereafter, the in-vehicle device 60 operates similarly.

In Step s212 for example, the controller 600 causes the display 620 to display the notified number of passengers for the predetermined time. Alternatively, the controller 600 outputs audio for notifying the notified number of passengers from the speaker 660 at least once. Alternatively, the controller 600 outputs audio for notifying the notified number of passengers from the speaker 660 at least once as well as causes the display 620 to display the notified number of passengers for the predetermined time. Accordingly, the driver or the like in the traveling vehicle 6B can recognize the number of passengers in the stopped vehicle 6A. Therefore, the driver or the like in the traveling vehicle 6B can recognize the probability that a person could unexpectedly come out from the stopped vehicle 6A. For example, the driver or the like in the traveling vehicle 6B can recognize the probability that a person could unexpectedly come out from the stopped vehicle 6A is high where the number of passengers in the stopped vehicle 6A is large. On the other hand, the driver or the like in the traveling vehicle 6B can recognize the probability that a person could unexpectedly come out from the stopped vehicle 6A is low where the number of passengers in the stopped vehicle 6A is small.

In the example in above-described FIG. 39, the in-vehicle device 60 of the traveling vehicle 6B present in the communication area 615 of the in-vehicle device 60 of the stopped vehicle 6A is notified from the in-vehicle device 60 of the stopped vehicle 6A of the number of passengers in the stopped vehicle 6A. The in-vehicle device 60 of the traveling vehicle 6B makes notification to a person in the traveling vehicle 6B based on the notified number of passengers. Therefore, the driver or the like in the traveling vehicle 6B can recognize the probability that a person could unexpectedly come out from the stopped vehicle 6A ahead the traveling vehicle 6B is to overtake. Thus, safe driving of the traveling vehicle 6B can be realized.

Note that, the in-vehicle device 60) of the traveling vehicle 6B may make other notification to a person in the vehicle 6 based on the notified number of passengers in Step s212. For example, the in-vehicle device 60 may make notification to a person in the vehicle 6 of the danger level based on the notified number of passengers. In this case, the controller 600 sets the danger level to "0" if the number of passengers is zero, sets the danger level to "1" if the number of passengers is one or more and three or less, and sets the danger level to "2" if the number of passengers is four or more. And the controller 600 causes the display 620 to display the obtained danger level based on the number of passengers. Alternatively, the controller 600 may output audio for notifying the danger level from the speaker 660 at least once, in place of or in addition to causing the display 620 to display the obtained danger level. Therefore, the driver or the like in the traveling vehicle 6B can recognize the probability that a person could unexpectedly come out from the stopped vehicle 6A is high where the notified danger level is high.

Further, in Step s202, the in-vehicle device 60 of the stopped vehicle 6A may make notification outside the stopped vehicle 6 of information corresponding to the number of passengers specified in Step s201. For example, the controller 600 of the in-vehicle device 60 may obtain the above danger level based on the specified number of passengers and output the obtained danger level to the wireless communication unit 110. In this case, the in-vehicle device 60 of the traveling vehicle 6B receives the danger level from the in-vehicle device 60 of the stopped vehicle 6A in Step s211. And, in Step s212, the controller 600 of the in-vehicle device 60 causes the display 620 to display the obtained danger level. Alternatively, the controller 600 outputs audio for notifying the danger level from the speaker 660 at least once, in place of or in addition to causing the display 620 to display the danger level.

As described above, if the vehicle 6 is stopped, the in-vehicle device 60 of the vehicle 6 notifies outside the vehicle 6 of the number of passengers in the vehicle 6 or the information corresponding to the number of passengers thereof; therefore, the convenience of the in-vehicle device 60 is improved.

<Specification Method of Number of Passengers>

Various methods for the number of passengers specification unit 760 to specify the number of passengers are conceivable. In the following, some examples of specification methods for specifying the number of passengers will be described.

<First Example of Specification Method of Number of Passengers>

In the present example, the number of passengers specification unit 760 specifies the number of passengers in the vehicle 6 based on the number of electronic apparatuses the wireless communication unit 610 is communicable with in the vehicle 6.

For example, the number of passengers specification unit 760 sets the number of Service Set Identifiers (SSID) of Wifi the wireless communication unit 610 receives if the vehicle 6 is stopped, to the number of passengers in the vehicle 6. The number of SSIDs of Wifi the wireless communication unit 610 receives can be considered the number of electronic apparatuses in the vehicle 6 the wireless communication unit 610 is communicable with. Accordingly, if each passenger in the vehicle 6 carries an electronic apparatus corresponding to Wifi for the mobile apparatus 10 or the like, in the in-vehicle device 60, the number of SSIDs of Wifi the electronic apparatus of each passenger transmits is considered the number of passengers. It should be noted that, if the wireless communication unit 610 receives no SSID if the vehicle 6 is stopped, the number of passengers specification unit 760 sets the number of passengers to zero. Alternatively, the number of passengers specification unit 760 may set the number of pieces of identification information of Bluetooth the wireless communication unit 610 receives if the vehicle 6 is stopped to the number of passengers in the vehicle 6.

<Second Example of Specification Method of Number of Passengers>

In the present example, the number of passengers specification unit 760 specifies the number of passengers in the vehicle 6 based on types of voice included in an output signal of a microphone 670. In other words, the number of passengers specification unit 760 specifies the number of passengers in the vehicle 6 based on the types of voice detected by the microphone 670.

In the present example, the number of passengers specification unit 760 specifies the number of passengers in the vehicle 6 based on types of voice included in an output signal of a microphone 670. And, the number of passengers specification unit 760 sets the specified number of types of voice to the number of passengers in the vehicle 6.

In the above-described first example, the number of passengers is specified based on the number of electronic apparatuses in the vehicle 6 the wireless communication unit 610 is communicable with; therefore, if a person carries a plurality of electronic apparatuses in the vehicle 6, the number of passengers may possibly be failed to specify correctly. Whereas, in the present example, the number of passengers is specified based on the types of voice included in the output signal of the microphone 670; therefore, the number of passengers can be specified more correctly.

Note, if a sound such as music is being output from the speaker 660, if the number of passengers specification unit 760 specifies the number of passengers, the number of passengers specification unit 760 may perform a cancellation process on the output signal of the microphone 670 for cancelling the output sound from the speaker 660. In the cancellation process, a signal of a reverse phase of the output sound of the speaker 660 is superimposed on the output signal of the microphone 670; thereby a component of the output sound is removed from the output signal. The number of passengers specification unit 760 specifies the types of voice included in the output signal of the microphone 670 after the cancelling process, and sets the number of types thus specified to the number of passengers. Accordingly, the probability that the number of passengers is not specified correctly by the influence of the output sound of the speaker 660 can be reduced.

<Third Example of Specification Method of Number of Passengers>

Figure 42:
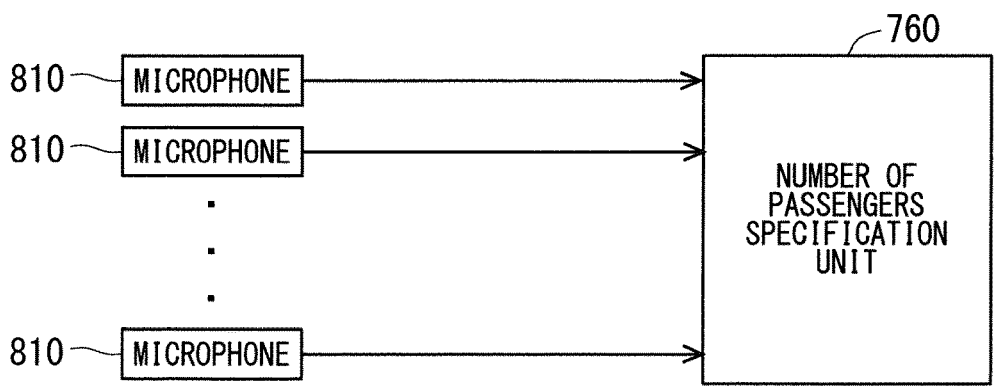
FIG. 42 is a block diagram for illustrating an operation of the electronic apparatus.

FIG. 42 is a block diagram for illustrating an operation of the number of passengers specification unit 760 according to the present example. As illustrated in FIG. 42, in the specification method of number of passengers according to the present example, provision of a plurality of microphones 810 in the vehicle 6 is assumed. A plurality of microphones 810 each are provided for a respective plurality of seats in the vehicle 6, for example. The microphone 810 is embedded inside the seat, for example. A plurality of microphones 810 are electrically connected to the controller 600 of the in-vehicle device 60 in a wired or wireless manner. A plurality of microphones 810 may be a part of the in-vehicle device 60.

The number of passengers specification unit 760 specifies the number of passengers in the vehicle 6 based on the number of microphones 810 in which a voice is included in its output signal among a plurality of microphones 810 in the vehicle 6. In other words, the number of passengers specification unit 760 specifies the number of passengers in the vehicle 6 based on the number of microphones 810 detecting a voice among a plurality of microphones 810 in the vehicle 6.

Specifically, the number of passengers specification unit 760 sets the number of microphones 810 in which a voice is included in its output signal among a plurality of microphones 810 to the number of passengers. Thus, the number of passengers can be more correctly specified.

Note, if a sound such as music is being output from the speaker 660, if the number of passengers specification unit 760 specifies the number of passengers, the number of passengers specification unit 760 may perform, in the same manner as described above, the cancellation process on the output signal of the microphone 810 for cancelling the output sound from the speaker 660. The number of passengers specification unit 760 specifies the number of passengers based on the number of microphones 810 in which a voice is included in its output signal after the cancellation process among a plurality of microphones 810. Accordingly, the probability that the number of passengers is not specified correctly by the influence of the output sound of the speaker 660 can be reduced.

<Fourth Example of Specification Method of Number of Passengers>

Figure 43:
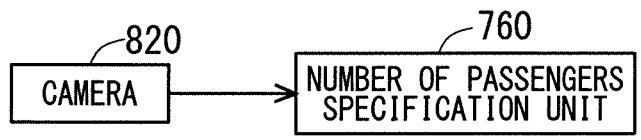
FIG. 43 is a block diagram for illustrating an operation of the electronic apparatus.

FIG. 43 is a block diagram for illustrating an operation of the number of passengers specification unit 760 according to the present example. As illustrated in FIG. 43, in the specification method of number of passengers according to the present example, provision of a camera 820 in the vehicle 6 for imaging the inside of the vehicle 6 is assumed. The camera 820 is installed such that all the seats in the vehicle 6 are captured in a captured image. The camera 820 may be installed near the display 620 of the in-vehicle device 60, may be attached to a rear view mirror in the vehicle 6, or may be attached a side mirror in the vehicle 6. The camera 820 is electrically connected to the controller 600 of the in-vehicle device 60 in a wired or wireless manner. The camera 820 may be a part of the in-vehicle device 60.

The number of passengers specification unit 760 specifies the number of passengers based on the captured image of the camera 820. Specifically, the passengers specification unit 760 performs an image process on the captured image of the camera 820 to specify the number of persons (passengers) captured in the captured image. And, the number of passengers specification unit 760 sets the specified number of persons to the number of passengers in the vehicle 6. Thus, the number of passengers can be more correctly specified.

Note, if the camera 820 is capturing other than the inside of the vehicle 6 while the vehicle 6 is traveling, the camera 820 may be changed in direction thereof and capture the inside of the vehicle 6 when the vehicle 6 is stopped.

<Fifth Example of Specification Method of Number of Passengers>

Figure 44:
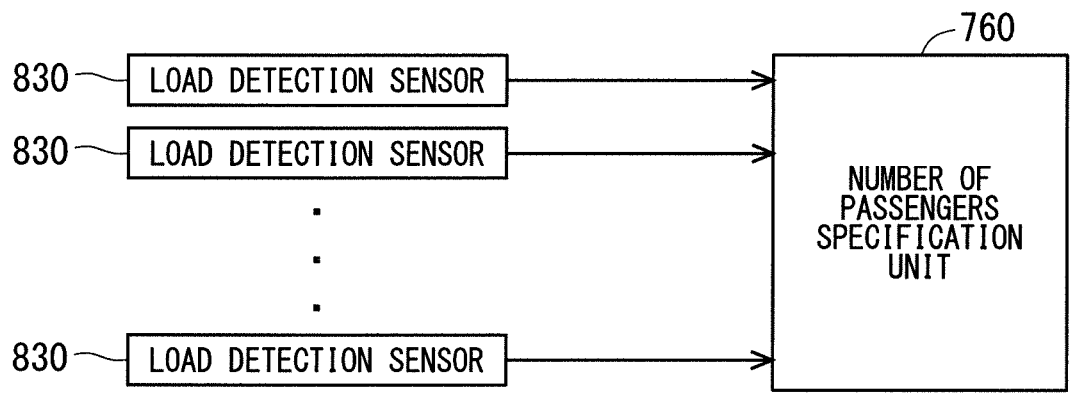
FIG. 44 is a block diagram for illustrating an operation of the electronic apparatus.

FIG. 44 is a block diagram for illustrating an operation of the number of passengers specification unit 760 according to the present example. As illustrated in FIG. 44, in the specification method of number of passengers according to the present example, provision of a plurality of load detection sensors 830 in the vehicle 6 is assumed. Each of a plurality of load detection sensors 830 can detect the respective loads applied on the plurality of seats in the vehicle 6. A plurality of load detection sensors 830 are electrically connected to the controller 600 of the in-vehicle device 60 in a wired or wireless manner. A plurality of load detection sensors 830 may be a part of the in-vehicle device 60.

The number of passengers specification unit 760 specifies the number of passengers based on the result of a plurality of load detection sensors 830. Specifically, the number of passengers specification unit 760 sets the number of load detection sensors 830 which have detected a load that is equal to or greater than a threshold among a plurality of load detection sensors 830 to the number of passengers. Alternatively, the number of passengers specification unit 760 sets the number of load detection sensors 830 which have detected a load that is greater than a threshold among a plurality of load detection sensors 830 to the number of passengers. Thus, the number of passengers can be more correctly specified.

<Sixth Example of Specification Method of Number of Passengers>

Figure 45:
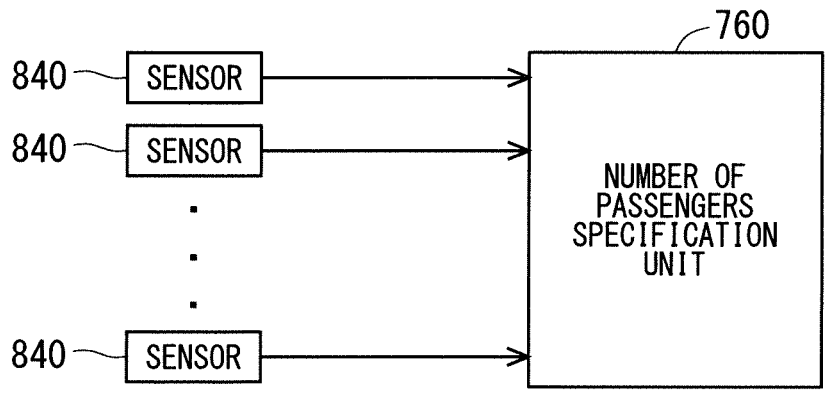
FIG. 45 is a block diagram for illustrating an operation of the electronic apparatus.

FIG. 45 is a block diagram for illustrating an operation of the number of passengers specification unit 760 according to the present example. As illustrated in FIG. 45, in the specification method of number of passengers according to the present example, provision of a plurality of sensors 840 in the vehicle 6 is assumed. Each of a plurality of load detection sensors 840 can detect whether each seatbelt for the plurality of seats in the vehicle 6 is fastened or unfastened. A plurality of sensors 840 are electrically connected to the controller 600 of the in-vehicle device 60 in a wired or wireless manner. A plurality of sensors 840 may be a part of the in-vehicle device 60.

The number of passengers specification unit 760 specifies the number of passengers based on the result of a plurality of sensors 840. That is, the number of passengers specification unit 760 specifies the number of passengers based on whether a plurality of seatbelts in the vehicle 6 are fastened or unfastened. Specifically, the number of passengers specification unit 760 sets the number of sensors 840 which have detected that the seatbelt is fastened among a plurality of sensors 840 to the number of passengers. Thus, the number of passengers can be more correctly specified.

<Specification and Notification of Number of Passengers by Mobile Apparatus in Stopped Vehicle>

Figure 46:
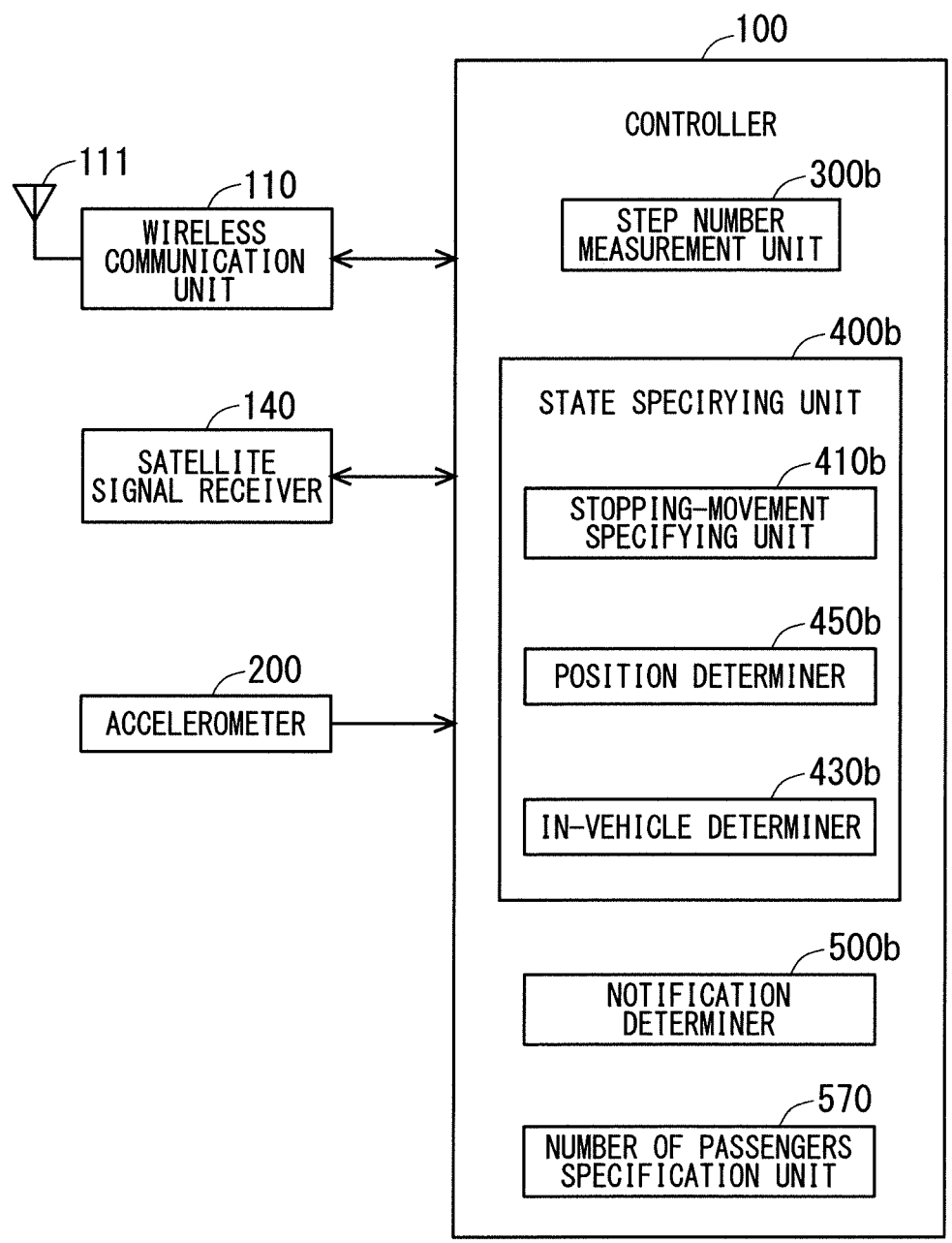
FIG. 46 illustrates a block diagram of an example of a configuration of the electronic apparatus.

In the above example, the in-vehicle device 60 of the stopped vehicle 6A specifies the number of passengers in the stopped vehicle 6A and notifies outside the stopped vehicle 6A of the specified number of passengers or the information corresponding to the number of passengers. The mobile apparatus 10 of the stopped vehicle 6A may specify the number of passengers in the stopped vehicle 6A and notify outside the stopped vehicle 6A of the specified number of passengers or the information corresponding to the number of passengers. That is, the mobile apparatus 10 in the stopped vehicle 6A may execute the same process as the process illustrated in FIG. 40. FIG. 46 illustrates a block diagram showing an example of a configuration of the controller 100 of the mobile apparatus 10 in this case. Hereinafter, in describing the operation of the mobile apparatus 10, the vehicle 6 signifies the vehicle 6 in which the mobile apparatus 10 is present, unless otherwise specified.

The controller 100 illustrated in FIG. 46 further includes an in-vehicle determiner 430*b* and a number of passengers specification unit 570 as compared with the controller 100 illustrated in FIG. 37 described above. The state specifying unit 400*b* includes, for example, an in-vehicle determiner 430*b*.

The in-vehicle determiner 430*b* can perform in-vehicle determination for determining whether the user 9 is present in the vehicle 6. The state in which the user 9 is present in the vehicle 6 is equivalent to the state in which the mobile apparatus 10 is present in the vehicle 6; therefore, the in-vehicle determiner 430b can perform in-vehicle determination for determining whether the mobile apparatus 10 is present in the vehicle 6. The in-vehicle determination will be described later in detail.

If the mobile apparatus 10 is in the stopped vehicle 6A, the number of passengers specification unit 570 of the mobile apparatus 10 can specify the number of passengers in the stopped vehicle 6A.

If the in-vehicle determiner 430b determines that the mobile apparatus 10 is present in the vehicle 6 and the stopping-movement specifying unit 410b specifies that the mobile apparatus 10 is stopped, the mobile apparatus 10 repeatedly executes the same process as the process illustrated in FIG. 40 above. If the in-vehicle determiner 430b determines that the mobile apparatus 10 is present in the vehicle 6 and the stopping-movement specifying unit 410b specifies that the mobile apparatus 10 is stopped, it can be said that the mobile apparatus 10 is present in the stopped vehicle 6A; therefore, the mobile apparatus 10 repeatedly executes the same process as the process illustrated in FIG. 40 when the mobile apparatus 10 is present in the stopped vehicle 6A.

In Step corresponding to Step s201 in FIG. 40, the number of passengers specification unit 570 of the mobile apparatus 10 of the stopped vehicle 6A specifies the number of passengers in the stopped vehicle 6A. And in the Step corresponding to the Step s202, the controller 100 causes the wireless communication unit 110 to transmit the signal including the number of passengers specified by the number of passengers specification unit 570. The wireless communication unit 110 transmits the signal including the number of passengers by the use of 700 MHz band communication by broadcasting. The in-vehicle device 60 of the traveling vehicle 6B which is notified the number of passengers from the mobile apparatus 10 operates similarly to the above. Note, as is the same with the above, the mobile apparatus 10 in the stopped vehicle 6A may output the information corresponding to the number of passengers specified by the number of passengers specification unit 570 to the wireless communication unit 110.

Here, if a power source such as an engine included in the vehicle 6 is stopped, the operation of the in-vehicle device 60 of the vehicle 6 may also be stopped. In such a case, if the in-vehicle device 60 of the stopped vehicle 6A is to execute the process in FIG. 40, the in-vehicle device 60 cannot notify outside the stopped vehicle 6A of the number of passengers in the stopped vehicle 6A or the information corresponding thereto after the power source of the stopped vehicle 6A is stopped.

Whereas, if the in-vehicle device 60 of the stopped vehicle 6A executes the same process as in the process in FIG. 40, the in-vehicle device 60 can notify outside the stopped vehicle 6A of the number of passengers in the stopped vehicle 6A or the information corresponding thereto even after the power source of the stopped vehicle 6A is stopped.

Note, if a plurality of mobile apparatuses 10 are present in the stopped vehicle 6A, any one mobile apparatus 10 of a plurality of mobile apparatuses 10 executes the same process as the process in FIG. 40. For example, of a plurality of mobile apparatuses 10 in the vehicle 6, a mobile apparatus 10 that was mutually communicating with the in-vehicle device 60 of the vehicle in-vehicle device through Wifi or Bluetooth immediately before the vehicle 6 stopped executes the same process as the process in FIG. 40. Alternatively, of a plurality of mobile apparatuses 10 in the stopped vehicle 6A, a mobile apparatus 10 having, for example, the smallest identification number (e.g. production number) assigned thereto may execute the same process as the process in FIG. 40. In this case, a plurality of mobile apparatuses 10 in the stopped vehicle 6A exchange the identification numbers each assigned thereto through Wifi or the like. Then, among the identification number for itself and a plurality of identification numbers comprising the received identification numbers, if the identification number for itself is the smallest, each of a plurality of mobile apparatuses 10 executes the same process as the process in FIG. 40. Thereafter, the mobile apparatus 10 executing the same process as the process in FIG. 40 may be referred to as "first specified mobile apparatus 10" in some cases. Also, a passenger carrying the first specified mobile apparatus 10 in the vehicle 6 may be referred to as "first specified passenger" in some cases.

<Specification of Number of Passengers by Mobile Apparatus>

The number of passengers specification unit 570 of the first specified mobile apparatus 10 can specify the number of passengers in the stopped vehicle 6A as is the same with the number of passengers specification unit 760 of the in-vehicle device 60. For example, as is the same with above <First example of specification method of number of passengers>, the number of passengers specification unit 570 can specify the number of passengers in the vehicle 6 based on the number of electronic apparatuses the wireless communication unit 110 is communicable with in the vehicle 6. In this case, the number of passengers specification unit 570 sets, for example, a value in which one is added to the number of SSIDs of Wifi the wireless communication unit 110 receives if the vehicle 6 is stopped, to the number of passengers in the vehicle 6. The number of SSIDs of Wifi the wireless communication unit 110 receives can be considered the number of electronic apparatuses in the vehicle 6 the wireless communication unit 110 is communicable with. If the each passenger other than first specified passenger in the stopped vehicle 6A carries the mobile apparatus 10 or the like compatible with Wifi, in the first specified mobile apparatus 10, SSID of Wifi the electronic apparatus of each passenger other than the first specified passenger transmits is received. It should be noted that, if the wireless communication unit 110 receives no SSID if the vehicle 6 is stopped, the number of passengers specification unit 570 sets the number of passengers to one.

Also, as is the same with <Second example of specification method of number of passengers>, the number of passengers specification unit 570 can specify the number of passengers in the vehicle 6 based on types of voice included in the output signal of a microphone 170. At this point, if a sound such as music is being output from the speaker 160, the number of passengers specification unit 570 may perform, in the same manner as described above, the cancellation process for on the output signal of the microphone 170 for cancelling the output sound from the speaker 160.

Further, as is the same with <Third example of specification method of number of passengers>, the number of passengers specification unit 570 can specify the number of passengers in the vehicle 6 based on the number of microphones 810 in which a voice is included in its output signal among a plurality of microphones 810 in the vehicle 6. At this point, if a sound such as music is being output from the speaker 160, the number of passengers specification unit 570 may perform, in the same manner as described above, the cancellation process for on the output signal of each microphone 810 for cancelling the output sound from the speaker 160.

Also, as is the same with <Fourth example of specification method of number of passengers>, the number of passengers specification unit 570 can specify the number of passengers based on the captured image of the camera 820. Note, the number of passengers specification unit 570 may specify the number of passengers based on the captured image of the first camera 180. In this case, it is essential that the first specified mobile apparatus 10 of the stopped vehicle 6A is installed such that the first camera 180 thereof can image inside the stopped vehicle 6A. Also, the number of passengers specification unit 570 may specify the number of passengers based on the captured image of the second camera 190. In this case, it is essential that the first specified mobile apparatus 10 of the stopped vehicle 6A is installed such that the second camera 190 thereof can image inside the stopped vehicle 6A.

Further, as is the same with <Fifth example of specification method of number of passengers>, the number of passengers specification unit 570 can specify the number of passengers based on the detection result of a plurality of load detection sensors 830.

Further, as is the same with <Sixth example of specification method of number of passengers>, the number of passengers specification unit 570 can also specify the number of passengers based on the detection result of a plurality of sensors 840. That is, the number of passengers specification unit 570 can also specify the number of passengers based on whether a plurality of seatbelts in the vehicle 6 are fastened or unfastened.

<In-Vehicle Determination by Mobile Apparatus>

Various methods are conceivable as a method of in-vehicle determination in the in-vehicle determiner 430b of the mobile apparatus 10. In the following, two examples of the in-vehicle determination will be described.

<First Example of In-Vehicle Determination>

As is in the same with the in-vehicle determination in the above-described first embodiment, the in-vehicle determiner 430b can determine whether the user 9 is present in the vehicle 6 based on the types of the moving means of the user 9 specified by the stopping-movement specifying unit 410b.

For example, if the moving means of the user 9 is determined to be "conveying device" in the stopping-movement specification, the in-vehicle determiner 430b determines that the user 9 is present in the vehicle 6. On the other hand, if the moving means of the user 9 is determined to be "walk" in the stopping-movement specification, the in-vehicle determiner 430b determines that the user 9 is absent in the vehicle 6. Further, if it is determined to be "run" in the stopping-movement specification, the in-vehicle determiner 430b determines that the user 9 is absent in the vehicle 6. Also, if it is determined to be "bicycle" in the stopping-movement specification, the in-vehicle determiner 430b determines that the user 9 is absent in the vehicle 6.

<Second Example of In-Vehicle Determination>

As is in the same with the in-vehicle determination in the above-described first embodiment, the in-vehicle determiner 430b determines whether the user 9 is present in the vehicle 6 based on whether setting (that is, communication connection setting) required for the communication connection between the in-vehicle device 60 of the vehicle 6 and the wireless communication unit 110 is established in the mobile apparatus 10. Specifically, the in-vehicle determiner 430b determines that the user 9 (mobile apparatus 10) is present in the vehicle 6 when the communication connection setting is established in the mobile apparatus 10. Meanwhile, the in-vehicle determiner 430b determines that the user 9 (mobile apparatus 10) is absent in the vehicle 6 when the communication connection setting is unestablished in the mobile apparatus 10. The detailed operation of the in-vehicle determiner 430b in this case is the same as the operation of the in-vehicle determiner 430 of the first embodiment.

It should be noted that the in-vehicle determiner 430b may perform the in-vehicle determination by another method. For example, as is the same with the in-vehicle determination in the first embodiment, the in-vehicle determiner 430b may determine whether the subject user 9 is present in the vehicle based on the movement of the other apparatus 10 that determines that the other user 9 is present in the vehicle and the movement of the subject apparatus 10. Alternatively, as is in the same with the in-vehicle determination in the first embodiment, the in-vehicle determiner 430b may determine that the user 9 is present in the vehicle based on whether the wireless communication unit 110 receives predetermined information (manufacturer information indicating a car manufacturer, for example) transmitted from the in-vehicle device 60. Also, as is in the same with the in-vehicle determination in the first embodiment, the in-vehicle determiner 430b may determine whether the user 9 is present in the vehicle based on a state of ambient air around electronic apparatus 10.

Further, the number of passengers or the information corresponding thereto notified from the stopped vehicle 6A may be received by the mobile apparatus 10 in the traveling vehicle 6B. The mobile apparatus 10 in the traveling vehicle 6B, which has received the number of passengers or the information corresponding thereto operates similarly to the in-vehicle device 60 in the traveling vehicle 6B, which has received the number of passengers or the information corresponding thereto to make notification to a person in the traveling vehicle 6B.

For example, in the mobile apparatus 10 in the traveling vehicle 6B, which has received the number of passengers, the controller 100 causes the display 120 to display the number of passengers. Alternatively, the controller 100 outputs audio for notifying the number of passengers from the speaker 160 at least once.

If the in-vehicle determiner 430b determines that the mobile apparatus 10 is present in the vehicle 6 and the stopping-movement specifying unit 410b specifies that the mobile apparatus 10 is moving, and if the mobile apparatus 10 receives the number of passengers or the information corresponding thereto, the mobile apparatus 10 makes notification to a person in the vehicle 6. If the in-vehicle determiner 430b determines that the mobile apparatus 10 is present in the vehicle 6 and the stopping-movement specifying unit 410b specifies that the mobile apparatus 10 is moving, it can be said that the mobile apparatus 10 is present in the traveling vehicle 6B.

Other Examples of Third Embodiment

In the following, other examples of the present embodiment will be described below.

First Other Example of Third Embodiment

Figure 47:
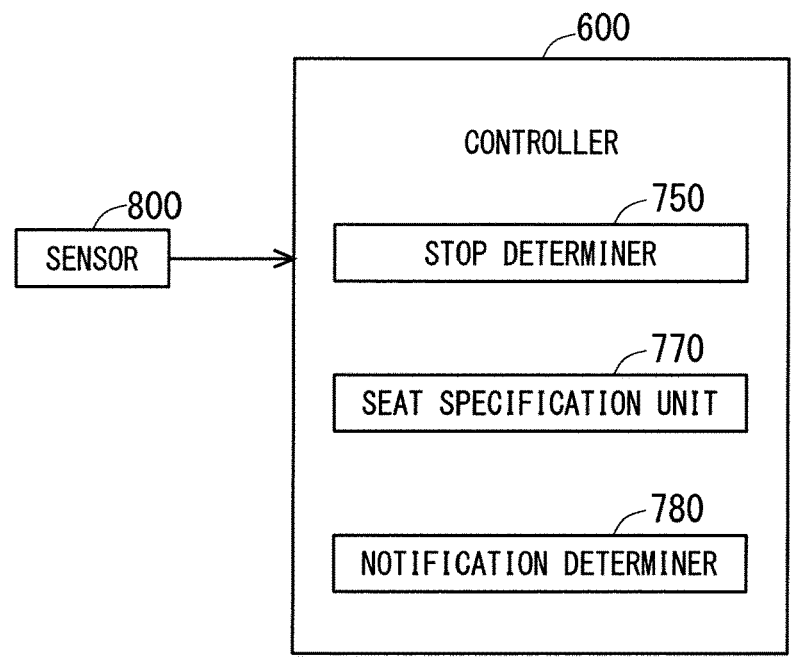
FIG. 47 illustrates a block diagram of an example of a configuration of the electronic apparatus.

FIG. 47 illustrates a block diagram of a part of an example of functional blocks formed in the controller 600 of the in-vehicle device 60 according to the present example. In the present example, the controller includes the above-described stop determiner 750, a seat specification unit 770, and a notification determiner 780 as the functional blocks. At least one of the stop determiner 750, the seat specification unit 770, and the notification determiner 780 may be realized by a hardware circuit in which software is not required to realize the functions of the hardware circuit.

Figure 48:
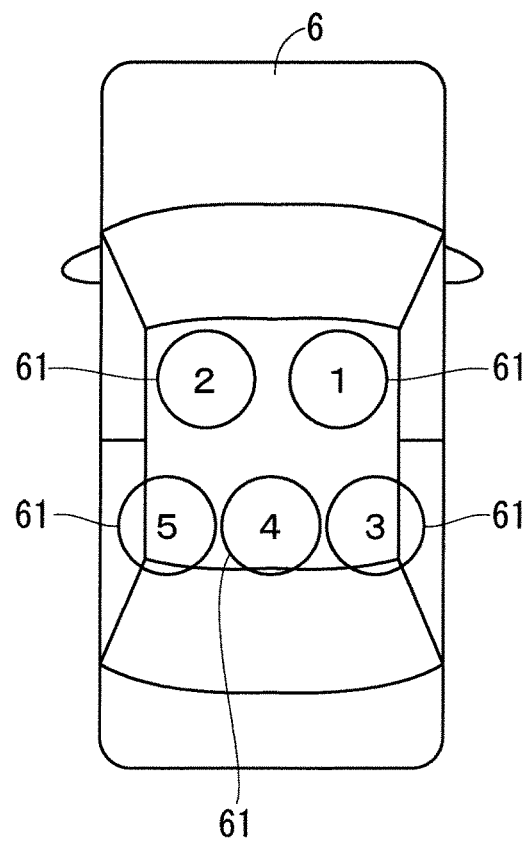
FIG. 48 illustrates a diagram showing an example of seat arrangement in a vehicle.

The seat specification unit 770 can specify the seat at which a passenger is positioned in the stopped vehicle 6. For example, as illustrated in FIG. 48, the case where five seats 61 numbered one to five present in the vehicle 6 is assumed. For example, if the seats 61 numbered one and two are seated, the seat specification unit 770 specified that the seats 61 the passengers are positioned are the seats numbered one and two of the seats 61. For example, if all the seats numbered one and five are seated, the seat specification unit 770 specified that the seats 61 the passengers are positioned are the seats numbered one and five of the seats 61.

If the vehicle 6 is stopped, the notification determiner 780 can execute the notification determination process for determining whether the notification is made outside the vehicle 6 based on the specified result produced by the seat specification unit 770. Thereafter, making notification outside the vehicle 6 may be referred to as "execution of external notification" and not making notification outside the vehicle 6 may be referred to as "non-execution of external notification" in some cases.

Figure 49:
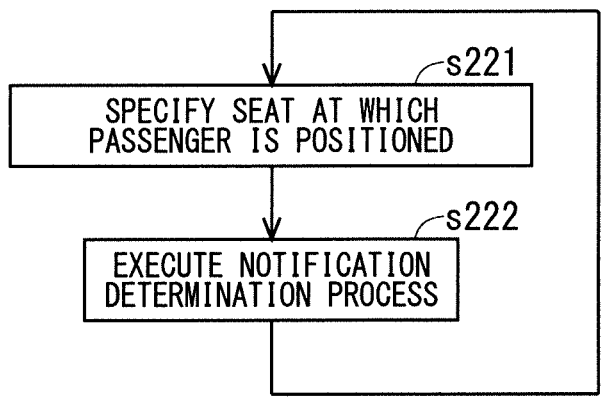
FIG. 49 illustrates a flowchart showing an example of an operation of the electronic apparatus.

FIG. 49 illustrates a flowchart showing an example of an operation of in-vehicle device 60 according to the present example if the vehicle 6 is stopped. If the stop determiner 750 determines that the vehicle 6 is stopped, the in-vehicle device 60 according to the present example repeatedly executes the process illustrated in FIG. 49.

As illustrated in FIG. 49, the seat specification unit 770 specifies a seat at which a passenger is positioned in the vehicle 6 in Step s221. Next, in Step s222, the notification determiner 780 executes the notification determination process based on the specified result produced in Step s221. Thereafter, Step s221 is re-executed, and hereafter, the in-vehicle device 60 operates similarly.

Figure 50:
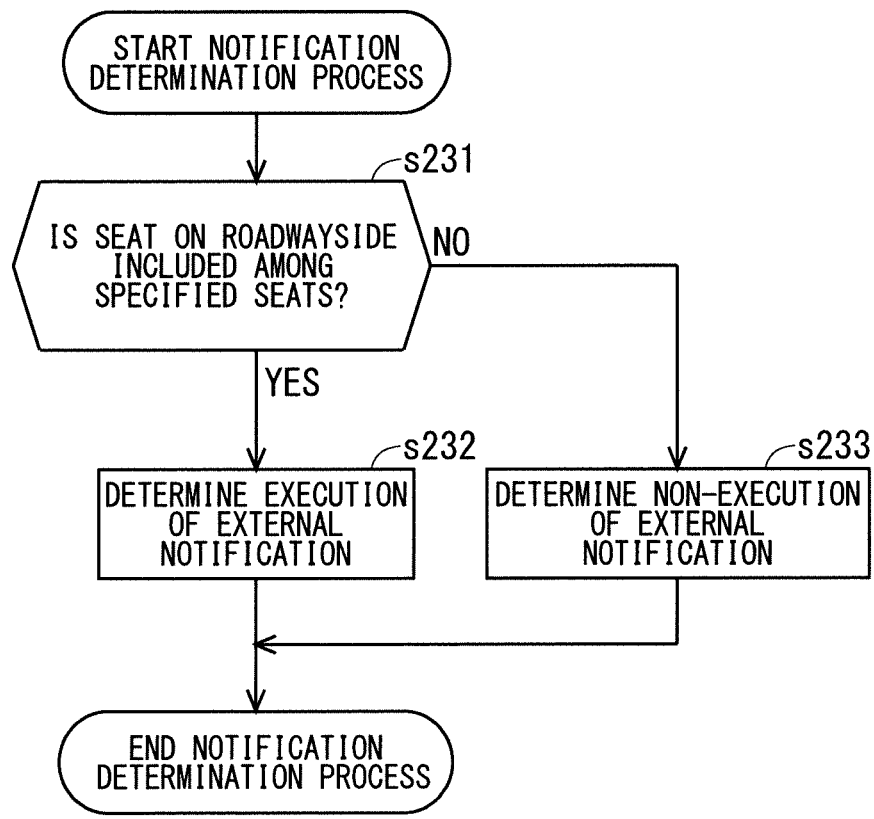
FIG. 50 illustrates a flowchart showing an example of an operation of the electronic apparatus.

FIG. 50 illustrates a flowchart showing an example of the notification determination process. As illustrated in FIG. 50, in Step s231, the notification determiner 780 determines whether a seat on a roadway side is included among the seats at which passengers are positioned which has been specified in s211. For example, the left-hand traffic system is adopted in Japan, therefore, seats on the right side in the stopped vehicle 6A locates on the roadway side. Therefore, in Japan, if a seat on the right side in the stopped vehicle 6A is included among the seats specified in Step s211, the notification determiner 780 determines that a seat on the roadway side is included among the seats specified in Step s221. On the other hand, if a seat on the right side in the stopped vehicle 6A is not included among the seats specified in Step s211, the notification determiner 780 determines that a seat on the roadway side is not included among the seats specified in Step s221. In the example of FIG. 48, if at least one of the seats numbered one and three of the seats 61 is included among the seats specified in Step s221, the notification determiner 780 determines that a seat on the roadway side is included among the seats specified in Step s221. It should be noted that in any nations adopting the right-hand traffic system such as the United States, seats on the left side in the stopped vehicle 6A (seats numbered two and five in FIG. 48 of the seats 61) locate on the roadway side.

In a plurality of seats in the stopped vehicle 6A, whether which seats locate on the roadway side may be set in the in-vehicle device 60 in advance based on the traffic regulations of a nation in which the stopped vehicle 6A is to be used. The in-vehicle device 60 of the stopped vehicle 6A may specify a nation in which the stopped vehicle 6A is present based on position information acquired by the receiver 640 and automatically determine which seats locate on the roadway side in the stopped vehicle 6A in accordance with the traffic regulations of the specified nation. The in-vehicle device 60 of the stopped vehicle 6A may acquire nation identification information based on a standard frequency time signal radio wave, and automatically determine which seats locate on the roadway side in the stopped vehicle 6A in accordance with the traffic regulations of the nation specified by the nation identification information.

In Step s231, if the notification determiner 780 has determined that a seat on the roadway side is included among the seats specified in Step s221, the notification determiner 780 determines execution of external notification in Step s232. On the other hand, in Step s231, if the notification determiner 780 has not determined that a seat on the roadway side is included among the seats specified in Step s221, the notification determiner 780 determines non-execution of external notification in Step s233.

Accordingly, execution or non-execution of external notification is determined based on the seat at which a passenger is positioned in the stopped vehicle 6A; therefore, the notification can be made outside the stopped vehicle 6A when the probability that a person could unexpectedly come out from the stopped vehicle 6A is high. For example, it can be considered that the probability that a person could unexpectedly come out from the stopped vehicle 6A is high if a passenger in the stopped vehicle 6A is positioned at the seat on the roadway side. Therefore, if a passenger in the stopped vehicle 6A is positioned at the seat on the roadway side, the execution of external notification is determined; therefore, therefore, the notification can be made outside the stopped vehicle 6A when the probability that a person could unexpectedly come out from the stopped vehicle 6A is high. Therefore, the notification that the probability that a person could unexpectedly come out from the stopped vehicle 6A is high can be made to the driver or the like in the traveling vehicle 6B.

Note, in the notification determination process, even if a center seat (a seat numbered four of the seats 61 in FIG. 48) is included among the seats at which passengers are positioned specified in Step s221, the execution of external notification may be determined.

If the notification determiner 780 of the in-vehicle device 60 of the vehicle 6 determines the execution of external notification, the vehicle 6 makes notification outside thereof. An example of method of the external notification will be described below.

First Example of External Notification According to First Other Example of Third Embodiment In the preset example, if the execution of external notification is determined in the notification determiner 780, the rear lamps of the stopped vehicle 6 are turned on for a predetermined time; therefore, the notification is made outside the vehicle 6.

If the execution of external notification is determined, the controller 600 notifies the vehicle control device that controls lamps of the vehicle 6 or the like of the lighting instruction information for instructing lighting of the rear lamps. The vehicle control device that has received the lighting instruction information turns on the rear lamps of the vehicle 6. For example, the vehicle control device controls the rear right and left direction indicators (turn signal) to blink for a predetermined time (for example, about 10 seconds). Accordingly, the warning is issued to the traveling specified vehicle 6B approaching the stopped specified vehicle 6A from behind. Therefore, the driver or the like in the traveling vehicle 6B can recognize the probability that a person could unexpectedly come out from the stopped vehicle 6A ahead is high.

It should be noted that, if the execution of the external notification is determined, the stopped specified vehicle 6A may turn on not only the rear lamps but also the front lamps. For example, the stopped specified vehicle 6A may turn on the rear right and left direction indicators and the front right and left indicators. In the case where only the rear lamps of the stopped specified vehicle 6A are turned on, the light of the stopped vehicle 6A is less likely to enter into eyes of the driver or the like of the traveling vehicle 6B which is positioned ahead of the stopped specified vehicle 6A and does not travel past the stopped vehicle 6A, such as the traveling vehicle 6B which is positioned ahead of the stopped specified vehicle 6A and is traveling in the opposite lane. Therefore, the probability that the notification that is hardly necessary for the driver or the like is made can be reduced.

Also, if the execution of the external notification is determined, the rear lamps of the stopped vehicle 6A may be turned on and if the non-execution of the external notification is determined, the rear lamps of the stopped vehicle 6A may be turned off.

Second Example of External Notification According to First Other Example of Third Embodiment In the present example, if the execution of the external notification is determined in the notification determiner 780, the wireless communication unit 610 makes the notification outside the vehicle 6.

If the execution of external notification is determined, the wireless communication unit 610 is controlled by the controller 600 to transmit first notification information by the use of 700 MHz band communication. The first notification information is information for notifying that the probability that a person could unexpectedly come out from the stopped vehicle 6A ahead is high. The wireless communication unit 610 transmits the first notification information by, for example, broadcasting. Accordingly, the in-vehicle device 60 of the traveling vehicle 6B present in the communication area 615 can receive the first notification information from the in-vehicle device 60 of the stopped vehicle 6A.

FIG. 51 illustrates a flowchart showing an example of an operation of in-vehicle device 60 according to the present example if the vehicle 6 is traveling. If the stop determiner 750 determines that the vehicle 6 is not stopped, in other words, if the stop determiner 750 determines that the vehicle 6 is traveling, the in-vehicle device 60 of the vehicle 6 repeatedly executes a process illustrated in FIG. 51.

As illustrated in FIG. 51, if the in-vehicle device 60 of the traveling vehicle 6 is notified from the in-vehicle device 60 of the stopped vehicle 6A of the first notification information in Step s241, the in-vehicle device 60 of the traveling vehicle 6 executes Step s242. In Step s242, the in-vehicle device 60 makes a notification to a person in the vehicle 6 based on the first notification information the wireless communication unit 610 received in Step s241. Thereafter, Step s241 is re-executed, and hereafter, the in-vehicle device 60 operates similarly.

In Step s242 for example, the controller 600 causes the display 620 to display second notification information for the predetermined time. The second notification information is information for notifying that the probability that a person could unexpectedly come out from the stopped vehicle 6A ahead is high. Alternatively, the controller 600 outputs predetermined audio from the speaker 660 at least once. The predetermined audio includes audio for notifying that the probability that a person could unexpectedly come out from the stopped vehicle 6A ahead is high. Alternatively, the controller 600 outputs the predetermined audio from the speaker 660 at least once as well as causes the display 620 to display the second notification information for a predetermined time. Therefore, the driver or the like in the traveling vehicle 6B can recognize the probability that a person could unexpectedly come out from the stopped vehicle 6A is high.

It should be noted that contents for the first and second notification information are not limited to the above. Contents for the predetermined audio the in-vehicle device 60 that has received the first notification information outputs from the speaker 660 are not limited to the above.

<Specification Method of Seat at which Passenger is Positioned>

Various methods for the seat specification unit 770 to specify seats at which passengers are positioned are conceivable. In the following, some examples of specification methods for specifying the seats at which passengers are positioned will be described.

<First Example of Seat Specification Method>

As is the same with above <Third example of specification method of number of passengers>, in the seat specification method according to the present example, provision of a plurality of microphones 810 in the vehicle 6, respectively attached to a plurality of seats in the vehicle 6 is assumed.

The seat specification unit 770 specifies a seat at which a passenger is positioned in the vehicle 6 based on an output signal of a plurality if microphones 810 in the vehicle 6. Specifically, the seat specification unit 770 specifies a microphone 810 in which a voice is included in its output signal among a plurality of microphones 810. Subsequently, the seat specification unit 770 specifies a seat to which the specified microphone 810 is attached. Then the seat specification unit 770 sets the specified seat to the seat at which a passenger is positioned. Thus, the seat at which a passenger is positioned can be more correctly specified.

Note, if a sound such as music is being output from the speaker 660, if the seat specification unit 770 specifies a seat at which a passenger is positioned, the seat specification unit 770 may perform, in the same manner as described above, the cancellation process on the output signal of the microphone 810 for cancelling the output sound from the speaker 660. The seat specification unit 770 specifies a seat at which a passenger is positioned based on an output signal after the cancellation process of each of the microphones 810. Accordingly, the probability that the seat at which a passenger is positioned is not specified correctly by the influence of the output sound of the speaker 660 can be reduced.

<Second Example of Seat Specification Method>

As is the same with above <Fourth example of specification method of number of passengers>, in the seat specification method according to the present example, provision of the above-described camera 820 for imaging the inside the vehicle 6 is installed in the vehicle 6 is assumed.

The seat specification unit 770 specifies a seat at which a passenger is positioned based on a captured image of the camera 820. Specifically, the seat specification unit 770 performs an image process on the captured image of the camera 820 to specify the seats at which persons captured in the captured image. Then the seat specification unit 770 sets the specified seat to the seat at which a passenger is positioned in the vehicle 6. Thus, the seat at which a passenger is positioned can be more correctly specified.

<Third Example of Seat Specification Method>

As is the same with above <Fifth example of specification method of number of passengers>, in the seat specification method according to the present example, provision, in the vehicle 6, of a plurality of load detection sensors 830 above for detecting the respective loads applied on the plurality of seats in the vehicle 6 is assumed. Hereinafter, a seat corresponding to the load detection sensor 830 signifies the seat of which load applied thereto is detected by the load detection sensor 830.

The seat specification unit 770 specifies a seat at which a passenger is positioned based on the detection result of a plurality of load detection sensors 830. Specifically, the seat specification unit 770 specifies the seat corresponding to the load detection sensor 830 which have detected a load that is equal to or greater than a threshold among a plurality of load detection sensors 830. Then the seat specification unit 770 sets the specified seat to the seat at which a passenger is positioned. Thus, the seat at which a passenger is positioned can be more correctly specified.

<Fourth Example of Seat Specification Method>

As is the same with above <Sixth example of specification method of number of passengers>, in the seat specification method according to the present example, provision, in the vehicle 6, of a plurality of sensors 840 above for detecting whether a plurality of seatbelts in the vehicle 6 are fastened or unfastened is assumed. Hereinafter, a seat corresponding to the sensor 840 signifies the seat for which whether the seatbelt is fastened or unfastened is detected.

The seat specification unit 770 specifies a seat at which a passenger is positioned based on the detection result of a plurality of sensors 840. That is, the seat specification unit 770 specifies the seat at which a passenger is positioned based on whether a plurality of seatbelts in the vehicle 6 are fastened or unfastened. Specifically, the seat specification unit 770 specifies the seat corresponding to the sensor 840 which have detected that the seatbelt is fastened among a plurality of sensors 840. Then the seat specification unit 770 sets the specified seat to the seat at which a passenger is positioned. Thus, the seat at which a passenger is positioned can be more correctly specified.

As described above, in the present example, the in-vehicle device 60 of the stopped vehicle 6 specifies the seat at which a passenger is positioned in the vehicle 6 and determines the execution and non-execution of external notification based on the specification result; therefore, the convenience of the in-vehicle device 60 is improved.

Note, in <Second example of external notification according to first other example of third embodiment>, the wireless communication unit 610 may notify the number of persons as passengers who are located at the seats on the roadway side in the vehicle 6 together with the first notification information. In this case, the in-vehicle device 60 of the traveling vehicle 6B received the number of persons and the first notification information may notify a person in the traveling vehicle 6B of the number of persons by using at least one of the display 620 and the speaker 660. The more number of persons as passengers positioned at the seats on the roadway side are present in the stopped vehicle 6A, the higher the probability that a person could unexpectedly come out from the stopped vehicle 6A becomes; therefore, the driver or the like in the traveling vehicle 6B can correctly recognize the probability that a person could unexpectedly come out from the stopped vehicle 6A by being notified the number of persons as passengers positioned at the seats on the roadway side in the stopped vehicle 6A. For example, in the example in above-described FIG. 48, it can be considered that the probability that a person could unexpectedly come out from the stopped vehicle 6A is higher in the case where passengers are positioned at both seats numbered one and three of the seats 61 than in the case where a passenger is positioned only at a seat numbered one of the seats 61 between the seats numbered one and three on the roadway side of the seats 61. It should be noted that, for the number of persons as passengers positioned at the seats on the roadway side in the stopped vehicle 6A, the seat specification unit 770 can obtain thereof at the time the seat specification unit 770 specifies a seat at which a passenger is positioned in the vehicle 6.

<Seat Specification and Notification Determination Process by Mobile Apparatus in Stopped Vehicle>

Figure 52:
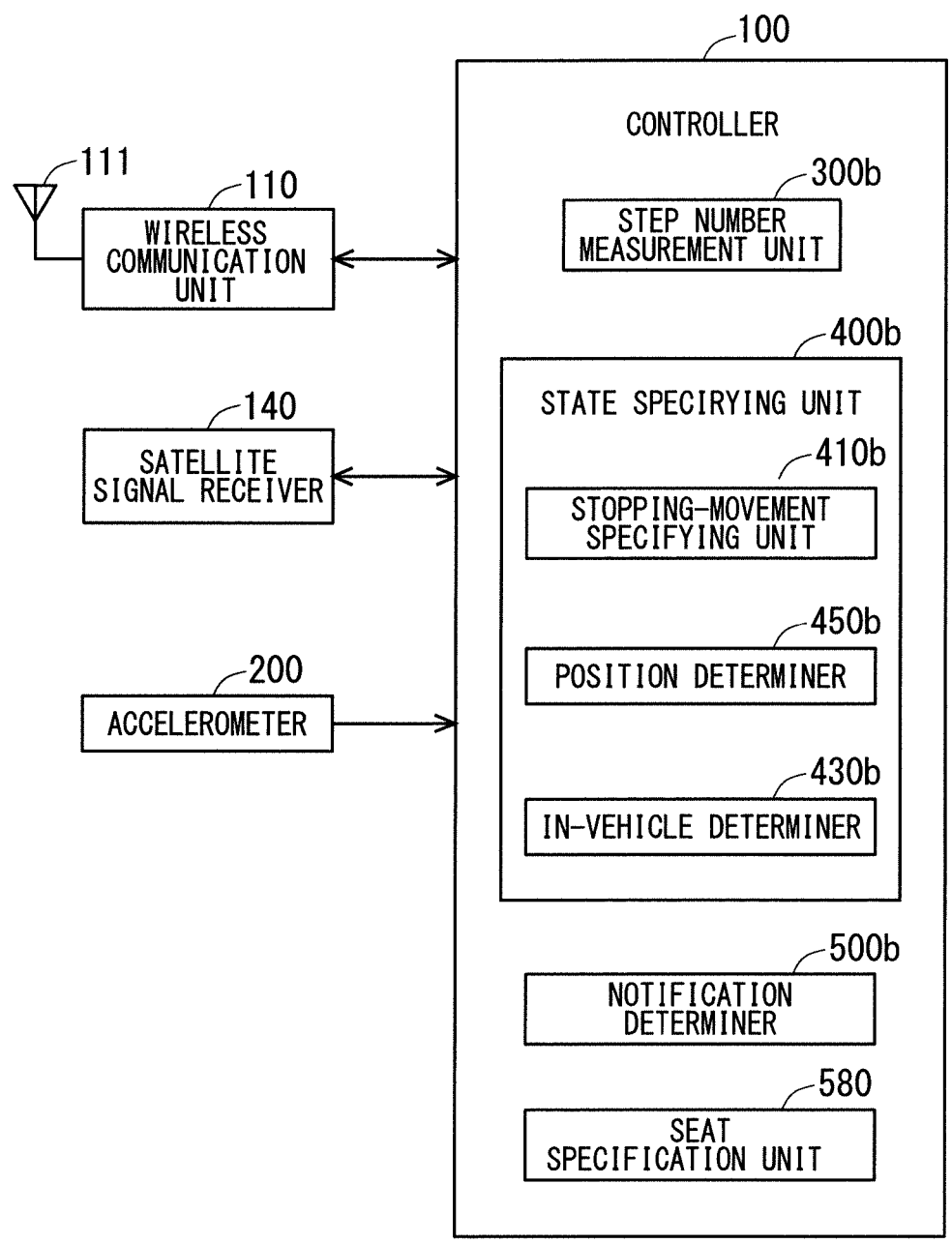
FIG. 52 illustrates a block diagram of an example of a configuration of the electronic apparatus.

In the above example, the in-vehicle device 60 of the stopped vehicle 6A specifies the seat at which a passenger is positioned in the stopped vehicle 6A and determines the execution and non-execution of external notification based on the specified result, however, the mobile apparatus 10 in the vehicle 6 may specify the seat at which a passenger is positioned in the stopped vehicle 6A and determine execution and non-execution of external notification based on the specification result. That is, the mobile apparatus 10 in the stopped vehicle 6A may execute the same process as the process illustrated in FIG. 49 and in FIG. 50. FIG. 52 illustrates a block diagram showing an example of a configuration of the controller 100 of the mobile apparatus 10 in this case.

The controller 100 illustrated in FIG. 52 includes a seat specification unit 580 in place of the number of passengers specification unit 570 of the controller 100 illustrated in FIG. 46 described above.

If the mobile apparatus 10 is in the stopped vehicle 6A, the seat specification unit 580 of the mobile apparatus 10 can specify the seat at which a passenger is positioned in the stopped vehicle 6A.

If the in-vehicle determiner 430b determines that the mobile apparatus 10 is present in the vehicle 6 and the stopping-movement specifying unit 410b specifies that the mobile apparatus 10 is stopped, the mobile apparatus 10 repeatedly executes the same process as the process illustrated in FIG. 49 and in FIG. 50 above. That is, the mobile apparatus 10 repeatedly executes the same process as the process in FIG. 49 and in FIG. 50 if the mobile apparatus 10 is present in the stopped vehicle 6A.

In Step corresponding to Step s221 in FIG. 49, the seat specification unit 580 of the mobile apparatus 10 of the stopped vehicle 6A specifies the seat at which a passenger is positioned in the stopped vehicle 6A. Then, in Step corresponding to Step s222, the notification determiner 500b executes the notification determination process based on the specified result produced by the seat specification unit 580.

In Step corresponding to Step s231 of FIG. 50, the notification determiner 500b determines whether a seat on the roadway side is included among the seats, specified by the seat specification unit 580, at which passengers are positioned. If the notification determiner 500b determines that a seat on the roadway side is included among the seats, specified by the seat specification unit 580, at which passengers are positioned, the notification determiner 500b determines the execution of external notification in Step corresponding to Step s232. On the other hand, if the notification determiner 500b determines that a seat on the roadway side is not included among the seats, specified by the seat specification unit 580, at which passengers are positioned, the notification determiner 500b determines the non-execution of external notification in Step corresponding to Step s233.

If the mobile apparatus 10 in the stopped vehicle 6A determines the execution of external notification, as is the same with above <First example of external notification according to first other example of third embodiment>, the notification is made outside the stopped vehicle 6A by turning on the real lamps of the stopped vehicle 6A for the predetermined time. In this case, the controller 100 of the mobile apparatus 10 that has determined the execution of external notification causes the wireless communication unit 110 to transmit the lighting instruction information for instructing lighting of the rear lamps. The lighting instruction information transmitted from the wireless communication unit 110 is received by the in-vehicle device 60 of the vehicle 6. The in-vehicle device 60 that has received the lighting instruction information notifies the vehicle control device of the lighting instruction information. The vehicle control device that has received the lighting instruction information turns on the rear lamps of the vehicle 6, in the same manner as described above.

Further, if the mobile apparatus 10 in the stopped vehicle 6A determines the execution of external notification, as is the same with above <Second example of external notification according to first other example of third embodiment>, the wireless communication unit 110 of the mobile apparatus 10 may make notification outside the stopped vehicle 6A. In this case, the wireless communication unit 110 transmits the first notification information above by the use of, for example, 700 MHz band communication by broadcasting. The in-vehicle device 60 of the traveling vehicle 6B that has received the first notification information from the mobile apparatus 10 operates similarly to the above.

Note, if a plurality of mobile apparatuses 10 are present in the stopped vehicle 6A, any one mobile apparatus 10 of a plurality of mobile apparatuses 10 executes the same process as the process in FIG. 49 and in FIG. 50. The determination method of the mobile apparatus 10 executing the same process as the process in FIG. 49 and in FIG. 50 is similar to the determination method of the first specified mobile apparatus 10. Thereafter, the mobile apparatus 10 executing the same process as the process in FIG. 49 and in FIG. 50 may be referred to as "second specified mobile apparatus 10" in some cases.

<Seat Determination by Mobile Apparatus>

The seat specification unit 580 of the second specified mobile apparatus 10 can specify the seat at which a passenger is positioned in the stopped vehicle 6A as is the same with the seat specification unit 770 of the in-vehicle device 60. For example, as is the same with above <First example of seat specification method>, the seat specification unit 580 specifies a seat at which a passenger is positioned in the vehicle 6 based on an output signal of a plurality if microphones 810 in the vehicle 6. At this point, if a sound such as music is being output from the speaker 160, the seat specification unit 580 may perform, in the same manner as described above, the cancellation process for on the output signal of each microphone 810 for cancelling the output sound from the speaker 160.

Further, as is the same with above <Second example of seat specification method>, the seat specification unit 580 can specify a seat at which a passenger is positioned based on a captured image of the camera 820.

Further, as is the same with above <Third example of seat specification method>, the seat specification unit 580 can specify a seat at which a passenger is positioned based on the detection result of a plurality of load detection sensors 830.

Further, as is the same with above <Fourth example of seat specification method>, the seat specification unit 580 can specify a seat at which a passenger is positioned based on the detection result of a plurality of sponsors 840.

Further, the first notification information notified from the stopped vehicle 6A may be received by the mobile apparatus 10 in the traveling vehicle 6B. The mobile apparatus 10 that has received the first notification information in the traveling vehicle 6B operates similarly to the in-vehicle device 60 that has received the first notification information in the traveling vehicle 6B to make notification to a person in the traveling vehicle 6B. For example, in the mobile apparatus 10 that has received the first notification information in the traveling vehicle 6B, the controller 100 causes the display 120 to display above-described second notification information for a predetermined time. Alternatively, the controller 100 outputs audio for notifying that the probability that a person could unexpectedly come out from the stopped vehicle 6A ahead from the speaker 160 at least once. If the in-vehicle determiner 430b determines that the mobile apparatus 10 is present in the vehicle 6 and the stopping-movement specifying unit 410b specifies that the mobile apparatus 10 is moving, and if the mobile apparatus 10 receives the first notification information, the mobile apparatus 10 makes notification to a person in the vehicle 6.

Second Other Example of Third Embodiment

Figure 53:
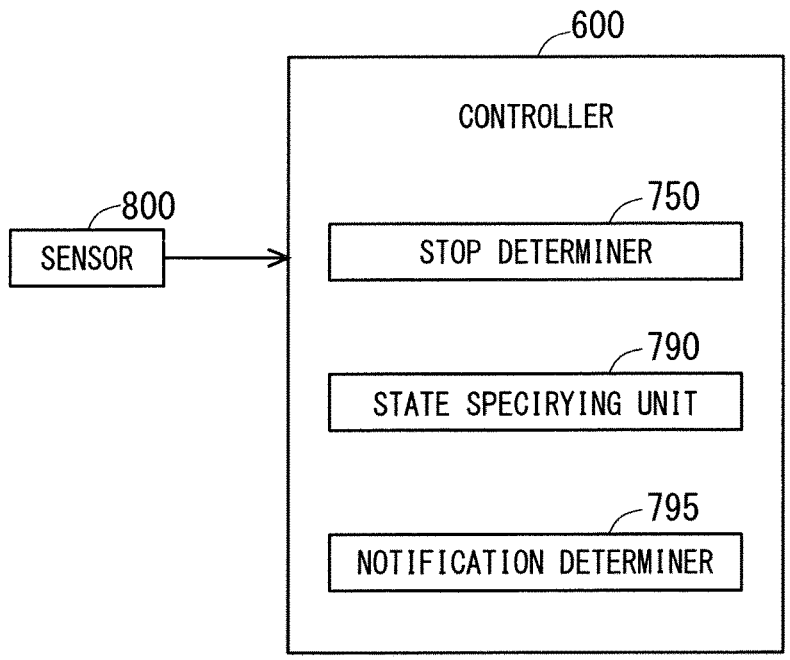
FIG. 53 illustrates a block diagram of an example of a configuration of the electronic apparatus.

FIG. 53 illustrates a block diagram of a part of an example of functional blocks formed in the controller 600 of the in-vehicle device 60 according to the present example. In the present example, the controller 600 includes the above-described stop determiner 750, the state specifying unit 790, and the notification determiner 785 as the functional blocks. Note that at least one of the state specifying unit 790 and the notification determiner 795 may be realized by a hardware circuit in which software is not required to realize the functions of the hardware circuit.

The state specifying unit 790 can specify a state in the vehicle 6 relating a passenger if the vehicle 6 is stopped. Specifically, the state specifying unit 790 can specify a first state in which passengers in the stopped vehicle 6 include only children. Also, the state specifying unit 790 can specify a second state in which passengers in the stopped vehicle 6 include only elderly persons. Also, the state specifying unit 790 can specify a third state in which passengers in the stopped vehicle 6 include only children and elderly persons.

If the state specifying unit 790 specifies any one of the first state to the third state when the vehicle 6 is stopped, the notification determiner 795 can determine the execution of notification outside the vehicle 6.

Figure 54:
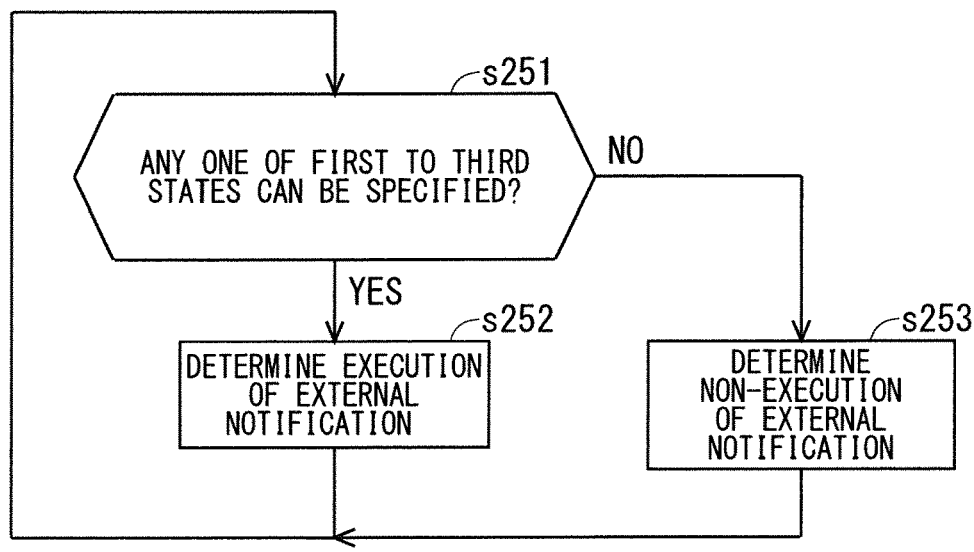
FIG. 54 illustrates a flowchart showing an example of an operation of the electronic apparatus.

FIG. 54 illustrates a flowchart showing an example of an operation of in-vehicle device 60 according to the present example if the vehicle 6 is stopped. If the stop determiner 750 determines that the vehicle 6 is stopped, the in-vehicle device 60 according to the present example repeatedly executes the process illustrated in FIG. 54.

As illustrated in FIG. 54, in Step s251, the state specifying unit 790 attempts the specification of the first to third state. In Step s251, if any one of the first to third states is specified, the notification determiner 795 determines the execution of external notification in Step s252. Thereafter, Step s251 is re-executed, and hereafter, the in-vehicle device 60 operates similarly. On the other hand, in Step s251, if not any one of the first to third states is specified, the notification determiner 795 determines the non-execution of external notification in Step s253. Thereafter, Step s251 is re-executed, and hereafter, the in-vehicle device 60 operates similarly.

Accordingly, in the present example, if the first state in which passengers in the stopped vehicle 6 include only children is specified in the state specifying unit 790, the execution of external notification is determined. Also, if the second state in which passengers in the stopped vehicle 6 include only elderly persons is specified, the execution of external notification is determined. Further, if the third state in which passengers in the stopped vehicle 6 include only children and elderly persons is specified, the execution of external notification is determined. If the passengers in the stopped vehicle 6 include only children, it can be considered that the probability that a person could unexpectedly come out from the vehicle 6 is high. Similarly, if the passengers in the stopped vehicle 6 include only elderly persons, it can be considered that the probability that a person could unexpectedly come out from the vehicle 6 is high. Similarly, if the passengers in the stopped vehicle 6 include only children and elderly persons, it can be considered that the probability that a person could unexpectedly come out from the vehicle 6 is high. Therefore, when any one of the first to third states is specified, the execution of external notification is determined; therefore, the notification can be made outside the stopped vehicle 6A if the probability that a person could unexpectedly come out from the stopped vehicle 6A. Therefore, the notification that the probability that a person could unexpectedly come out from the stopped vehicle 6A is high can be made to the driver or the like in the traveling vehicle 6B.

If the notification determiner 795 of the in-vehicle device 60 of the vehicle 6 determines the execution of external notification, the vehicle 6 makes notification outside thereof. An example of an external notification method will be described below.

First Example of External Notification According to Second Other Example of Third Embodiment In the present example, if the execution of external notification is determined in the notification determiner 795, as is in the same with above <First example of external notification according to first other example of third embodiment>, the rear lamps of the stopped vehicle 6 are turned on for a predetermined time; therefore, the notification is made outside the vehicle 6. When the execution of external notification is determined, the in-vehicle device 60 and the vehicle 6 operate in the same manner as described above.

Second Example of External Notification According to Second Other Example of Third Embodiment In the present example, if the execution of the external notification is determined in the notification determiner 795, the wireless communication unit 610 makes the notification outside the vehicle 6.

If the execution of external notification is determined, the wireless communication unit 610 is controlled by the controller 600 to transmit third notification information by the use of 700 MHz band communication. The wireless communication unit 610 transmits the third notification information by, for example, broadcasting. Accordingly, the in-vehicle device 60 of the traveling vehicle 6B present in the communication area 615 can receive the third notification information from the in-vehicle device 60 of the stopped vehicle 6A. The third notification information is information for notifying that the probability that a person could unexpectedly come out from the stopped vehicle 6A ahead is high.

Figure 55:
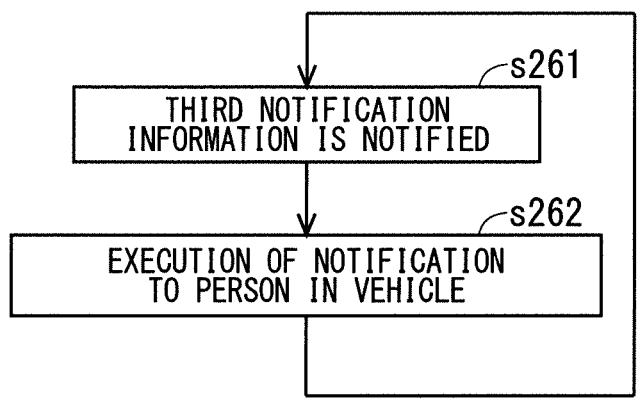
FIG. 55 illustrates a flowchart showing an example of an operation of the electronic apparatus.

FIG. 55 illustrates a flowchart showing an example of an operation of in-vehicle device 60 according to the present example if the vehicle 6 is traveling. If the stop determiner 750 determines that the vehicle 6 is not stopped, in other words, if the stop determiner 750 determines that the vehicle 6 is traveling, the in-vehicle device 60 of the vehicle 6 repeatedly executes the process illustrated in FIG. 55.

As illustrated in FIG. 55, if the in-vehicle device 60 of the traveling vehicle 6 is notified from the in-vehicle device 60 of the stopped vehicle 6A of the third notification information in Step s261, the in-vehicle device 60 of the traveling vehicle 6 executes Step s262. In Step s262, the in-vehicle device 60 makes a notification to a person in the vehicle 6 based on the third notification information the wireless communication unit 610 received in Step s261. Thereafter, Step s261 is re-executed, and hereafter, the in-vehicle device 60 operates similarly.

In Step s262 for example, the controller 600 causes the display 620 to display fourth notification information for a predetermined time. The fourth notification information is information for notifying that the probability that a person could unexpectedly come out from the stopped vehicle 6A ahead is high. Alternatively, the controller 600 outputs predetermined audio from the speaker 660 at least once. The predetermined audio includes audio for notifying that the probability that a person could unexpectedly come out from the stopped vehicle 6A ahead is high. Alternatively, the controller 600 outputs the predetermined audio from the speaker 660 at least once as well as causes the display 620 to display the third notification information for a predetermined time. Therefore, the driver or the like in the traveling vehicle 6B can recognize the probability that a person could unexpectedly come out from the stopped vehicle 6A is high.

It should be noted that contents for the third and fourth notification information are not limited to the above. Contents for the predetermined audio the in-vehicle device 60 that has received the third notification information outputs from the speaker 660 are not limited to the above.

<Specification Method of First to Third States>

Various methods for the state specifying unit 790 to specify the first to third states are conceivable. In the following, some examples of specification methods for specifying the first to third states will be described.

<First Example of Specification Method of First to Third States>

In the present example, if the specification of the first to third states is executed, the state specifying unit 790 generates instruction information for instructing the mobile apparatus 10 a passenger carries in the vehicle 6 to notify the age of the owner of the mobile apparatus 10. The wireless communication unit 610 notifies the mobile apparatus 10 the passenger carries in the vehicle 6 of the instruction information generated in the state specifying unit 790 through, for example. Wifi or the like.

In the mobile apparatus 10 that has received the instruction information, the controller 100 acquires the age included in profile information, which is stored in the storage 103, of the owner of the mobile apparatus 10. The wireless communication unit 110 notifies the in-vehicle device 60 of the age acquired by the controller 100 through, for example Wifi or the like. The age of the owner of the mobile apparatus 10 can be understood as the age of the driver carrying the mobile apparatus 10. Therefore, the age of each passenger in the vehicle 6 is notified to the in-vehicle device 60 of the vehicle 6.

In the in-vehicle device 60 to which the age of each passenger in the vehicle 6 is notified, the state specifying unit 790 determines whether each passenger corresponds to a child, an elderly person, or a category other than children or elderly persons. For example, the state specifying unit 790 determines that the passenger corresponds to a child if the notified age is less than ten years of age. Also, the state specifying unit 790 determines that the passenger corresponds to an elderly person if the notified age is 70 years of age or over. And, the state specifying unit 790 determines that the passenger corresponds to the category other than children or elderly persons if the notified age is 10 or more and less than 70 years of age. Accordingly, the state specifying unit 790 can specify whether the passengers in the vehicle 6 are only children, only elderly persons, or only children and elderly persons. That is, the state specifying unit 790 can specify the first to third states.

<Second Example of Specification Method of First to Third States>

In the specification method of the first to third states according to the present example, provision of the above-described camera 820 for imaging the inside the vehicle 6 is installed in the vehicle 6 is assumed.

The state specifying unit 790 determines, for each of the passengers in the vehicle 6, whether each passenger corresponds to a child, an elderly person, or a category other than children or elderly persons based on the captured image of the camera 820. Specifically, the passengers specification unit 790 performs an image process on the captured image of the camera 820 to specify the image of passengers included in the captured image. Then, the state specifying unit 790 estimates an age of the passenger based on the specified image of passenger. Thereafter, as is the same with above <First example of specification method of first to third states>, the state specifying unit 790 determines whether each passenger corresponds to a child, an elderly person, or the category other than children or elderly persons based on the estimated age. Therefore, the state specifying unit 790 can specify the first to third states.

It should be noted that in the above example, the state specifying unit 790 specifies all the first to third states; however, the state specifying unit 790 may specify at least one of the first to third states. For example, the state specifying unit 79) may specify only the first state of the first to third states. In this case, if the state specifying unit 790 specifies the first state, the execution of external notification is determined. Alternatively, the state specifying unit 790 may specify only the first and the second states of the first to third states. In this case, if the state specifying unit 790 specifies the first state, the execution of external notification is determined and if the state specifying unit 790 specifies the second state, the execution of external notification is determined.

As described above, at least one state of the in-vehicle device 60 according to the present example, the first state in which passengers in the stopped vehicle 6 include only children, the second state in which passengers in the stopped vehicle 6 include only elderly persons, and the third state in which passengers in the stopped vehicle 6 include only children and elderly persons is specified, the execution of external notification is determined; therefore, the convenience of the in-vehicle device 60 is improved.

<Another Service In-Vehicle Device According to Second Other Example of Third Embodiment is Applicable to>

The in-vehicle device 60 according to the second other example of the third embodiment is also applicable in a monitoring service monitoring children and elderly persons, for example.

For example, if the in-vehicle device 60 of the stopped vehicle 6 specifies the first state in Step s251 and determines the execution of external notification in Step s252, the in-vehicle device 60 of the stopped vehicle 6 may transmit fifth notification information to a pre-registered electronic mail address. For example, the in-vehicle device 60 of the vehicle 6 may transmit the fifth notification information to an electronic mail address for the mobile telephone of the owner of the vehicle 6. Alternatively, the in-vehicle device 60 may transmit the fifth notification information through Wifi, Bluetooth, or by the use of 700 MHz band communication by broadcasting. In this case, the device that has received the fifth notification information from the in-vehicle device 60 can notify people around the vehicle 6 on which the in-vehicle device 60 is mounted by displaying and so on the fifth notification information. The fifth notification information is information for notifying that the passengers in the stopped vehicle 6A are only children, for example. Alternatively, if the fifth notification information is transmitted to the pre-registered electronic mail address, the fifth notification information may be information for notifying that someone returns to the vehicle 6 in no time, for example.

Further, if the in-vehicle device 60 of the stopped vehicle 6 specifies the second state in Step s251 and determines the execution of external notification in Step s252, the in-vehicle device 60 of the stopped vehicle 6 may transmit sixth notification information, similarly to the fifth notification information, to a pre-registered electronic mail address. Alternatively, the in-vehicle device 60 may transmit the sixth notification information through Wifi, Bluetooth, or by the use of 700 MHz band communication by broadcasting. The sixth notification information is information for notifying that the passengers in the stopped vehicle 6A are only elderly persons, for example. Alternatively, if the sixth notification information is transmitted to the pre-registered electronic mail address, the sixth notification information may be information for notifying that someone returns to the vehicle 6 in no time, for example.

Further, if the in-vehicle device 60 of the stopped vehicle 6 specifies the third state in Step s251 and determines the execution of external notification in Step s252, the in-vehicle device 60 of the stopped vehicle 6 may transmit seventh notification information, similarly to the fifth and sixth notification information, to a pre-registered electronic mail address. Alternatively, the in-vehicle device 60 may transmit the seventh notification information through Wifi, Bluetooth, or by the use of 700 MHz band communication by broadcasting. The seventh notification information is information for notifying that the passengers in the stopped vehicle 6A are only children and elderly persons, for example. Alternatively, if the seventh notification information is transmitted to the pre-registered electronic mail address, the seventh notification information may be information for notifying that someone returns to the vehicle 6 in no time, for example.

It should be noted that contents for the fifth and seventh notification information are not limited to the above. Further, the fifth to seventh notification information may be the same information from one after another.

Alternatively, the in-vehicle device 60 in the vehicle 6 may determine the execution of external notification if the in-vehicle device 60 specifies any one of the first to three states and the temperature in the vehicle 6 falls within a predetermined range, instead of the in-vehicle device 60 determining the execution of external notification immediately after any one of the first to three states is specified. For example, the in-vehicle device 60 in the vehicle 6 may determine the execution of external notification if the in-vehicle device 60 specifies any one of the first to three states and the temperature in the vehicle 6 is 15° C. or lower. Alternatively, the in-vehicle device 60 in the vehicle 6 may determine the execution of external notification if the in-vehicle device 60 specifies any one of the first to three states and the temperature in the vehicle 6 is 30° C. or more. Therefore, the notification can be made outside of the vehicle 6 if the probability that children or elderly persons in the vehicle 6 could be in a dangerous state (such as development of hypothermia or heat stroke) is high. Note, the temperature in the vehicle 6 can be acquired by providing a temperature sensor in the vehicle 6. The temperature sensor may be a part of the in-vehicle device 60.

<State Specification and Notification Determination Process by Mobile Apparatus in Stopped Vehicle>

In the above example, if the in-vehicle device 60 of the stopped vehicle 6A specifies any of the first to third states, the device 60 determines the execution of external notification, however, the mobile apparatus in the stopped vehicle 6A may determine the execution of external notification if the device 10 specifies any of the first to third states. That is, the mobile apparatus 10 in the stopped vehicle 6A may execute the same process as the process illustrated in FIG. 54. FIG. 56 illustrates a block diagram showing an example of a configuration of the controller 100) of the mobile apparatus 10 in this case.

The controller 100 illustrated in FIG. 56 includes a state specifying unit 590 in place of the number of passengers specification unit 570 of the controller 100 illustrated in FIG. 46 described above.

If the mobile apparatus 10 is present in the stopped vehicle 6A, the state specifying unit 590 of the mobile apparatus 10 can specify the first state in which passengers in the stopped vehicle 6 include only children, the second state in which passengers in the stopped vehicle 6 include only elderly persons, and the third state in which passengers in the stopped vehicle 6 include only children and elderly persons.

If the in-vehicle determiner 430b determines that the mobile apparatus 10 is present in the vehicle 6 and the stopping-movement specifying unit 410b specifies that the mobile apparatus 10 is stopped, the mobile apparatus 10 repeatedly executes the same process as the process illustrated in FIG. 54 above. That is, the mobile apparatus 10 repeatedly executes the same process as the process in FIG. 54 and if the mobile apparatus 10 is present in the stopped vehicle 6A.

In Step corresponding to Step s251 in FIG. 54, the state specifying unit 590 of the mobile apparatus 10 of the stopped vehicle 6A attempts to specify the first to third states. If the state specifying unit 590 specifies any of the first to third states, the notification determiner 500b determines the execution of external notification in Step corresponding to Step s252. In this case, if the state specifying unit 590 specifies the first state, the execution of external notification is determined, if the state specifying unit 590 specifies the second state, the execution of external notification is determined, and if the state specifying unit 590 specifies the third state, the execution of external notification is determined. On the other hand, If the state specifying unit 590 cannot specify any of the first to third states, the notification determiner 500b determines the non-execution of external notification in Step corresponding to Step s253.

Note, the state specifying unit 590 may specify at least one of the first to third states.

If the mobile apparatus 10 in the stopped vehicle 6A determines the execution of external notification, as is the same with above <First example of external notification according to second other example of third embodiment>, the notification is made outside the stopped vehicle 6A by turning on the real lamps of the stopped vehicle 6A for the predetermined time. In this case, the controller 100 of the mobile apparatus 10 that has determined the execution of external notification causes the wireless communication unit 110 to transmit the lighting instruction information for instructing lighting of the rear lamps. The lighting instruction information transmitted from the wireless communication unit 110 is received by the in-vehicle device 60 of the vehicle 6. The in-vehicle device 60 that has received the lighting instruction information notifies the vehicle control device of the lighting instruction information. The vehicle control device that has received the lighting instruction information turns on the rear lamps of the vehicle 6, in the same manner as described above.

Further, if the mobile apparatus 10 in the stopped vehicle 6A determines the execution of external notification, as is the same with above <Second example of external notification according to second other example of third embodiment>, the wireless communication unit 110 of the mobile apparatus 10 may make notification outside the stopped vehicle 6A. In this case, the wireless communication unit 110 transmits the third notification information above by the use of, for example, 700 MHz band communication by broadcasting. The in-vehicle device 60 of the traveling vehicle 6B that has received the third notification information from the mobile apparatus 10 operates similarly to the above.

Note, if a plurality of mobile apparatuses 10 are present in the stopped vehicle 6A, any one mobile apparatus 10 of a plurality of mobile apparatuses 10 executes the same process as the process in FIG. 54. The determination method of the mobile apparatus 10 executing the same process as the process in FIG. 54 is similar to the determination method of the first specified mobile apparatus 10. Thereafter, the mobile apparatus 10 executing the same process as the process in FIG. 54 may be referred to as "third specified mobile apparatus 10" in some cases. Also, a passenger (user 9) carrying the third specified mobile apparatus 10 in the vehicle 6 may be referred to as "third specified passenger" in some cases.

<Specification Method of First to Third States by Mobile Apparatus>

The state specifying unit 590 of the third specified mobile apparatus 10 can specify the first to third states as is the same with the state specifying unit 790 of the in-vehicle device 60. For example, as is the same with above <First example of specification method of first to third states>, if the specification of the first to third states is executed, the state specifying unit 590 generates instruction information for instructing the mobile apparatus 10 a passenger other than the third specified passenger carries in the vehicle 6 to notify the age of the owner of the mobile apparatus 10. The wireless communication unit 110 notifies the mobile apparatus 10 the passenger other than the third passenger carries in the vehicle 6 of the instruction information generated in the state specifying unit 590 through, for example, Wifi or the like.

In the mobile apparatus 10 that has received the instruction information, the controller 100 acquires the age included in profile information, which is described in the storage 103, of the owner of the mobile apparatus 10. The wireless communication unit 110 notifies the third specified mobile apparatus 10 of the age acquired by the controller 100 through, for example Wifi or the like. Therefore, the age of each passenger other than the third specified passenger in the stopped vehicle 6A can be notified to the third specified mobile apparatus 10 in the stopped vehicle 6A.

In the third specified mobile apparatus 10 that has been notified the age of each passenger is notified, the state specifying unit 590 determines, similarly to above, whether each passenger other than the third specified passenger correspond to a child, an elderly person, or a category other than children or elderly persons. In the third specified mobile apparatus 10, the state specifying unit 590 acquires the age included in profile information, which is described in the storage 103, of the owner of the third specified mobile apparatus 10. Then, the specification unit 590 determines, similarly to above, whether each passenger other than the third specified passenger correspond to a child, an elderly person, or a category other than children or elderly persons based on the acquired ages. Accordingly, the state specifying unit 590 can specify whether the passengers in the vehicle 6 each are only children, only elderly persons, or only children and elderly persons. That is, the state specifying unit 590 can specify the first to third states.

Also, as is the same with above <Second example of specification method of first to third states>, the state specifying unit 590 can determine, for each of the passengers in the vehicle 6, whether each passenger corresponds to a child, an elderly person, or a category other than children or elderly persons based on the captured image of the camera 820.

Note, the third notification information notified from the stopped vehicle 6A may be received by the mobile apparatus 10 in the traveling vehicle 6B. The mobile apparatus 10 that has received the third notification information in the traveling vehicle 6B operates similarly to the in-vehicle device 60 that has received the third notification information in the traveling vehicle 6B to make notification to a person in the traveling vehicle 6B. For example, in the mobile apparatus 10 that has received the third notification information in the traveling vehicle 6B, the controller 100 causes the display 120 to display above-described fourth notification information for a predetermined time. Alternatively, the controller 10) outputs audio for notifying that the probability that a person could unexpectedly come out from the stopped vehicle 6A ahead from the speaker 160 at least once. If the in-vehicle determiner 430b determines that the mobile apparatus 10 is present in the vehicle 6 and the stopping-movement specifying unit 410b specifies that the mobile apparatus 10 is moving, and if the mobile apparatus 10 receives the third notification information, the mobile apparatus 10 makes notification to a person in the vehicle 6.

Alternatively, if the mobile apparatus 10 in the stopped vehicle 6A specifies at least one of the first to third states and if the execution of external notification is determined if any of the first to third states is specified, the mobile apparatus 10 can be applicable in a monitoring service monitoring children and elderly persons, for example, similarly to the above.

For example, if the mobile apparatus 10 of the stopped vehicle 6 specifies the first state and determines the execution of external notification, the mobile apparatus 10 of the stopped vehicle 6 may transmit the above fifth notification information to the pre-registered electronic mail address. Alternatively, the mobile apparatus 10 may transmit the fifth notification information through Wifi, Bluetooth. or by the use of 700 MHz band communication by broadcasting.

Alternatively, if the mobile apparatus 10 of the stopped vehicle 6 specifies the second state and determines the execution of external notification, the mobile apparatus 10 of the stopped vehicle 6 may transmit the above sixth notification information to the pre-registered electronic mail address. Alternatively, the mobile apparatus 10 may transmit the sixth notification information through Wifi, Bluetooth. or by the use of 700 MHz band communication by broadcasting.

Alternatively, if the mobile apparatus 10 of the stopped vehicle 6 specifies the third state and determines the execution of external notification, the mobile apparatus 10 of the stopped vehicle 6 may transmit the above seventh notification information to the pre-registered electronic mail address. Alternatively, the mobile apparatus 10 may transmit the seventh notification information through Wifi, Bluetooth, or by the use of 700 MHz band communication by broadcasting.

Alternatively, the mobile apparatus 10 in the stopped vehicle 6 may determine the execution of external notification if the mobile apparatus 10 specifies any one of the first to three states and the temperature in the vehicle 6 falls within a predetermined range, instead of the mobile apparatus 10 determining the execution of external notification immediately after any one of the first to three states is specified. For example, the mobile apparatus 10 in the vehicle 6 may determine the execution of external notification if the mobile apparatus 10 specifies any one of the first to three states and the temperature in the vehicle 6 is 15° C. or lower. Alternatively, the mobile apparatus 10 in the vehicle 6 may determine the execution of external notification if the mobile apparatus 10 specifies any one of the first to three states and the temperature in the vehicle 6 is 30° C. or more. The mobile apparatus 10 may set the temperature detected by an individual temperature sensor provided in the vehicle 6, apart from the mobile apparatus 10 to the temperature in the vehicle 6 or may set the temperature detected by a temperature sensor provided in the mobile apparatus 10 to the temperature in the vehicle 6.

In the above first to third examples, the electronic apparatus 10 is represented by a cellular phone such as a smartphone, however, the electronic apparatus 10 may be represented by other types of electronic apparatus. The electronic apparatus 10 may be represented by, for example, a tablet terminal, a personal computer, a wearable device, and so forth. The wearable device adopted as the electronic apparatus 100 may be a wrist wearable type such as a wristband type or a wristwatch type, a head-wearable type such as a headband type or an eyeglass type, a type that is worn on body like clothes, or the like.

As described above, while the electronic apparatuses 10, 60 or the like has been described in detail, the forgoing description in all aspects illustrative and not restrictive. The respective modifications described above are appropriately applicable in combination as long as they are inconsistent each other. It is understood that numerous other modifications and variations that are not exemplified can be devised without departing from the scope of the disclosure.

The invention claimed is:
1. An electronic apparatus, comprising:
at least one processor configured to:

execute in-vehicle determination to determine whether a first user being a user of the electronic apparatus is present in a vehicle; and execute a determination process to determine whether the electronic apparatus notifies outside the electronic apparatus based on a result of the in-vehicle determination, wherein the at least one processor is configured to determine whether the electronic apparatus is positioned within a predetermined area, and the at least one processor is configured
to execute the determination process when the electronic apparatus is determined to be positioned within the predetermined area, and
not to execute the determination process when the electronic apparatus is not determined to be positioned within the predetermined area.

2. The electronic apparatus according to claim 1, further comprising:
a communication unit configured to communicate with a communication device mounted on the vehicle, wherein
the at least one processor is configured to determine whether the first user is present in the vehicle based on whether the communication unit receives predetermined information transmitted from the communication device.

3. The electronic apparatus according to claim 1, wherein
the at least one processor is configured to determine whether the first user is present in the vehicle based on movement of an other electronic apparatus that is different from the electronic apparatus and determines that a second user being a user of the other electronic apparatus is present in the vehicle and movement of the electronic apparatus.

4. The electronic apparatus according to claim 3, wherein
the at least one processor is configured to determine whether the first user is present in the vehicle based on at least one of a movement stop timing and a moment start timing of the other electronic apparatus and the electronic apparatus.

5. The electronic apparatus according to claim 3, wherein
the at least one processor is configured to determine whether the first user is present in the vehicle based on shaking of the other electronic apparatus and the electronic apparatus.

6. The electronic apparatus according to claim 1, wherein
the at least one processor is configured to determine whether the first user is present in the vehicle based on a state of air around the electronic apparatus.

7. The electronic apparatus according to claim 6, wherein
the at least one processor is configured to determine whether the first user is present in the vehicle based on a detection result of a sensor configured to detect ambient gas of the electronic apparatus as the state of air.

8. The electronic apparatus according to claim 6, wherein
the at least one processor is configured to determine whether the first user is present in the vehicle based on a detection result of a sensor configured to detect ambient smell of the electronic apparatus as the state of air.

9. The electronic apparatus according to claim 1, wherein
the at least one processor is configured to specify that movement of the electronic apparatus is stopped,
the at least one processor is configured to specify at least one of opening and closing of a door of the vehicle, and
the at least one processor is configured to determine that the first user has left the vehicle when the at least one of opening and closing of the door has been specified after specification that the movement of the electronic apparatus is stopped when the first user is determined to be present in the vehicle.

10. The electronic apparatus according to claim 9, wherein
the at least one processor is configured to specify at least one of opening and closing of the door of the vehicle based on shaking of the electronic apparatus.

11. The electronic apparatus according to claim 9, wherein
the at least one processor is configured to specify that the first user moves by oneself without riding any conveying device, and
the at least one processor is configured to determine that the first user has left the vehicle when that the first user moves by oneself is specified after that the movement of the electronic apparatus is stopped is specified when the first user is determined to be present in the vehicle.

12. The electronic apparatus according to claim 1, wherein
the at least one processor is configured to specify that movement of the electronic apparatus is stopped, and
the at least one processor is configured to determine that the first user has left the vehicle when the at least one of opening and closing of the door has been notified from the vehicle after that the movement of the electronic apparatus is stopped is specified when the first user is determined to be present in the vehicle.

13. The electronic apparatus according to claim 12, wherein
the at least one processor is configured to specify that the first user moves by oneself without riding any conveying device, and
the at least one processor is configured to determine that the first user has left the vehicle when that the first user moves by oneself is specified after that the movement of the electronic apparatus is stopped is specified when the first user is determined to be present in the vehicle.

14. The electronic apparatus according to claim 1, wherein
the at least one processor is configured
to execute the in-vehicle determination when the electronic apparatus is determined to be positioned within the predetermined area, and
not to execute the in-vehicle determination when the electronic apparatus is not determined to be positioned within the predetermined area.

15. The electronic apparatus according to claim 1, wherein
the at least one processor is configured to specify a moving means of the first user, and
the at least one processor is configured to execute the in-vehicle determination in accordance with a type of the specified moving means.

16. A control device which is included in an electronic apparatus and is configured to control an operation of the electronic apparatus, the control device comprising:
at least one processor configured to:
execute in-vehicle determination to determine whether a user of the electronic apparatus is present in a vehicle; and execute a determination process to determine whether the electronic apparatus notifies outside the electronic apparatus based on a result of the in-vehicle determination, wherein the at least one processor is configured to specify that movement of the electronic apparatus is stopped, and the at least one processor is configured to determine that the first user has left the vehicle when the at least one of opening and closing of the door has been notified from the vehicle after that the movement of the electronic apparatus is stopped is specified when the first user is determined to be present in the vehicle.

17. A computer-readable non-transitory storage medium storing a control program, the control program configured to control an electronic apparatus and cause the electronic apparatus to execute:

in-vehicle determination to determine whether a user of the electronic apparatus is present in a vehicle;

a determination process to determine whether the electronic apparatus notifies outside the electronic apparatus based on a result of the in-vehicle determination;

a specification process to specify that movement of the electronic apparatus is stopped and to specify at least one of opening and closing of a door of the vehicle; and a second determination process to determine that the first user has left the vehicle when the at least one of opening and closing of the door has been specified after specification that the movement of the electronic apparatus is stopped when the first user is determined to be present in the vehicle.

18. An operation method of an electronic apparatus, comprising;

executing in-vehicle determination to determine whether a user of the electronic apparatus is present in a vehicle;

executing a determination process to determine whether the electronic apparatus notifies outside the electronic apparatus based on a result of the in-vehicle determination; and executing a specification process to specify a moving means of the first user, wherein the in-vehicle determination is executed in accordance with a type of the specified moving means.

* * * * *